United States Patent [19]
Hollen et al.

[11] Patent Number: 5,708,633
[45] Date of Patent: Jan. 13, 1998

[54] METHOD AND APPARATUS FOR MANUFACTURING INFORMATION STORAGE DEVICES

[75] Inventors: Zdenek A. Hollen; Russell A. Meyer, both of Colorado Springs; Kent Murphy, Parker; Robert G. Russell, Yoder; Christopher J. Monsen, Monument; Herbert E. Heaton; Christopher A. Knorr, both of Colorado Springs; David L. Papiernik, Calhan; James K. Louie, Colorado Springs; Leonardus J. Grassens, Monument; Wilhelm Taylor, Colorado Springs, all of Colo.; Charles DePuy, Austin, Tex.; Douglas E. Hoover, Colorado Springs, Colo.; Gary Anderson, Colorado Springs, Colo.; Hollis O'Neal Hall, II, Colorado Springs, Colo.

[73] Assignee: Discovision Associates, Irvine, Calif.

[21] Appl. No.: 596,000

[22] Filed: Feb. 6, 1996

Related U.S. Application Data

[63] Continuation-in-part of Ser. No. 475,930, Jun. 7, 1995.

[51] Int. Cl.[6] ........................................................ G11B 7/00
[52] U.S. Cl. ........................................ 369/44.11; 369/44.14; 359/813
[58] Field of Search ............................. 369/44.11, 44.21, 369/44.14, 44.22, 244, 249, 256; 59/813, 814, 823, 824

[56] References Cited

U.S. PATENT DOCUMENTS

| | | | |
|---|---|---|---|
| 5,132,944 | 7/1992 | Berg | 369/44.14 |
| 5,313,332 | 5/1994 | Schell et al. | 369/44.15 |
| 5,347,500 | 9/1994 | Eguchi | 369/44.22 |
| 5,493,546 | 2/1996 | Kasahara | 369/44.14 |
| 5,532,989 | 7/1996 | Getreuer et al. | 369/44.15 |

*Primary Examiner*—Thang V. Tran
*Attorney, Agent, or Firm*—Ronald J. Clark; Robert T. Braun; Donald Bollella

[57] ABSTRACT

A method and apparatus for manufacturing information storage devices is described herein. Two embodiments of the invention are disclosed. In particular, the invention includes, but is not limited to, a bearing insertion device, a lens insertion device, a coarse coil gluing tool, a spring gluing tool, a device for gluing pole pieces, a pentaprism insertion and inspection tool, a constants and transfers test, an optics module alignment device, wedge, microprism and beam-splitter insertion devices, a read channel alignment test, a mass balance attachment invention, a position sensor alignment tool, an invention for the attachment of focus and radial coils, a quality control test for test an optical storage device prior to insertion of the objective lens, and a servo system test. The invention described herein is designed to manufacture information storage devices with increased quality and efficiency.

17 Claims, 85 Drawing Sheets

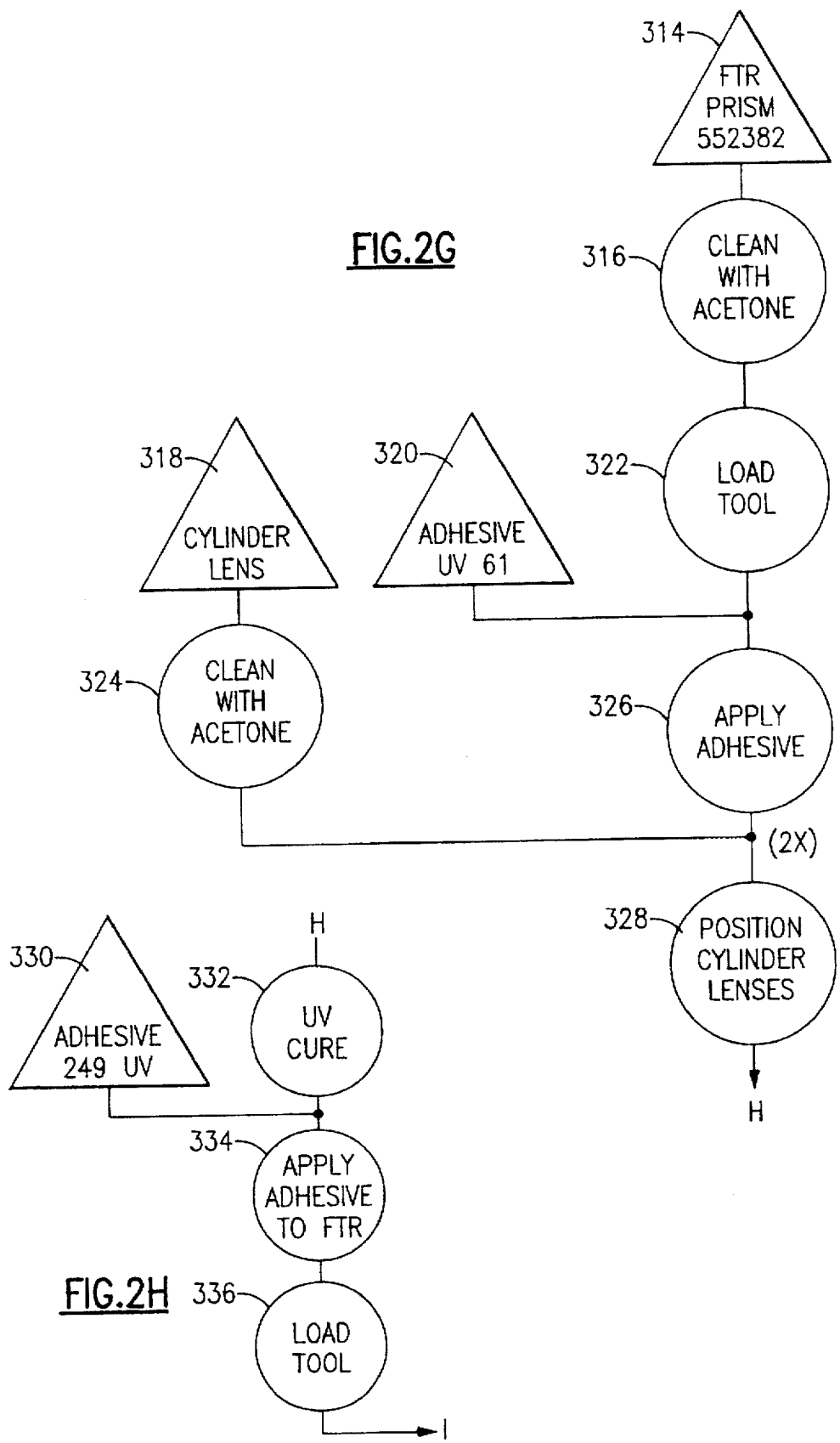

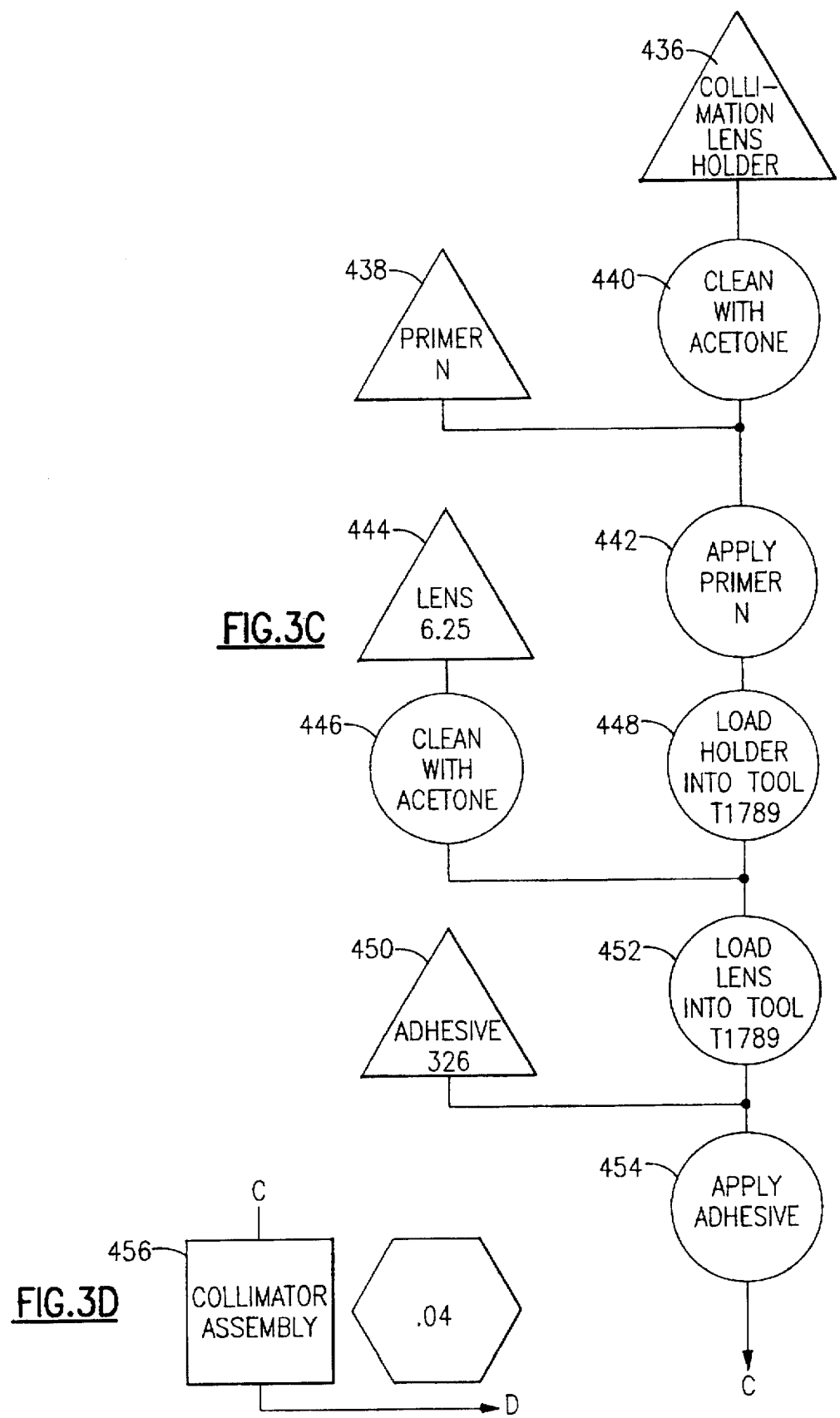

A=INNER RADIUS
B=OUTER RADIUS

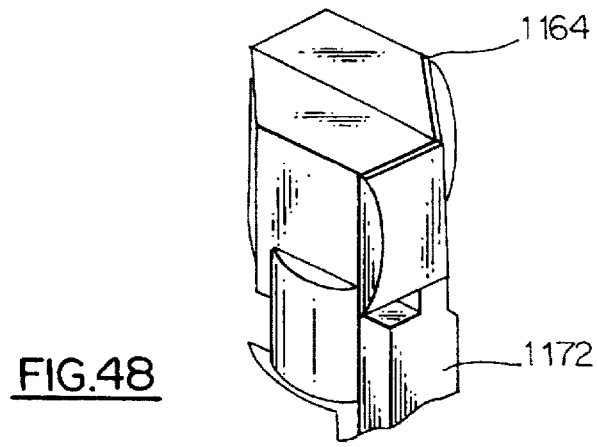
FIG.48
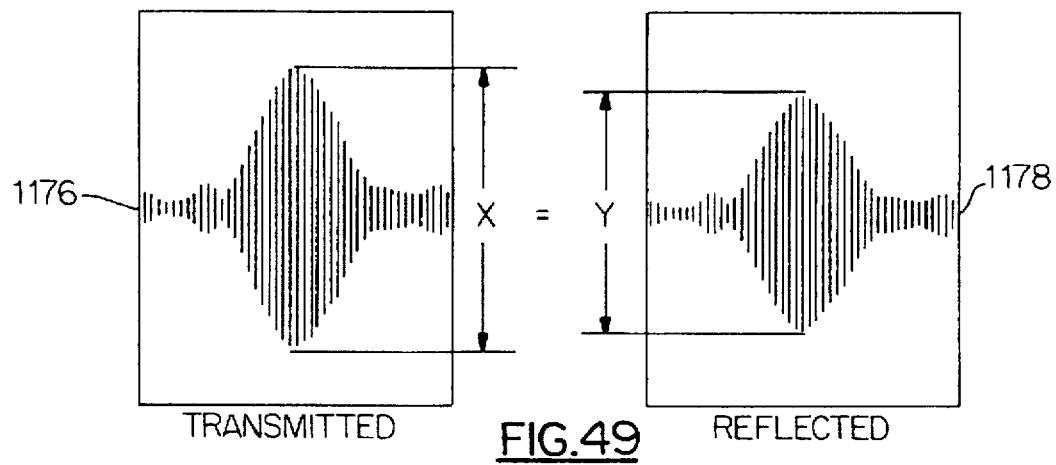
TRANSMITTED        FIG.49        REFLECTED
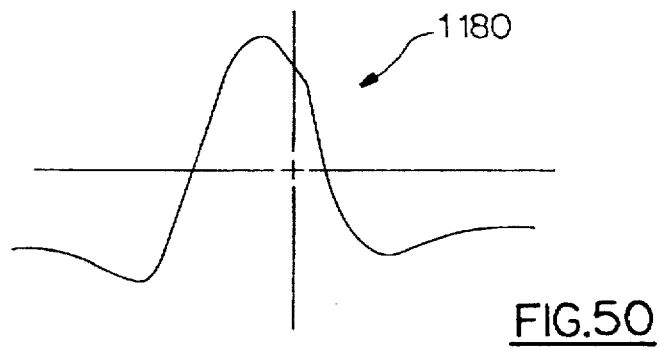
FIG.50

METHOD AND APPARATUS FOR
MANUFACTURING INFORMATION
STORAGE DEVICES

CROSS REFERENCE TO RELATED APPLICATIONS

This application is a continuation-in-part of U.S. patent application Ser. No. 08/475,930, filed Jun. 7, 1995.

BACKGROUND OF THE INVENTION

1. Field of the Invention

This invention relates to the manufacture of information storage devices. More particularly this invention relates to the manufacture of magneto-optical disc drives.

2. Description of the Related Art

In the past, the assembly and manufacture of information storage devices has been largely time consuming and prone to quality control problems. The latest optical storage devices have only magnified these problems. A general demand for quicker access times and greater reliability has translated into a general demand for better manufacturing apparatuses and processes. For example, the newest magneto-optical drives place extreme importance on a well adjusted optical system. These drives operate by the Kerr Effect. If the optical system is not finely tuned, then the drive will fail.

One way of ensuring a quality information storage device is to increase labor and quality control. The increased labor will allow more time per drive for alignment and adjustment. The increased quality control will reject substandard drives. The disadvantage is a dramatically increased cost. Parts and unacceptable devices are discarded upon failure. A better strategy is to manufacture storage devices with maximized quality and efficiency.

For example, the demand for lower access times has increased the operating stresses internal to an optical drive. Typically, an optical carriage will be powered by a linear motor across two rails during operation. This system is subject to severe acceleration and deceleration during searches for information. Naturally, the tolerances required during manufacturing must increase. Customers have returned drives with failures in the bearings that support the optical head on the rails and with failures in the coils used in the linear motors. These types of failures completely immobilize the information storage device.

According to one aspect of the present invention, multiple bearings can be accurately press fitted into an optical carriage using the bearing insertion method and apparatus described herein. In the past, only one bearing was inserted at a time by hand. Washers were used to help the assembler better position the bearings. The present invention saves time by allowing for the accurate insertion of multiple bearings.

The coils used in the linear motor, also called the coarse coils, are subjected to tremendous stress but must maintain very tight tolerances. Coarse coils are subject to loosening which leads to failure. In the past, coarse coils were positioned and glued by hand. A technician would align one coil manually and attempt to stabilize the coil while gluing. The technician would later assemble the matching coil. In the present invention, efficiency and accuracy is improved by gluing two coils simultaneously.

As mentioned previously, parts and labor are the most expensive elements of an information storage device. This is particularly true with the optical elements in an optical information storage device. In the past, optical elements were positioned by hand. An assembler would hold the elements in place and apply glue. Quality control would later determine if the optical part was properly placed. The problem with this method is that in the case of a misplaced piece additional labor was uselessly added to a failing drive. Typically, any repair attempt destroys the glued part, and increases labor cost. In the present invention, optics are inspected during the assembly or immediately following assembly. Immediate optical feedback using an external laser, partially assembled player optics, or an inspection camera allows immediate reworking of a problematic part. For example, an objective lens is a common element to all types of optical information storage devices. In the present invention, a camera is used to check the installation of the lens during the installation process. After the lens has been glued or otherwise affixed, then an optical device such as an autocollimator measures the performance of the glued assembly.

Attachment of a beamsplitter in the optics of the device is yet another improvement provided by the present invention. According to this invention, the beamsplitter is held and positioned in three dimensions while an external laser simulates actual working conditions using the partially assembled device. Immediate feedback allows an operator to adjust the position and attachment of the beamsplitter. Since the beamsplitter is being tested with the actual optics, it is guaranteed to function.

SUMMARY OF THE INVENTION

It is an object of the present invention to improve the manufacturing precision of an information storage device.

It is another object of the invention to provide the efficient assembly of an information storage device.

The invention provides for the assembly of a carriage subassembly that moves along rail guides. This is accomplished by aligning a plurality of bearings into a plurality of feeder tubes that can each hold a plurality of bearings. The carriage has a plurality of bearing mounts, and is placed onto a carriage support structure having a plurality of bearing shaft clearance grooves. A supporting face is provided on the carriage support structure for support of the bearing mounts. After ensuring that the bearing mounts and the bearing shaft clearance grooves are aligned, the aligned bearings are simultaneously press fitted into the bearing mounts. According to this technique, multiple bearings may be press fitted at the same time.

In one aspect of the invention, a bearing insertion tool is provided, comprising a carriage support structure adapted to receive and locate a carriage, wherein the carriage has at least two bearing mounts. At least two feeder tubes are adapted to hold several bearings in an aligned position, and the carriage support structure has at least two bearing shaft clearance grooves. The bearings are aligned with the bearing mounts and the bearing shaft clearance grooves to allow press fitting of multiple bearings into a carriage.

The invention provides a gluing tool, comprising a nest suited for locating a carriage thereon, and having a portion suited for magnetic attraction, such as a magnet. An upper magnet is adapted to receive a part to be glued to the carriage. The nest portion and the upper magnet are sufficiently attracted to hold a part therebetween during curing of the glue.

In another aspect of the invention gluing is accomplished by locating multiple carriages into corresponding multiple nests, each of the nests having a first portion suitable for magnetic attraction. Multiple holding tools, each adapted to receive a part to be glued to the carriage and being magnetically attracted to the first portion are provided. The parts are then glued to corresponding multiple carriages using multiple holding tools.

The invention provides a measuring tool for measuring the tension of a preload bearing, comprising at least one rail guide adapted to receive a carriage having a non-preload bearing. The rail guide is in contact with the preload bearing and the non-preload bearing. A tab makes electrical contact with a bearing. The tool includes a circuit capable of sensing electrical contact between the tab, the carriage, the non-preload bearing and the rail guide. A force measuring transducer is movable to measure a force applied to the carriage, wherein the circuit has the capability to sense the force on the force measuring transducer when electrical contact between the rail guide and preloaded bearing is broken.

The invention provides a process for measuring the tension on a preload bearing, comprising the steps of forming an electrical contact between a non-preload bearing and a rail guide, pushing on a carriage having a preload bearing, and measuring the pushing force using a force measuring transducer when electrical contact is broken between the non-preload bearing and the rail guide.

The invention provides a pole piece gluing assembly, comprising an XY clamp to hold a carriage, and a Z clamp designed to hold the carriage. The XY clamp and Z clamp act to fix the carriage in three dimensional space. A nest has top pole pieces attached and is adapted to receive the carriage. The top pole pieces are adapted to mate, engage and accurately locate the pole pieces to be glued.

In accordance with an aspect of the invention, a process for accurately gluing lower pole pieces to a carriage comprises the steps of positioning the lower pole pieces onto upper pole pieces adapted to mate and locate the lower pole pieces. Glue is applied to the lower pole pieces. A carriage is loaded into a nest, and the carriage is clamped for a predetermined amount of time while the glue cures.

The invention provides a tool for attaching and inspecting an optical element, comprising a rail guide for accepting and locating a carriage, and a vacuum chuck for holding the optical element. The vacuum chuck is movable for placing the optical element and stabilizing the optical element in relationship to the carriage to allow an adhesive to cure. An inspection laser emits light through the optical element, and an inspection camera views the light passing through the optical element.

The invention provides a process for attaching and inspecting an optical element, comprising the steps of positioning a carriage in a fixed location, loading the optical element onto a holding means, inspecting the optical element using a laser inspection device, and gluing the optical element to the carriage using the holding means to stabilize the optical element while the glue is curing. The optical element is reinspected after gluing using the laser inspection device.

The invention provides a coarse coil attachment tool, comprising a body having at least one guide rail for locating a carriage, and at least two coil arms adapted to locate and hold coarse coils. The coil arms are movably attached to the body for movement between a first position and a second position, wherein the first position is a loading position in which the coil arms are accessible, and the second position is an attachment position. The coil arms locate and attach the coils precisely in order to establish proper clearance for the pole pieces of a linear motor.

The invention provides a process for attaching coils to a carriage for a disc drive, comprising the steps of mounting at least two coils to a coarse coil attachment tool, mounting the carriage on the coarse coil attachment tool, applying a substantially thick layer of adhesive to the carriage body, and positioning the coils held in the coarse coil attachment tool in contact with the adhesive in order to attach the coils to the carriage. Excessive adhesive is removed, and remaining adhesive on the carriage body is allowed to set. The adhesive forms an adjustable gap to allow for variations in individual coil dimensions.

An assembly tool is provided in accordance with the invention for assembling an actuator, a focus coil, and radial coils. The tool comprises a body having a means for attaching and holding an actuator, and multiple clamps attached to the body. Each clamp is independently adjustable and functions to clamp a portion of a coil, so that multiple coils can be accurately positioned and attached to the actuator. The tool is employed by loading the focus coil and actuator onto a holding means, wherein the holding means is disposed on the assembly tool. The radial coils are loaded using the multiple clamps disposed on the assembly tool for clamping the actuator, focus coil, and radial coils together, and a clamp is partially loosened to adjust the radial coils.

The invention provides a lens attachment tool, comprising a body having an attached visual inspection device, such as a camera, for inspecting an objective lens, and a vacuum chuck that is movably connected to the attachment tool body. The vacuum chuck is adapted to hold and position the objective lens during attachment of the lens.

A lens can be attached according to one aspect of the invention by holding the lens using a holding means, such as a vacuum chuck, positioning the lens for attachment into an actuator, while holding the lens with the holding means, and attaching the lens to the actuator while still holding the lens with the holding means. The lens can be attached to the actuator with glue, and can be inspected prior to attachment.

The invention provides a process for inspecting an objective lens attached to a carriage assembly, wherein the carriage assembly is designed to be incorporated into an information storage device. Prior to incorporating the carriage assembly into an information storage device, the lens is illuminated, and driven through focus and tracking movements. The light is sensed with an autocollimator to determine performance of the lens during the focus and tracking movements.

The invention provides a test stand for a baseplate assembly, comprising a rotatable base capable of tilting the baseplate assembly, drive electronics capable of driving the baseplate assembly in accordance with its functions in a disc drive, and a computer for controlling the drive electronics and baseplate assembly. The computer is connected to suitable sensors, wherein it is capable of sensing motor noise, a constant of acceleration, and seek capability. In accordance with an aspect of the invention a process for testing a baseplate assembly is provided in conjunction with the test stand, comprising the steps of connecting the baseplate assembly to drive electronics, driving the assembly through high frequency and low frequency searches, and sensing motor noise, acceleration capability, seek capability and dynamic stability of the baseplate assembly.

The invention provides an apparatus for aligning a laser contained in an optics module that designed to attach to a baseplate assembly, comprising a positioning tool capable of clamping onto the optics module. The positioning tool is movable in order to align the optics module with the baseplate assembly. It further includes means for energizing the laser in order that the laser light enter and exit the baseplate assembly, and a photodetector for sensing the condition of the laser light as it exits the baseplate assembly. In accordance with an aspect of the invention, a process is provided in conjunction with the apparatus for aligning a laser, comprising the steps of clamping the optics module, energizing the laser, wherein the energized laser sends laser light through a baseplate assembly. The process further includes the steps of sensing the laser light issuing from the baseplate assembly, and adjusting the optics module to maximize the amount of sensed laser light.

The invention provides a process for aligning a prism and photodetector assembly contained in an optical drive, comprising the steps of reading a disc using the optical drive and generating a read signal from a reflected beam, moving the photodetector assembly to maximize the read signal, and rotating the prism and photodetector assembly to align the prism and the reflected beam in terms of phase.

The invention provides an apparatus for attaching a prism to a substrate, comprising a microscope that presents an image of an outline of a substrate and a prism to an operator. The apparatus further includes means for aligning the substrate with the outline of the substrate, means for aligning the prism with the outline of the prism, and means for holding the prism during attachment of the prism to the substrate.

The invention provides a method of manufacturing an optical disc drive which has a movable carriage for carrying an actuator which incorporates an objective lens for focusing a beam of radiant energy, for example laser light, onto a storage medium, for example an optical disc. The disc drive includes a head assembly through which radiant energy passes. The path of the energy extends between a source of radiant energy and the optical disc. Prior to incorporating the objective lens in the actuator, a deflector is provided in the carriage for deflecting the beam into the actuator. The carriage and the actuator are positioned proximate the head assembly, and a beam of radiant energy is passed through the head assembly to strike the deflector, wherein the beam is deflected by the deflector through the actuator. This is accomplished by disposing a collimator proximate the laser, placing the source of radiant energy in the head assembly, and directing the emission of radiant energy toward the collimator. The path of the beam is then adjusted to minimize optical aberrations of the head assembly and the deflector by disposing an autocollimator perpendicular to the front face of the head assembly, and placing an interferometer beyond the actuator in the path of the beam. An operator manipulates the source of radiant energy and the collimator in order to optimize alignment and minimize optical aberrations. Once it has been determined that the beam alignment of the carriage and the actuator meet a predetermined standard, the objective lens is inserted in the actuator.

In an aspect of the invention, a pentaprism is installed in the actuator to provide the deflector.

In another aspect of the invention, a guide, such as a pair of parallel rails, is disposed on a baseplate for guiding the carriage in linear motion relative the baseplate, and the carriage is installed on the guide. After inserting the objective lens in the actuator, the optical axis of the objective lens is aligned with respect to the baseplate.

The invention further provides a method of manufacturing an optical disc drive which includes the steps of assembling a carriage assembly and a magnetic drive therefor, wherein the carriage assembly includes a linear actuator and an initially lensless objective lens assembly suspended therein. A pentaprism in the linear actuator is aligned so as to direct an incident light beam toward the objective lens assembly. A tilt-over-stroke test is performed on the carriage assembly and the lensless objective lens assembly in a procedure wherein a laser is installed in a head assembly having a collimator. The head assembly is placed on a head support module, and a bias coil assembly is installed on a baseplate. A read detector is mounted in the head assembly, and the carriage assembly is disposed on a carriage support module proximate the head assembly. A beam of radiant energy from the laser is directed through the head assembly and the pentaprism for prealignment thereof. The beam is prealigned in order to minimize optical aberrations of the head assembly and the pentaprism. After completion of the prealignment, the head assembly and the carriage assembly are mounted on a baseplate. An objective lens is then inserted in the installed lensless objective lens assembly, and its optical axis is aligned with the baseplate.

In one aspect of the invention, the laser is installed by press fitting.

In another aspect of the invention the carriage support module comprises a rail for slidably receiving the carriage assembly thereon.

In yet another aspect of the invention, the beam is prealigned according to the following procedure. An autocollimator is disposed perpendicular to the front face of the head assembly. An interferometer is placed beyond the carriage assembly in the path of the beam. Then the laser and the collimator are manipulated with reference to the autocollimator and the interferometer until alignment is achieved.

In still another aspect of the invention, the tilt-over-stroke test is performed by inserting a temporary optical element in the lensless objective lens assembly, and passing a beam of light is passed through the temporary optical element. The autocollimator monitors the beam as the objective lens assembly moves up and down in a focusing direction.

The invention further provides for determination of a focus error signal, wherein the carriage assembly comprises a focus motor. This is accomplished by passing the laser beam of radiant energy through the objective lens onto a storage medium, displacing the objective lens assembly from the storage medium, and measuring the system's focus error signal during displacement.

In another aspect of the invention, wherein the magnetic drive for the carriage assembly comprises a carriage tracking motor, a focus motor, and a coarse positioning motor. The baseplate is horizontally mounted on a rotatable stage. Transfer curves are measured for the carriage tracking motor, the focus motor, and the coarse positioning motor while the baseplate is horizontally mounted. In a second aspect of the process, the baseplate is vertically mounted on a rotatable stage, and acceleration constants are measured for the carriage tracking motor, the focus motor, and the coarse positioning motor while the baseplate is vertically mounted.

In yet another aspect of the invention the read detector is evaluated according to the following procedure. An optical disc is placed on the baseplate. The laser is actuated to illuminate the optical disc, wherein light returning from the optical disc impinges on the read detector. While the laser is actuated, the read detector is linearly displaced to optimize an output signal thereof. Thereafter the bias coil assembly is actuated, and the laser energized to write information on the optical disc. The written information is then read in a reading operation. While reading is being performed, the read detector is rotated to further optimize the output signal. Afterward the read detector is fixed in position in the head assembly.

BRIEF DESCRIPTION OF THE DRAWING

For a better understanding of these and other objects of the present invention, reference is made to the detailed description of the invention which is to be read in conjunction with the following drawings, wherein:

FIGS. 2A–2J depict an interconnected a flow chart diagram detailing a method for making a baseplate assembly;

FIGS. 3A–3M depict an interconnected flow chart diagram detailing an optical module assembly;

FIG. 48 is a detailed perspective view of the DFTR gripping tool shown in FIG. 47;

FIG. 49 is a diagram of an oscilloscope output of a transmitted channel and a reflected channel according to a test of an optics module according to the process illustrated in FIG. 44;

FIG. 50 is a diagram of a focus S-curve according to the process illustrated in FIG. 44;

DESCRIPTION OF THE PREFERRED EMBODIMENT

First Embodiment of a Method and Apparatus for Manufacturing Information Storage Devices Understanding of the invention will be facilitated by a discussion of a manufacturing process and apparatus for producing an information storage device as discussed in terms of three subunit assemblies. This process has been previously practiced by the inventors in the United States, but has not heretofore been publicly disclosed. FIG. 1 shows the assembly of the optical carriage, a major subunit assembly of an information storage device. FIG. 2 illustrates the assembly of the baseplate and FIG. 3 shows the assembly of an optics module. Both the baseplate and optics module are major subunits of an information storage device.

Figure 61A:
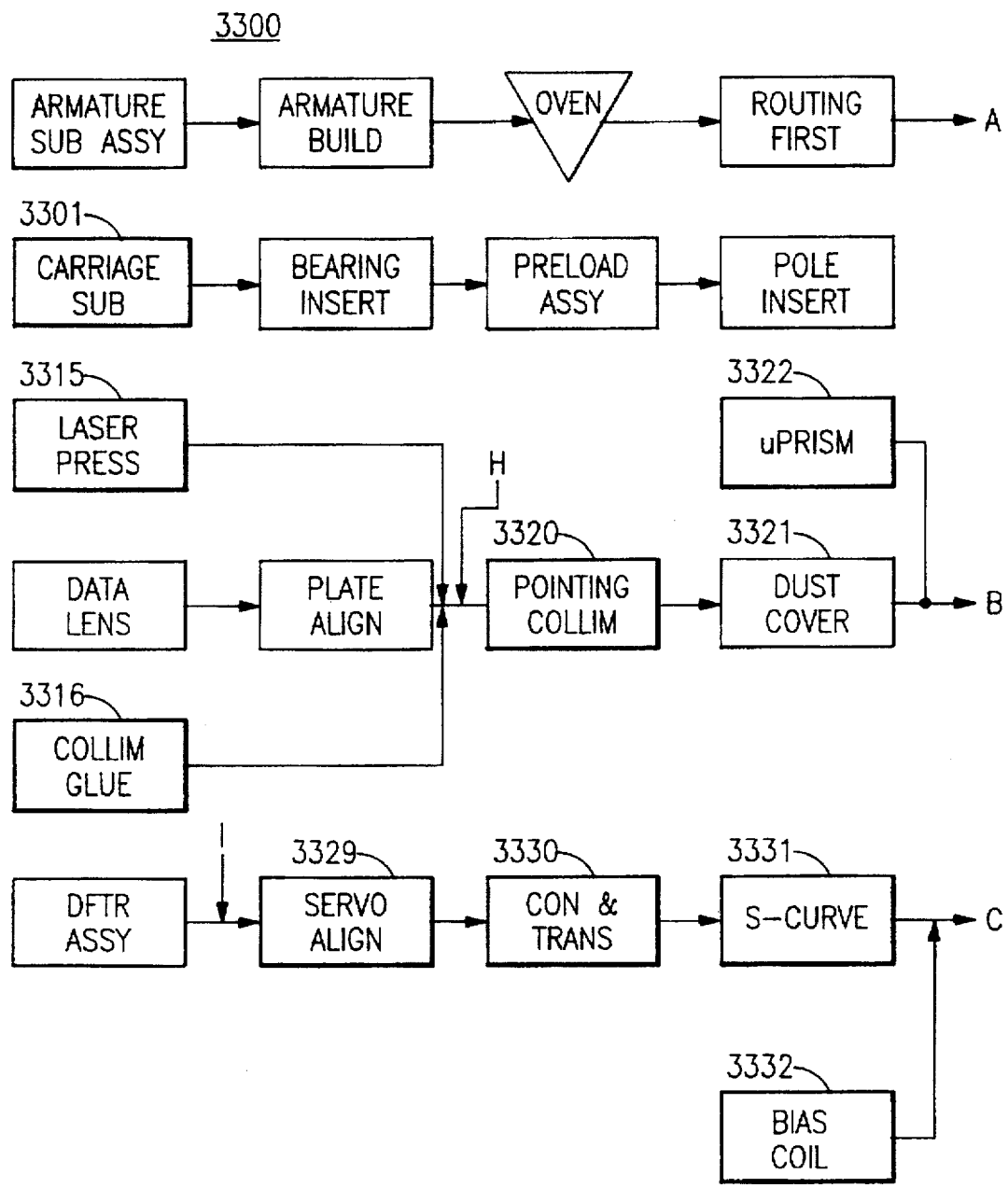
FIGS. 61A–61C depict an interconnected flow chart diagram detailing optical drive assembly in the second embodiment of the present invention.
Figure 61B:
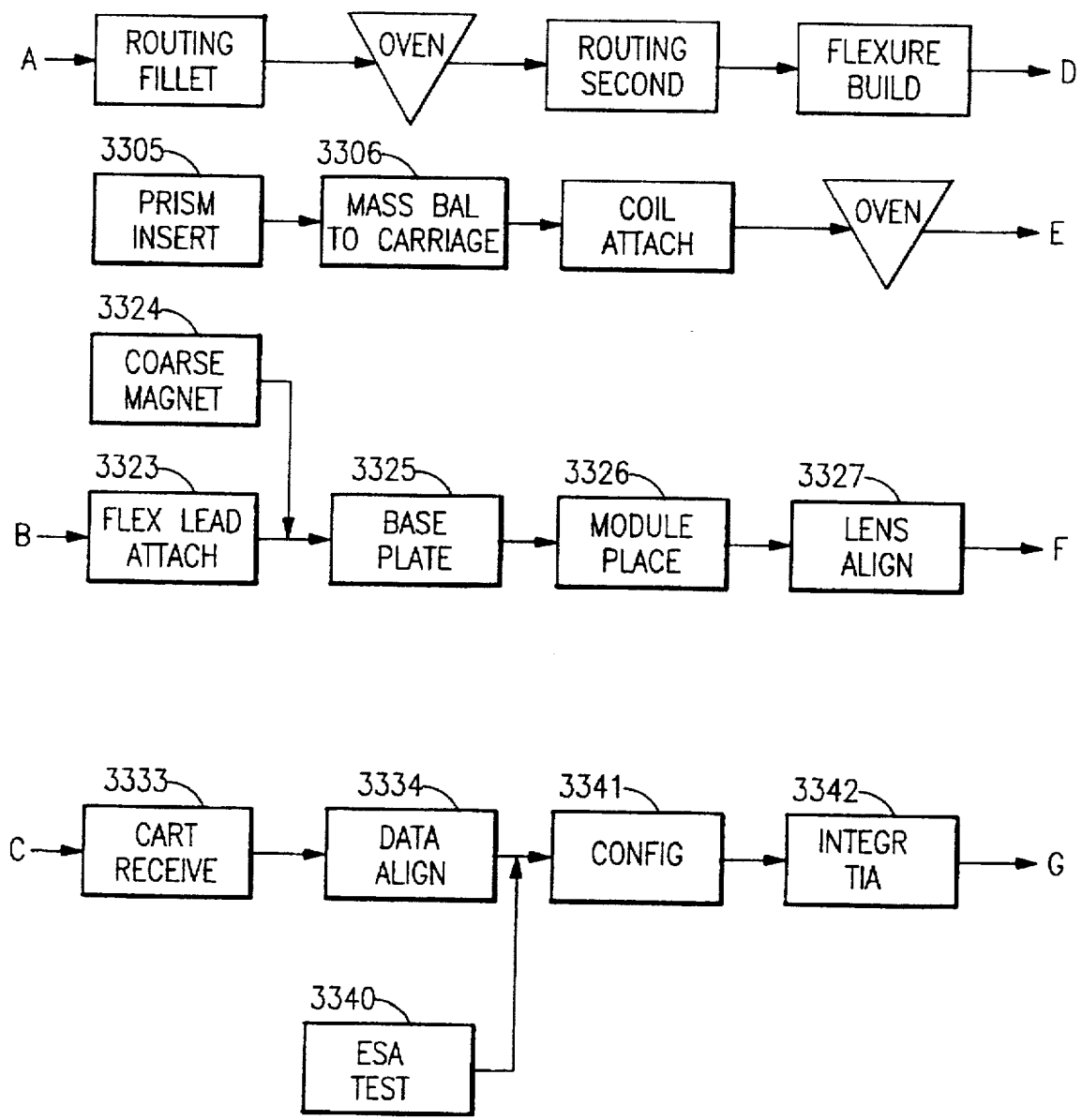
Figure 61C:
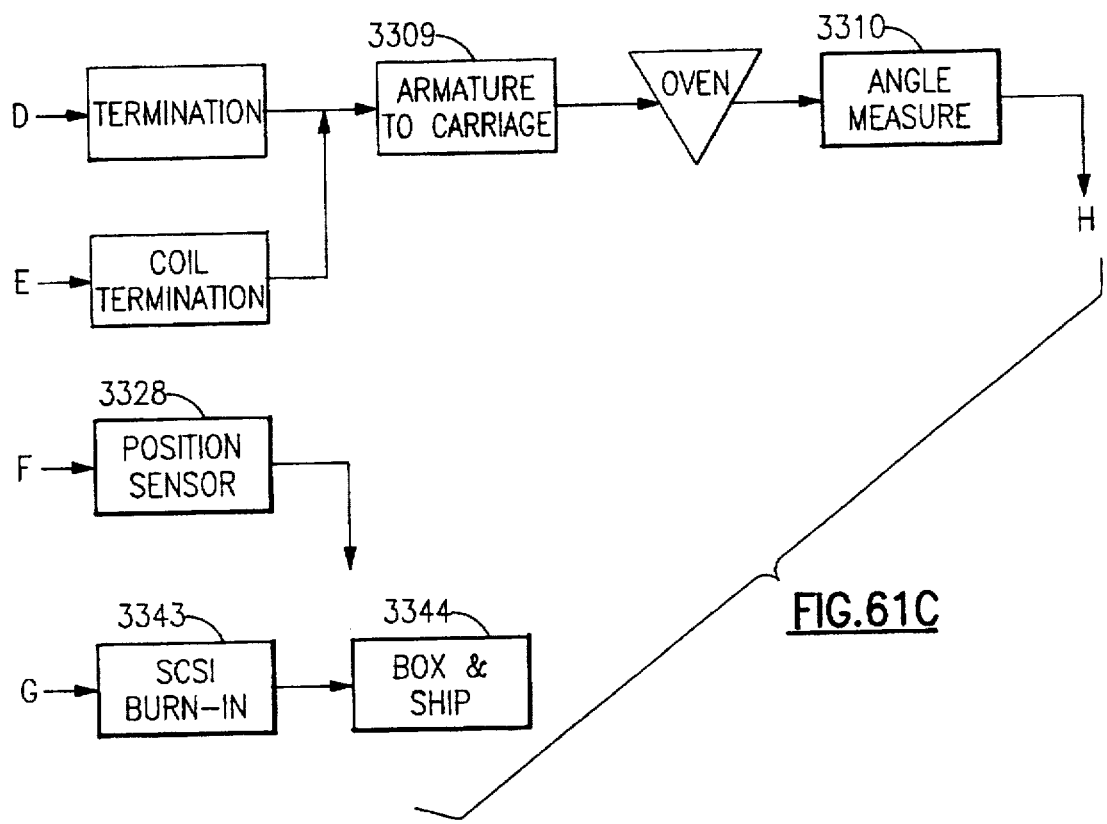
Figure 61D:
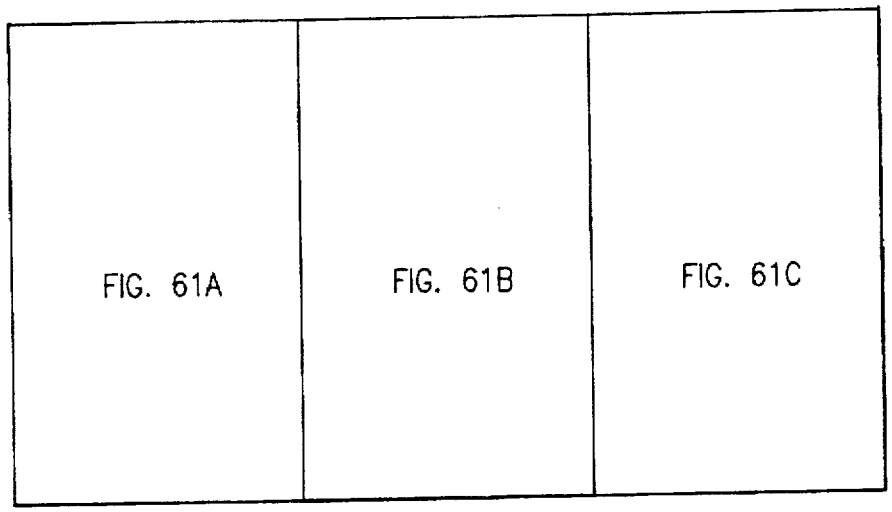
FIG. 61D is a diagram indicating the relationships of FIGS. 61A–61C.

The inventive embodiment of the manufacturing process and apparatus for producing an information storage device is shown in FIGS. 61A–61C. In this invention the major components involve the production of a carriage, an optical head, an optical mechanical loader, and a final integration of drive. The process steps in the second embodiment that represent a difference from corresponding steps of the conventional embodiment are shown in bold outline. FIGS. 1A-3M and 61A-61C are manufacturing flow charts that show the overall organization of the manufacture of information storage devices. These flow-charts are to be considered in conjunction with the entire drawing, which shows the details of the apparatus and process steps indicated in FIGS. 1A-3M and 61A-61C. FIGS. 1-3, and 61 show only one of the envisioned arrangement for production of a storage device. The individual process steps may be rearranged to produce the same outcome. Therefore, many variations of the order shown in FIGS. 1A-3M and 61A-61C are possible within the scope of the present invention.

Carriage Production

Figure 25:
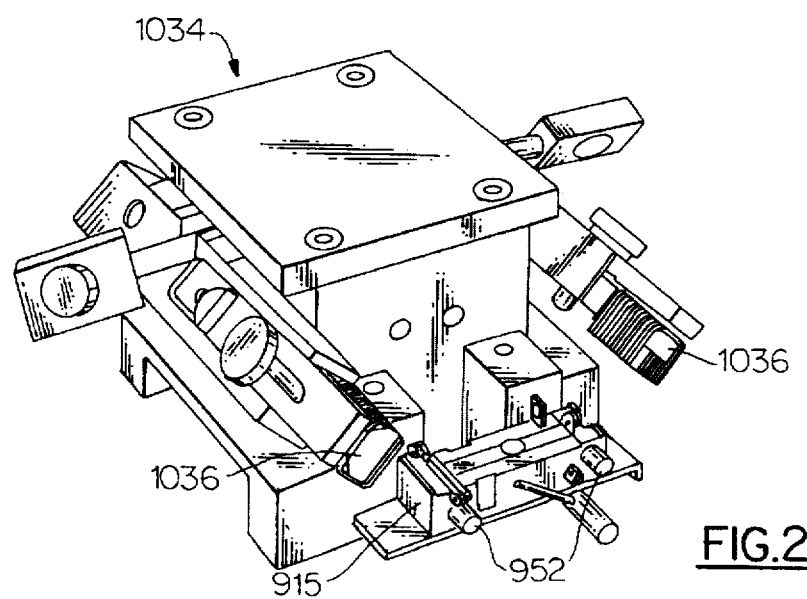
FIG. 25 is a coarse coil attachment tool.
Figure 26:
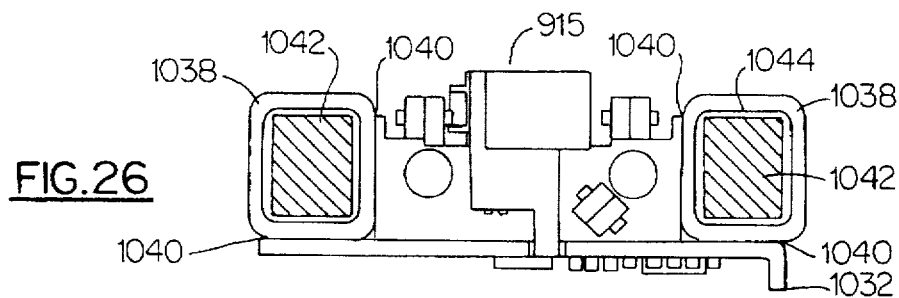
FIG. 26 is a carriage base having attached coarse coils assembled using the tool shown in FIG. 25.

Referring to FIGS. 1A-1J there is shown a manufacturing flow chart for production of the carriage. The carriage is a moving part of the information storage device, also called a drive or a recorder. The carriage glides over the disc surface and retrieves information Generally, a carriage is an important subunit assembly in an optical drive, but is applicable to magnetic, optical/magnetic and other types of drives and recorders. A partially assembled carriage 915 is shown in FIGS. 25 and 26.

A typical optical carriage moves along two rail guides on precision bearings. The bearings, magnetic assemblies, springs, optics and electronics are elements of a carriage. According to the present invention, some or all of the above mentioned elements can be included individually. This depends on the type and the complexity of the carriage to be manufactured.

Figure 6:
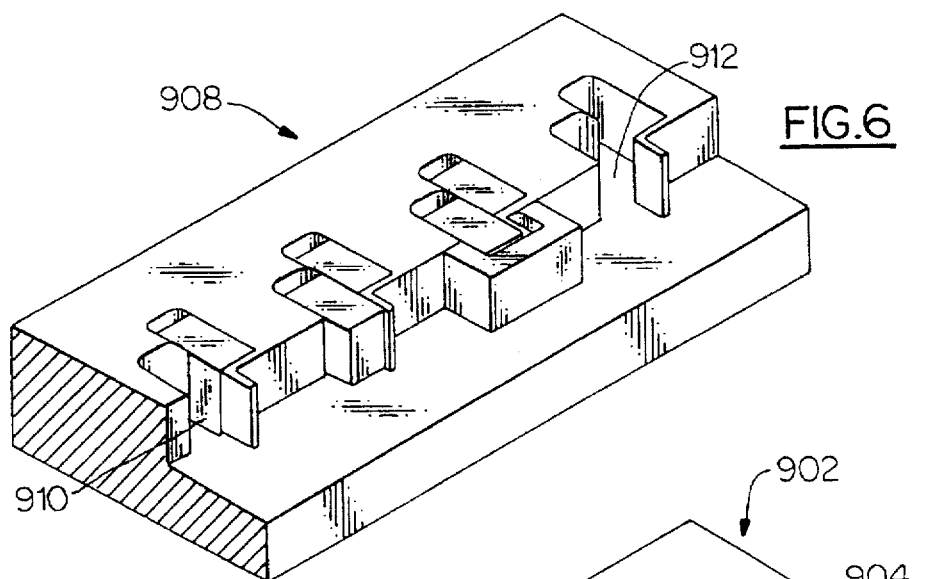
FIG. 6 is a cross sectional view in perspective of a magnet and pole piece tool assembly.
Figure 5:
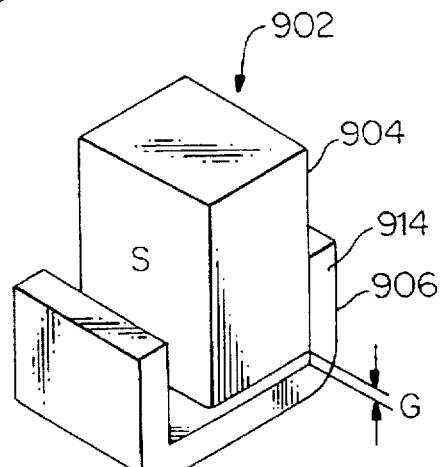
FIG. 5 is an isometric assembly view of a flying magnet and pole piece which are assembled by the tool illustrated in FIG. 6.

In order to produce the magnetic assembly 902 shown in FIG. 5, a flying magnet 904 and a pole piece 906 FIG. 5, are assembled using the magnet and polepiece tool assembly 908 shown in FIG. 6. The magnet and polepiece tool assembly 908 has permanent magnets 910 which are used to align and orientate the magnetic poles properly on the flying magnets 904. In this manner the flying magnets 904 can be properly positioned and magnetically oriented in the magnetic assembly 902. The cutout area 912 is used as a space for the insertion of the flying magnet 904. The magnetic pole piece 906 is precision adhered to the flying magnet 904 to leave a small air gap G which preferably is 0.5±0.1 mm. In the preferred embodiment, one leg 914 of the pole piece 906 is thicker and is adhered the north face of the flying magnet 904. The magnetic assembly 902 is used as part of the voice coil assembly to move the optical reading lens through focus and tracking.

Figure 1A:
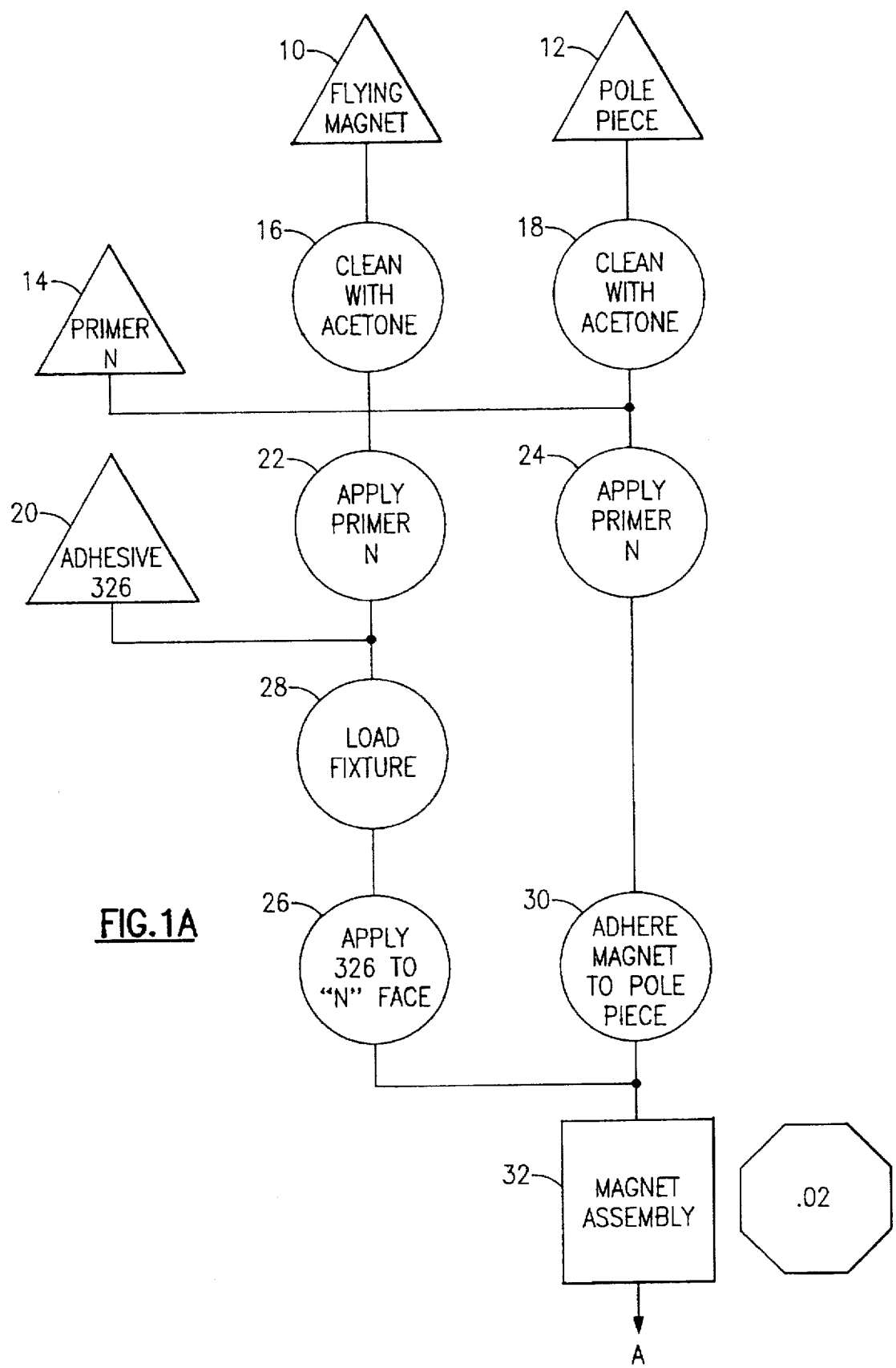
FIGS. 1A–1J depict an interconnected flow chart diagram detailing a method for making carriage assembly.
Figure 1B:
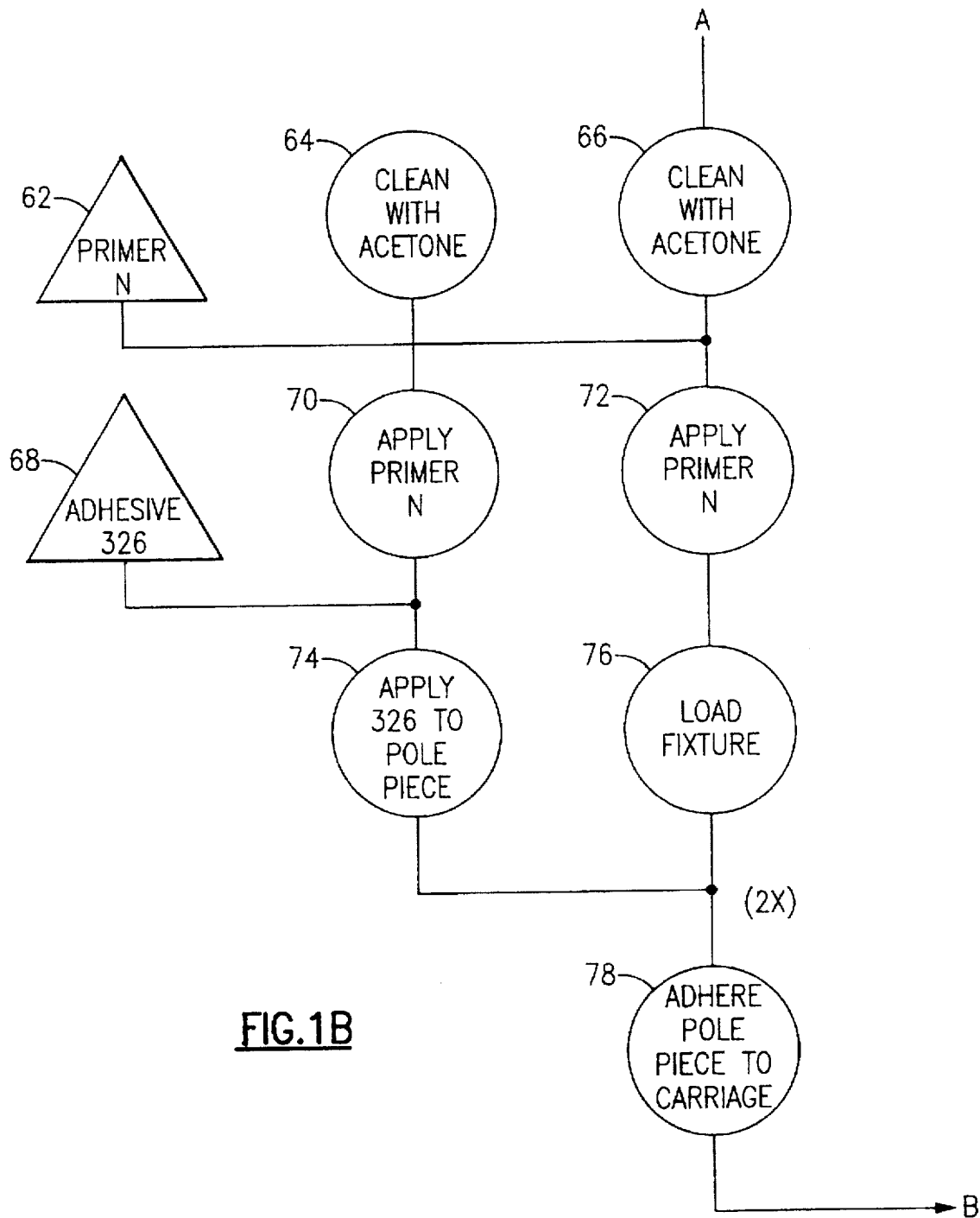

Referring to FIG. 1A, process steps 10-32 are used to produce the magnetic assembly 902 FIG. 5. The process steps in FIGS. 1A-3M can be further understood in the following manner: triangle process steps introduce a part or material; a circle is an operational process step; and a rectangle is a completed assembly. A key illustrating this usage for FIGS. 1A-1J, 2A-2J, and 3A-3M is shown, respectively in FIGS. 1L, 2L, and 4A. For example, process steps 10 and 12 require the introduction of a flying magnet 904 and a pole piece 906. Process steps 14-30 detail the cleaning, gluing and loading of the magnet and pole piece. Process step 32 shows the completion of the magnetic assembly 902. Primer "N" is an adhesive accelerator used to decrease the curing time of the compatible adhesive. Adhesive "326" is a structural adhesive. These can be replaced with any suitable substitute such as, but not limited to, thermal set glues, general adhesives, and ultra violet curing adhesives.

Referring to FIGS. 1C, 7, 8, and 9, a procedure and tools are described to insert five bearings into a carriage. These five bearings in addition to a sixth bearing, described separately, allow an optical carriage to slide on two rail guides 952 shown in FIG. 11. The rail guides 952 create a predetermined line of travel. The bearings 936 cause the optical carriage 915 to glide smoothly over the rail guides 952. Bearings 936 are an important and common feature in many carriages.

Figure 1C:
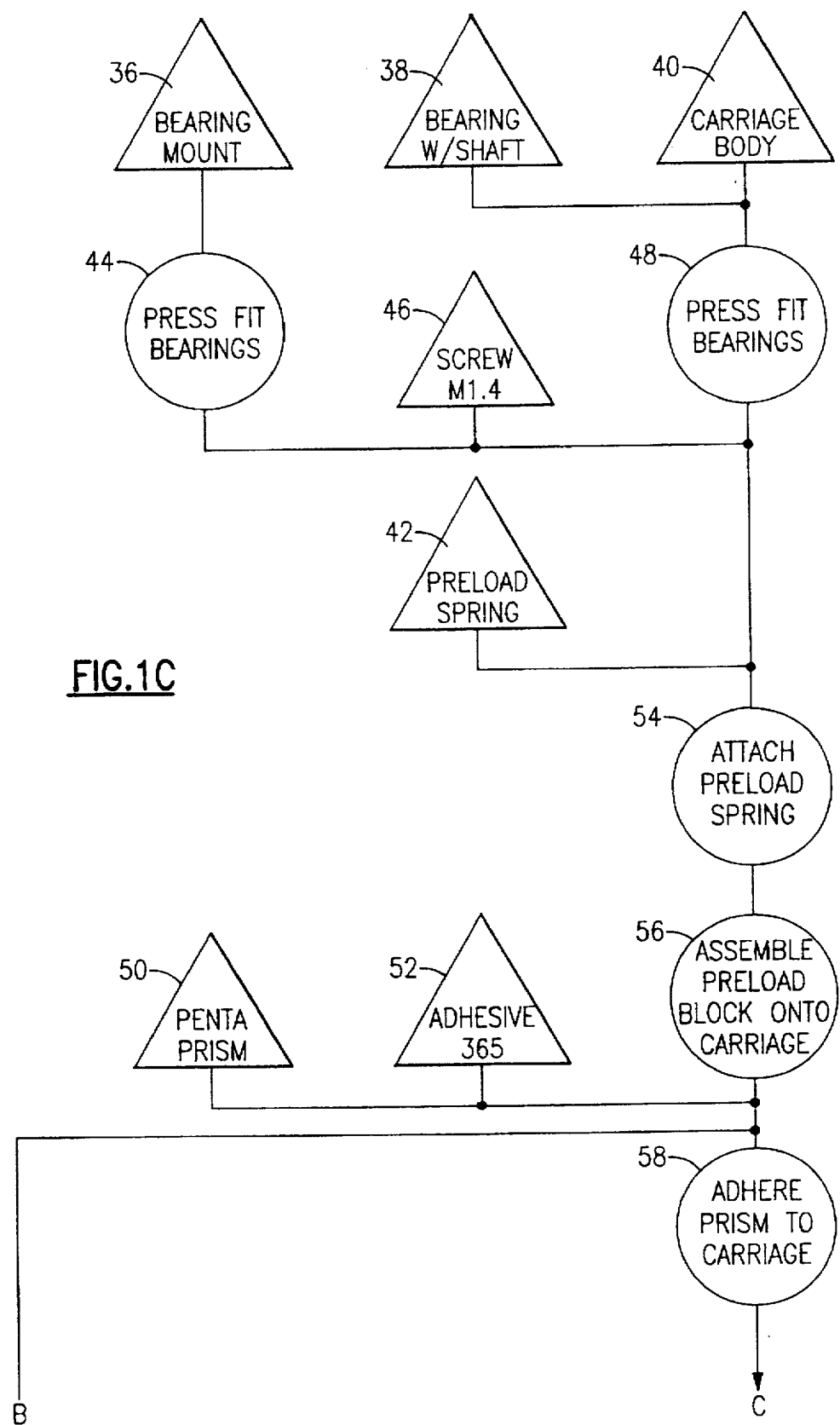
Figure 7:
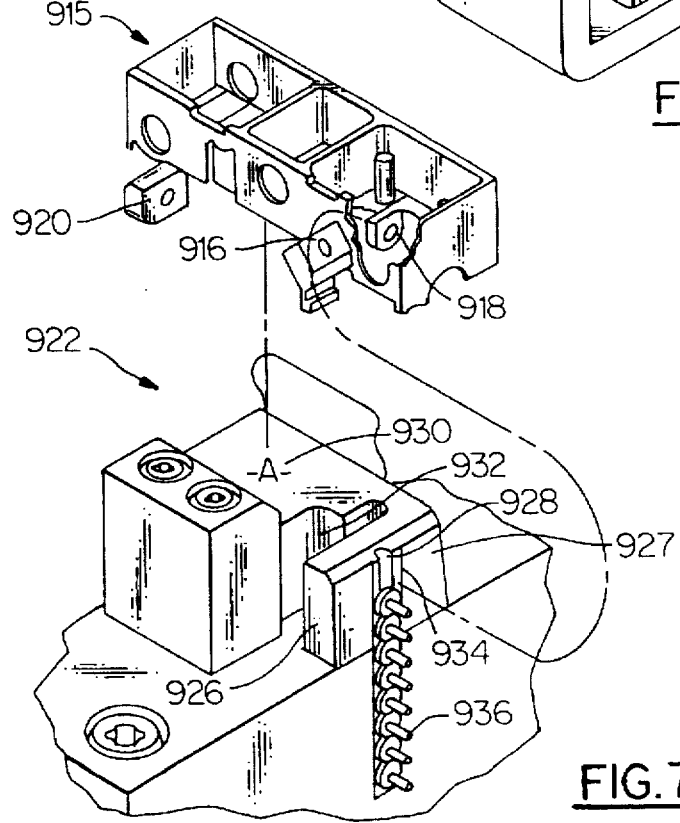
FIG. 7 is an isometric assembly view of a single bearing insertion tool and a carriage body.

An important feature of the bearing insertion is the fact that in some instances two bearings may be inserted at the same time, which increases production and enhances quality control. Referring to FIG. 1C, introduction of the bearing with shaft 38 and introduction of the carriage body 40 in order to press fit bearings 48 encompasses insertion of five bearings. The first type of tool 922 is used to insert a single bearing into second bearing mount 918 as shown in FIG. 7. The four remaining bearings are inserted two at a time as shown in FIGS. 8 and 9.

Referring in detail to FIG. 7, a single bearing inserting tool 922 is adapted to receive a carriage 915. The second bearing mount 918 should fit snugly against the face 927 of the bearing support structure 926. The face 927 is used to support the back side of the second bearing mount 918 so that a bearing 936 contained in the bearing support and feeder tube 934 may be press fitted. The remainder of the carriage is supported by the carriage support structure 930 having a carriage clearance cutout 932. The bearing shaft clearance groove 928 accommodates the bearing shaft as is pushed through the second bearing mount 918.

Figure 8:
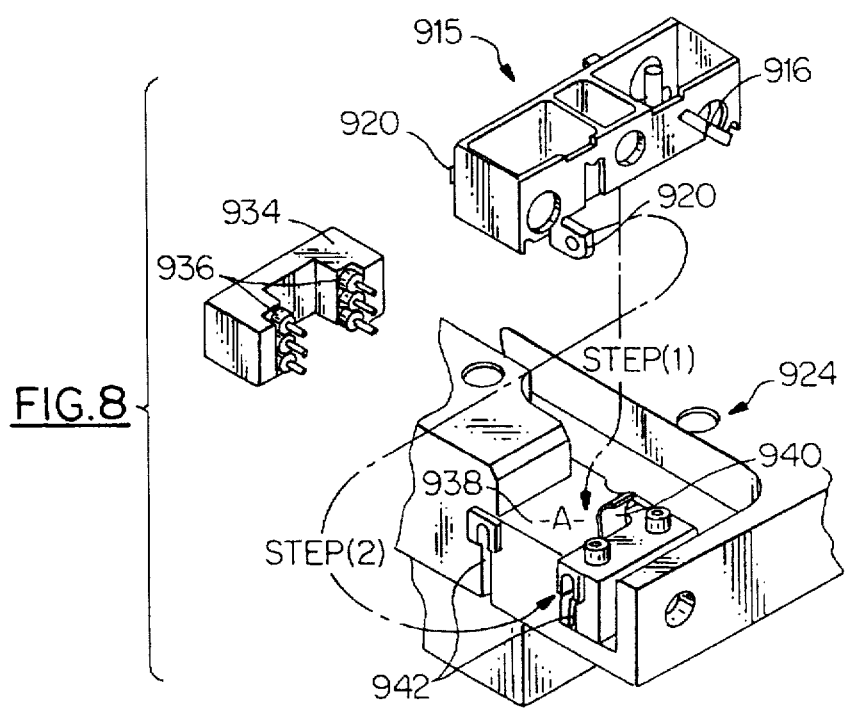
FIG. 8 is an assembly view of a dual bearing insertion tool and carriage body.
Figure 11:
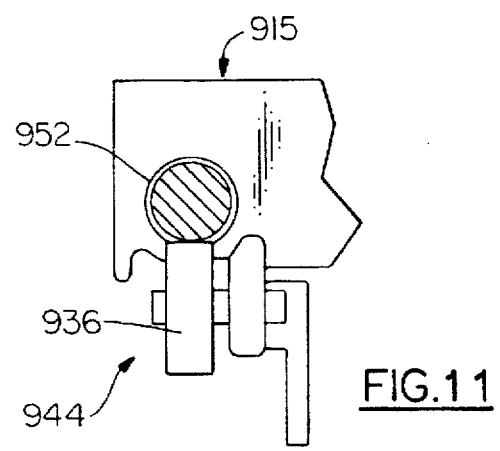
FIG. 11 is a cross sectional view of a carriage with bearings inserted therein that has been assembled with the tool shown in FIG. 8.

Referring now to FIG. 8, the carriage 915 is loaded into the dual bearing insertion tool 924. The carriage 915 fits onto the carriage support structure 938 and is held in place by the carriage retaining clip 940. The bearing support and feeder tubes 934, which is an integral part of the dual bearing insertion tool, 924 holds the bearings 936 for press fitting. In this manner, the bearings 936 press firmly against the third bearing mounts 920 with the shafts extending through the third bearing mounts 920 and into bearing shaft clearance grooves 942. In FIG. 11 the assembled bearing 936 and carriage 915 are shown in combination with the rail guide 952.

Figure 9:
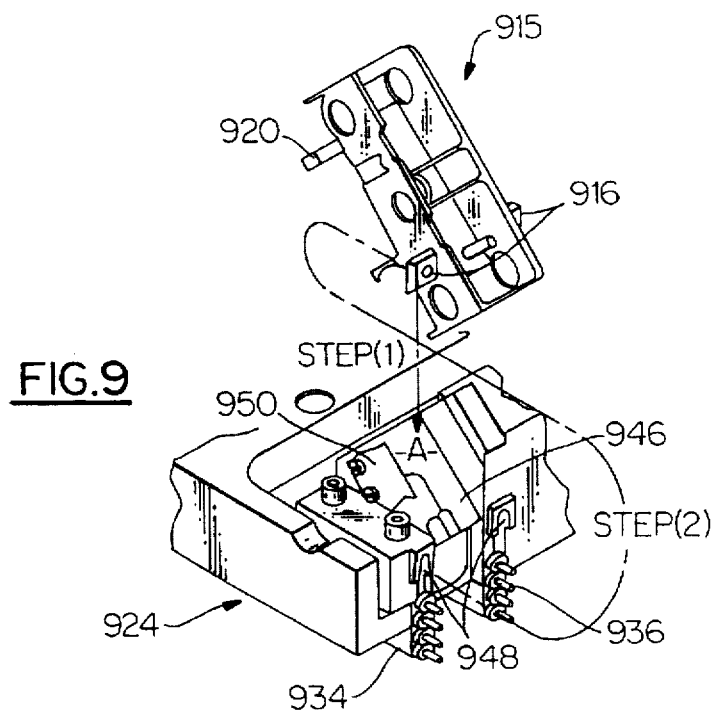
FIG. 9 is an assembly view of a second embodiment of the dual bearing insertion tool and carriage body shown in FIG. 8.

Referring now to FIG. 9, a second half of the dual bearing insertion tool 924 is shown. The dual bearing insertion tool 924 may be used to insert bearings into several types of mounts. Alternatively, different mounts may be press fitted at separate tools. The carriage 915 is releasable connected to the carriage support structure 946 using the carriage retaining clip 950. The first bearing mount 916 is pressed firmly against the front surface of the bearing shaft clearance groove 948. The bearing (not shown) is pressed through the first bearing mount 916 and the bearing shaft extends into the bearing clearance groove 948. In this manner two bearings may inserted into the carriage 915 at the same time.

In general, the bearing insertion shown in FIGS. 7-9, utilizes a two step process. Step one requires loading of the carriage into the bearing insertion tools 922 and 924. Step two requires either single or dual insertion of the bearing 952 into the bearing mounts which are held firmly at the bearing clearance grooves.

Figure 10:
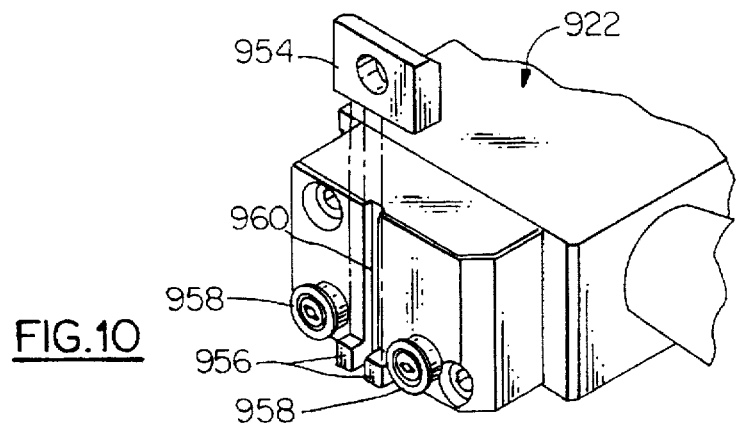
FIG. 10 is an assembly view of a single bearing insertion tool and a fourth bearing mount.

Referring now FIGS. 1C and 10, insertion of a sixth bearing is described. A single bearing insertion tool 922 is used to insert a bearing (not shown) into a fourth bearing mount 954. The fourth bearing mount 954 is placed as shown in FIG. 10 into the insertion tool 922 and comes to rest on the bearing mount stop 956. The bearing mount retention rollers 958 help to retain the alignment of the fourth bearing mount 954. In this position, a bearing shaft (not shown) is press fitted through the fourth bearing mount 954 and extends into the bearing shaft clearance group 960.

Process steps 36–40, 44, and 48 show the proper sequence for press fitting bearings into a carriage.

Figure 12:
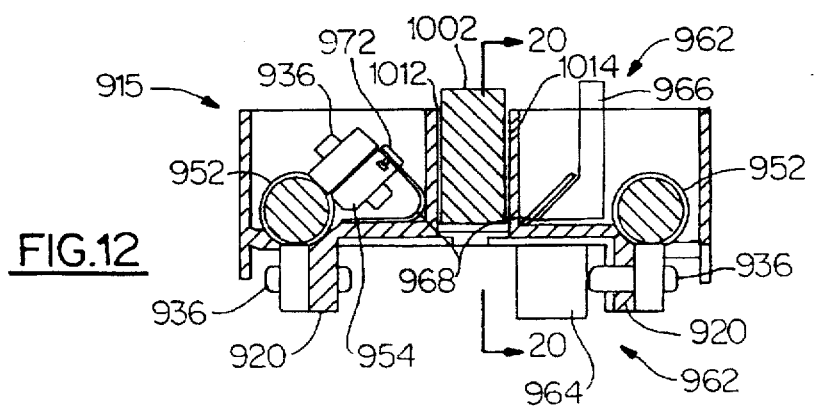
FIG. 12 is a cross sectional view of a carriage showing insertion of a spring using a spring magnet and a final assembly of the preload bearing.
Figure 17:
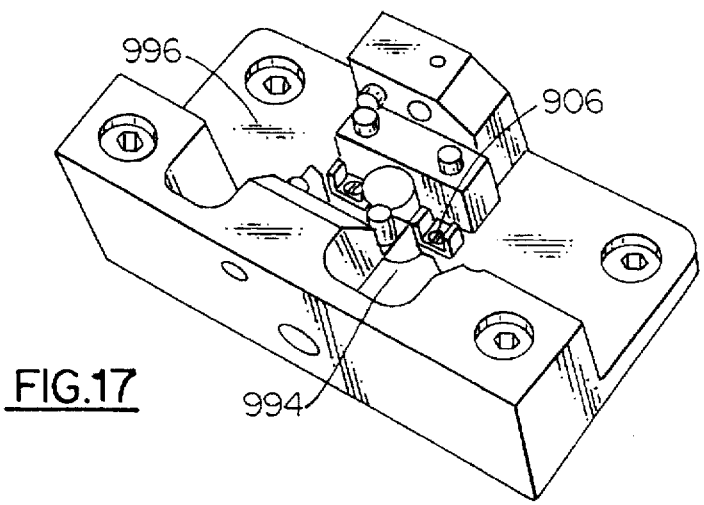
FIG. 17 is a cut away view of a dual pole piece insertion tool.

A spring installation tool 962 is used to attach the preload spring 968, shown in FIG. 12, to the carriage 915 such that the fourth bearing mount 954 may be added to the carriage. The spring installation tool consists of two magnets, magnet 964 and a spring holding magnet 966, which are attracted and apply force to the installation. A nest or carriage holder (not shown) may be used to hold one of the two magnets and properly locate the carriage. The nest is similar to the nest 994 in FIG. 17. Alternatively, either one of the two magnets could be replaced by any metal that would be attracted by a magnet or a mechanical fixture. Referring now to FIG. 12 in conjunction with FIG. 1C, the spring 968 is cleaned and a small amount of glue is added. The carriage 915 is similarly cleaned with a solvent such as acetone such that the glue will strongly adhere to both surfaces. Spring 968 is held and cured by the spring holding magnet 966 which is attracted to the bottom magnet 964, see process steps 42 and 54 in FIG. 1C. Other types of clamping systems which may be used in place of the clamping magnets include, by way of example and not of limitation, pneumatic and manual clamps.

Figure 13:
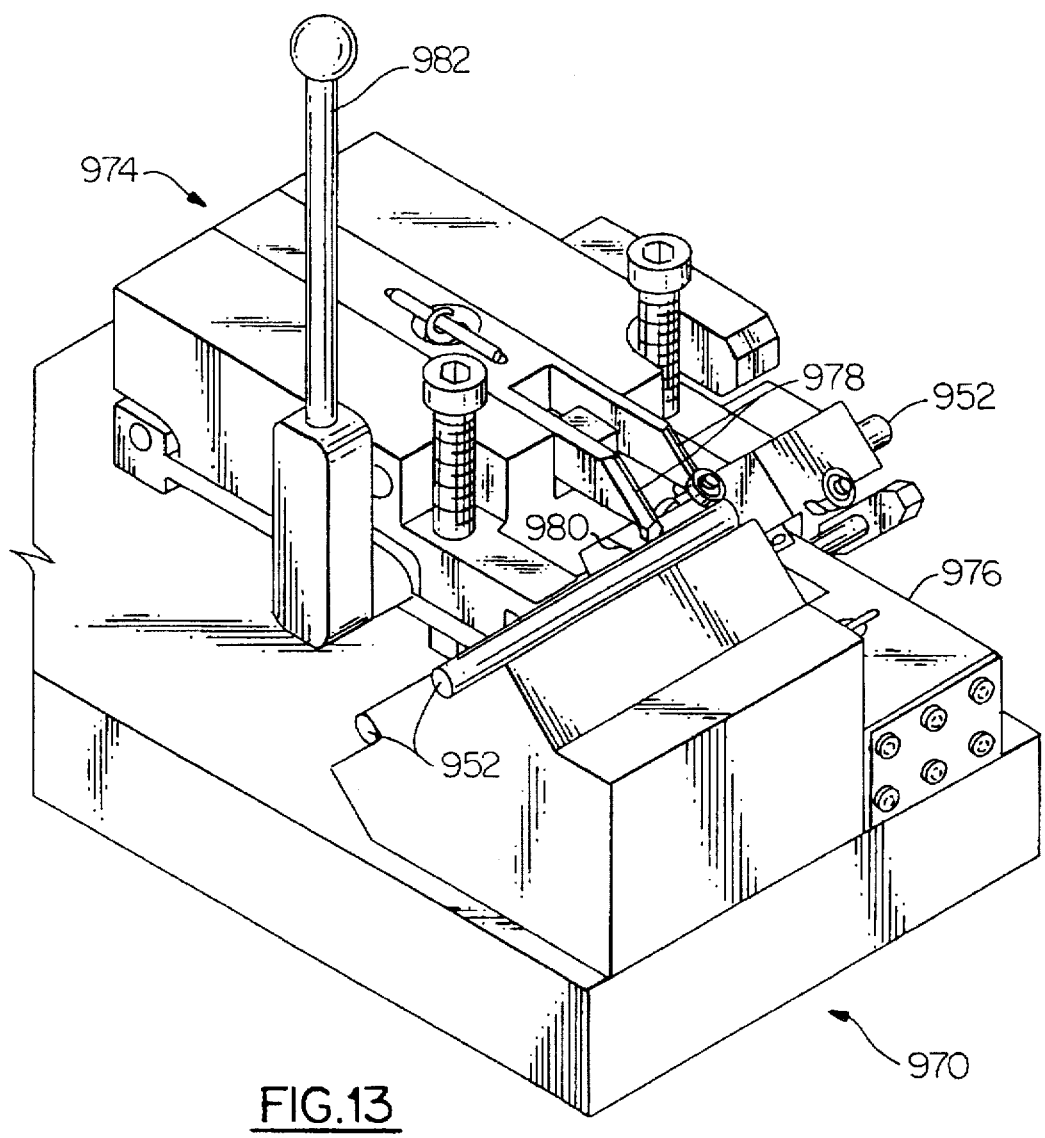
FIG. 13 is an isometric assembly view of a preload bearing tool.

In order to attach the fourth mount 954 to the spring 968, the preload bearing tool 970 shown in FIG. 13 is employed. The partially assembled carriage 915, FIG. 12, is placed onto the rail guides 952 of the preload bearing tool 970. Rail guides 952 serve to simulate an actual player and will be used to align the preload bearing 972. Preload bearing 972 consists of the fourth bearing mount 954, the spring 968, and the bearing 936. The positioning of the preload bearing 972 and the rail guides 952 is very critical to the long term operation of any player. The bearing 936 should be properly centered so as to minimize torque and insure long term reliability. The carriage 915 is clamped into position using the carriage clamp 976 which ensures stability of the carriage on the rail guides. The alignment block 974 clamps onto at least one of the rail guides 952. Top clamp 978 functions to align the preload bearing by moving in response to the lever 982 such that the top clamp aligning surface 980 grabs the fourth bearing mount 954 and forces it into alignment with the rail guide 952. Process step 56 in FIG. 1C includes the preload bearing tool 970 as part of the assembly process.

Figure 14:
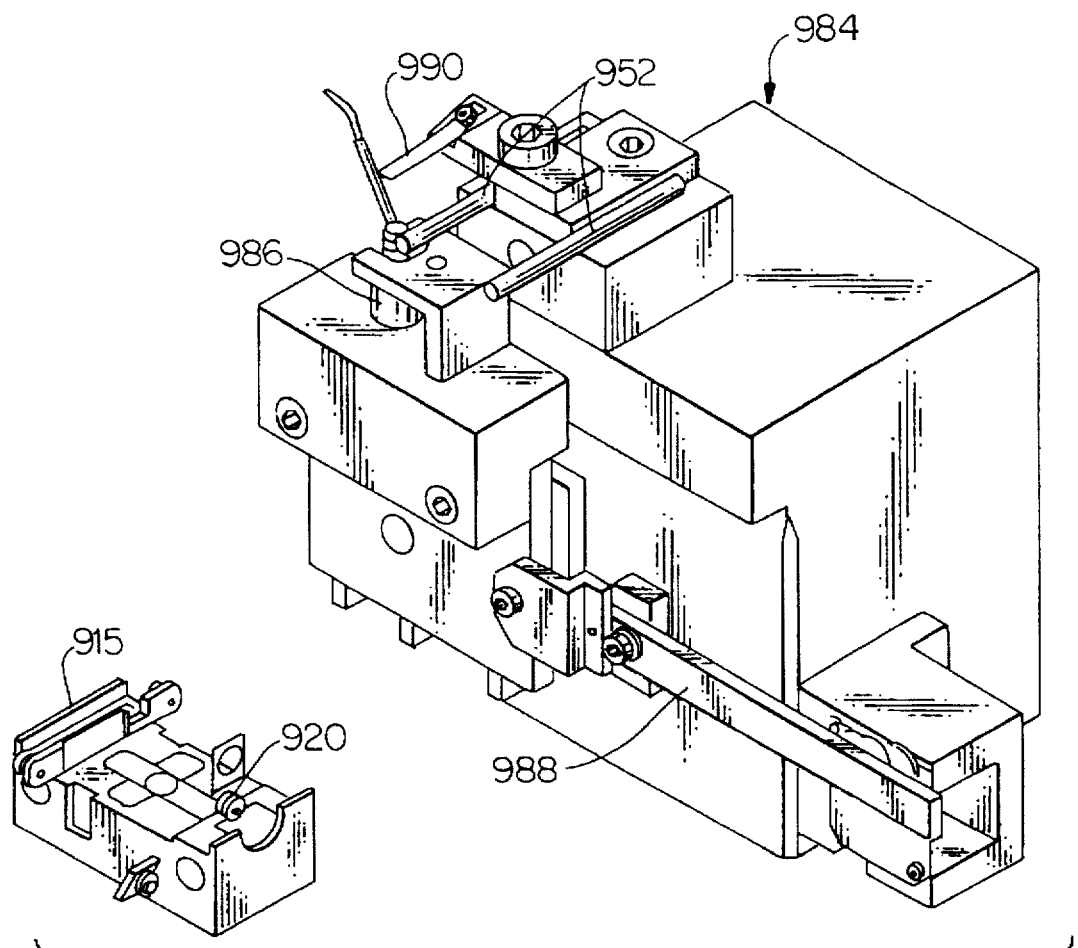
FIG. 14 is an assembly view of a preload measurement device.
Figure 15:
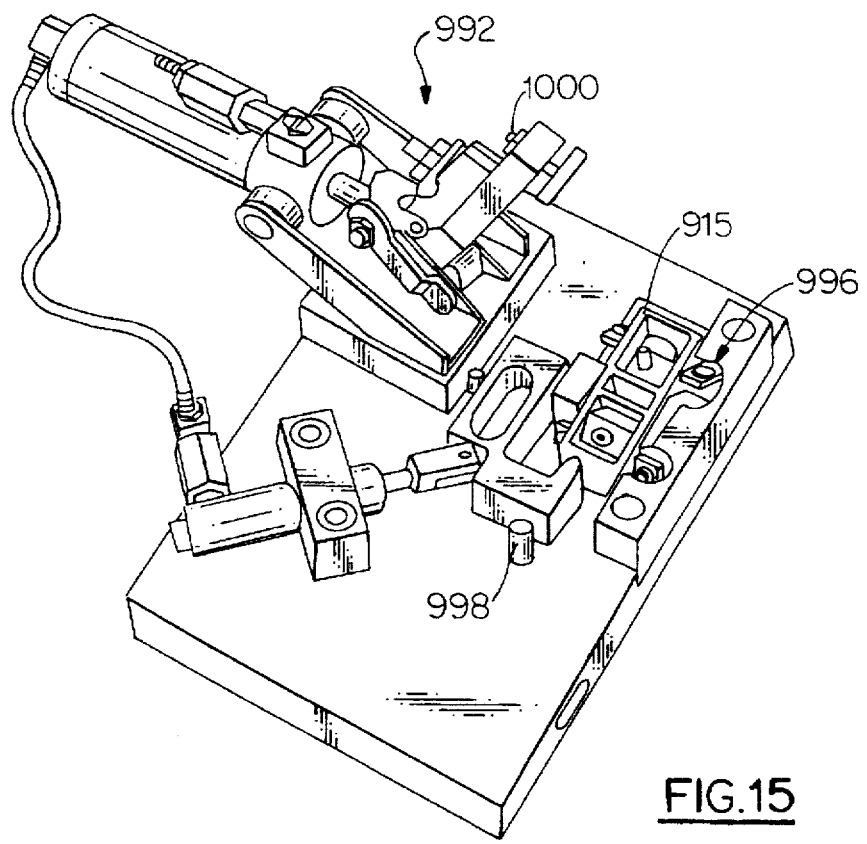
FIG. 15 is an isometric assembly view of a dual pole piece insertion tool with a carriage body mounted thereon.

A preload measuring tool 984, FIG. 14, is used for quality assurance inspection and in order to assure proper tensioning of the spring 968, as shown in FIG. 14. If the tension of spring 968 is too loose then there may be seek errors, because preload bearing 972 would slide instead of rolling. If the preload is too tight, then premature wear of the bearings may result. Preload measuring tool 984 has two rail guides 952. Carriage 915 is loaded onto the rail guides 952. A transducer 986, or force measuring gauge, is used to push upwardly the carriage 915 and makes a load measurement of preload bearing 972. A lever 988 is used to actuate the movement of the transducer 986. Electrical contact is made between a tab 990 and the bearing 920. The bearing 920, which is a non-preload bearing, sits opposite the movable preload bearing 972. The transducer 986 presses upwardly on the carriage 915 until the bearings 920 loses electrical and physical contact with the rail guide 952. At this point a measurement is made of the force applied to the transducer. This measurement is used to pass or fail a carriage 915 according to predetermined criteria.

The above mentioned operations on the preload spring installation and quality assurance is incorporated into process step 54 in FIG. 1C.

Referring to FIGS. 1B and 15–17, a procedure and apparatus for insertion of dual pole pieces 906 into an optical carriage body 915 is described.

Primer N and adhesive is applied to a pole piece 906 in process steps 62–74. Two pole pieces 906 are loaded in process step 76 into a dual pole piece insertion tool 992. These two pole pieces 906 fit into the nest 994. Alternately, adhesive can be added to the pole pieces 906 at this time. The carriage body 915 is loaded into the carriage bay 996 in process step 78. The XY locational clamp 998 and Z locational clamp 1000 are actuated and clamp the carriage body 915 to the pole piece 906. Following a predetermined amount of time the clamps are released.

Figure 16:
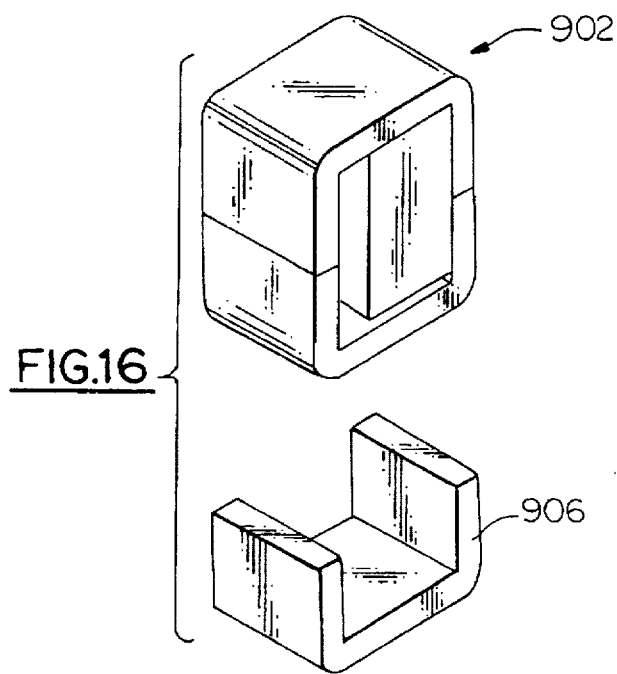
FIG. 16 is a sectional view of a magnet assembly being aligned on a pole piece integral with the dual pole piece insertion tool shown in FIG. 17.
Figure 18:
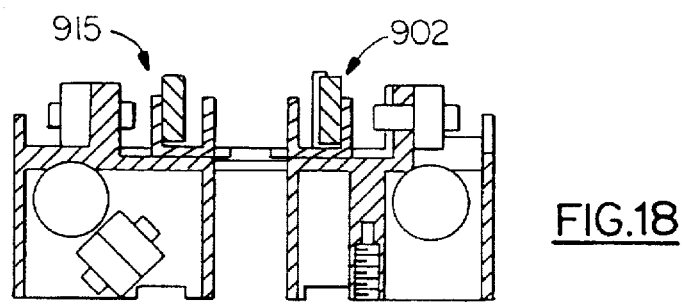
FIG. 18 is a carriage body having a two magnet assembly which is assembled using the apparatus shown in FIGS. 15–17.

The machine uses actual pole pieces 906, shown in FIG. 16, to locate and assist in the assembly of the carriage body shown in FIG. 18.

Pentaprism Insertion

Figure 20:
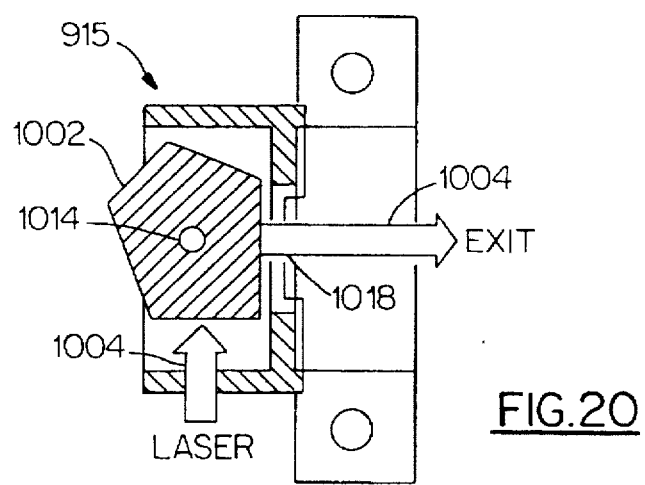
FIG. 20 is a sectional view through line 20—20 of FIG. 12, illustrating the pentaprism and carriage body.
Figure 21:
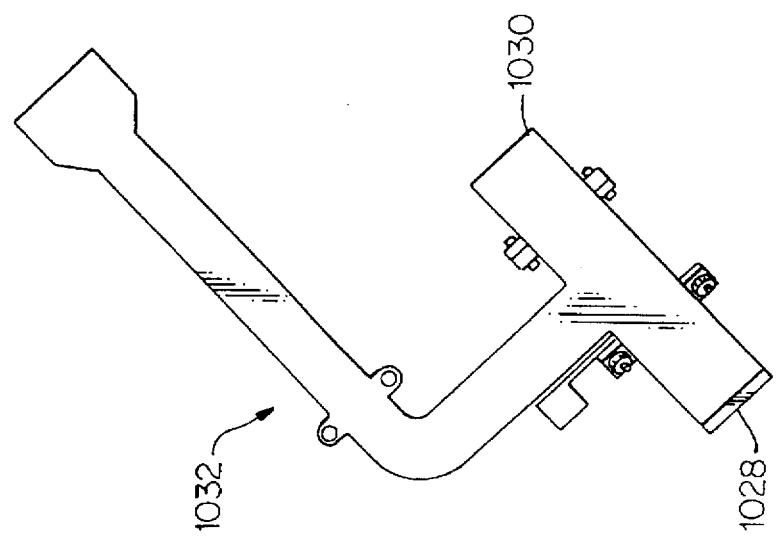
Figure 19:
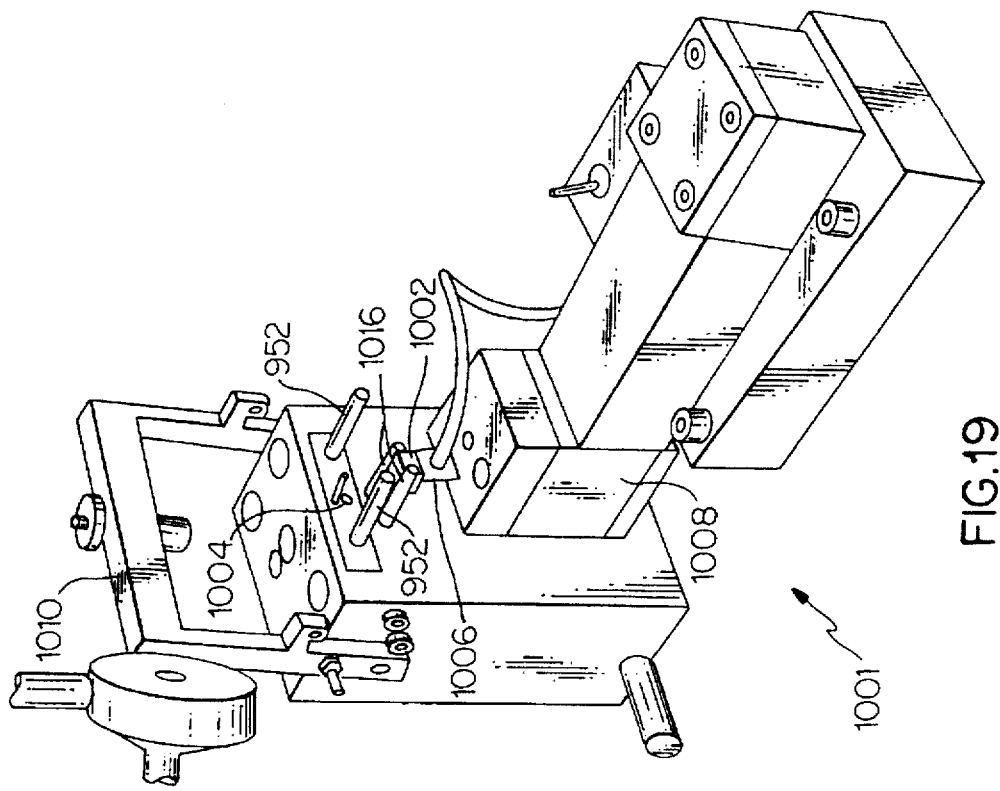
FIG. 19 is a pentaprism insertion tool.

Referring to FIGS. 12, 19, and 20 a pentaprism 1002 is to be assembled into a carriage body 915.

The pentaprism 1002 is loaded into the pentaprism insertion tool 1001. The pentaprism 1002 is held by the vacuum chuck 1006. Its physical dimensions are quality controlled by the pentaprism tolerance rails 1016. The pentaprism tolerance rails 1016 ensure that the pentaprism is not physically too big. A prism 1002 that is too large will fit too tightly in the carriage body. During periods of thermal change the pentaprism will undergo phase degradation. The moving platform 1008 raises the pentaprism held in the vacuum chuck 1006 into the carriage body (not shown) which is held on the rail guides 952. A pentaprism quality assurance laser 1004 is shown in FIGS. 19 and 20. The laser 1004 helps ensure that the exit angle 1018 between entrance and the exit beams are within tolerance. The carriage body 915 is held by the carriage body clamp 1010. The alignment of the carriage body, pentaprism, and clamp guarantee that the pentaprism 1002 is properly glued into the carriage body 915.

The pentaprism 1002 is held in place by a filled glue bond 1012 and a tacked glue bond 1014 as shown in FIG. 12. This gluing arrangement is important to allow for thermal change and unsure operation of the optics over a large thermal range, in FIG. 12 and FIG. 20 the filled glue bond 1012 covers a much larger area than the tacked glue bond 1014. The tacked glue bond serves a dual purpose of allowing thermal expansion, but still maintaining mechanical rigidity.

In FIG. 1C, process step 58 recites the attachment of the pentaprism to the carriage.

Connection of the Mass Balance

Figure 1D:
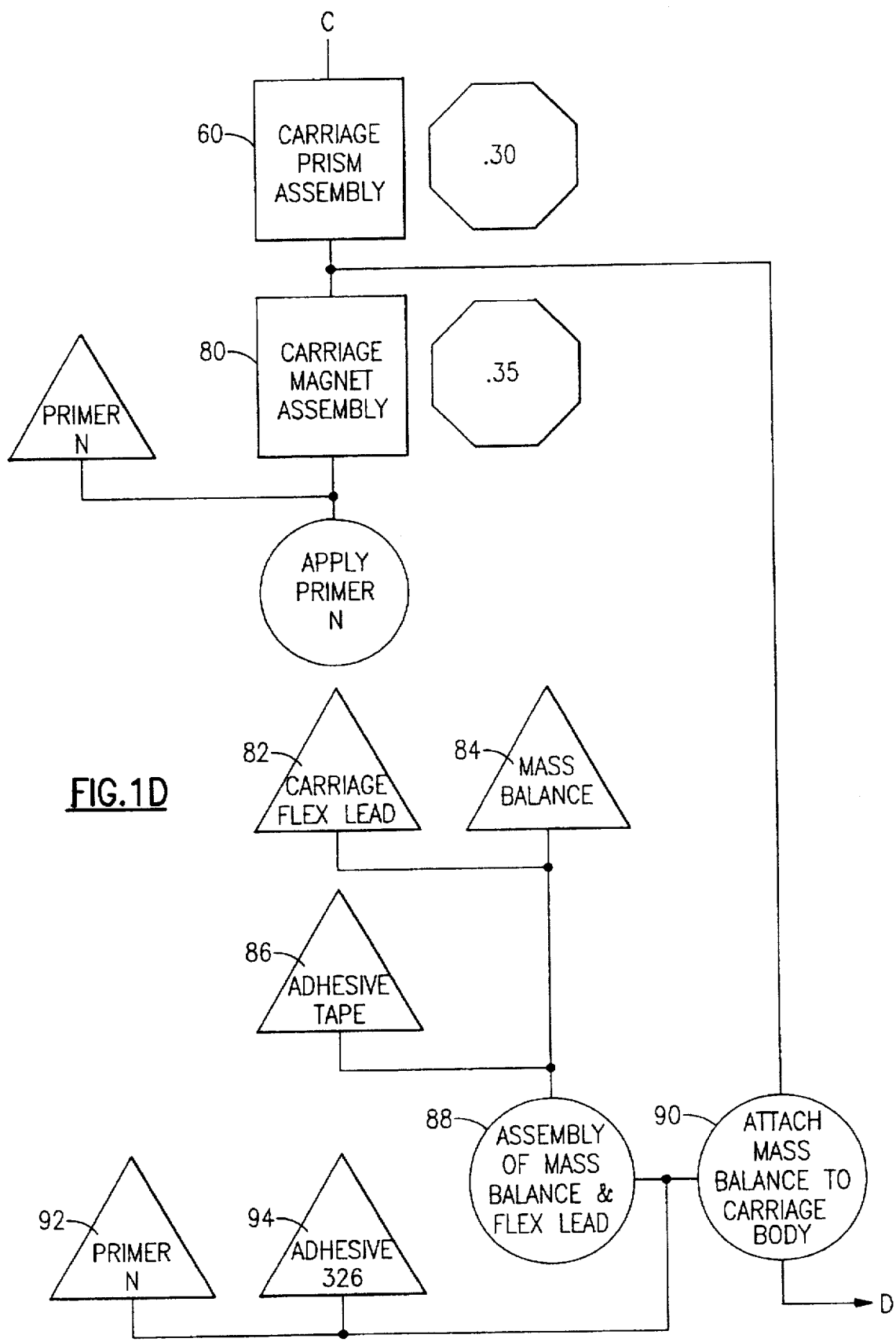
Figure 21:
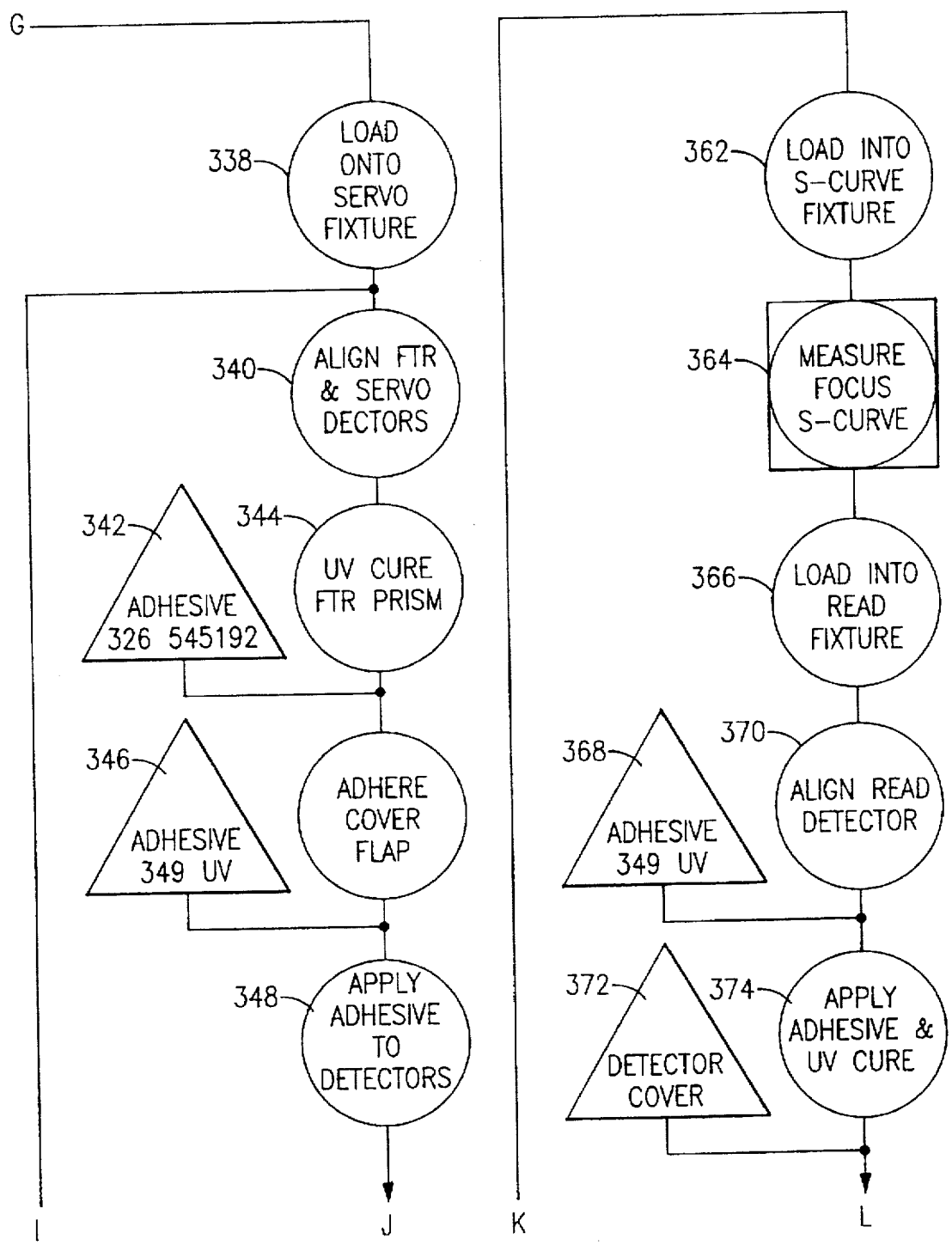
FIG. 21 is an assembly view of a mass balance and flex carriage lead that are assembled according to the process shown in FIG. 1.

Referring to FIGS. 1D and 21, the carriage flex lead 1030 is introduced in process step 82 along with a mass balance 1028 in process step 84 and adhesive tape (not shown in FIG. 21) in process step 86. The carriage flex lead 1030 is attached to the mass balance 1028 using two sided adhesive tape, as mentioned in process step 88.

The assembled mass balance, flexure lead 1032, and carriage body 915 should be attached according to process steps 90–94.

Figure 23:
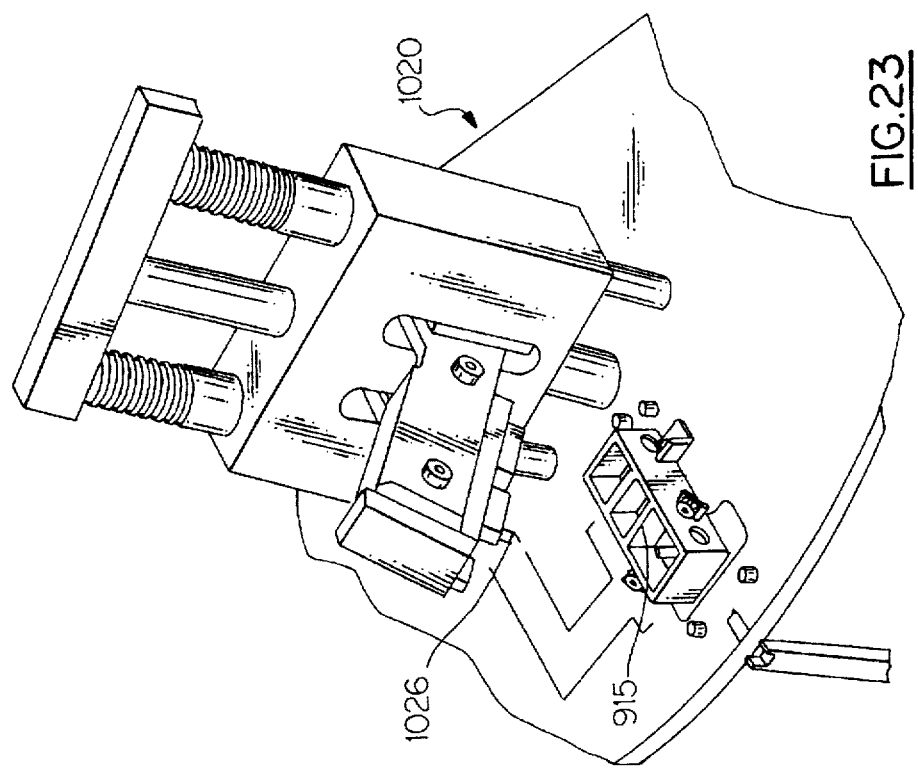
FIG. 23 is a detailed view of the mass balance attachment tool shown in FIG. 22 and a carriage disposed thereon.
Figure 22:
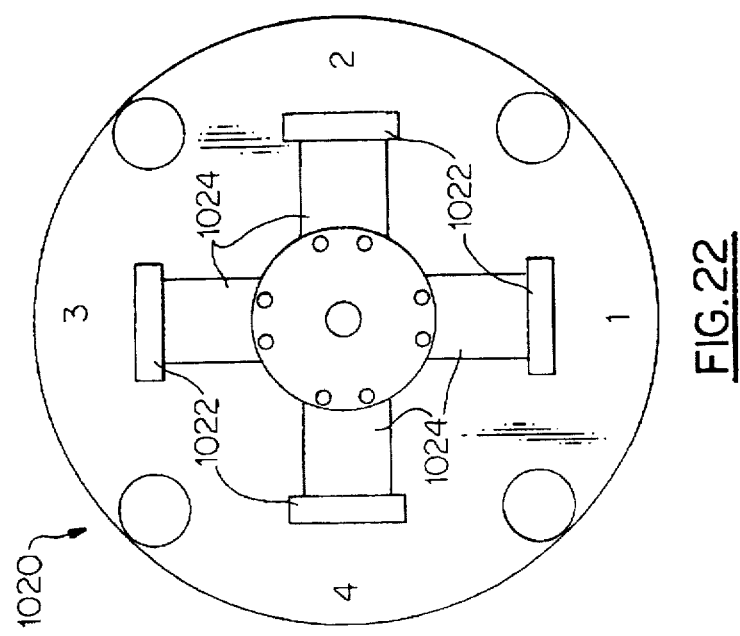
FIG. 22 is a top view of a mass balance attachment tool.
Figure 24:
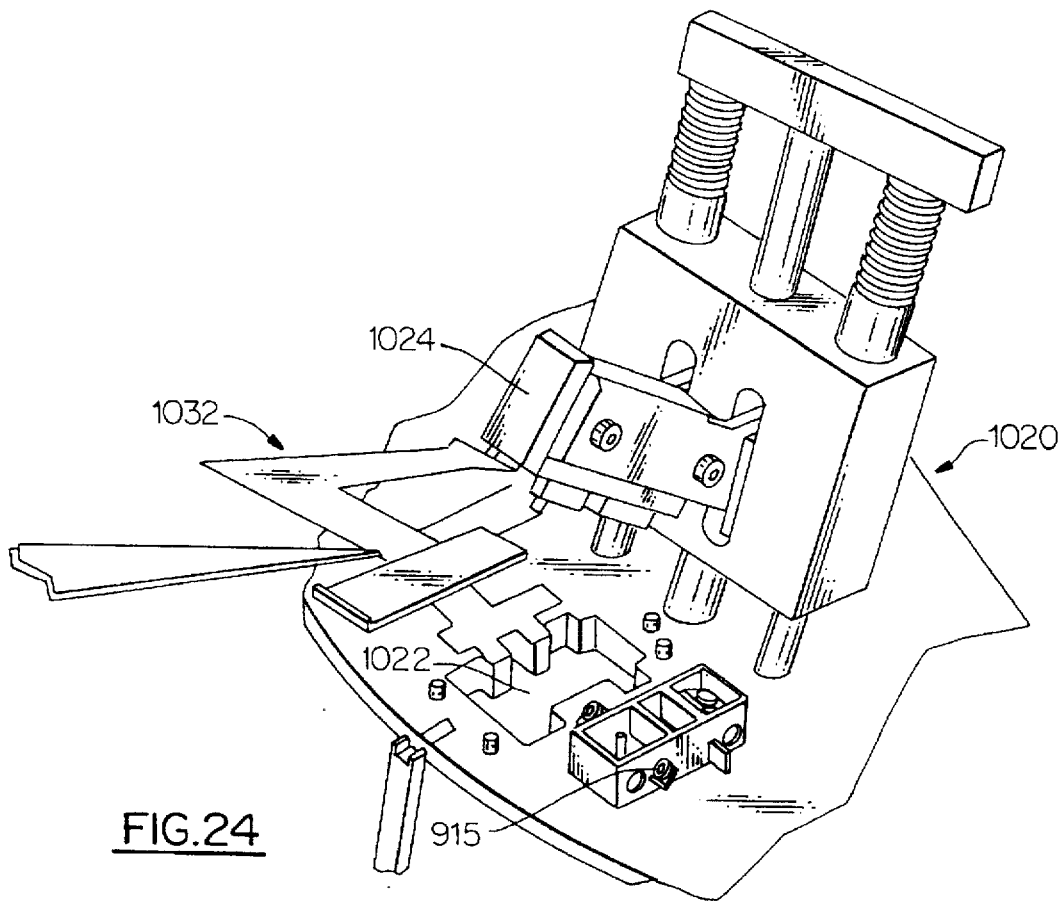
FIG. 24 is a detailed view of the mass balance attachment tool shown in FIG. 22, in relation to a carriage, mass balance and, flex lead.

As shown in FIGS. 22–24, the mass balance attachment tool 1020 will hold the mass balance assembly 1032 and the carriage 915. Mass balance attachment tool 1020 contains a carriage bay 1022, which firmly holds the optical carriage. A mass balance attachment clamp 1024 has mass balance alignment pins 1026 as shown in FIG. 23. The alignment pins 1026 are adapted to mate with the mass balance 1032 in order to provide alignment between the carriage 915 and the mass balance.

In the embodiment shown in FIG. 22, there are four identical stations for attachment of the mass balance assembly and the carriage.

Coarse Coil Attachment Tool and Process

Referring to FIGS. 25 and 26, there is respectively shown a coarse coil attachment tool 1034 and the carriage 915 having attached coarse coils 1038. Coil arms 1036 are used to hold and locate the coarse coils 1038. A carriage body 915 is positioned on the coarse coil attachment tool 1034 by use of rail guides 952. The coil arms 1036 swing about a pivot to produce a carriage body 915 with attached coarse coils 1038 as shown in FIG. 26.

The placement of coarse coils 1038 is very important since these coils should clear the linear pole pieces 1042. Individual coils vary somewhat in physical dimension. Coarse coil attachment tool 1034 positions the inside dimensions of the coarse coil with respect to the rail guides 952 in order to account for these variations.

The coarse coils 1038 are glued to mass balance assembly 1032 and the carriage body 915 as shown in FIG. 26. The amount of glue and space 1040 between the coil and supporting structure is variable and allows the air gap 1044 to remain within tolerance. The pivoting coil arms 1036 rest against stops (not shown) to place them in proper relationship to the rail guides 952. This is the gluing position.

Referring to FIG. 1, procedure step 96–102 (not shown) detail the fact that the coarse coil 1038 has epoxy applied to two sides. The epoxy is applied in a very thick layer and the excess is wiped away. Alternately, the adhesive may be applied to carriage 915. The finished carriage assembly 915, with coarse coils 1038, is baked at a prescribed temperature for a prescribed amount of time. In this particular embodiment HARD MAN EPOXY is baked at 70° C. for 1 hour.

Attachment of Focus and Radial Coils

Figure 1E:
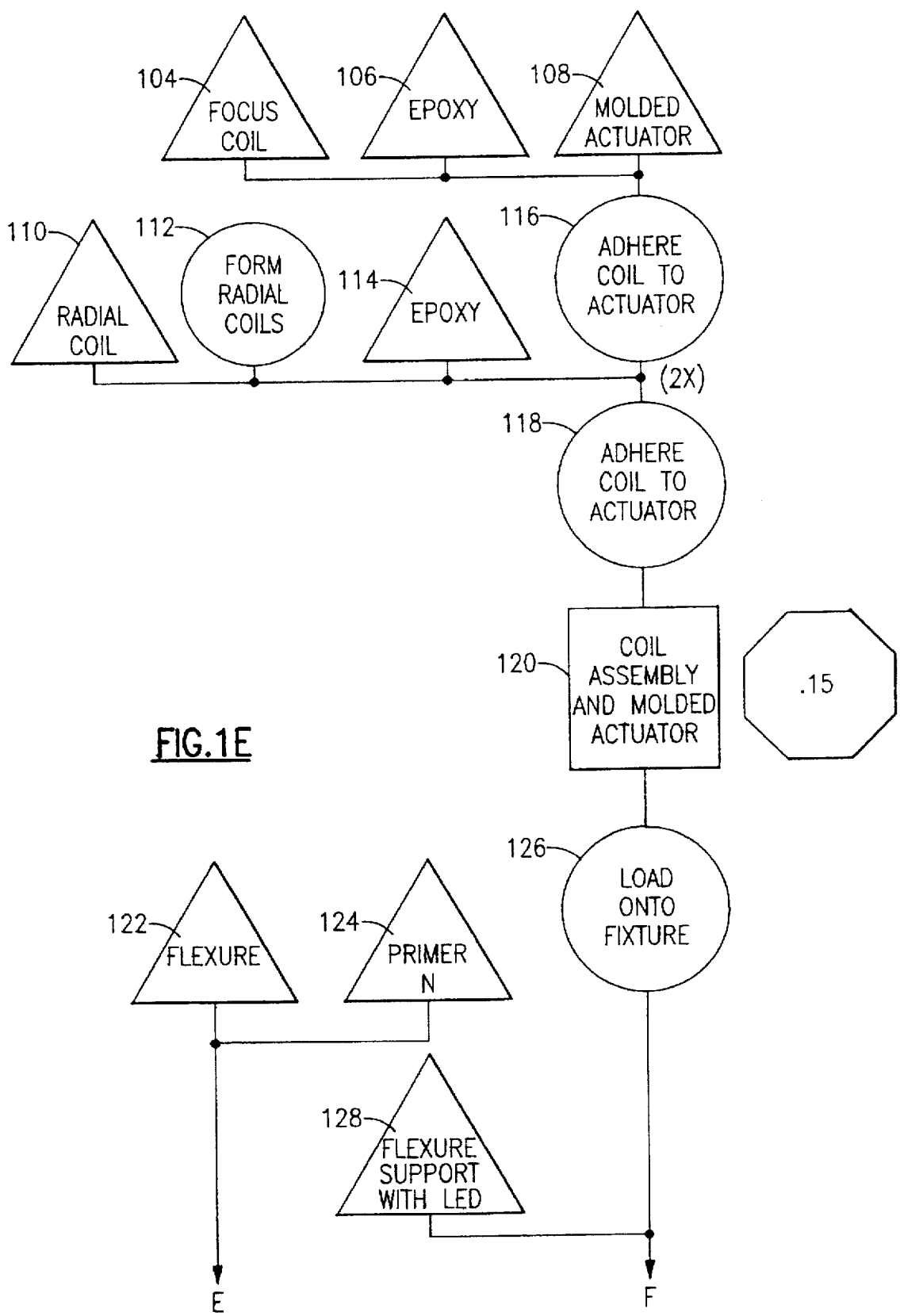
Figure 27:
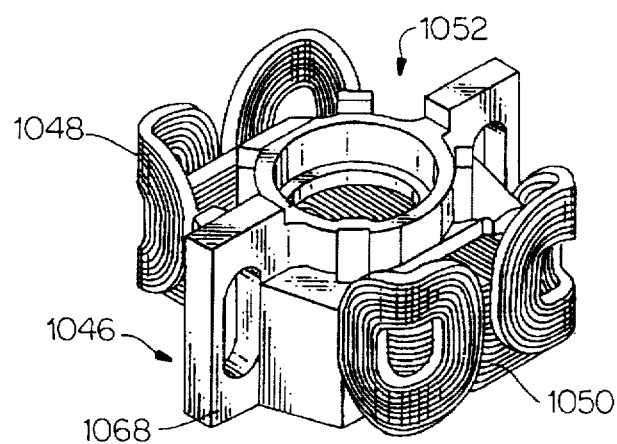
FIG. 27 is a molded actuator with focus coil and radial coils that is assembled according to the process shown in FIG. 1.

Referring to FIG. 1E, there shown the process for forming a molded actuator assembly 1052 with coils in process steps 104–120. A completed molded actuator assembly 1052 is shown in FIG. 27. Focus coil 1050 and radial coils 1048 must be glued onto a plastic molded actuator 1046. To ensure quality and proper life, the molded actuator assembly 1052 must be clamped and glued precisely.

Figure 30:
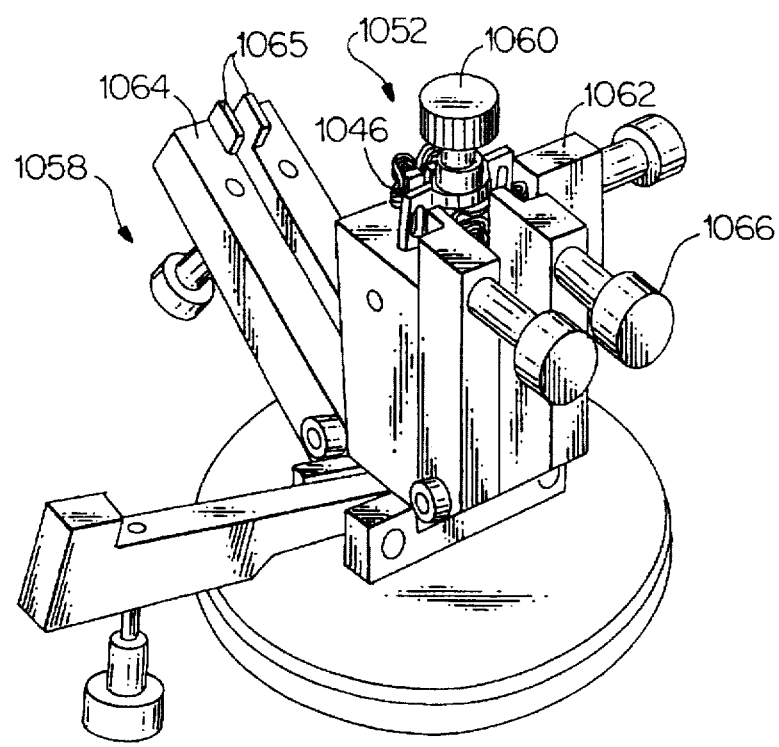
FIG. 30 is a perspective view of a spider tool and actuator assembly.
Figure 31:
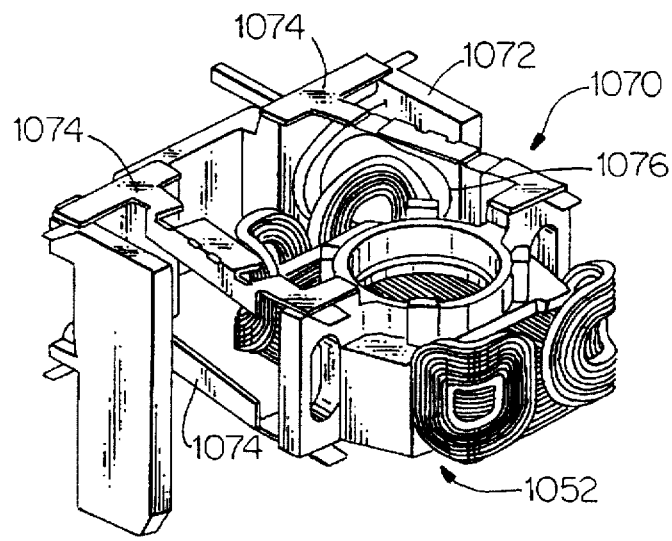

Referring to FIG. 30, the spider tool 1058 is shown. The advantage of a spider tool is partly in the consistency of placement of the radial coils and focus coil. Another advantage is that assembly time is reduced. A molded actuator 1046 is shown in FIG. 30 without focus coil 1050 and radial coil 1048. The right half of FIG. 30 shows the spider tool 1058 with clamps 1060, 1062, and 1064 in place. The right half of FIG. 30 also shows the molded actuator assembly 1052 with radial coils 1048 and focus coil 1050. Before placing a molded actuator 1046 into the spider tool 1058, the radial coils 1048 must be bent. This is done according to standard coil bending procedures. In addition, the focus coil 1050 must be placed into the molded actuator 1046 before assembly on the spider tool 1058.

The molded actuator 1046, focus coils 1050, and radial coils 1048 are placed and clamped into the spider tool 1058. Referring to the right hand side of FIG. 30A, the wide side clamp 1062 and narrow side clamps 1064 are used to accommodate the structure of the molded actuator assembly 1052. The narrow clamps 1064 avoid the tabs 1068 while still allowing access to the radial coils for clamping. A thermal set glue is applied to the coils during a first stage. At this first stage the actuator assembly 1052 is clamped into the spider tool. An operator may manually loosen any one of the clamps to readjust the coils in order to make final adjustments. After such final adjustment, or second stage, the molded actuator and spider tool are baked in an oven. Alternatively, all coil may be final adjusted by partially loosening each clamp, manually adjusting the coils and then tacking the coils into place using a general adhesive.

In FIG. 30B arms 1065, 1065 are angularly mounted on the side clamps 1064 to better accommodate the radial coils to be clamped.

Figure 28:
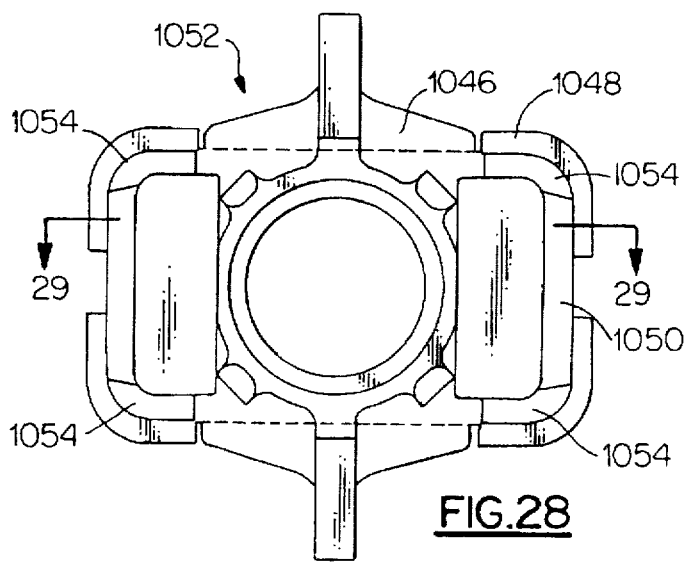
FIG. 28 is a cross section view of the molded actuator with focus coil and radial coils shown in FIG. 27.
Figure 29:
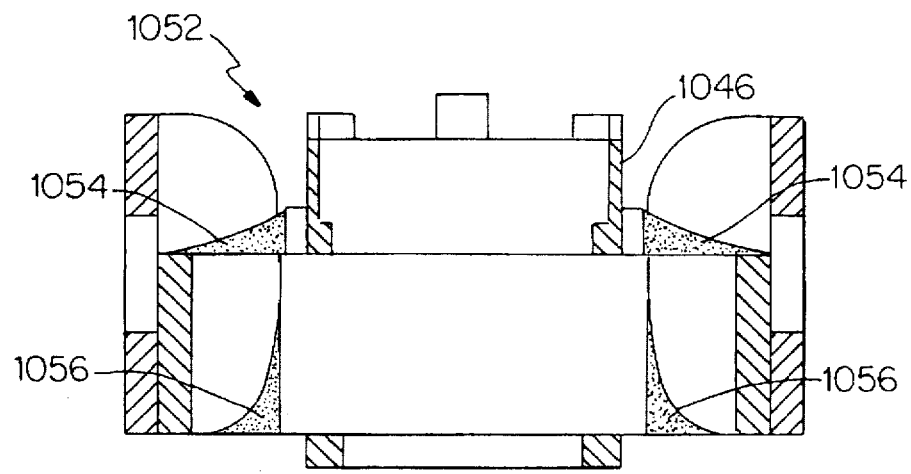
FIG. 29 is a sectional view through line 29—29 of FIG. 28.

Referring to FIGS. 28 and 29, additional glue is later added for structural integrity. Glue fillets 1054 are added to glue the focus coil 1050 to the molded actuator 1046 and to glue the focus coil 1050 to the radial coils 1048. Similarly, glue fillets 1056 for the radial coils 1048 are added to give structural support between the radial coil 1048 and the molded actuator 1046.

Armature Assembly

Figure 31:
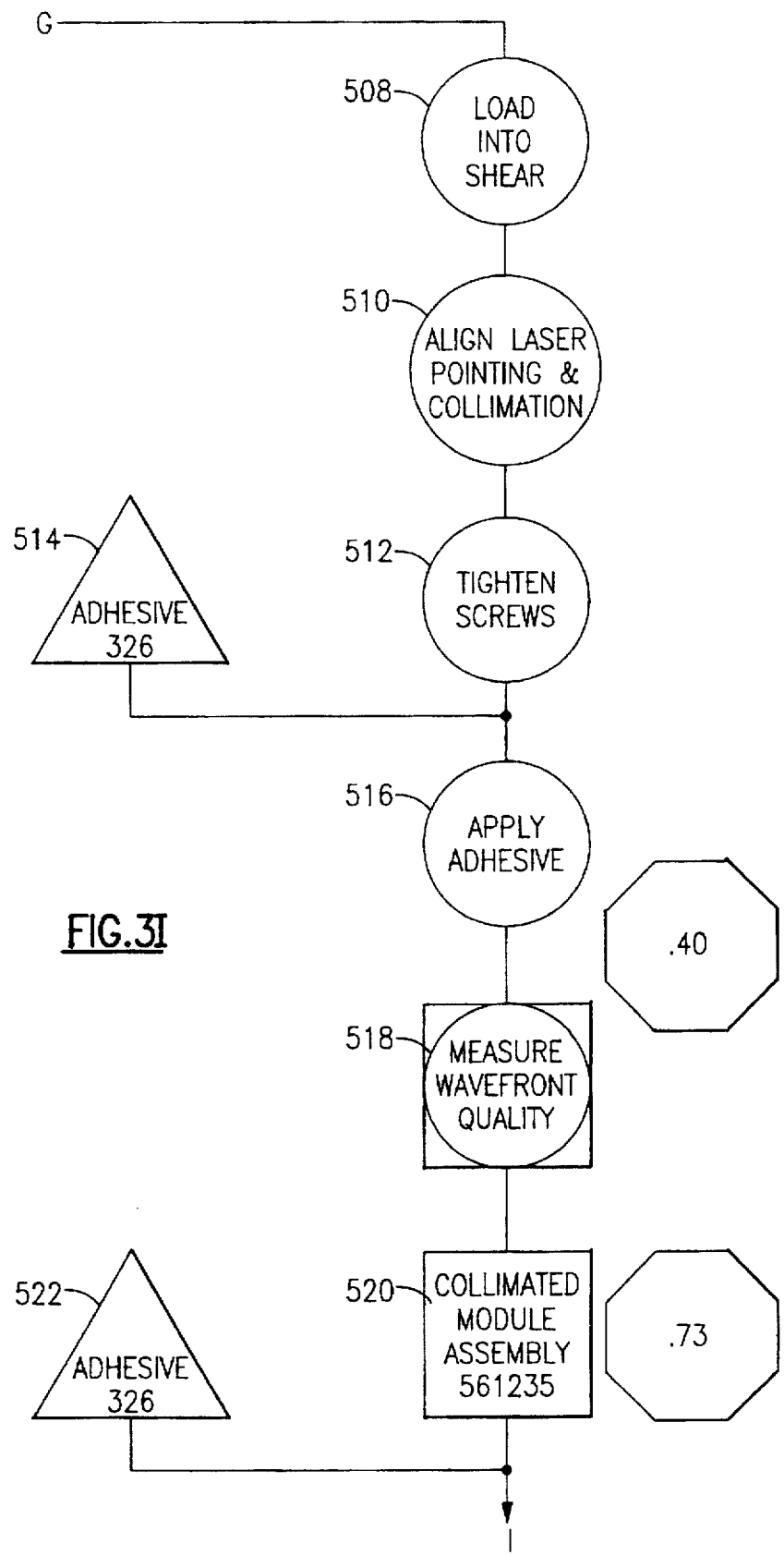
FIG. 31 is a perspective view of an armature assembly.
Figure 3J:
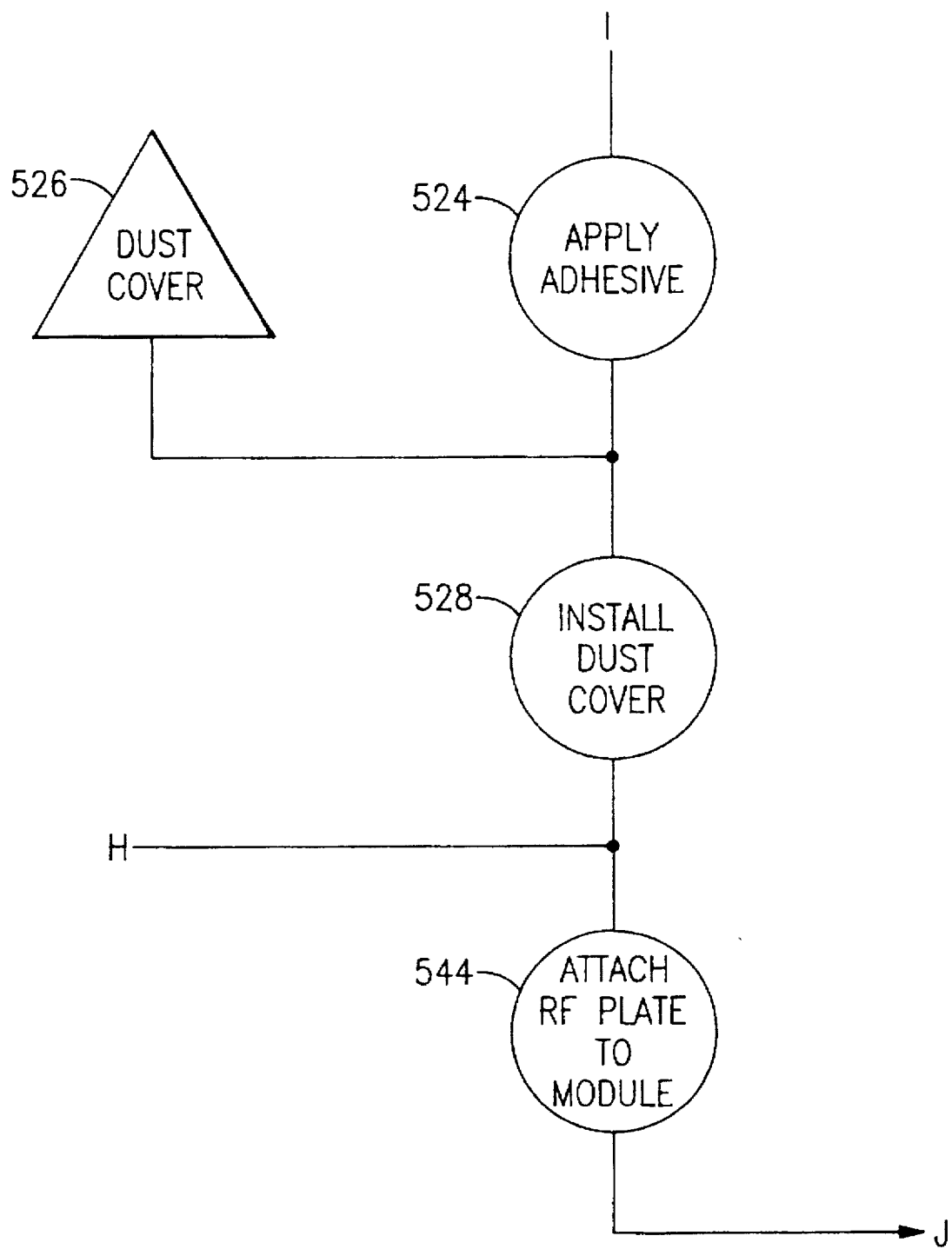
Figure 3K:
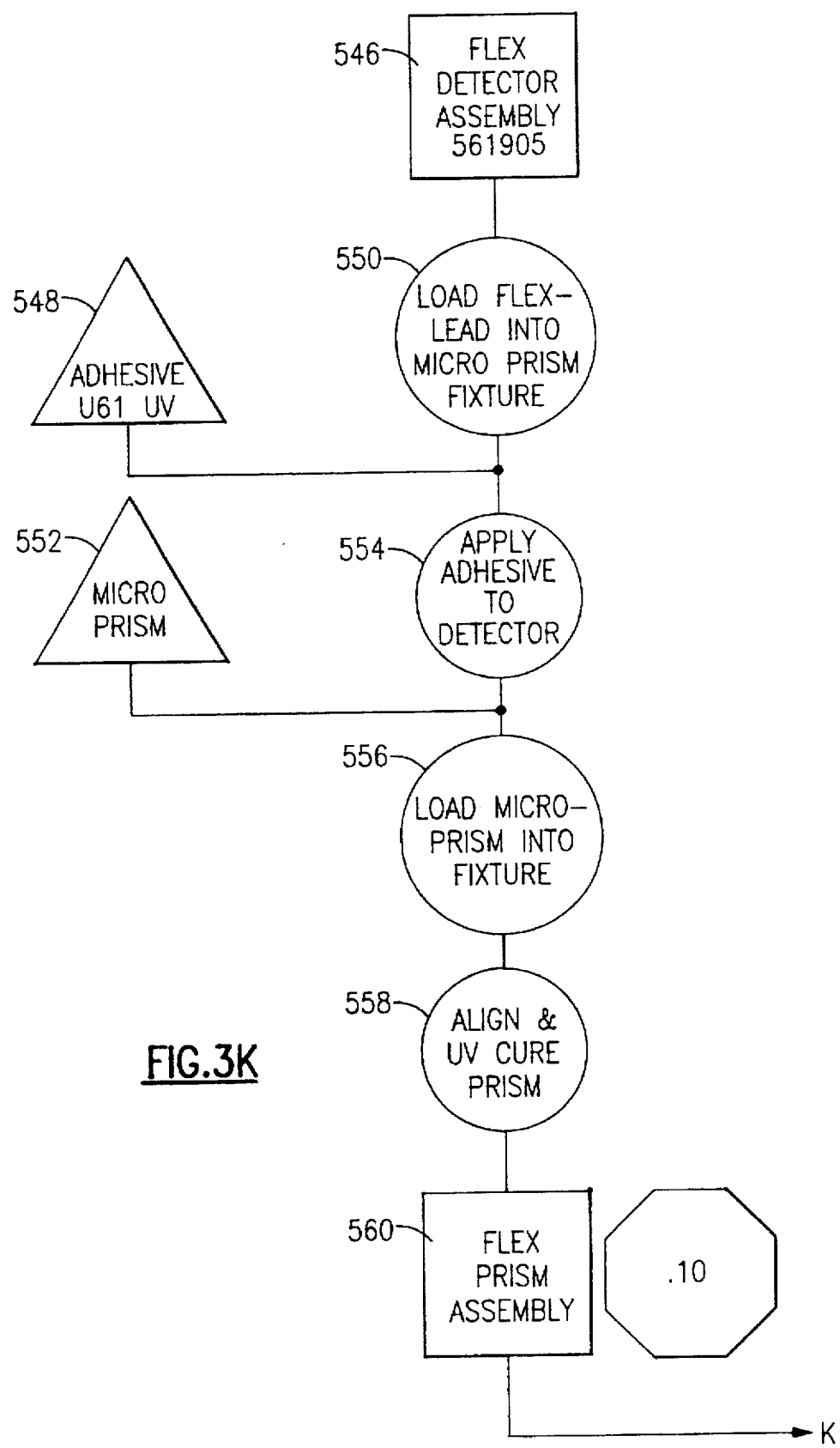
Figure 3L:
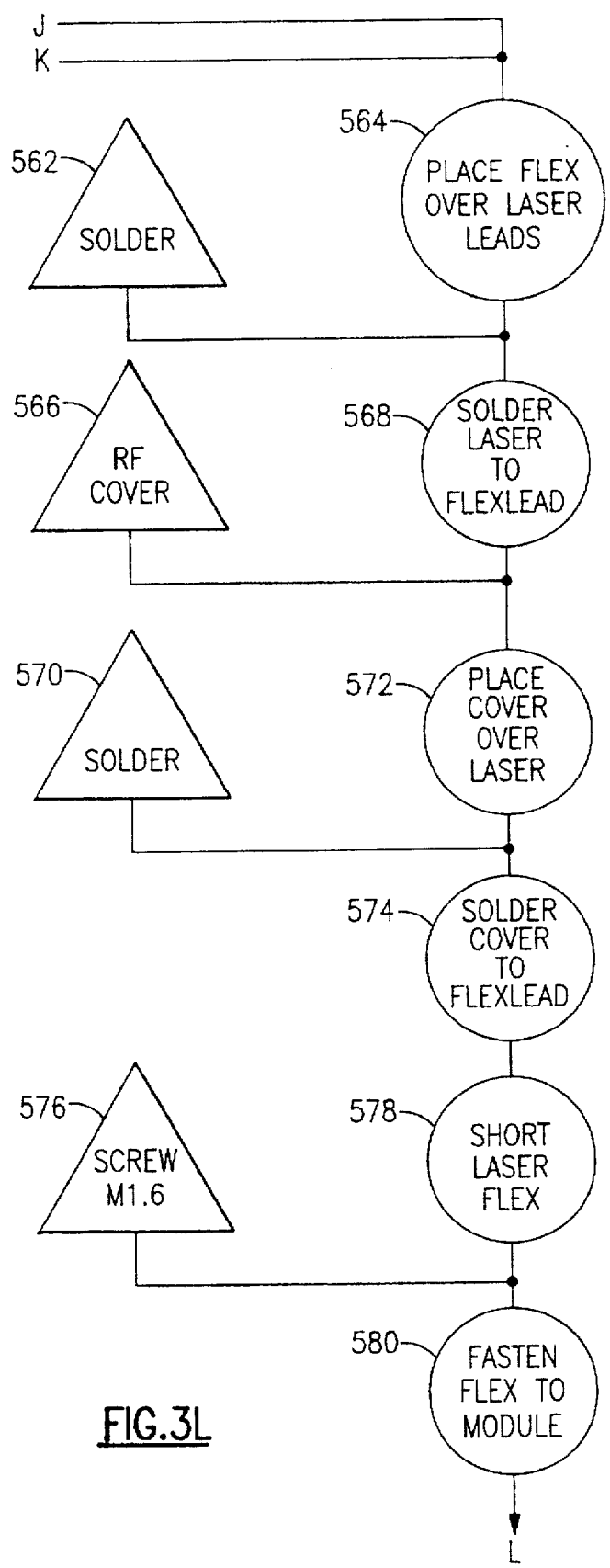
Figure 3M:
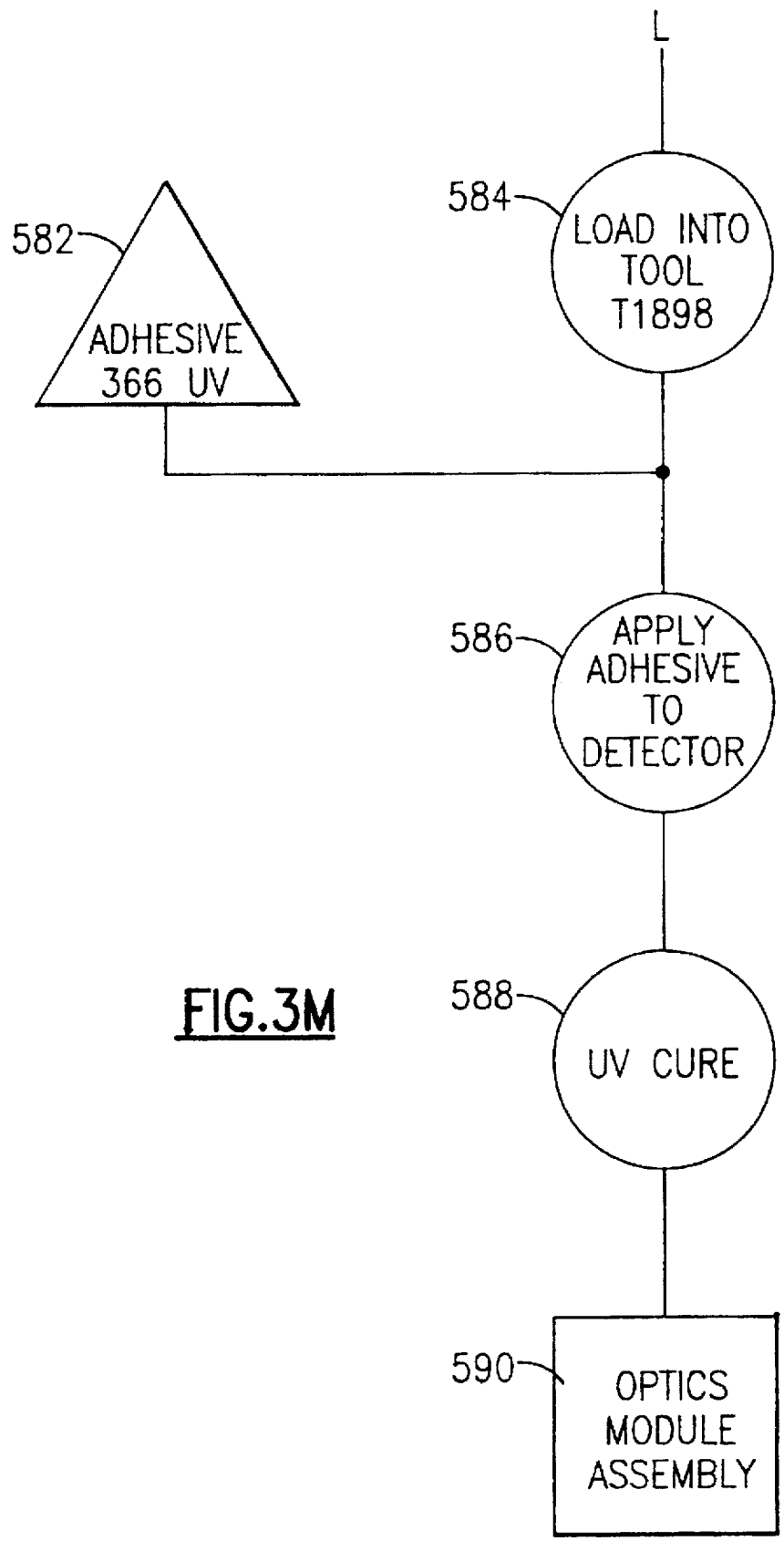

Referring to FIG. 31, an armature assembly 1070 is shown. The armature assembly 1070 consists of a flexure support 1072, flexures 1074, and the molded actuator assembly 1052. The purpose of armature assembly 1070 is so that the molded actuator assembly 1052 can travel up and down and side to side, bending the flexures using the coils to power the movement of the assembly. The flexures 1074 are made from three layers of metal, the top and bottom layers being a copper beryllium alloy, and the middle layer being a dampening material. A viscoelastic dampening material is the appropriate type of material to be used in this flexure.

Figure 32:
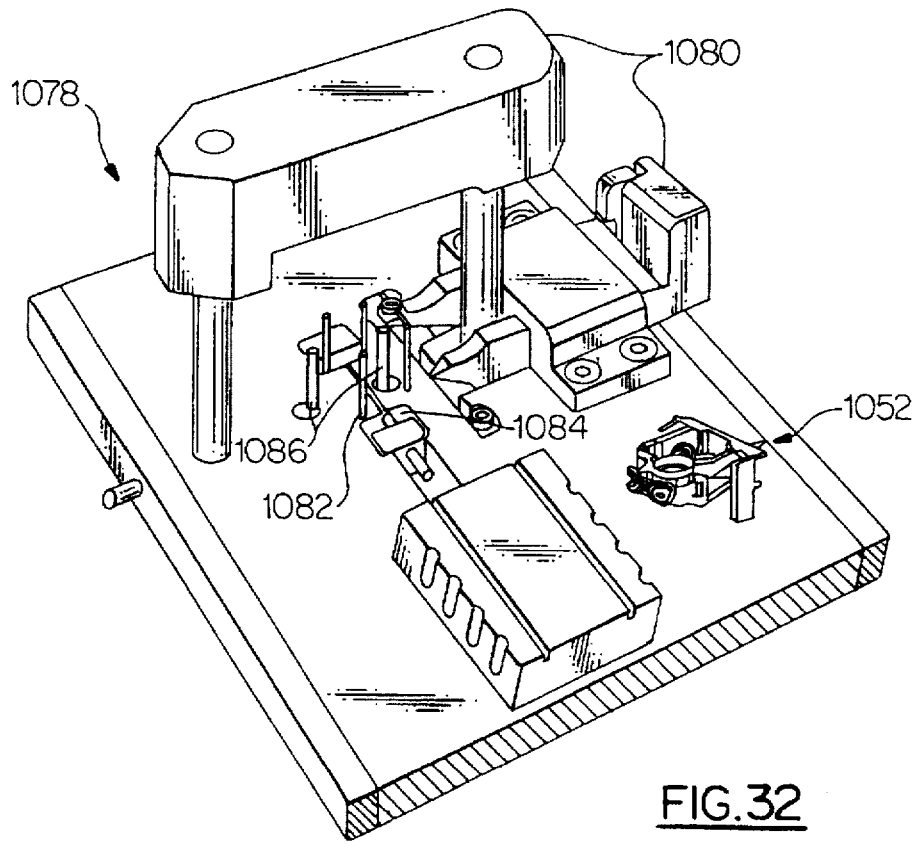
FIG. 32 is a perspective view of an armature assembly tool.

Referring to FIG. 32, an armature assembly tool 1078 is shown. The bottom flexure 1074 (not shown) exists with supporting material that will later be cut out. In this stage the flexures look like a single stamped piece instead of two separate pieces. The stamped one-piece flexure has alignment holes (not shown). The alignment holes fits over alignment pins 1086. Next, glue is placed on the bottom of the actuator assembly 1052 and flexure support 1072. Flexure support is positioned over the flexures by use of the alignment slots 1084. The actuator assembly fits over an alignment pin 1086 and is clamped by clamp 1080 such that it does not rotate around its major axis. Glue is applied on the top of the actuator assembly 1052 and flexure support 1072. Top flexure assembly 1074 is aligned on the alignment pins 1086.

Referring to FIG. 1, process element 122 through 144 correspond to the manufacture of the armature assembly 1070.

The armature assembly 1070 is manually assembled with the carriage body 915 using a structural adhesive. Top pole pieces are glued using more structural adhesive. Next, the flexures 1074 are attached to flex leads using solder. The last electrical connection to complete the armature assembly is soldering an LED 1076 to the flex lead.

Referring to FIG. 1, the above processes are contained in process steps 144 through 172.

Objective Lens Attachment and Quality Control

Figure 34:
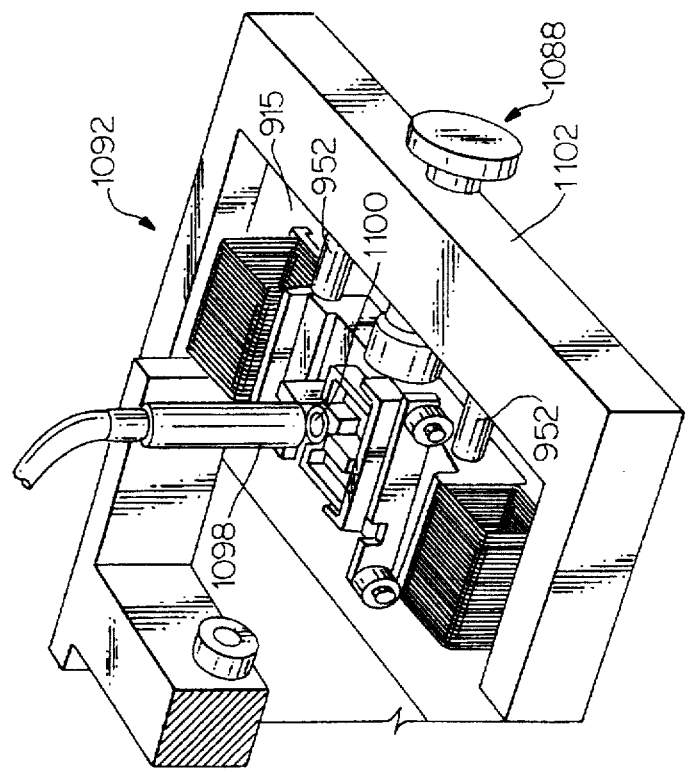
FIG. 34 is a perspective view of a lens attachment tool.
Figure 33:
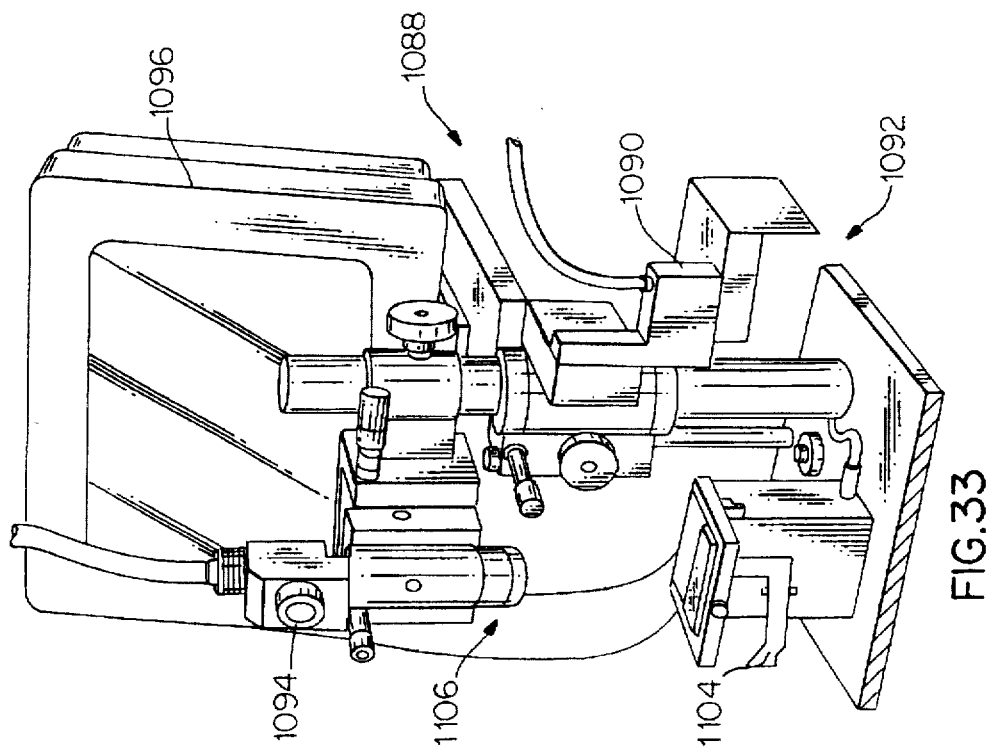
FIG. 33 is a perspective view of a lens placement station.

Referring to FIGS. 33 and 34, there is shown lens placement station 1088. Lens placement station 1088 is designed to assist in the insertion of an objective lens and with the inspection of the lens after insertion. These two steps are done in two similar stations which sit side-by-side. The lens attachment tool 1092 is where the lens is positioned and glued. Objective lens 1100 is held by vacuum chuck 1098. Lens 1100 is inserted into the carriage 915 which is clamped in place with the carriage clamp 1102 and supported by rail guides 952. Glue is applied to the lens and UV light is used to cure the glue. Procedures 174 through 184 apply to the attachment of a lens.

The lens inspection tool 1106 is part of the lens placement station 1088. The inspection tool 1106 contains an autocollimator 1094. It produces a light source having a parallel beam which measures tilt-over-stroke of the objective lens. A computer system 1096 will drive the assembly which is powered through a flex lead 1104. The computer system 1096 contains tests designed to measure the focus and tracking capabilities of each optical carriage 915. The inspection tool 1106 performs a test of the optical carriage by driving the carriage actuator up, down, left and right through its focus and tracking movements and by stopping at each position for the operator to read the autocollimator. The autocollimator measures the quality of the optical assembly by sending a beam of light down to the flange on the objective lens and reflecting it back up into the autocollimator to be read by the operator. If the carriage objective lens tilts as it moves up or down then this is detected. If the tilt-over-stroke is greater than the specified tolerance, then computer system 1096 will notify the operator of a failed unit.

In another embodiment of this invention, the autocollimated light is refracted through the objective lens and reflected from a mirror resembling a disc. The light is returned through the objective and measured by the autocollimation system. In this embodiment it is not necessary to use an objective lens having a circular doughnut flange with a flat semi-reflective surface. A lens with a flange will work in both embodiments.

Figure 35:
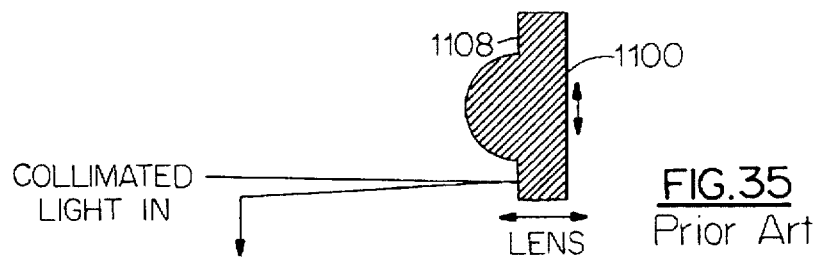
FIG. 35 is a diagram of an objective lens being illuminated by an autocollimated light source in accordance with the prior art.

Referring to FIG. 35, an objective lens 1100 is shown having a flange 1108. The light from the auto collimator is reflected back form the flange and measured as illustrated in FIG. 35.

Figure 36A:
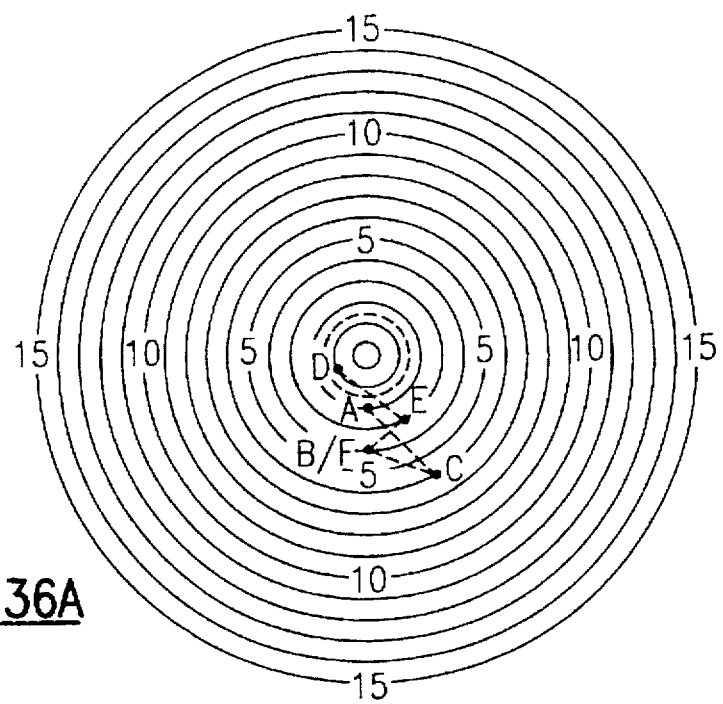
FIG. 36A is a diagram of a tilt-over-stroke test showing a passing result.
Figure 36B:
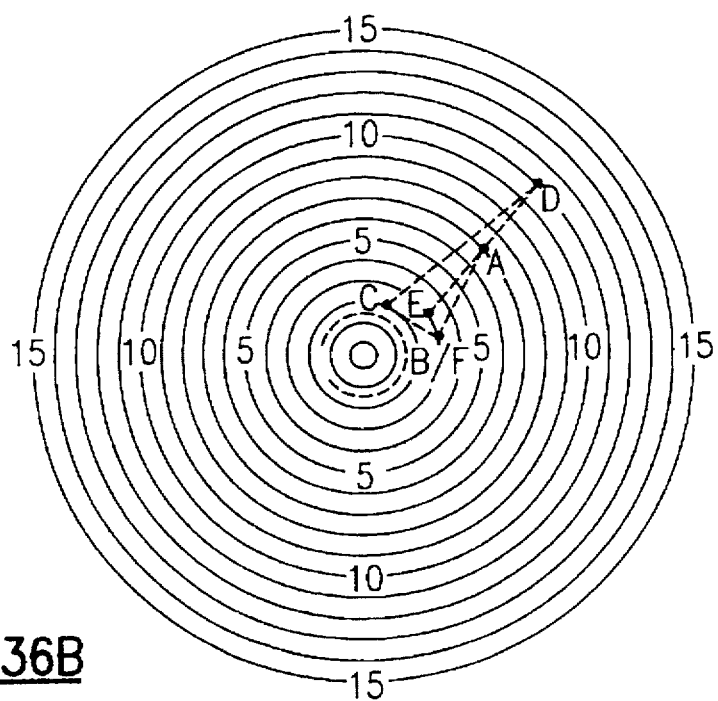
FIG. 36B is a diagram of a tilt-over-stroke test showing a failing result.

Referring to FIG. 36A, an actual test result is illustrated. This tilt-over-stroke test shows a passing result. Referring to FIG. 36B, a tilt-over-stroke test showing a failure result is illustrated. One feature of the autocollimator is that it contains an optical sensing device such as a CCD camera. The returned light is measured using a bulls eye targeting type grid in order to note deviations from the center bulls eye. For example, a unit passing the test may have returned light that is within a tolerance of 0.3 milliradians. Each 0.3 milliradians corresponds to one ring from bulls eye. Two rings from the bulls eye center correspond to 0.6 milliradians. An unacceptable lens out of tolerance, for example 0.9 milliradians, would show up as a bright spot 3 or more rings away. The ring system is shown on the computer display for the operator's benefit. In a perfect optical carriage assembly, the returned light would strike a bulls eye and remain on the bulls eye through the focus and tracking operations. However, in practice some tilt-over-stroke will be seen. If an unacceptable amount of tilt-over-stroke is observed, then the unit is rejected and the lens is removed.

Referring to FIG. 36A, a passing unit is shown. Point A is a lens angle at nominal position which means voltage has been applied to counteract gravity, thereby placing the actuator in a nominal position. Point B corresponds to the lens angle at top of focus. Point C is the lens angle at bottom focus. The lens angle away from the spindle is point D and the lens angle toward spindle is measured as point E. Then power is removed and the lens angle is measured at rest as point F. A failing unit is defined that the angle is greater than 10 rings as measured on the autocollimator. A pass is shown when all points reside within inside the 10 ring limit.

Figure 37:
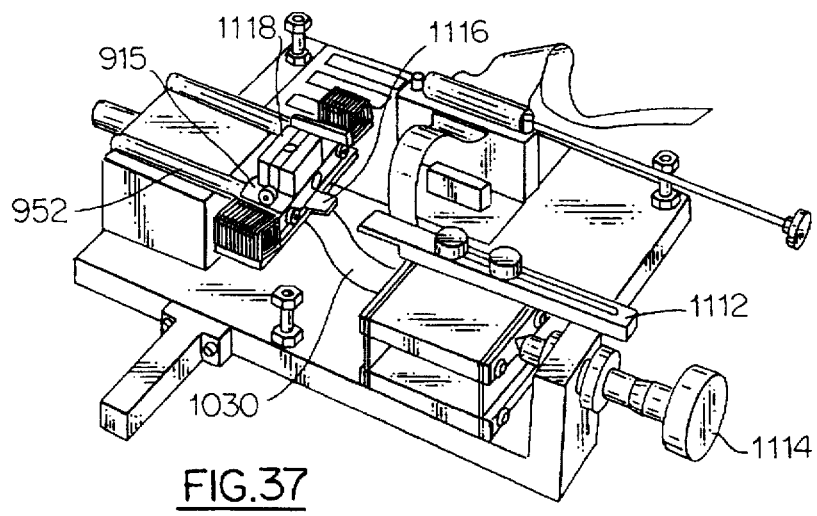
FIG. 37 is a perspective view of an alignment tool.

Process step 185 is the tilt-over-stroke test. Process steps 186 through 190 refer to manual gluing of a protective cover 1118 shown on FIG. 37. FIG. 37 also shows a position sensor alignment tool.

Position Sensor Alignment

Figure 38:
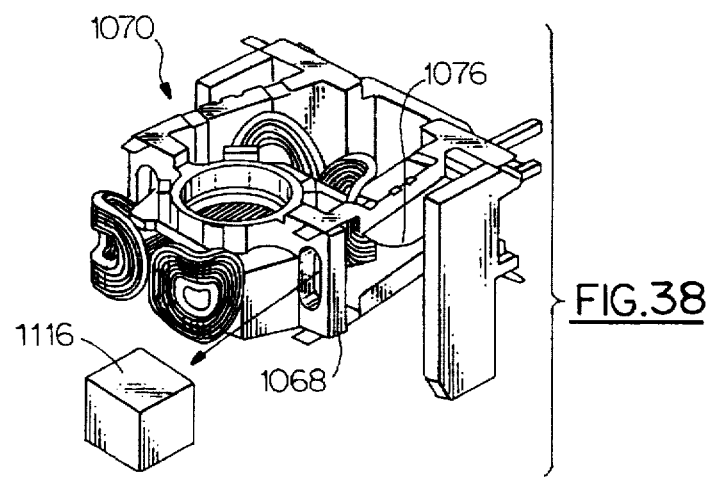
FIG. 38 is a perspective view of an armature assembly with a position sensor that can be aligned with the tool shown in FIG. 37.

Referring to FIG. 38, an armature assembly 1070 with a position sensor 1116 is shown. An LED 1076, a tab 1068 with a slot cut for passage of light, and the position sensor 1116 are used to determine the position of the armature assembly 1070. The position sensor 1116 is contained on the flexure lead 1030 and needs to be precisely glued to the carriage body 915.

In FIG. 37 an optical carriage contained on rail guides 952 is ready for position sensor alignment. The manipulator arm 1112 holds position sensor 1116. Fine adjustment is done with the adjustment knob 1114 until the position sensor 1116, tab 1068 with slot, and LED 1076 are in complete alignment. Standard electronic elements are used to drive the LED and make a measurement of the readout of the position sensor. The position sensor 1116 is a quad segment photodiode.

The position sensor 1116 is glued and remains held in place for several minutes while the glue is drying. Process steps 192 through 198 in FIG. 1 illustrate the above process.

Figure 39:
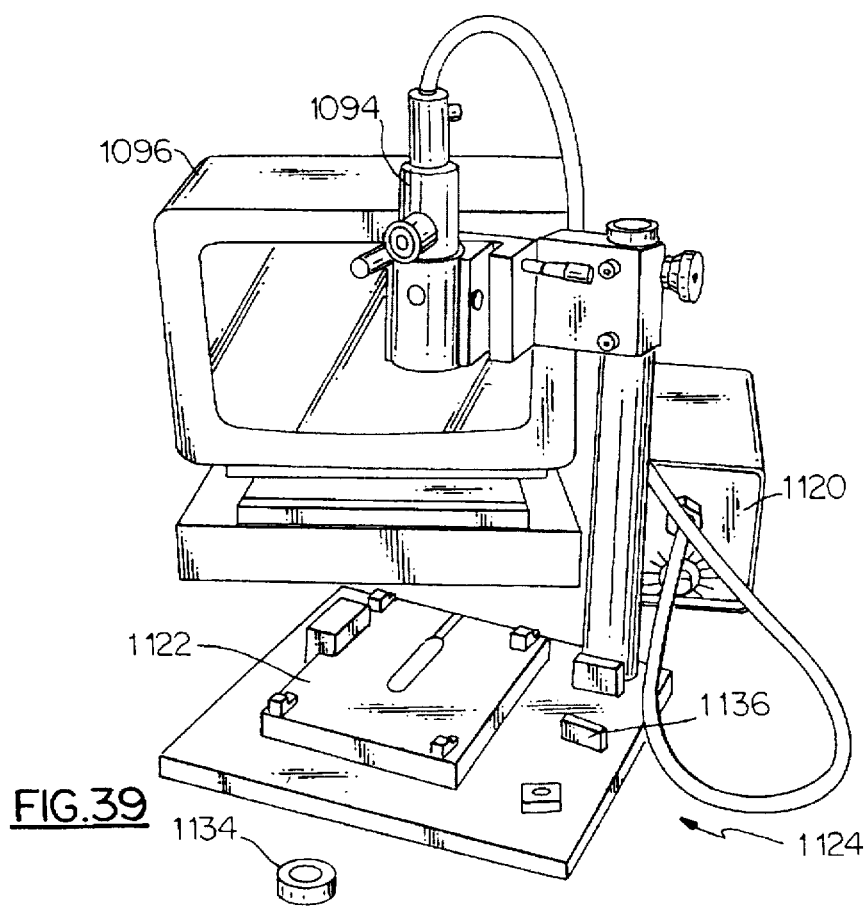
FIG. 39 is a perspective view of a spindle-to-rail measurement station.

Referring to FIG. 39, a machine, known as a rail-to-spindle motor test station 1124, is used to test the angle between the plane of a disc riding on the spindle and the plane of the guide rails 952. Any offset angle between these two planes will result in the optical head gradually becoming more distant or closer to the disc during operation. Therefore, any angle between the guide rails 952 and the disc (not shown) is undesirable. However, in manufacturing and supply of the baseplate sometimes a small angle is introduced. Such an angle can be compensated for during the procedure to load and locate a lens. The rail-to-spindle motor test station 1124 contains an autocollimator light source 1120 supplying light to an autocollimator 1094. A computer system 1096 is used to monitor test results. The measuring platform 1122 holds the baseplate assembly (not shown). A circular mirror 1134 is placed flush across the spindle motor hub. The autocollimator is zeroed on this point. A gauge block 1136 is placed across the outer diameter (viewed as if a disc were present) and inner diameter of the rails, which correspond to the farthest and nearest point from the spindle motor. The autocollimator 1094 will receive a reflection and record any angle deviation.

Figure 41:
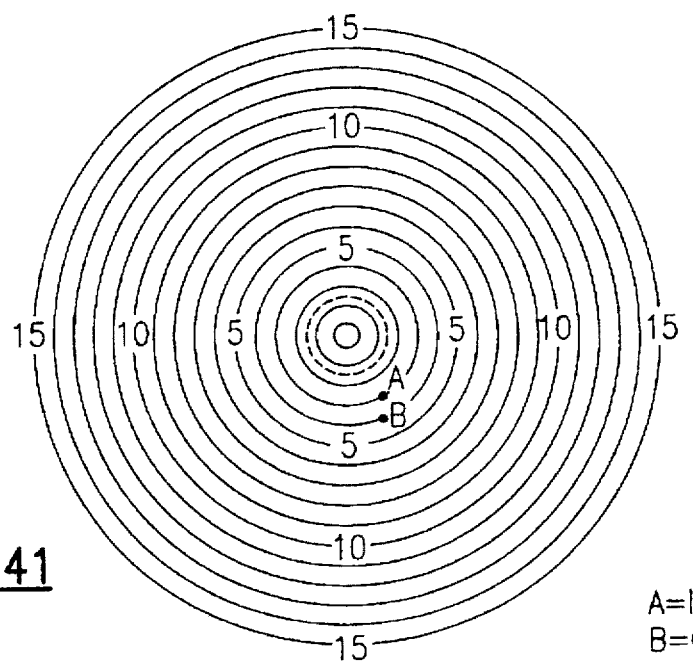
FIG. 41 is a diagram of a spindle-to-rail angle measurement accomplished with the use of the station shown in FIG. 39.

FIG. 41 shows a sample test in which the rails are offset 2 rings, or 0.6 milliradians at point A. Point B represents an angle deviation of 0.9 milliradians or 3 rings.

In FIG. 1, the rail-and-spindle motor angle measurement is shown as process step 201.

Constants and Transfers Test Station

Figure 40:
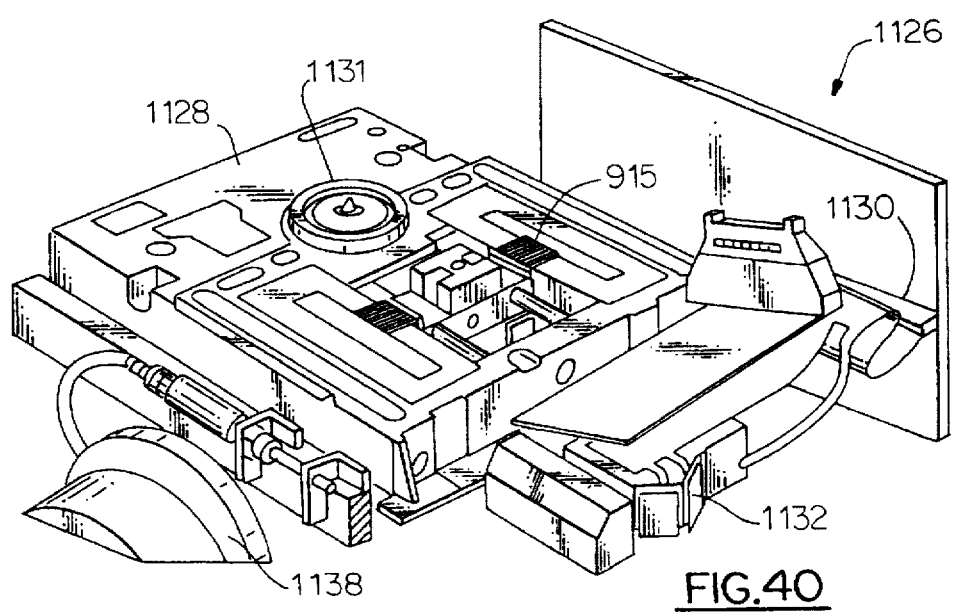
FIG. 40 is a perspective view of a constants and transfer test station.

FIG. 40 shows a constants and transfers test station 1126. This test station 1126 incorporates a base 1138 that is able to rotate. The rotatable base 1138 can position the baseplate assembly 1128 in various different configurations such as horizontal or vertical. Details of the manufacture of the baseplate assembly are disclosed hereinbelow. The test station 1126 is used to simulated various working positions. The interface electronics 1130 drives the spindle motor 1130, carriage 915, and armature assemblies through various tests. An optics module 1132 is mounted in the test station 1126, and is aligned with an X-Y manipulator in order to balance the servo signals generated by the assembly 1128.

To conduct the tests, a baseplate 1128 is mounted on the rotatable base 1138 of the test station 1126, and electrical connections are made to the baseplate, electronics 1130, and to an analysis computer (not shown). Dynamic characteristics of the carriage, including constants of the baseplate's tracking motor, focus motor, and coarse positioning motor are determined. More particularly the sensitivity of each motor to driving currents is evaluated. Transfer curves are determined for each of these motors, for example low and high frequency focus transfer, low and high frequency tracking transfer, and a transfer curve for the coarse positioning motor. The motor sensitivities are determined by first obtaining measurements in a horizontal position, and then again after the baseplate 1128 is mounted in a first vertical orientation. In order to determine how much driving current is required for the tracking motor to hold the carriage in place, a further analysis is made after rotating the baseplate 1128 by 180° into a second vertical orientation. Thus the full effects of gravity are taken into account in determining the sensitivity of the tracking motor in both directions of carriage travel. Similarly the focus motor is evaluated by obtaining measurements in a first horizontal orientation, and in a second horizontal orientation after rotating the baseplate 1128 by 180°.

The following tests are run during the constants portion of the testing:

1. Motor testing;
2. Acceleration constant testing;
3. Seek testing;
4. Position sensor slope measurement; and
5. Nominal focus current measurement.

Multiple transfer functions are run at low and high frequency to check the dynamic stability of the actuator assembly of the baseplate assembly. The following are some specific tests:

1. Low frequency focus;
2. High frequency focus;
3. High frequency fine;
4. Coarse; and
5. Low frequency radial.

Baseplate Assembly and Test Process

Referring to FIG. 2, processes 208 through 302 involve manual assembly using conventional techniques of the following elements for the baseplate assembly: spindle motor, carriage assembly, two guide rails, two outer pole pieces with magnets, one inner weldment. These major pieces are substantially connected together using screws. The screws are torqued in using a standard torque wrench in following conventional assembly practice.

Laser Alignment and Test Station

Figure 42:
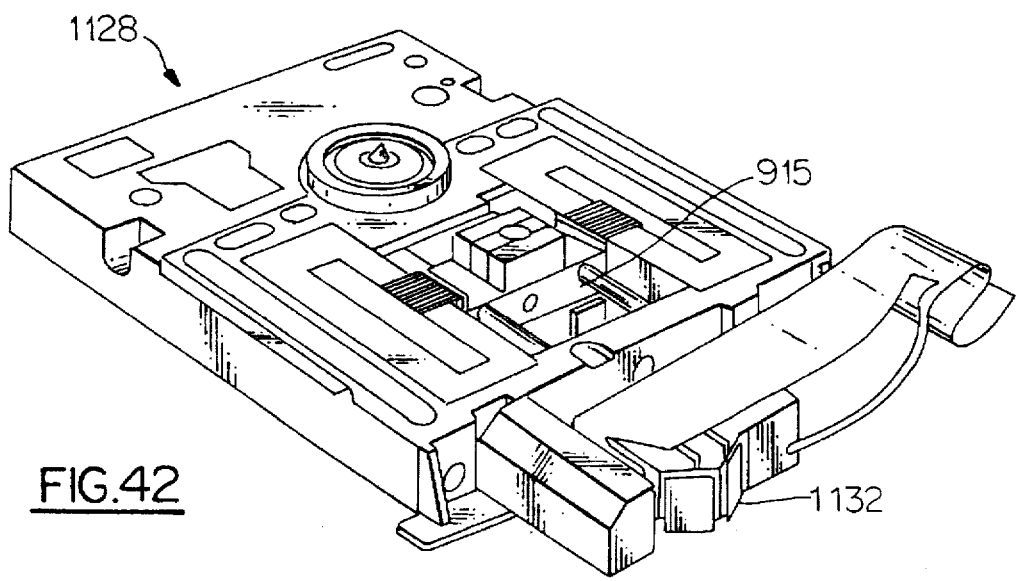
FIG. 42 is a perspective view of a baseplate with an optics module.
Figure 43:
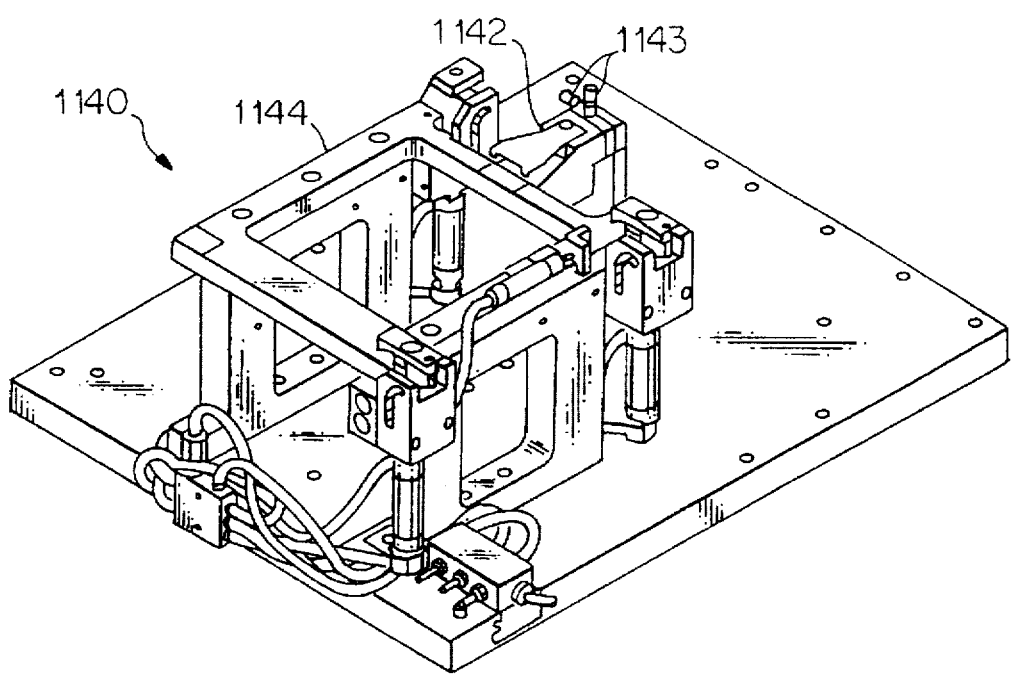
FIG. 43 is a perspective view of an optics module alignment tool.

Referring to FIGS. 42 and 43, a baseplate assembly 1128 having an optics module 1132 is assembled on the laser alignment station 1140. The baseplate 1128 is received on the baseplate fixture 1144. This baseplate fixture 1144 is a universal piece of hardware which is used in various embodiments throughout the baseplate assembly and testing process. A positioning tool 1142 clamps onto the optics module 1132. The positioning tool 1142 is movable by use of micrometers 1143. The laser alignment station 1140 functions to align the optics module with respect to the baseplate. This is done by energizing the laser found in the optics module and sensing the output at the carriage 915. Small adjustments can be made using the micrometers on the positioning tool 1142 to maximize transmission of laser light through the baseplate assembly 1128. The laser light power sensing is performed using a standard photo detector held in a fixture (not shown) above the carriage 915.

Figure 44:
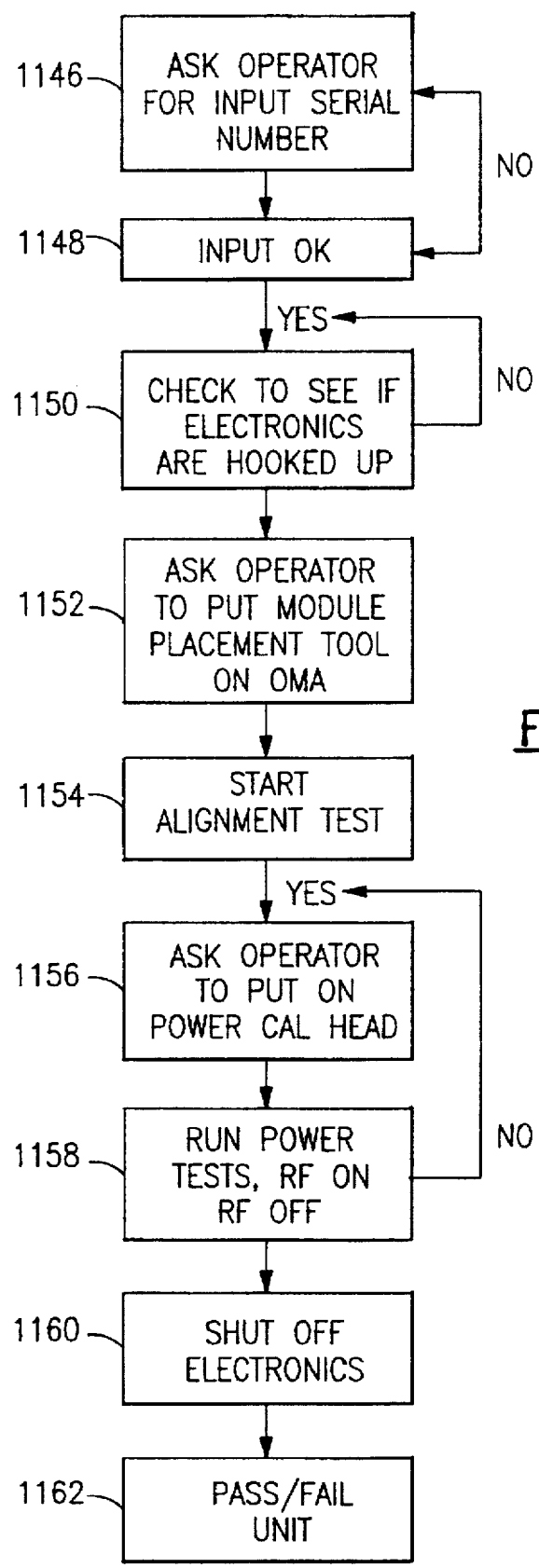
FIG. 44 is a flow chart of a laser alignment test.
Figure 47:
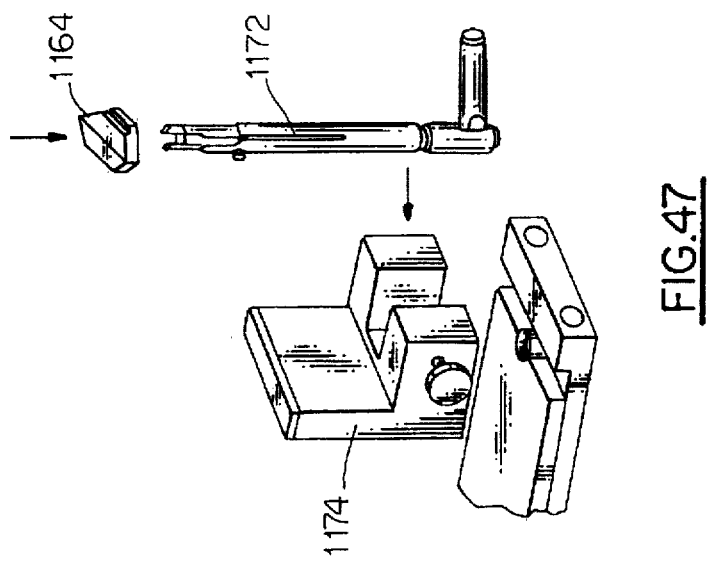
FIG. 47 is a perspective view of a DFTR gripping tool.
Figure 46:
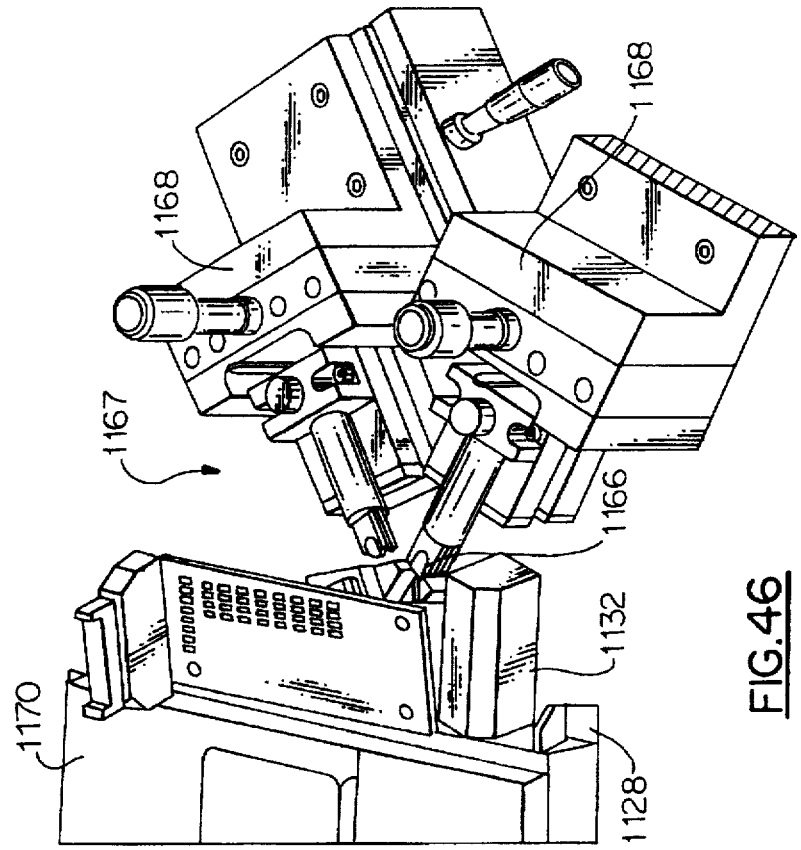
FIG. 46 is a perspective view of a servo alignment station.

A process for running the laser alignment test is diagramed in FIG. 44. Referring to FIG. 44 and the first process step 1146, the operator inputs the serial number of the unit. This serial number is used for tracking the unit and output of past/fail data from the operation. Operation 1148 checks the input to see if it is correct in the numerical format; if it is not step 1146 is repeated. In process step 1150 the operator checks that the electronics are all connected and that power is applied. If the power is applied the process continues; if not the operator is prompted to by a computer to recheck all connections. In process step 1152 the operator positions the photodetector to sense a laser output (not shown). In process step 1154 the operator starts the alignment test to align the optics module output beam to the center of the objective lens on the carriage. Once this step is completed, in process step 1156 the operator removes the photo diode and places the power calibration head. This power calibration head (not shown) is a standard power detector to measure the laser IP curve as a laser is energized. It is a fixture that locates on the cartridge location pins and holds a power detector over the carriage objective lens to measure the output power of the laser diode. The power detector is connected through wires and electronics to feed back into the analog test box and computer system. Once the power calibration head is placed on the unit, a power calibration test is run as shown in process step 1158. The test drives the laser through radiofrequency (RF) on and RF off states. The power calibration test performs a standard laser IP curve. Different parameters of the unit are also tested and include the following: 1) how well the laser powers up through a power curve with RF on and RF off; 2) the percentage change between the RF on and the RF off; and 3) the forward sense power calibration loops for amount of forward sense and currents. The results of the above mentioned tests are presented to the operator for determination of whether the unit passes or fails. The operator, as shown in process 1160, then shuts the electronics off, removes the unit and either rejects or passes the unit, as shown in process step 1162.

In FIG. 2, process steps 304 through 312 cover the use of the laser alignment station described hereinabove.

Process steps 314 through 332 refer to the optical gluing of two cylinder lenses onto focus and transmit reflection prism. The lenses are cleaned with acetone to ensure a clean gluing surface. An optically clear UV adhesive is used to bind the lenses to the prism.

Servo Alignment

Referring to FIGS. 45 through 48, the differential frustrated total internal reflection prism (hereinafter "DFTR") 1164 is loaded into the DFTR gripping tool 1172. The DFTR gripping tool 1172 is in turn loaded into a nest 1174 designed to securely hold the tool and yet provide rotation about its longitudinal axis. The nest 1174 and tool 1172 form an integral part of the servo alignment tool 1167. Servo alignment tool 1167 acts to position and uses micrometers to manipulate the DFTR 1164 and servo detectors 1166. The baseplate assembly 1128 and the optics module 1132 are loaded onto a standard baseplate fixture 1144. Detector manipulators 1168 are used to manipulate the servo detectors 1166. The servo alignment tool 1167 has a disc 1170 that simulates actual read/write situation. In this manner, the three optical units comprising the DFTR 1164 and two servo detectors 1166 can be optically aligned.

Figure 45:
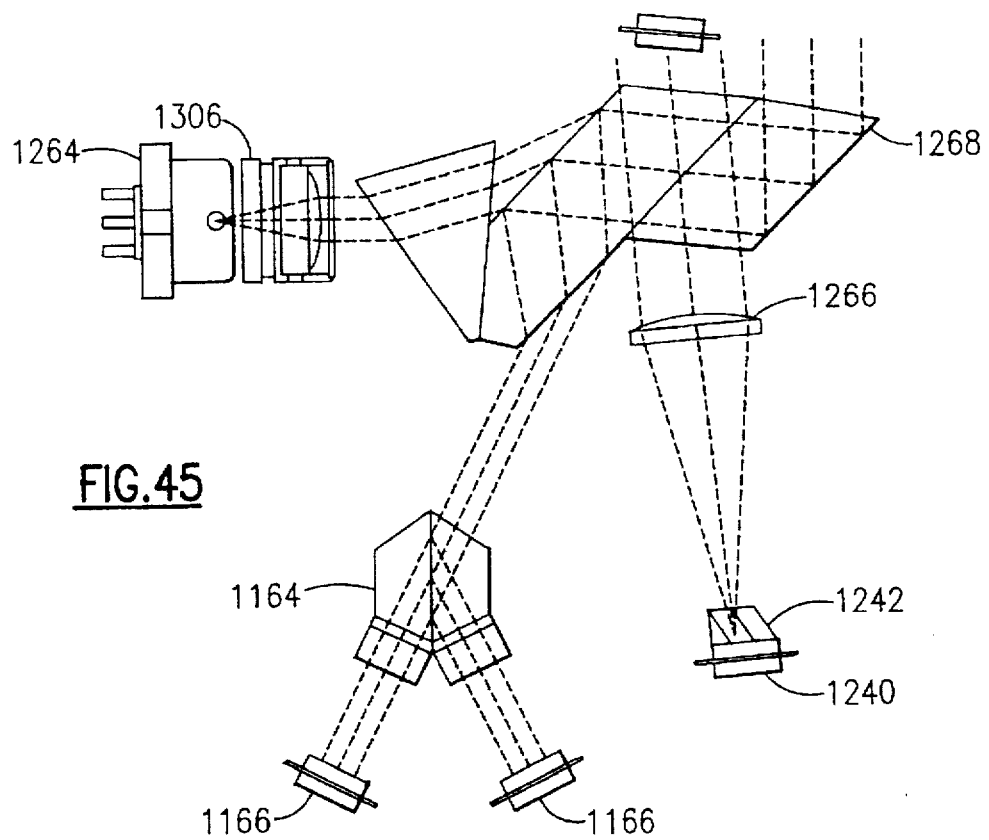
FIG. 45 is a diagram of an optics module that is tested according to the chart illustrated in FIG. 44.

Referring to FIGS. 45 and 49, the servo detectors 1166 transmit to an oscilloscope a transmitted signal 1176 and a reflected signal 1178, respectively. An operator will use the detector manipulators 1168 to balance the transmitted and reflected signals shown in FIG. 49.

In FIG. 2 process steps 334 through 348, refer to alignment of the differential frustrated total internal reflection prism (hereinafter DFTR) and servo detectors.

Once the reflected and transmitted signals are balanced, an operator will view an S curve focus signal 1180 such as the one seen in FIG. 50. The S curve represented on the oscilloscope 1180 is a practical test to determine whether the final arrangement of the DFTR 1164 and servo detectors 1166 are acceptable. If the final alignment of these components is acceptable, then an operator will glue and cure components. Process steps 348 through 358 represent the final gluing of these sensors.

Servo Alignment Test Software and Procedures

Figure 51:
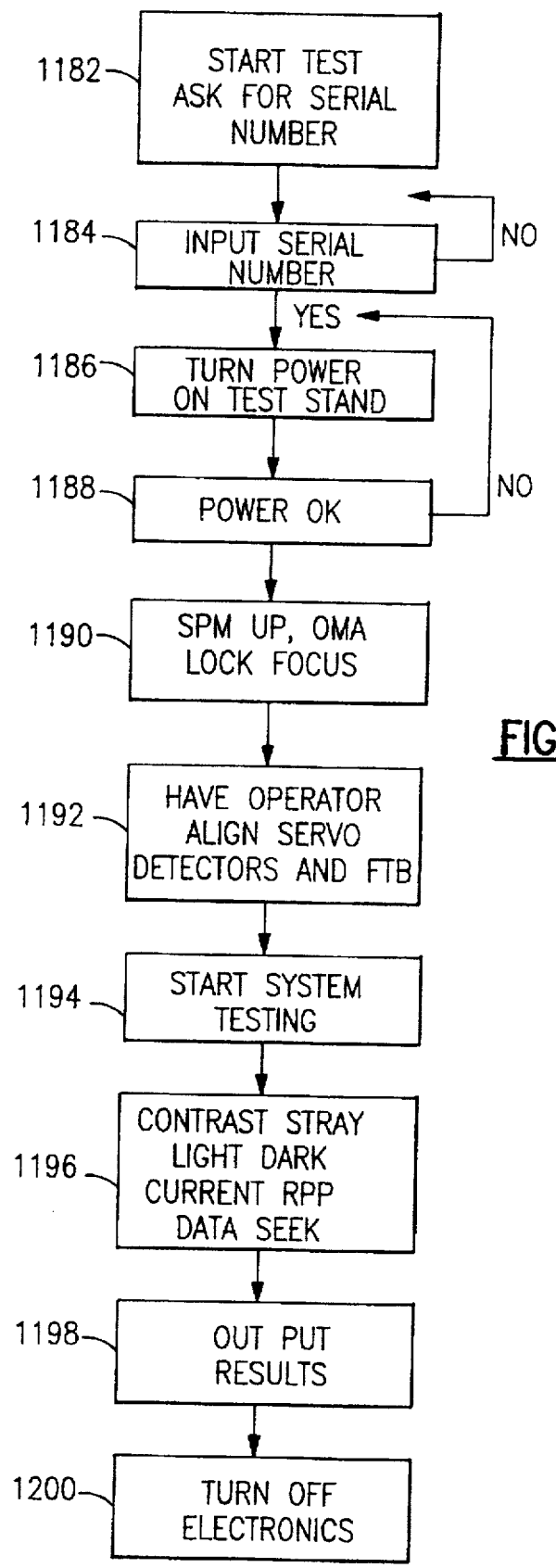
FIG. 51 is a flow chart of a servo alignment test.

The following is a description of FIG. 51 and process steps 1182 through 1200. The first process step 1182 requires that the operator enter the serial number or bar code number of the unit to be tested. If the input is formatted incorrectly, then the system will reject the operator back to step 1182 asking for input to be repeated, as shown in step 1184. Once the computer system accepts the serial number input, the computer software program will ask the operator to hook-up electronics and turn the system on, as shown in box 1186. The system is verified through test signals in the electronics, shown in box 1188, to confirm that the unit is hooked-up correctly and will power up. If the unit does not power up, the operator is told to turn the power off, check connections of the test stand and repeat steps 1186 and 1188. Once the program has determined that the power and connections are correct, the program spins up the spindle and locks focus. This is shown in step 1190. The program presents focus and tracking signals to the oscilloscope for the operator to look at the transmitted signal (step 1176) and reflected signal 1178 as shown in FIG. 49, then the program then waits for the operator to check the signals and balance the components with the DFTR prism (shown in step 1164) and the quad photo detectors (shown in 1166). This is shown in box 1192. Once the operator has completed these tasks, the operator will input to the program to start testing of the system itself, as shown in box 1194.

The following tests are performed on a unit at the servo alignment station: Contrast, stray light, dark currents, RPP data, and seek. Each test result will be described hereinbelow.

Contrast Test

The contrast test is used to measure the contrast ratio of the differential servo channels. This test measures the differential quad sum. The quad sums are measured five different times on a non-rotating disc and each of the five measurements must be within 10% of each other. This eliminates error due to taking readings in the header part of the disc. The contrast is measured by taking the currents of the transmitted quad sum, shown in number 1176, and the reflected signal 1178. The percentage difference between these two signals is how contrast is quantized.

Stray Light Test

Stray light is measured by determining the amount of undesirable light that is present in the optics module. It is measured by setting the laser power and removing the disc. The servo detector's currents remaining after removal of the disc are the stray light currents. By removing the disc there is no longer a reflected signal sent back into the optics module. The total stray light is the total differential quad sum stray light minus the total differential quad sum dark current signals (see immediately below).

Dark Current Test

The dark current is measured on the servo detectors by simply turning off the laser and observing how much current remains on each of the detectors after there is no longer light reflected back from the disc.

RPP Signal Test

The radial push pull signal, (RPP signal), amplitude is measured by performing a 2,000 track seek at a constant 75 mm/s rate and measuring the amplitude of the RPP signal 25 milliseconds into the seek. The amplitude of the RPP signal is measured for about 3 tracks crossing in either direction and in terms of the differential reflected and transmitted quad sums, and focus cross talk. The RPP signal test measure the performance of the servo signals in a seek condition.

Seek Test

The seek test performs random seeks to test the overall servo system using acceleration and deceleration constants. After the test is completed, the software program (as shown in box 1198) outputs results to the operator stating whether the unit passed or failed all tests. The last process step 1200 in this program tells the operator to turn off the electronics and outputs a data file.

S Curve Focus Test

Figure 53:
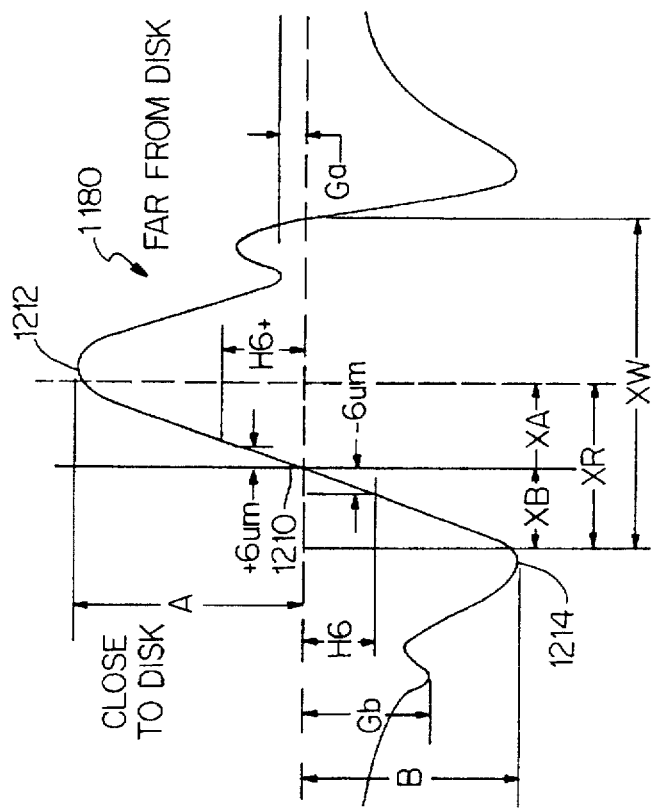
FIG. 53 is a trace of a focus acquisition signal using the station shown in FIG. 52.
Figure 52:
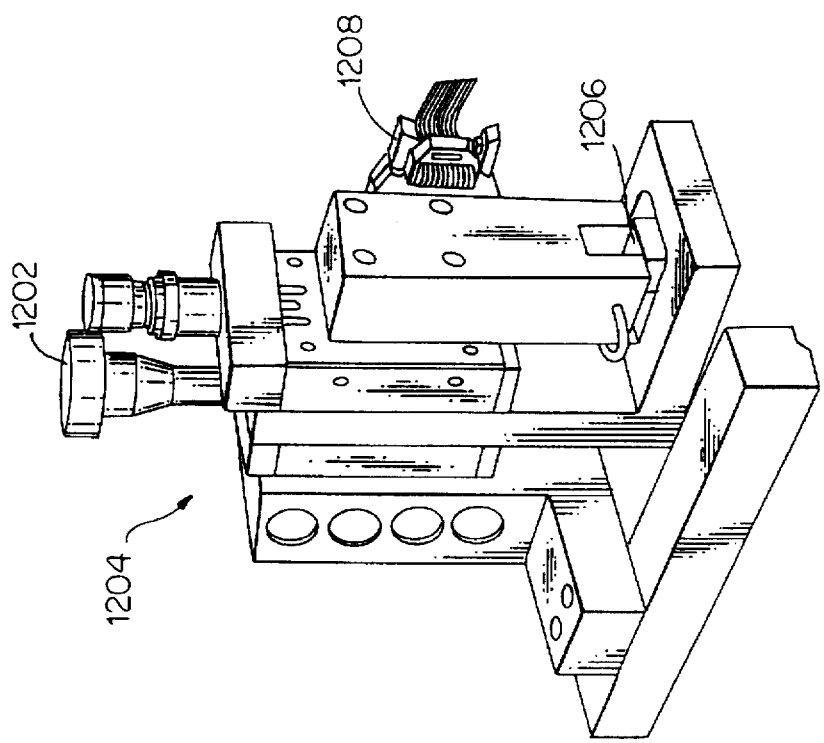
FIG. 52 is a perspective view of a measure head for a focus S-curve station.
Figure 54:
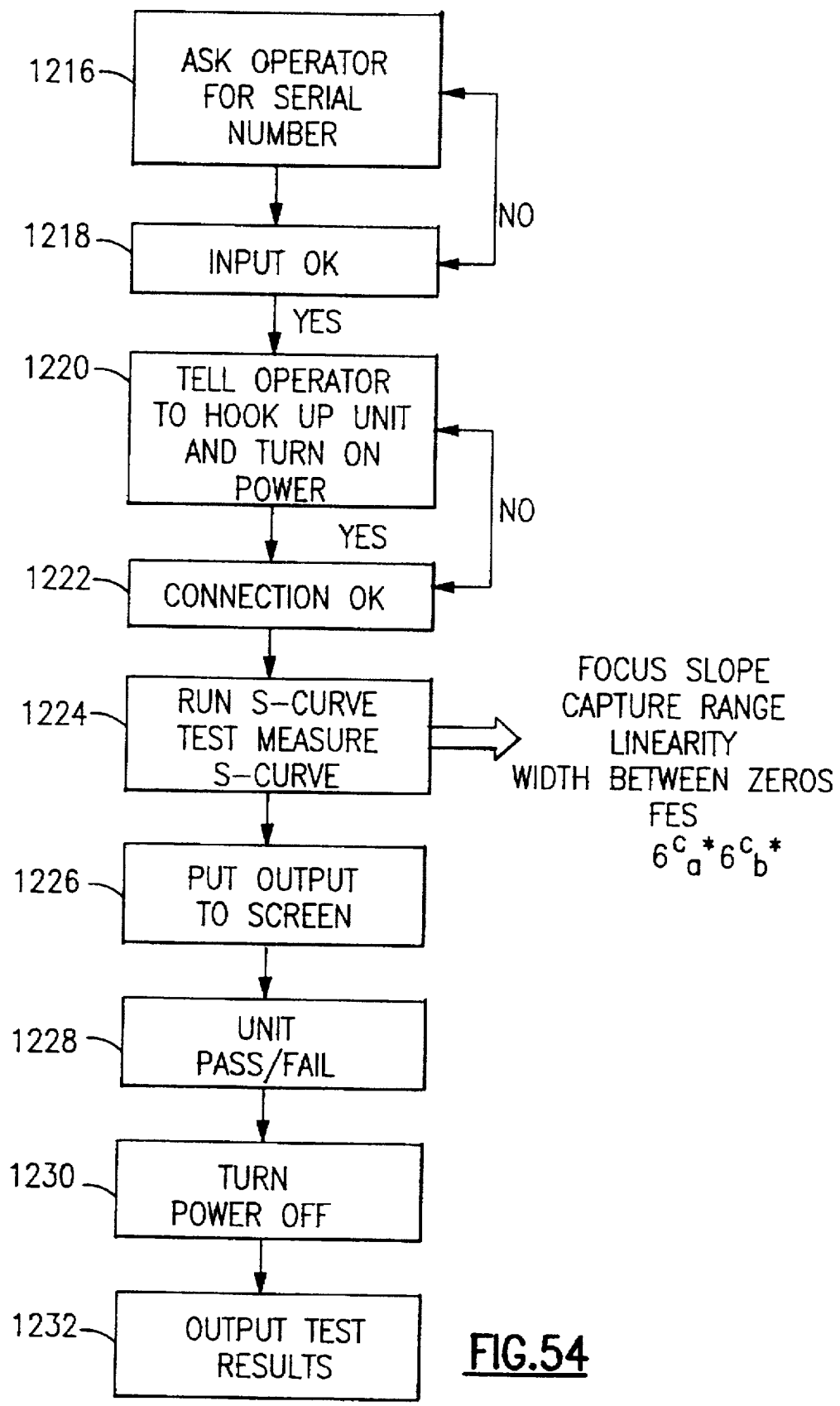
FIG. 54 is a flow diagram of a S-curve measurement test.

Referring to FIGS. 52 through 54, an S curve focus test is used to determine functioning of optics and sensors. This test does not involve movement of the armature assembly. The reason is that this test involves quantitative measurements and a position sensor is not available to quantize the movement of the armature. Instead, the measurement tool 1204 moves in response to the focus signals. The tool 1204 is capable of sensing and recording its movements whereas the armature is not capable.

In FIG. 52 there is a measurement tool 1204 for the measurement of the focus S curve 1180. Measurement tool 1204 has an adjustment knob 1202 for adjusting the appropriate height of the reflective mirror (not shown). Also shown is an electrical connector 1208 and the reflective mirror housing 1206.

Referring to FIG. 53, an S curve 1180 is shown. It is generated from the servo detectors 1166. The signal is quantitatively driven by moving the mirror with respect to a position sensor. Therefore, the measuring tool 1204 takes the place of a disc for test purposes.

Referring in combination to FIGS. 53 and 54, the following is a description of the software used in conjunction with the test station 1204. Process step 1216 asks the operator to input the serial number of the unit. Process step 1218 compels the software program to check if the input is formatted correctly. If the input is formatted incorrectly, the software program asks the operator to reenter the number. Process step 1220 tells the operator to hook up the unit and turn on the power. Process step 1222 checks the electrical connection. If it is correct, the testing software starts. If it is incorrect, the operator is prompted to turn off the power and check connections. In process step 1224, the S curve test is run. Several measurements are made on the focus S curve, which are illustrated in FIG. 53.

The first parameter that is checked is the focus slope. The focus slope is measured as shown in FIG. 53 at the zero crossing point 1210. The next measurement made in process step 1224 is the linearity of the S curve as it crosses through the zero point. Another measurement is the width between zero crossings. This can be seen in FIG. 53 as XW. Additionally, the values indicated by dimensions Ga and Gb are measured. These measured values are compared with set values stored within the program.

The data representing a focus S curve, such as the typical one shown in FIG. 53, is presented to the operator in process step 1226. The unit is either passed or failed in process step 1228. The operator then turns power off, in process step 1230, and the unit is removed and the test results are output.

In FIG. 2, the S curve measurement test is shown in process steps 362 and 364.

Read Channel Alignment

Figure 55:
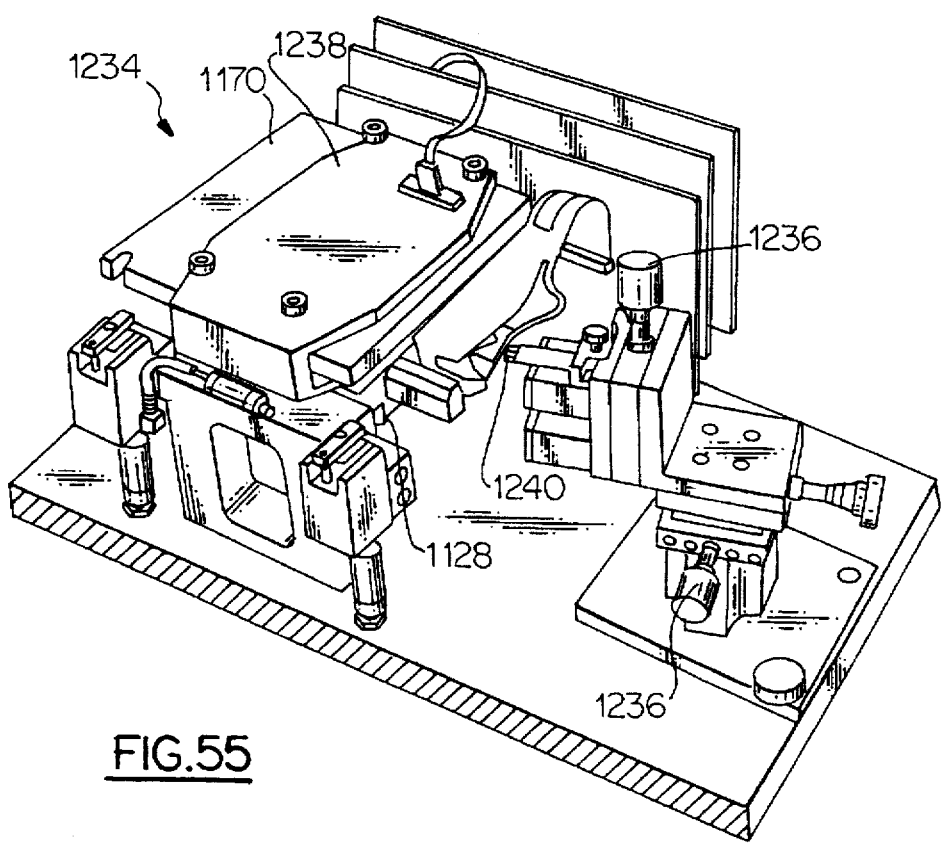
FIG. 55 is a read channel alignment station.

Referring to FIGS. 45 and 55, a read channel alignment station 1234 is shown. The alignment station 1234 has a manipulator 1236 which functions to move the quad photo diode detector 1240. In this alignment station 1238 an operator uses the manipulator 1236 to maximize the read signal which is shown quantitatively to an operator on an oscilloscope (not shown). After obtaining maximum signal, the operator rotates the quad photo detector 1240 to balance the MO signal. This aligns the phase the micro prism 1242 with respect to the phase the MO signal to be read.

Figure 56:
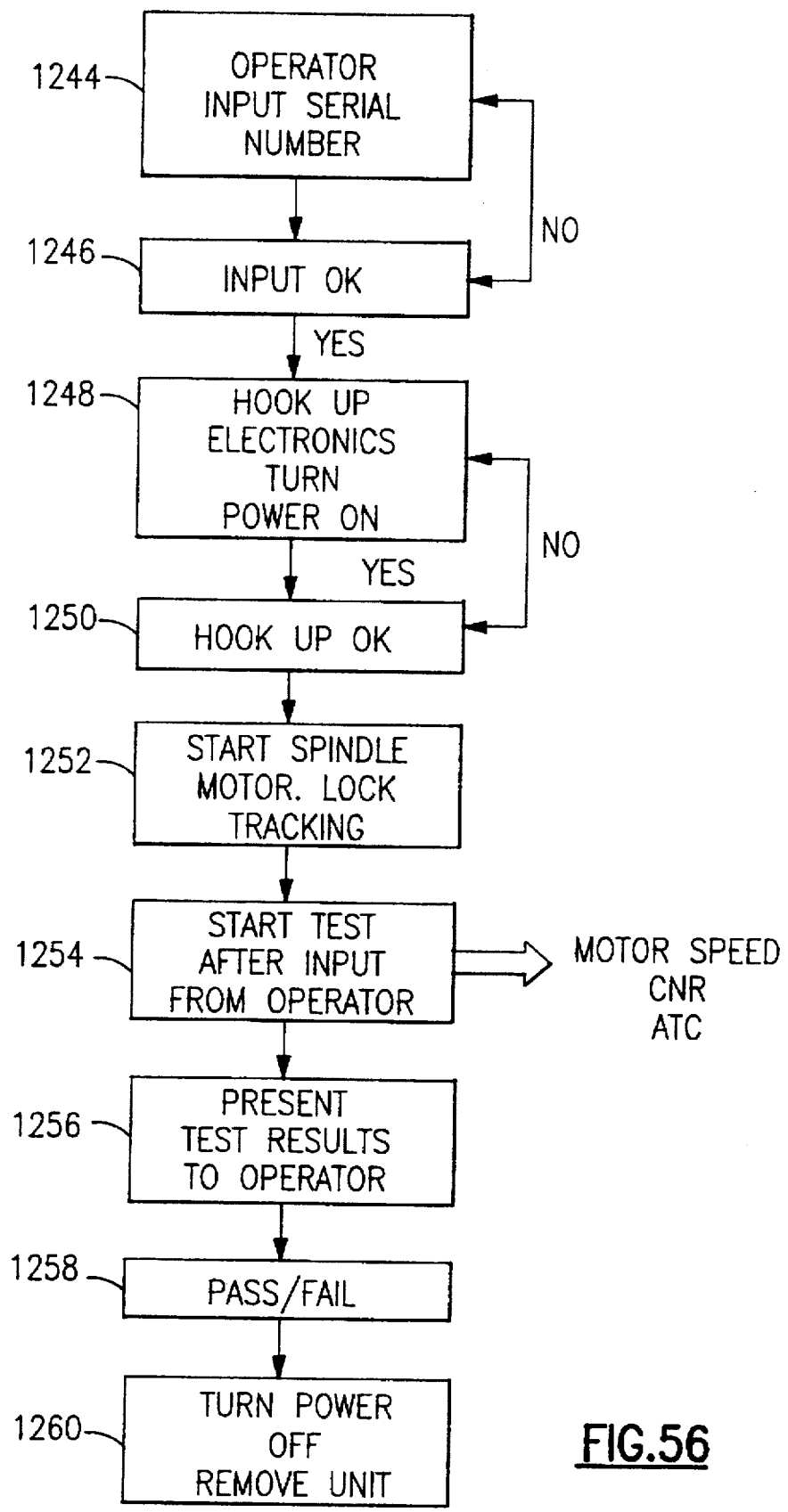
FIG. 56 is a flow diagram of a read channel detector alignment procedure utilizing the station shown in FIG. 55.

Referring to FIG. 56, process step 1244 requires input from the operator. This input is the number of the unit to be tested. The software checks the accuracy in process step 1244 of the input from the operator. In process step 1248, the operator is asked to connect the electronics and turn the power on. The software program tests the electrical hook-up in step 1250. If this is correct, the program continues. If not, it returns to process step 1248. The software program starts the spindle motor rotating the media and locks focus and tracking in process step 1252. Process step 1254 requires adjust the read detector with manipulators 1236 shown in FIG. 55. Once the signal has been maximized by adjusting knobs 1236, the operator switches to MO mode and rotates the data detector to balance the signal. The operator then glues the detector in place, prompting the software to start testing the unit.

The following tests are performed in process step 1254: 1) motor speed test; 2) carrier to noise; 3) adjacent track cross talk; 4) laser noise; 5) disc noise; 6) electrical noise; and 7) carrier to noise focus offset. These measurements are made while the motor speed is monitored using the tachometer output from the spindle motor. The carrier to noise is measured at 8 megahertz using a spectrum analyzer. The adjacent track cross talk is measured by writing one track on the disc and then reading adjacent tracks. The adjacent tracks should be blank, so that detected noise is attributable to adjacent track cross talk. The laser noise, disc noise and electrical noise are all measured using a spectrum analyzer and using standard noise measuring techniques to measure the noise level of the different components in the system. The carrier to noise focus offset is measured by offsetting the focus in the lens and measuring the carrier to noise in the system using a spectrum analyzer.

Referring again to FIG. 56, the results are presented to the operator in process step 1256. The software determines in process step 1258 if the unit has passed or failed by comparing the measure values to the selected standard values. The operator powers down and removes the unit in process step 1260.

Process steps 366 through 386 are described hereinabove in connection with the read channel test.

Laser Diode Assembly

Figure 57:
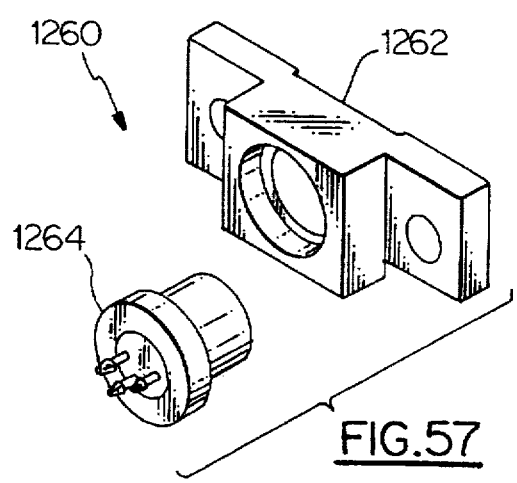
FIG. 57 is an exploded view of a laser diode assembly.

Referring now to FIGS. 3 and 57, there is shown a laser diode 1264 and laser diode mounting block 1262 contained in the laser diode assembly 1260. Process steps 400 through 422 are used to manufacture this assembly. Specifically the laser diode 1264 is cleaned with acetone, and a shorting plug (not shown) to prevent static electricity is attached. The laser mounting block 1262 is cleaned with acetone and manually loaded into a clamping fixture (not shown). The assembly is placed into an oven at process step 418 until the final assembly is ready 422.

Process steps 424 through 434 detail the use of screws and washers to place and fix the laser diode assembly 1260 onto the optics module.

Procedures 436 through 456 detail manual gluing of a lens (not shown) into a collimator barrel (not shown). The lens rests on a shelf located interior of the barrel (not shown) and is held flat by gravity. A small rod is used as a tool to clamp the lens in place. Glue is applied to the circumference of the lens in order to secure it.

Referring to FIGS. 3 and 45, process steps 458 through 484 prepare the optics module for subsequent operations by cleaning with acetone and performing operations such as the gluing of the read lens 1266 as shown in FIG. 45, and the gluing of the plastic aperture (not shown). The optics module is cleaned to allow later insertion of optical elements.

Beamsplitter Insertion

Figure 58:
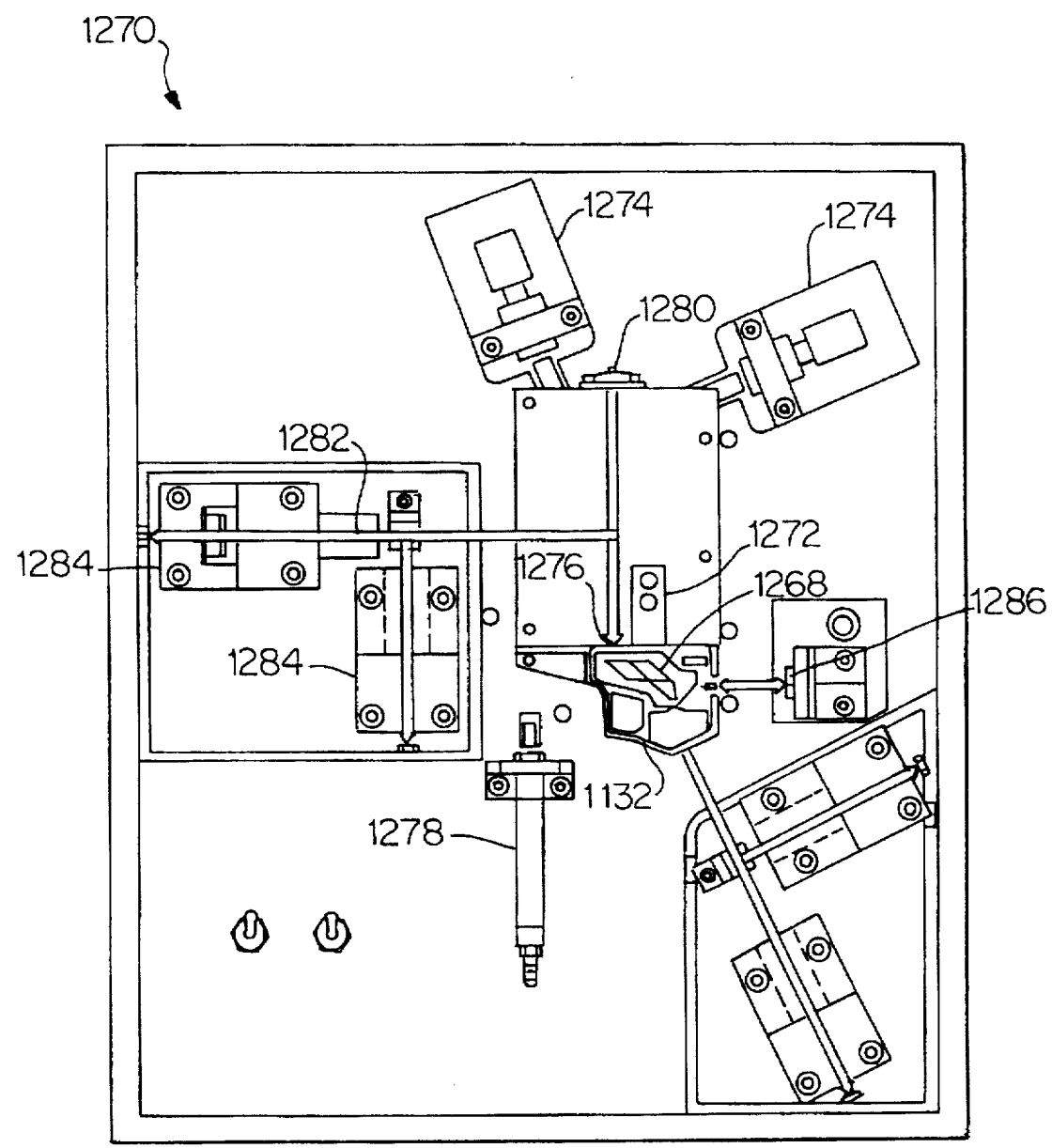
FIG. 58 is a plan view of a beamsplitter insertion tool.

Referring now to FIG. 58, there is shown a beamsplitter insertion tool 1270. The physical placement of the plate beamsplitter 1268 is critical. Plate beamsplitter 1268 must be carefully positioned and glued into the optics module 1132. The insertion tool 1270 allows an operator to hold and position the plate beamsplitter 2168 while receiving optical feedback from an internal laser 1280. Initially, the optics module without the plate beamsplitter 1268 is clamped by the pneumatic clamp 1278. Certain alignment features such as holes, recesses, or ridges are used to accurately align the optics module 1132 on the beamsplitter insertion tool 1270. The plate beamsplitter 1268 is held by a vacuum chuck 1272. An operator can control the adjustment knobs 1274 in order to align and rotate the plate beamsplitter 1268 in the x, y, and z directions. An alignment pin 1276 fits into the laser aperture. The laser integral to insertion tool 1280 shoots a beam through the plate beamsplitter which is reflected by mirror 1286 onto detectors 1284. This is shown schematically by the ray trace 1282. An operator can maximize the beam intensity by analyzing the signal on the detector. The alignment pin 1276 has a hole in order to pass the incident and reflected beams.

In FIG. 3 procedure steps 486 through 502 detail the insertion of the plate beamsplitter 1268.

Referring again to FIG. 3, process steps 504 through 506 refer to placing the collimation barrel and laser onto the optics module using the screws mentioned in process steps 424 through 434.

Pointing and Collimation

Figure 59:
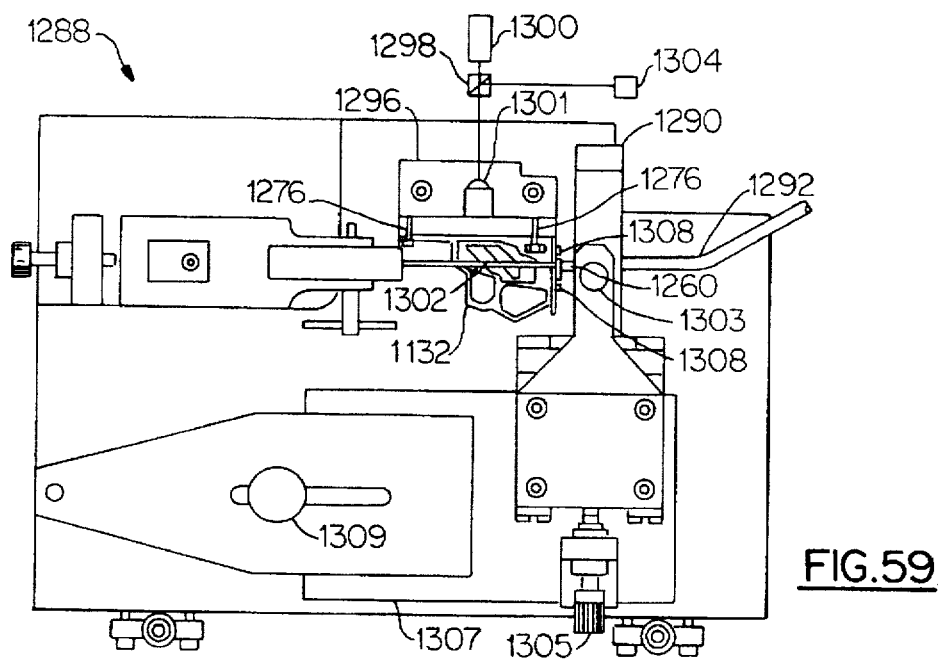
FIG. 59 is a plan view of a collimating and laser pointing tool.

Pointing and collimation is explained in conjunction with step 510 (FIG. 31), and FIG. 59, wherein a pointing and collimation test station is referenced generally at 1288. The object of the procedure is to point the laser that is disposed in a laser assembly 1260 in a desired direction with respect to the optical elements in an optics module 1132, and to move the collimation barrel 1306 (FIG. 45) along the optical axis of the laser in order to minimize astigmatism. Initially the operator mounts the optics module 1132 to be aligned on the mounting block 1296, using two locating pins 1276, 1276, and further aligned using an aperture locator 1301, having a round tube (not shown) therein for further positioning the optics module 1132. The aperture locator 1301 is then removed. A manipulator stage 1307 is then clamped into place by knob 1309. The laser assembly 1260 is clamped into place by laser adjuster 1290, and the collimation adjustment arm 1302 is brought down and inserted into a collimation barrel 1306 of the laser assembly 1260. Power cord 1292 is inserted into a suitable source of power (not shown), and the laser is energized. Laser light passes through the optics module 1132, and exits, striking beamsplitter 1298, which splits the light beam into a first branch that reaches an autocollimator 1300, and a second branch which reaches an interferometer 1304. The operator evaluates the direction of the laser beam using the autocollimator, manipulating the pointing knob 1305 to achieve alignment, and also manipulating the collimation barrel 1306 with knob 1303 to minimize astigmatism. The optical wavefront is checked using the interferometer 1304. After alignment is complete screws 1308, which hold the laser in place, are tightened down. The laser stage 1307 is removed by loosening knob 1309, and sliding back the stage. Collimating and pointing are preferably rechecked, and if acceptable, glue is injected into the collimation barrel 1306 to secure it in place. After curing the collimation manipulator arm is removed, and the wave front rechecked with the interferometer 1304. The optics module is powered down, and the power cord 1392 detached. A grounding plug (not shown) is installed, and the optics module 1132 is removed from the station 1288.

Microprism Insertion

Figure 60:
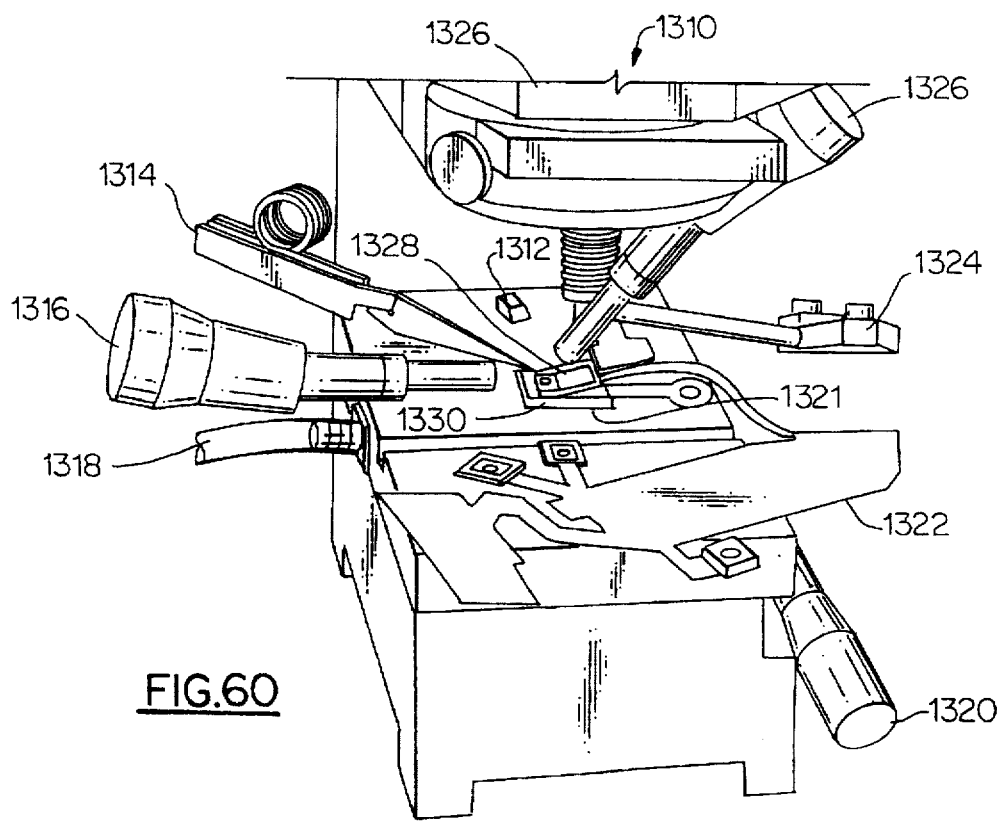
FIG. 60 is a perspective view of a micro prism insertion station.

Referring to FIG. 60, there is shown microprism insertion station 1310. The microprism 1312 is to be attached to a quad detector 1328. Alignment of these two optical pieces is important. A flex lead 1322 has an integral quad detector 1328. The quad detector is seated into an alignment pocket 1330 and then held in place by a vacuum 1318. An adjustment knob 1320 will align and adjust vacuum chuck 1321. Vacuum chuck 1321 is alignable along its major plane. A swing clamp 1324 is used to ensure positive seating of the quad detector 1328 in the alignment pocket 1330. Tweezers 1314 are adjustably connected to the microscope 1326. The tweezers 1314 hold the microprism. The microscope 1326 contains an outline that the assembler can use to obtain the proper relation between the quad diode 1328 and the microprism 1312. The operator aligns these two pieces by peering through the microscope and adjusting the two pieces so that they fit within the outline. Unnecessary alignment is avoided due to the repeatability of the quad detector seated within the alignment pocket 1330 and with tweezers having been properly adjusted.

Second Embodiment of a Method and Apparatus for Manufacturing Information Storage Devices Disclosed hereinbelow is an embodiment of the invention. Certain of the elements of the alternate embodiment are substantially identical to corresponding elements of the first embodiment, and in the interest of brevity their description will not be repeated. Referring now to FIG. 61, there is shown a block diagram of a process of manufacture, generally referenced 3300, wherein steps that differ from corresponding steps of the first embodiment are indicated in emphasized boxes, for example step ARMATURE TO CARR. 3309.

Figure 76:
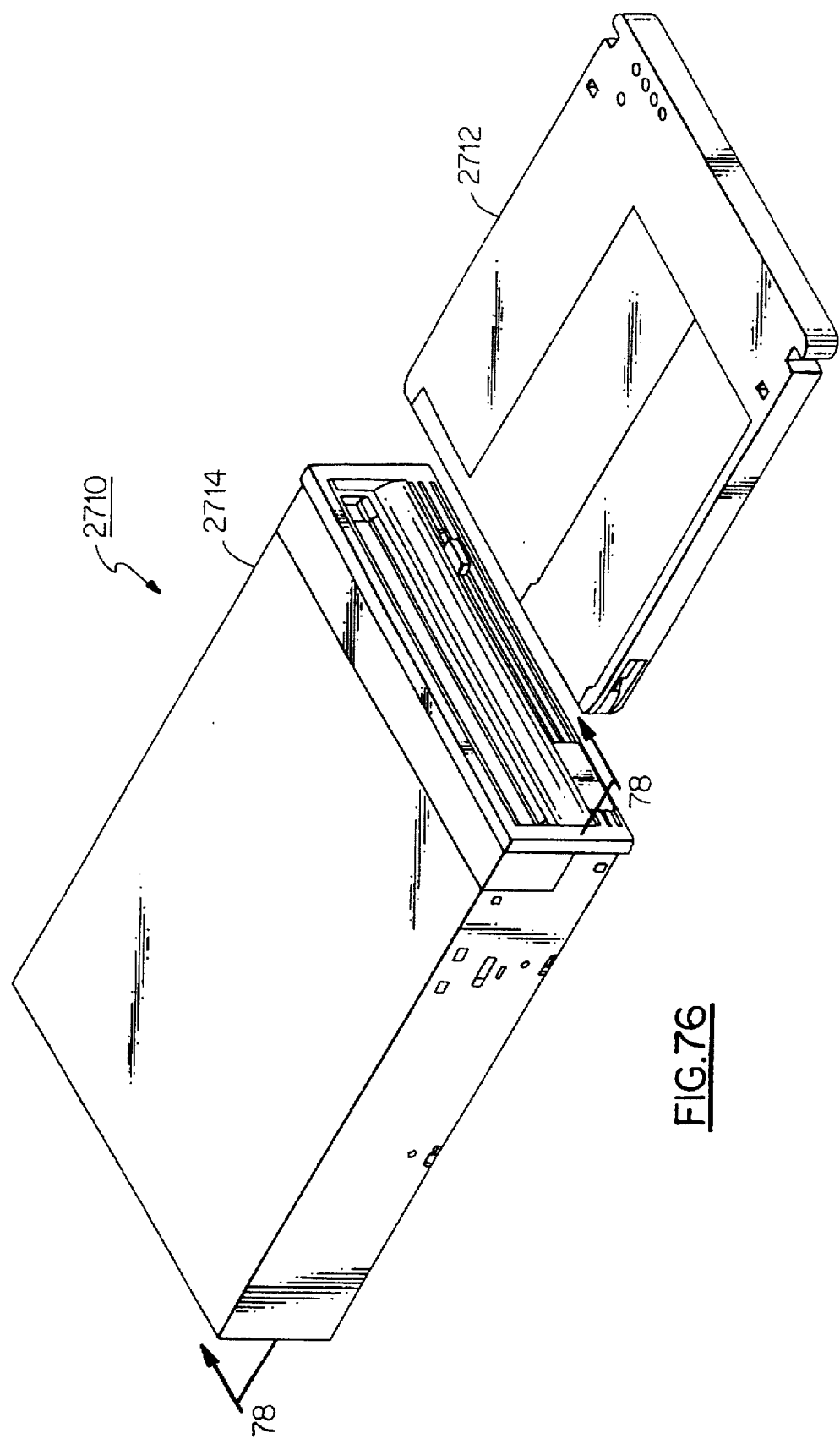
FIG. 76 is an isometric view of an optical disc drive that can be constructed according to the embodiment of the present invention depicted in FIG. 61.
Figure 77:
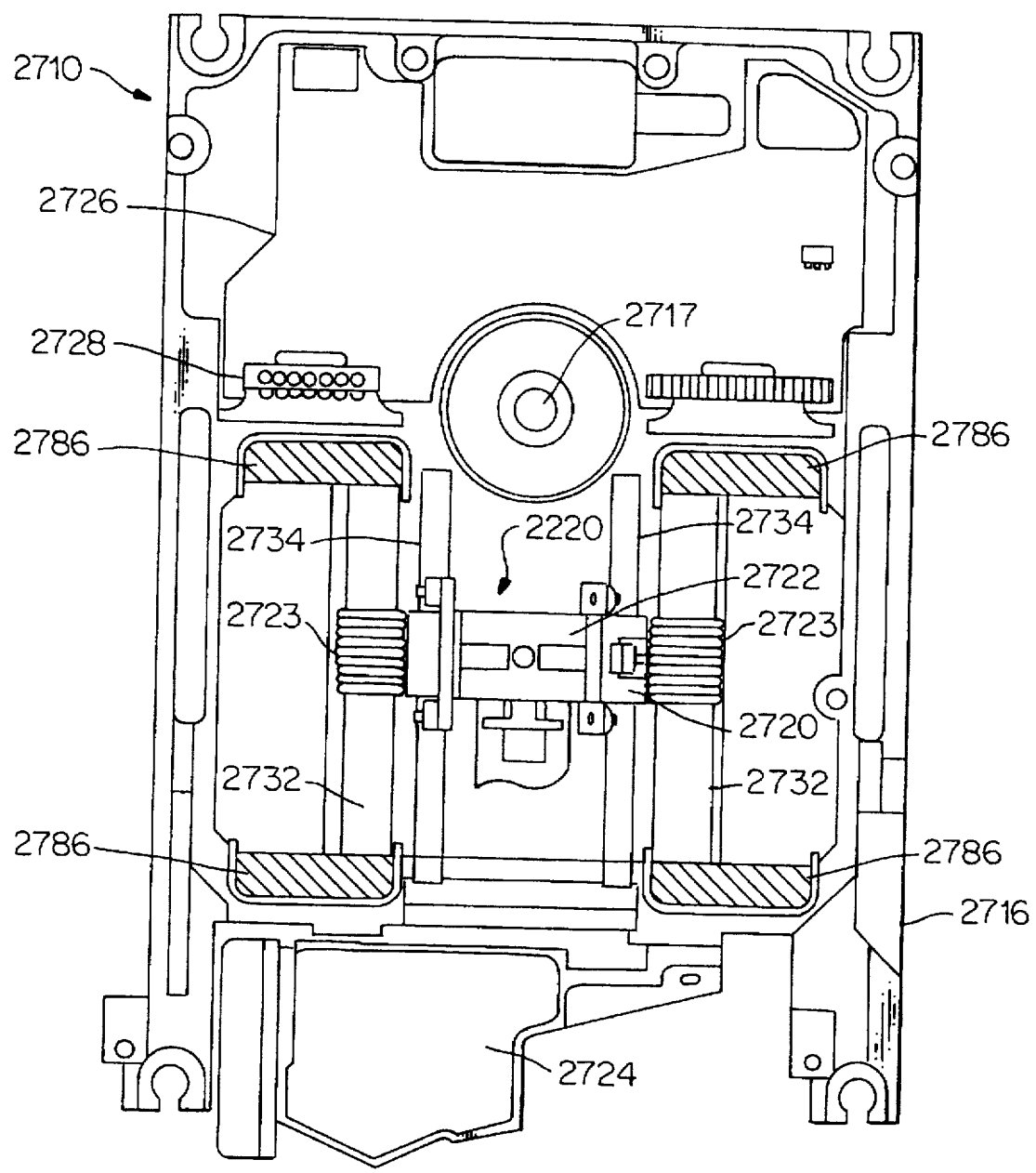
FIG. 77 is a top view of the disc drive of FIG. 76, with the housing of the drive removed.
Figure 78:
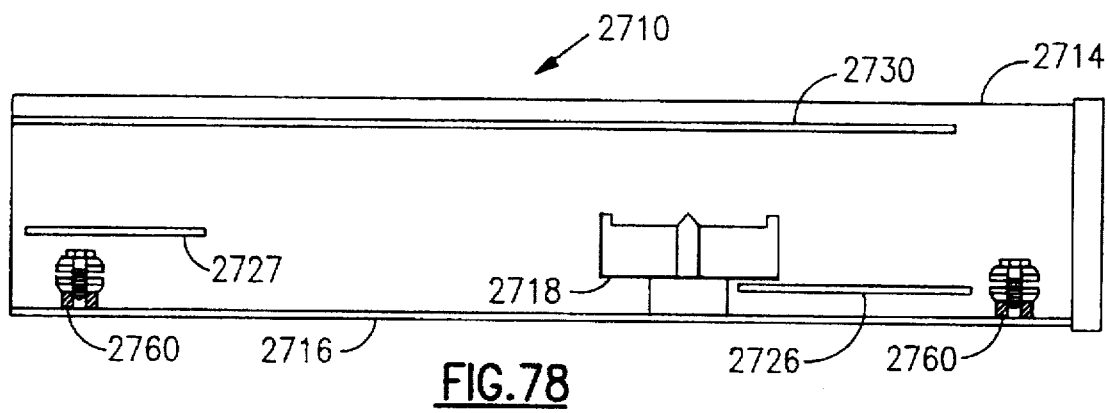
FIG. 78 is a cross-sectional view of the disc drive of FIG. 76, taken in the direction of arrows 78—78 in FIG. 76 with detail omitted.

A product that can be constructed according to the embodiment of FIG. 61 is now discussed briefly with reference to FIGS. 76–78. Referring first to FIG. 76, there is shown an optical disc drive 2710. Disc drive 2710 plays and/or records on a disc (not shown) that is housed in removable disc cartridge 2712. Alternatively, the disc could be contained within the housing 2714 of disc drive 2710.

Referring now to FIGS. 77 and 78, in FIG. 77 there is shown a top view of drive 2710, with housing 2714 removed to reveal certain important mechanical, electrical and optical components of the drive 2710. FIG. 78 is a cross-sectional view of drive 2710, taken in the direction of arrows 78—78 in FIG. 76. In FIG. 77 there is shown baseplate 2716, spindle 2717, linear actuator assembly 2720, objective lens assembly 2722, optics module 2724, drive circuit board 2726, and flexible circuit connector 2728. FIG. 78 shows main circuit board 2730, spindle motor 2718, optics module circuit board 2727, and drive circuit board 2726.

In brief, baseplate 2716 acts as a base for the other components of drive 2710, positioning and aligning the components with respect to each other. Preferably base 2716 is made of cast steel for low cost.

Figure 80:
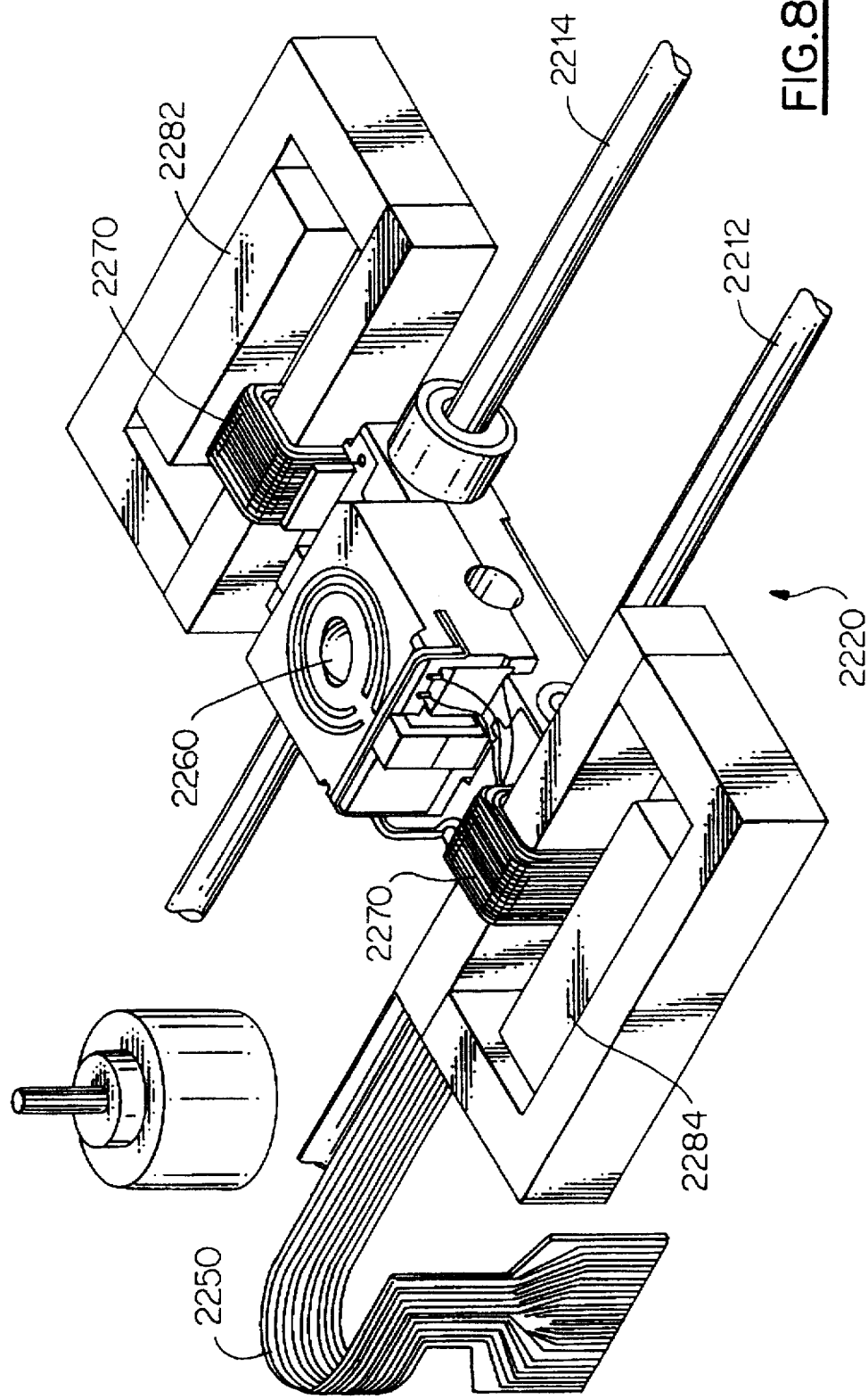
FIG. 80 is a perspective view of a carriage assembly and associated drives therefor, the assembly removed from the disc drive shown in FIG. 76.

Linear actuator assembly 2720 includes a pair of linear actuators 2723. Each actuator 2723 consists of a rail 2734 that is rigidly attached to baseplate 2716. Rails 2734 are substantially parallel. Surrounding a portion of each rail 2212, 2214 (FIG. 80) is an actuator coil 2723. Each actuator coil 2723 is attached to an opposite portion of objective lens assembly 2722, so that when coils 2723 are properly energized, objective lens assembly 2722 moves along rails 2212, 2214 (FIG. 80). Actuator coils 2723 are driven by signals from drive circuit board 2726, which result in linear motion of objective lens assembly 2722 relative to optics module 2724, and relative to a disc (not shown) inserted in drive 2710. In this manner, linear actuator assembly 2722 enables coarse tracking of the disc.

Optics module 2724 and objective lens assembly 2722 together contain the principal optics of drive 2710. Optics module 2724 is rigidly attached to baseplate 2716, and contains a laser, various sensors, and optics (not shown). In operation, the laser directs a beam (not shown) from optics module 2724 towards objective lens assembly 2722, and optics module 2724 in turn receives a return beam (not shown) from objective lens assembly 2722. Objective lens assembly 2722 is movably attached to linear actuator assembly 2720 by coils 2723, as described above. Objective lens assembly 2722 contains a pentaprism (not shown), an objective lens 2260 (FIG. 80), servomotors (not shown) for focusing the objective lens, and servomotors (not shown) for fine adjustments of the objective lens position relative to the position of the linear actuator assembly 2720 and to the inserted disc, to enable fine tracking of the disc. Electrical information and control signals are transferred between objective lens assembly 2722 on the one hand, and main circuit board 2730 and drive circuit board 2726 on the other hand by means of flexible circuit connector 2728.

Optics module circuit board 2727 contains a laser driver and preamplifiers (not shown). Drive circuit board 2728 controls motor 2718, linear actuators 2723 of linear actuator assembly 2720, and the servomotors of objective lens assembly 2722. Drive circuit board 2728 is controlled by main circuit board 2730. Main circuit board 2730 includes most of the electronic components that various design considerations (e.g., noise reduction, EMI and power loss) do not require to be located on optics module circuit board 2727, objective lens assembly 2722, or drive circuit board 2726.

Motor 2718 is rigidly attached to baseplate 2716. Motor 2718 directly drives spindle 2717, which in turn spins the disc.

Carriage Assembly In steps CARRIAGE SUB 3301, PRISM INSERT 3305, and MASS-BAL TO CARR 3306 the components of the carriage assembly 2220 (FIG. 77) are assembled together, including the tracking coils, and coarse coils for coarse positioning of the carriage assembly 2220. A specially adapted tool (not shown) is proposed for facilitating the insertion of the pentaprism 2216 (FIG. 65) into the carriage assembly 2220 in step PRISM INSERT 3305.

At step ARMATURE-TO-CARR. 3309, the flex lead 2250 (FIG. 80) is attached to the carriage assembly 2220 in much the same manner as in the first embodiment. However the configuration of the flex lead 2250 differs somewhat in configuration. During assembly the pentaprism 2216 is manually manipulated into alignment, while the flex lead 2250 is temporarily retracted, and the carriage assembly 2220 is fixedly held in position. Epoxy fastening agent is then applied and oven cured.

With reference to FIGS. 61 and 80, step ANGLE MEASURE 3310 is carried out in much the same manner as in the first embodiment. However as the objective lens 2260 has not yet been installed, it is necessary to insert a dummy lens or mirror (not shown) in its place. Electrical connections are then made to the armature coils 2270, 2270, and the armature driven in its focus direction. The tilt-over-stroke test, which was disclosed with respect to the first embodiment, is then conducted. Verifying the alignment and stroke performance of the carriage assembly 2220 prior to undertaking the mounting of the objective lens 2260 provides substantial economy in the assembly of the complete unit, as defective carriage assemblies are immediately detected and are never subjected to lens mounting.

Head Assembly

Figure 63:
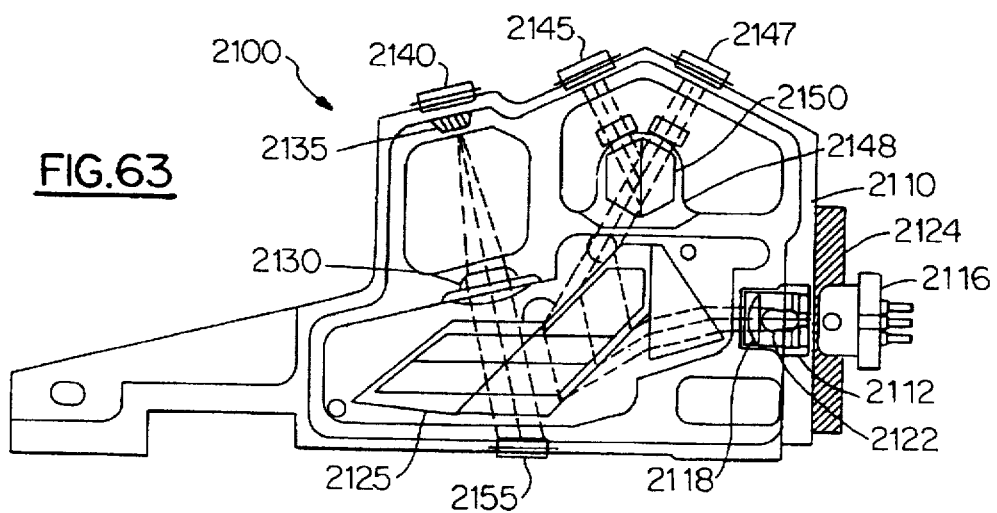
FIG. 63 is a partially schematic plan view of a head with detail omitted, which is assembled according to the process shown in FIG. 61.
Figure 64:
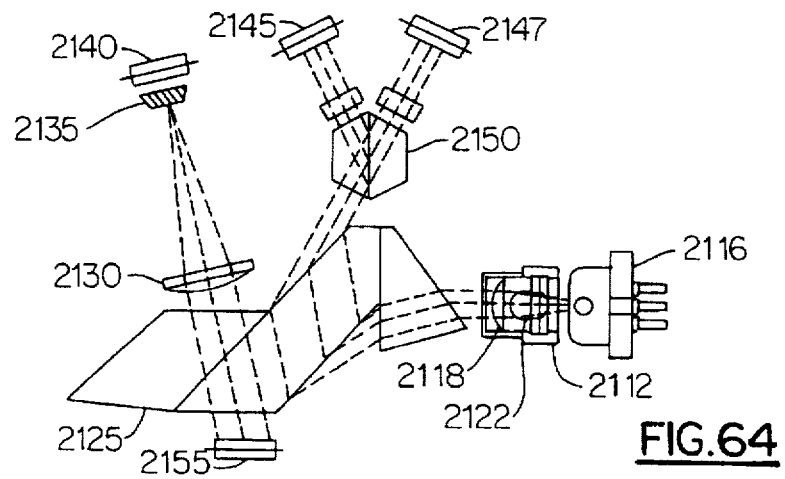
FIG. 64 is a fragmentary view of the arrangement shown in FIG. 63 illustrating its optical elements.

Referring now to FIGS. 61, 63, and 64, a head assembly is referenced generally at 2100. In step LASER PRESS 3315, a laser source 2116 is mounted to a mounting plate 2124 that is disposed on the frame 2110 head by press fitting, rather than by gluing as in the first embodiment. Substantial time is saved with this modification. Preferably the mounting plate 2124 is selected from a plurality of laser mounting plates having receptacles of different sizes in order assure adequate precision in alignment.

In step COLLIM GLUE 3316, a collimator lens 2118 is inserted into the stainless steel housing 2112. Using an autocollimator (not shown), the lens is manipulated into precise alignment, and then bonded with a suitable glue or fastening agent, such as UV epoxy glue.

Step POINTING COLL. 3320 is discussed with reference to FIGS. 65–69, wherein a pointing-and-collimation station 2200 comprises two principal modules. A head support module 2230 is adapted to support a head assembly 2100 (FIG. 65) This module is provided with manipulators for the collimator 2118 and the laser 2116 and is substantially the same as described for the first embodiment. A carriage support module 2210 is disposed proximate the head support module 2230, and is provided with two rails 2212, 2214 for slidably receiving a carriage assembly 2220 thereon.

When the head support module 2230 with a head assembly 2100 mounted thereon is properly aligned with the carriage support module 2210, actuation of the laser 2116 produces a beam 2222 that exits the head support module 2230, and is incident upon the pentaprism 2216 which is disposed in the carriage assembly 2220. The beam 2222 is then deflected upwardly in a direction normal to the plane defined by the rails 2212, 2214, whereupon it exits the carriage assembly 2220. It should be noted that the carriage assembly 2220 as yet does not have an objective lens installed that would alter the characteristics of the beam 2222.

In operation an autocollimator 2224 (FIG. 65) is disposed intermediate the head support module 2230 and the carriage support module 2210, wherein a portion of the beam 2222 is deflected and analyzed. The autocollimator 2224 is aligned perpendicular to the front face of the head assembly 2100. An interferometer 2228 receives the beam 2222 upon exit from the carriage assembly 2220. A reflecting mirror 2226 is provided so that the interferometer 2228 can be conveniently placed. The operator manipulates the laser 2116 and the collimator 2118 in the manner described with respect to the first embodiment until true pointing and collimation of the beam are achieved. Advantageously in step POINTING COLL. 3320 any optical aberrations caused by the pentaprism or other optical elements are also minimized at this time with the use of the interferometer 2228.

Step μPRISM 3322 accomplishes the installation of a microprism 2135 (FIG. 63) onto the read detector 2140 which is also mounted on the flex lead 2250 (FIG. 80). This step is similar to the corresponding step of the previous embodiment, except that the configuration of the prism is changed somewhat in shape, and the manipulation tool has been correspondingly changed. Alignment of the microprism 2135 is accomplished in step DATA ALIGN 3334, which will be described below in detail.

Step FLEXLEAD ATTACH 3323 secures the flex lead 2250 onto the body of the head assembly 2100. This is accomplished by screws and is very similar to the corresponding step of the previous embodiment, except that the configuration of the flex lead 2250 has been changed somewhat.

In step COARSE MAGNET 3324, the coarse magnets 2282, 2284 are installed with rubber grommet mountings 2786, which provide mechanical isolation for the magnets 2282, 2284. The subassembly including the coarse magnets 2282, 2284 is further secured to the baseplate 2310 by four spring clips (not shown).

Figure 65:
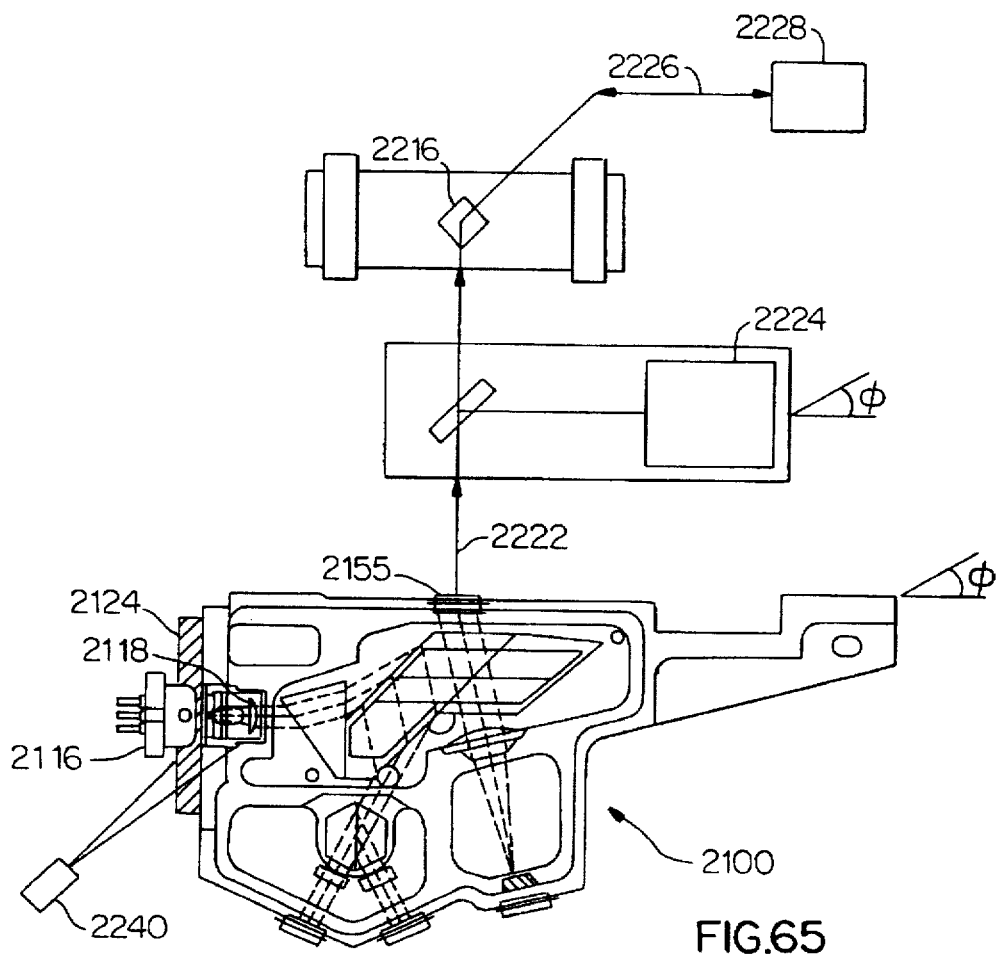
FIG. 65 is a view similar to FIG. 63 schematically illustrating the step of pointing and collimation according to the embodiment of FIG. 61.
Figure 66:
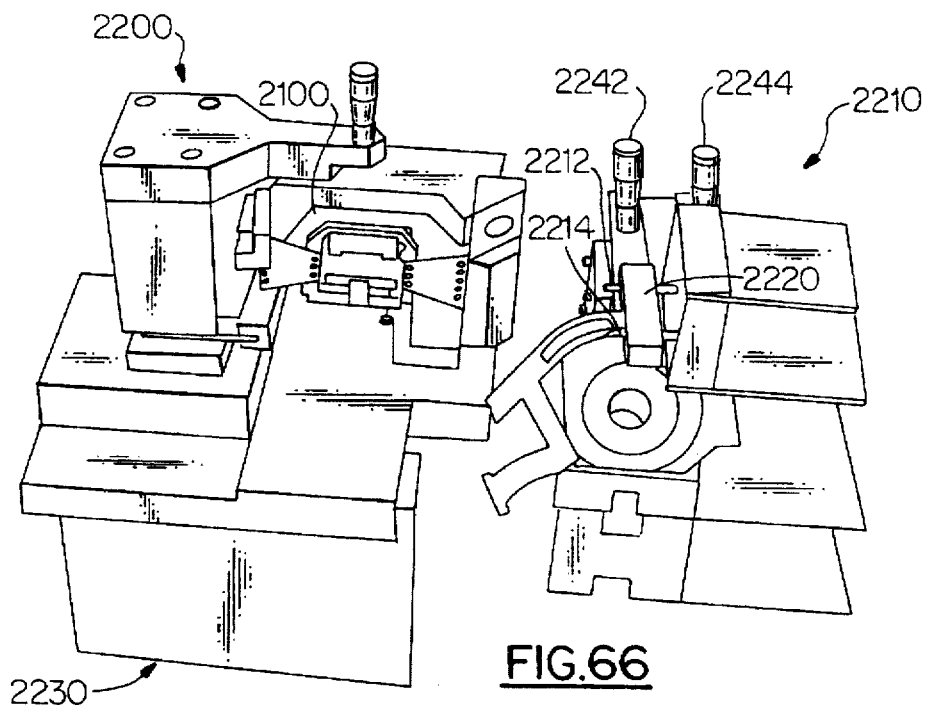
FIG. 66 is a perspective view of a pointing and collimation station with a carriage assembly and a head assembly mounted thereon.
Figure 67:
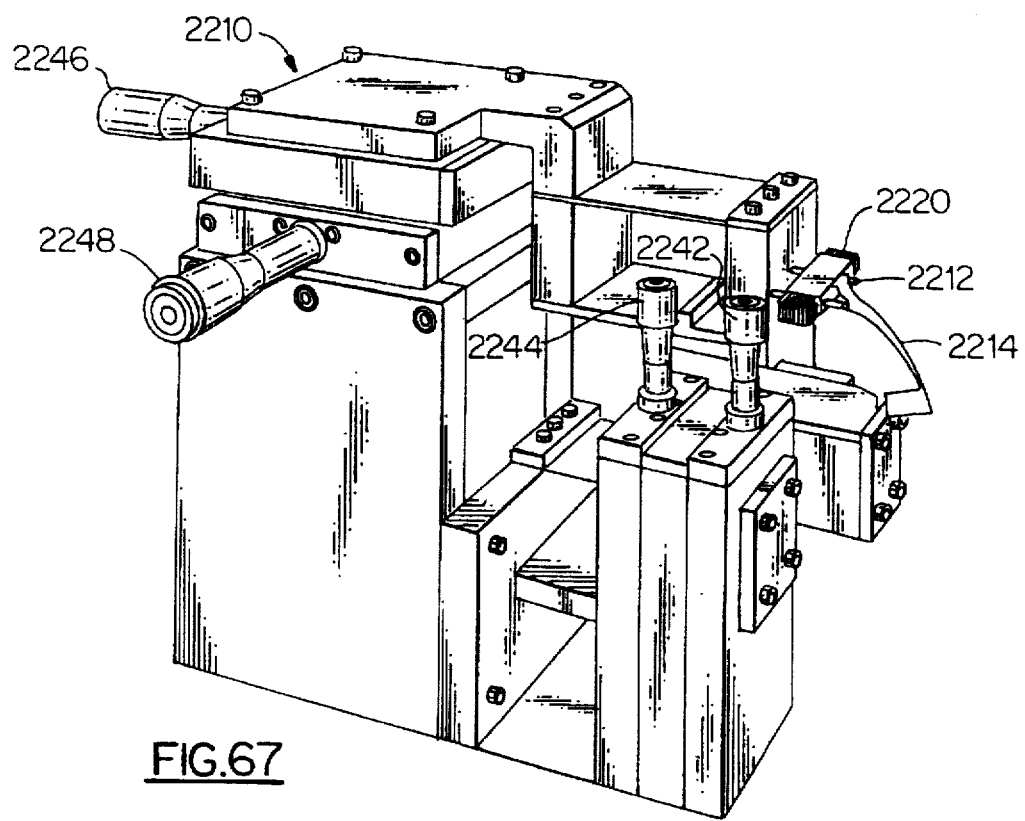
FIG. 67 is a perspective view of the carriage support module of the station shown in FIG. 66.
Figure 68:
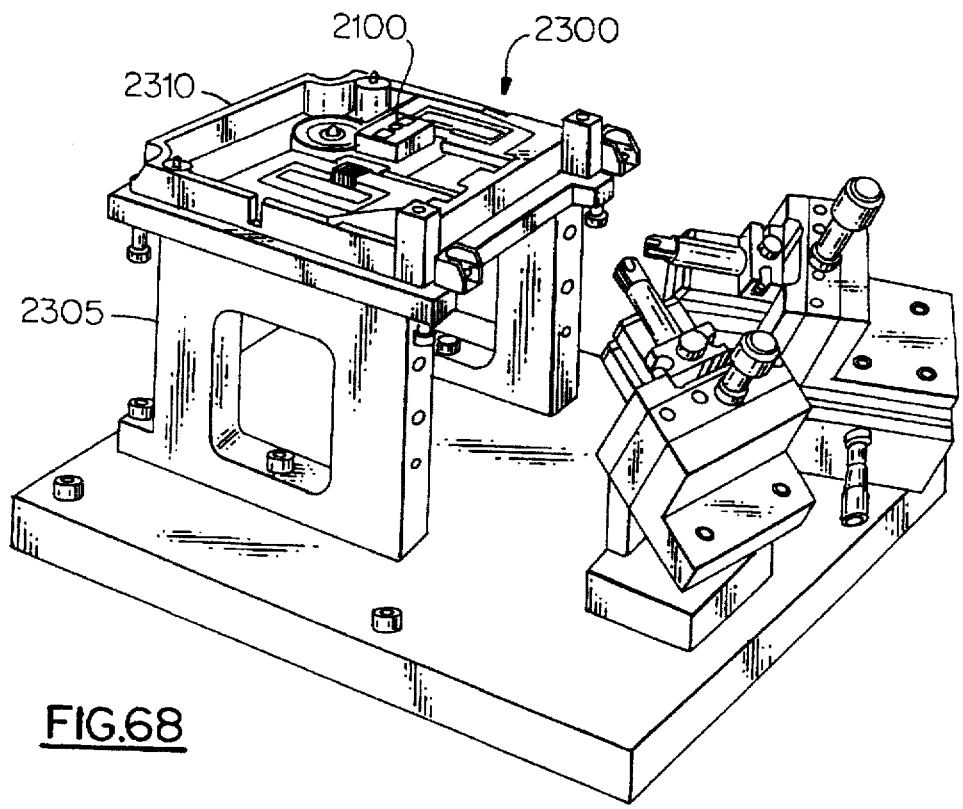
FIG. 68 is a perspective view of a station for servo alignment according to the embodiment of FIG. 61.
Figure 69:
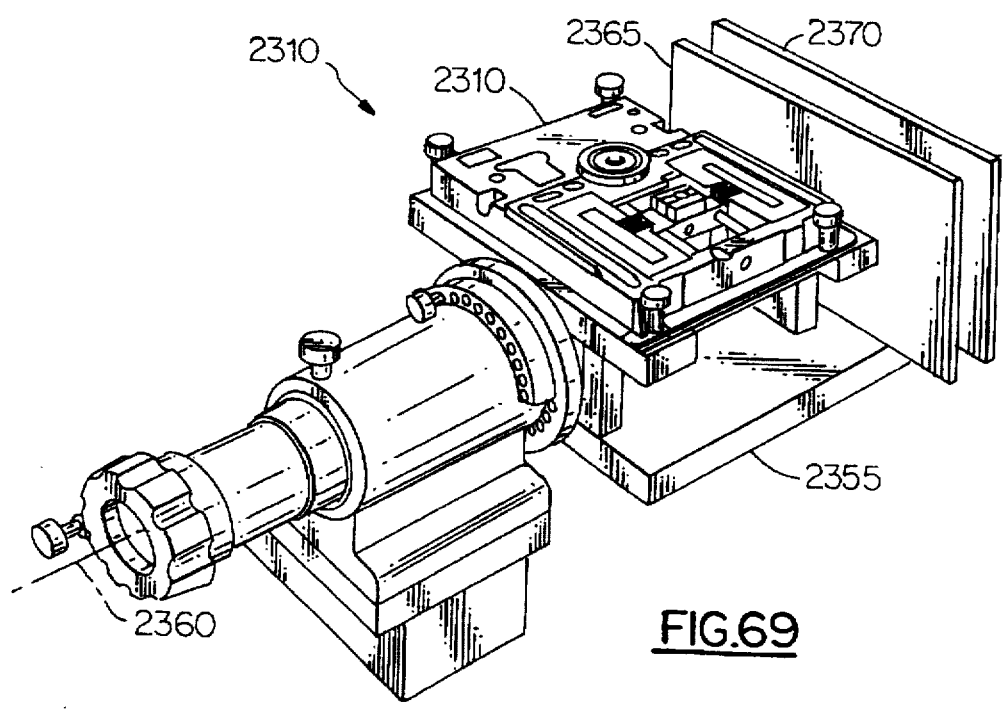
FIG. 69 is a perspective view of a test station for determining motor constants and transfer functions according to the embodiment of FIG. 61 and having a baseplate mounted thereon in a horizontal orientation.
Figure 75:
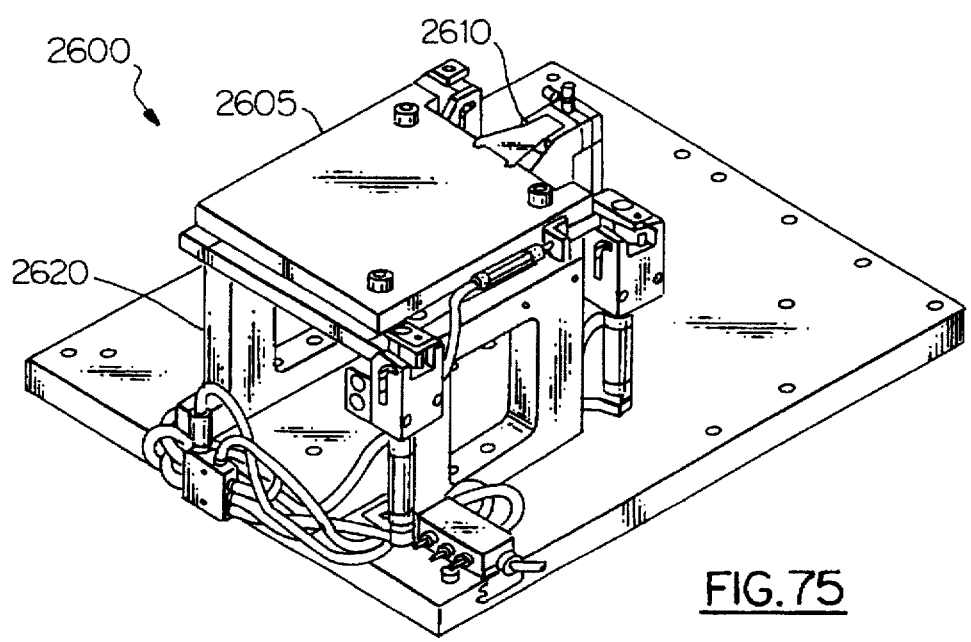
FIG. 75 is a perspective view of a station for aligning the head assembly with respect to the carriage assembly in a baseplate.

At Step MODULE PLACE 3326, which is discussed with reference to FIGS. 63, 65, and 75, the head assembly 2100 is joined to a baseplate 2310 (FIG. 68). At this point the baseplate 2310 has a carriage assembly not have an objective lens in place not have an objective lens in place, nor is the position sensor 2275 (FIG. 81) aligned. Also the top of the carriage is not yet shielded by a protective cover. A baseplate 2310 is mounted on the stage 2605 of module placement station 2600, and suitable electrical connections made. The head assembly 2100 is held in a clamp 2610, and can be moved by a micromanipulator 2620. The micromanipulator 2620 is preloaded, so that it urges the head assembly against the mounting surface of the baseplate 2310, thereby maintaining squared-up alignment with the baseplate 2310. Laser 2116 in the head assembly 2100 is actuated and a beam generated, which passes through the pentaprism 2216 (FIG. 65) of the carriage assembly 2220. The purpose of step MODULE PLACE 3326 is to center the beam passing through the head assembly 2100, after which the carriage assembly 2310 is permanently fixed to the baseplate 2310. Alignment of the head assembly 2100 is accomplished by disposing a conventional CCD camera (not shown) thereabove in the path of the exiting beam. A computer (not shown), executing the software program disclosed in Appendix 1, determines the outline of the aperture 2278 (FIG. 81) in the carriage assembly 2220. Then the head assembly 2100 is moved so that the beam's "hot spot" is centered in the aperture 2278 as shown on the computer display. Once alignment is completed, the head assembly is fixed in place on the baseplate 2310 by tightening its mounting screws (not shown).

Objective Lens Insertion

Figure 79:
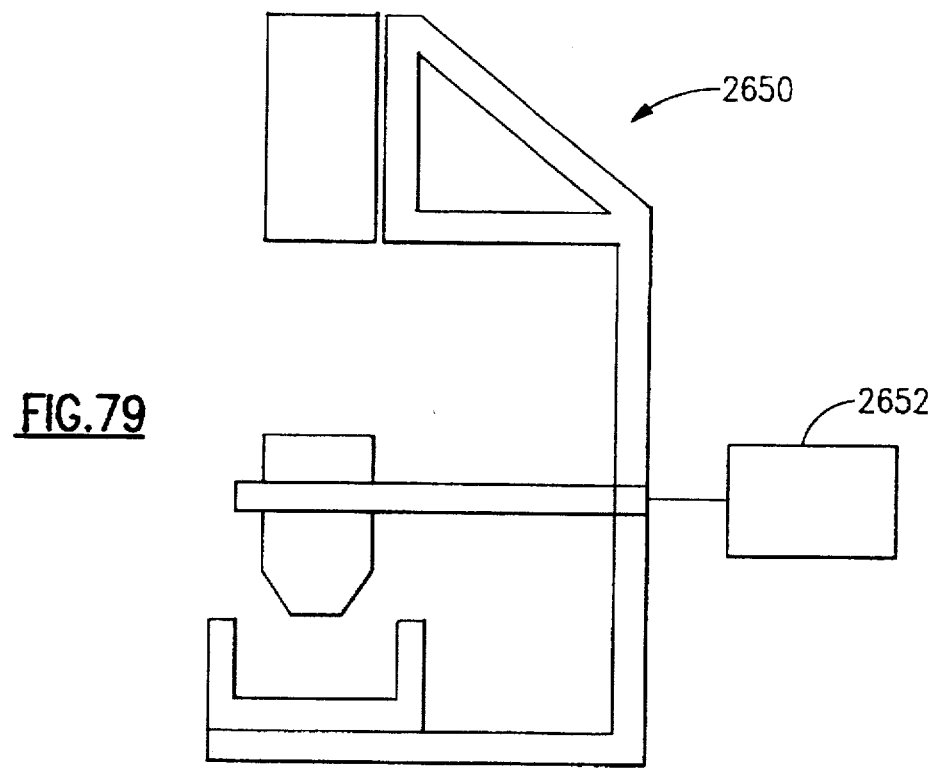
FIG. 79 is a schematic view of a lens alignment tool that is utilized in the process according to FIG. 61.

Insertion of the objective lens 2260 in the carriage assembly 2220 (FIG. 77) is accomplished at step LENS ALIGN 3327 by a specialized insertion and alignment tool 2650 (FIG. 79). Presently step LENS ALIGN 3327 is highly labor intensive, and is a rate limiting step in the process 3300. The tool 2650 aligns the optical axis of the objective lens with respect to fixed features on the baseplate assembly, and in particular with respect to a plane to be occupied by storage media. While not implemented in the present embodiment, automation of the lens alignment process may readily be accomplished by computer control of the micromanipulation mechanisms of the alignment tool 2650 utilizing conventional motorized servomechanisms, with appropriate modification of the software operating in the analysis computer 2652 that is operatively associated with the alignment tool 2650.

Figure 83:
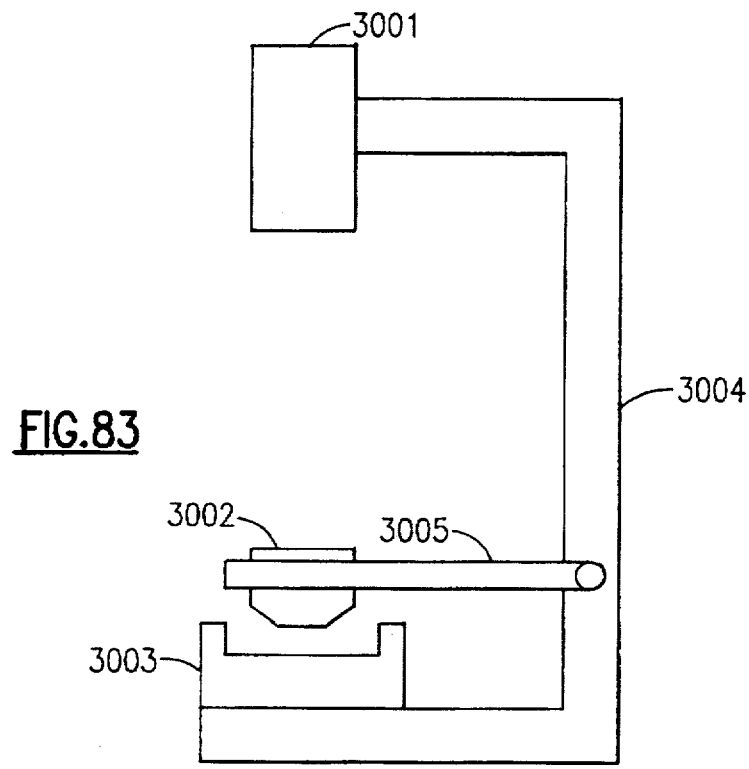
FIG. 83 is a generalized side view of one embodiment of the invention, showing the gripper assembly in a closed position.
Figure 84:
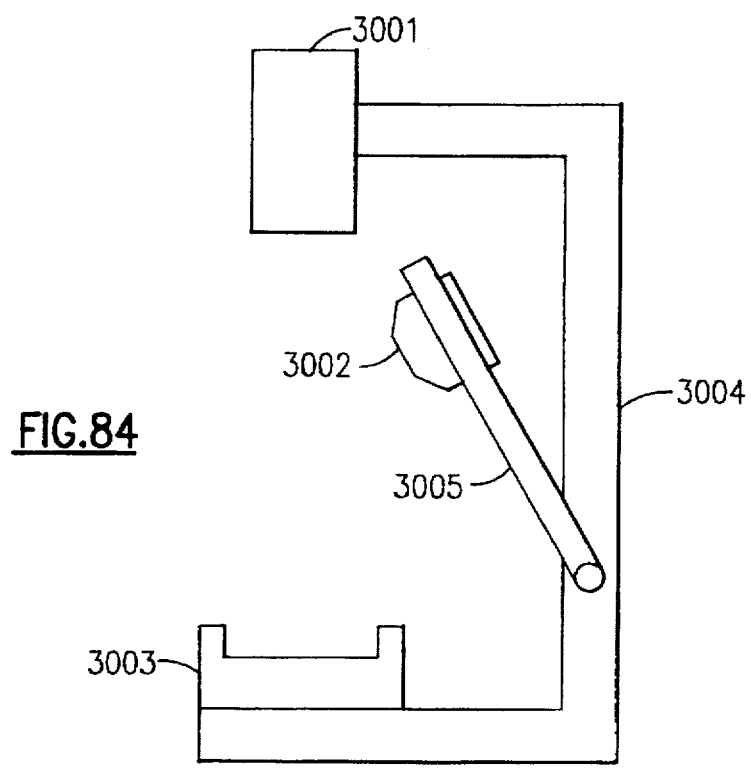
FIG. 84 is a generalized side view of one embodiment of the invention, showing the gripper assembly in an open position.

The tool 2650 is now more fully disclosed with reference to FIGS. 83–95. Referring initially to exemplary FIGS. 83 and 84, according to one aspect of the invention, the apparatus comprises a tower assembly 3001, a gripper assembly 3002, and a cradle assembly 3003. The tower assembly 3001 is fixedly mounted to a frame 3004. The tower assembly 3001 defines a tower axis. The gripper assembly 3002 is fixedly mounted to a lever assembly 3005, which is rotatably mounted to the frame 3004. The cradle assembly 3003 is mounted to the frame 3004 with at least one degree of freedom of motion. A line between the tower assembly 3001 and the cradle assembly 3003 is referred to as an assembly axis. In the closed position, as shown in FIG. 83, the gripper assembly 3002 is between the tower assembly 3001 and the cradle assembly 3003 along the assembly axis. In the open position, as shown in FIG. 84, the gripper assembly 3002 is not along the assembly axis.

Figure 85:
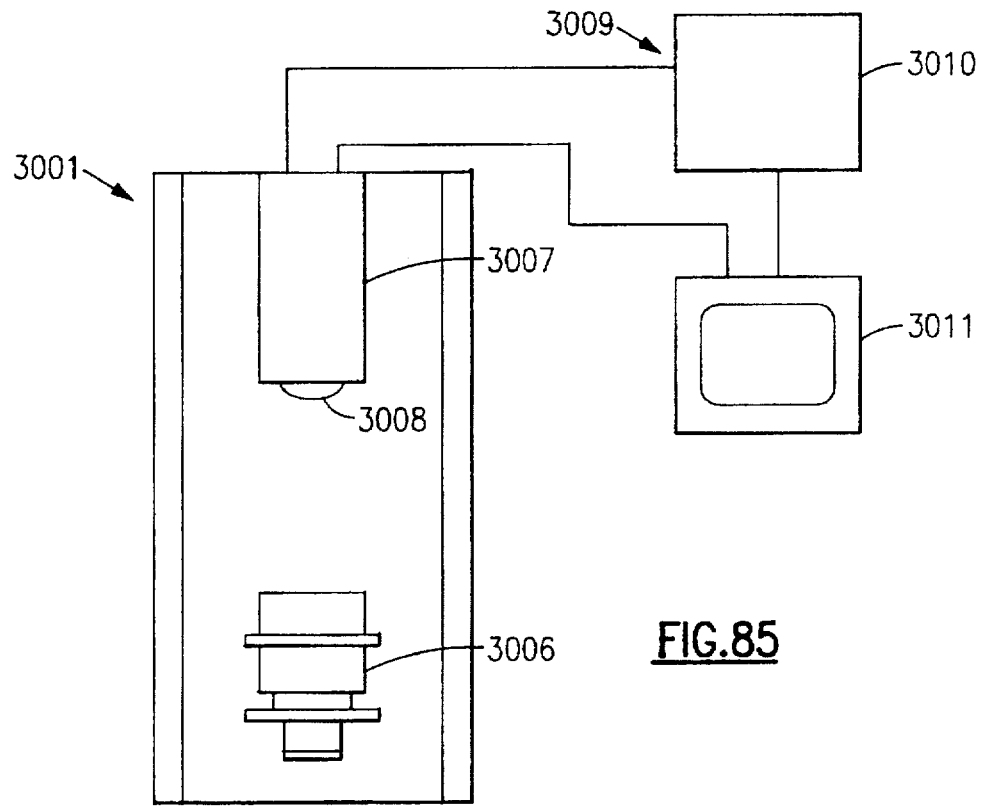
FIG. 85 is a cross-sectional view of the tower assembly, including an embodiment of the analysis assembly.

Referring to exemplary FIG. 85, a cross-section of the tower assembly 3001 is shown in more detail. The tower assembly 3001 comprises a tower magnifying lens 3006 and a video camera 3007 having a camera lens 3008. The optical axes of the camera lens 3008 of the video camera 3007 and the tower magnifying lens 3006 are the same, and are referred to collectively as the tower optical axis. The output from the video camera 3007 is connected to an analysis assembly 3009. The analysis assembly 3009 may be any assembly suitable for analyzing the characteristics of a radiant beam of energy. In the embodiment shown in exemplary FIG. 85, the analysis assembly 3009 comprises a processor 3010 and a monitor 3011.

Figure 86:
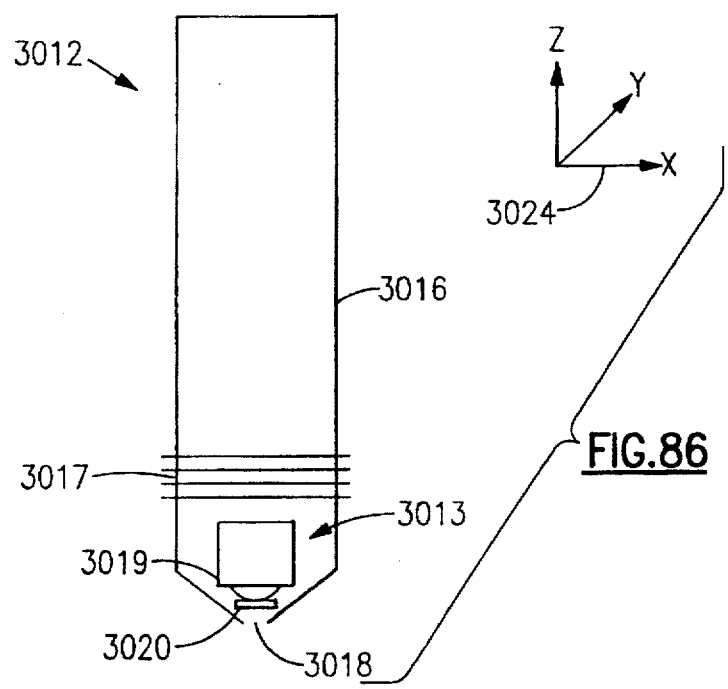
FIG. 86 is a cross-section view of the vacuum chuck and the microscope objective lens assembly.
Figure 87:
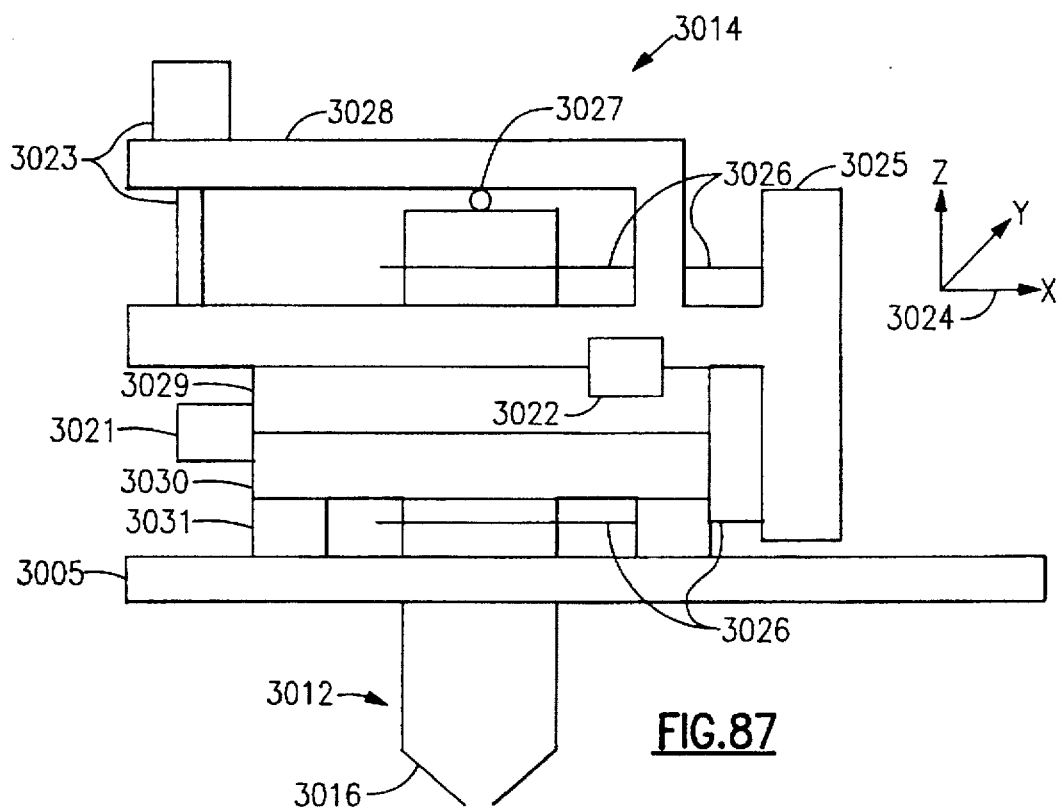
FIG. 87 is a view of the microscope objective lens alignment assembly.
Figure 88:
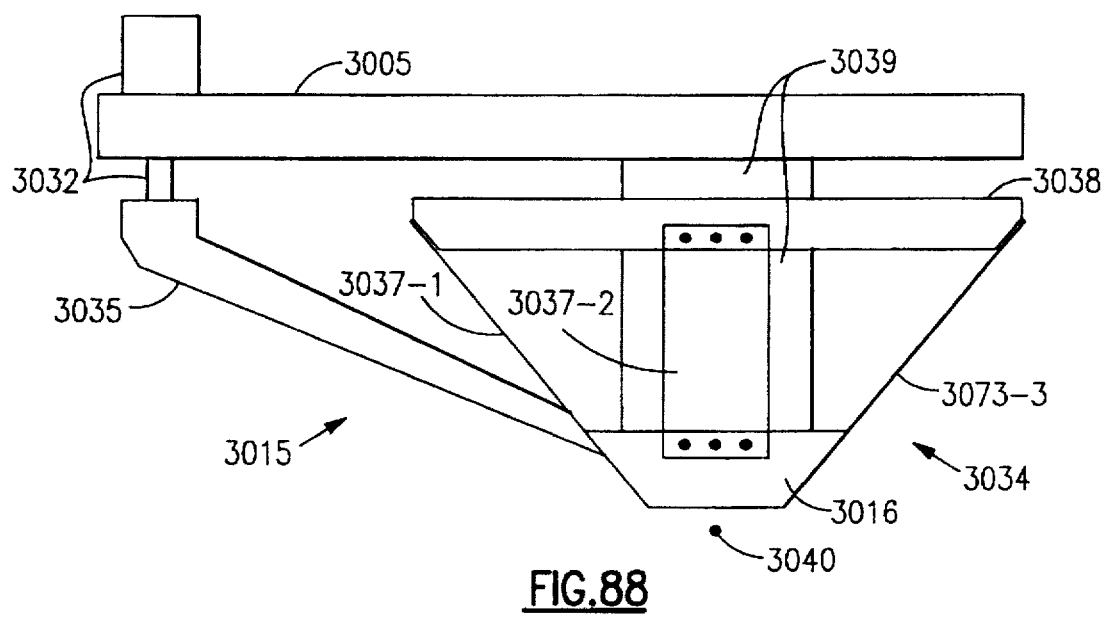
FIG. 88 is a side view of the actuator lens tilt assembly.
Figure 89:
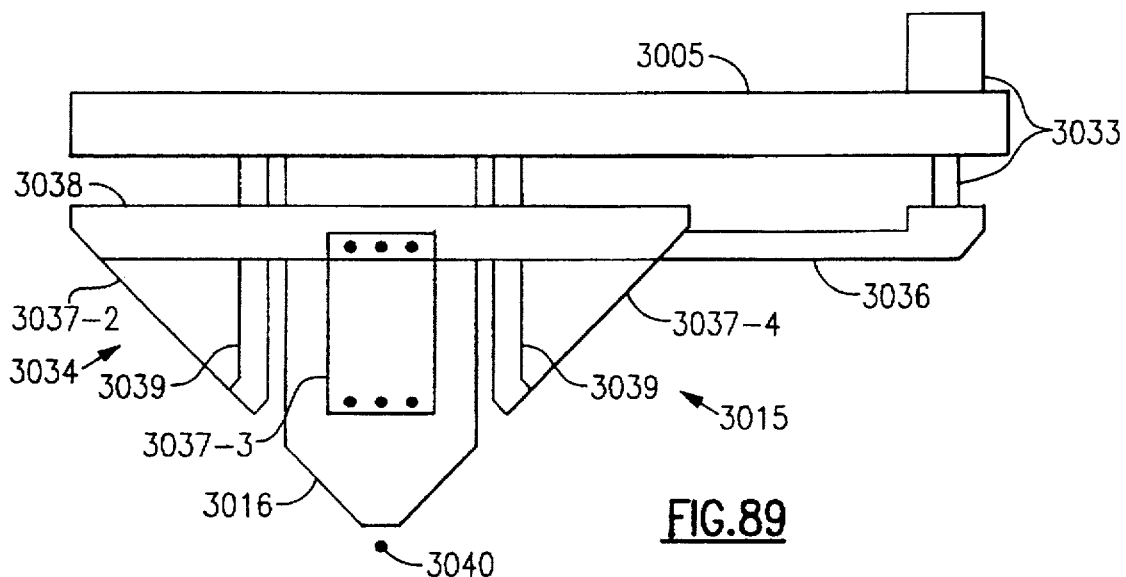
FIG. 89 is a front view of the actuator lens tilt assembly.

Referring to exemplary FIGS. 86–89, the gripper assembly 3002 comprises a vacuum chuck 3012, a microscope objective lens assembly 3013, a microscope objective lens alignment assembly 3014, and an actuator lens tilt assembly 3015. FIG. 86 shows a cross-sectional view of one embodiment of the vacuum chuck 3012 and the microscope objective lens assembly 3013. FIG. 87 shows a view of one embodiment of the microscope objective lens alignment assembly 3014. FIGS. 88 and 89 show two views of the actuator lens tilt assembly 3015.

Referring to exemplary FIG. 86, the vacuum chuck 3012 comprises a housing 3016, a bellows structure 3017, and an actuator lens receiving opening 3018. A pneumatic tube (not shown) is connected to the housing 3016. In operation, an actuator lens (not shown) is placed within the actuator lens receiving opening 3018 such that the actuator lens receiving opening 3018 is completely covered. The actuator lens may be an objective lens. Air is then evacuated from the housing 3016 through the pneumatic tube (not shown) to create a pressure differential between the interior and the exterior of the housing 3016. This pressure differential operates to hold the actuator lens against the actuator lens receiving opening 3018 when the gripper assembly 3002 moves. The housing 3016 contains a bellows structure 3017 to allow the housing 3016 to bend while maintaining a pressure differential.

The microscope objective lens assembly 3013 comprises a microscope objective lens 3019 and a substrate 3020. In operation, a beam of radiant energy will enter the housing 3016 through the actuator lens receiving opening 3018 and, if present, through the actuator lens. The beam will pass through the substrate 3020 and through the microscope objective lens 3019. The beam then passes through the housing 3016 and into the tower assembly 3001, where it passes through the tower magnifying lens 3006 and is received by the video camera 3007. Together, the microscope objective lens 3019 and the tower magnifying lens 3006 magnify the beam and focus the beam in the video camera 3007. The tower magnifying lens 3006 may be a tube lens. The substrate 3020 simulates the optical properties of an information-bearing disk, and the effects of those properties on the beam. The substrate 3020 is mounted such that, when the gripper assembly 3002 is in the closed position, the substrate 3020 is orthogonal to the tower optical axis.

Referring to exemplary FIG. 87, the microscope objective lens alignment assembly 3014 comprises an X-axis lateral alignment actuator 3021, a Y-axis lateral alignment actuator 3022, and a focus actuator 3023. Referring to exemplary FIG. 87, there is shown a reference coordinate system 3024. This reference coordinate system 3024 is chosen for purposes of explanation only, and it will be obvious to one skilled in the art that any convenient coordinate system could be chosen without departing from the spirit and scope of the present invention.

In the embodiment particularly shown in FIG. 87, a microscope support frame 3025 having a frame extension 3028 supports the housing 3016 by a support leaf spring 3026. The support leaf spring 3026 biases the housing 3016 against a cylindrical bearing 3027 located between the housing 3016 and a frame extension 3028. The focus actuator 3023 is mounted to the frame extension 3028, and maintains a distance between the frame extension 3028 and the microscope support frame 3025 along the Z-axis, as indicated by the reference coordinate system 3024. Motion of the housing 3016 along the Z-axis adjusts the focus of the microscope objective lens 3019 in combination with the tower magnifying lens 3006.

The microscope support frame 3025 is mounted on a Y-axis lateral alignment support 3029 such that the microscope support frame 3025 may slide relative to the Y-axis lateral alignment support 3029 along the Y-axis, as indicated by the reference coordinate system 3024. The Y-axis lateral alignment actuator 3022 is mounted to the microscope support frame 3025, and will actuate the relative sliding motion along the Y-axis.

The Y-axis lateral alignment support 3029 is mounted on an X-axis lateral alignment support 3030 such that the Y-axis lateral alignment support 3029 may slide relative to the X-axis lateral alignment support 3030 along the X-axis, as indicated by the reference coordinate system 3024. The X-axis lateral alignment actuator 3021 is mounted to the Y-axis lateral alignment support 3029, and will actuate the relative sliding motion along the X-axis.

The X-axis lateral alignment support 3030 is mounted to a lateral alignment assembly support 3031. The lateral alignment assembly support 3031 is mounted to the lever assembly 3005. It will be apparent to one skilled in the art that the mountings between the microscope support frame 3025, the Y-axis lateral alignment support 3029, the X-axis lateral alignment support 3030, and the lateral alignment assembly support 3031 may be rearranged from the above description without departing from the spirit and scope of the present invention.

Referring to exemplary FIGS. 88 and 89, there are shown two views of the actuator lens tilt assembly 3015. FIG. 88 represents a left side view of the actuator lens tilt assembly 3015 according to one aspect of the invention. FIG. 89 represents a front view of the same actuator lens tilt assembly 3015. The actuator lens tilt assembly 3015 comprises an X-axis tilt actuator 3032, a Y-axis tilt actuator 3033, and a flexure assembly 3034. The X-axis tilt actuator 3032 is mounted to the lever assembly 3005 and against an X-axis lever 3035. The X-axis lever 3035, at the end nearest the X-axis tilt actuator 3032, is biased against the lever assembly 3005, and at the other end is mounted to the flexure assembly 3034. The Y-axis tilt actuator 3033 is mounted to the lever assembly 3005 and against a Y-axis lever 3036. The Y-axis lever 3036, at the end nearest the Y-axis tilt actuator 3033, is biased against the lever assembly 3005, and at the other end is mounted to the flexure assembly 3034.

The flexure assembly 3034 comprises a plurality of flexure plates 3037-1, 3037-2, 3037-3, 3037-4, a flexure support ring 3038, and a plurality of flexure support plates 3039. Flexure plate 3037-1 is mounted at one end to the flexure support ring 3038, and mounted at its other end to the X-axis lever 3035 and the housing 3016. Flexure plate 3037-3 is mounted opposite flexure plate 3037-1 to the flexure support ring 3038 and to the housing 3016. Flexure plate 3037-4 is mounted at one end to the Y-axis lever 3036 and the flexure support ring 3038, and mounted at its other end to a flexure support plate 3039. Flexure plate 3037-4 is mounted at a 90 degree interval from both flexure plate 3037-1 and flexure plate 3037-3. Flexure plate 3037-2 is mounted opposite flexure plate 3037-2 to the flexure support ring 3038 and to a flexure support plate 3039. The flexure support plates 3039 are mounted to the lever assembly 3005.

Flexure plates 3037-1, 3037-2, 3037-3, 3037-4 each lie in a separate plane. The planes in which flexure plates 3037-1 and 3037-3 lie intersect along a line through an intersection point 3040. The planes in which flexure plates 3037-2 and 3037-4 lie intersection along a line through the intersection point 3040. The lines may be orthogonal to each other.

The operation of the actuator lens tilt assembly 3015 will be described with respect to a downward motion imparted on each of the tilt actuators, the X-axis tilt actuator 3032 and the Y-axis tilt actuator 3033.

A downward motion of the X-axis tilt actuator 3032 imparts a downward motion on the X-axis lever 3035. This downward force produces a counterclockwise rotational force on flexure plate 3037-1 about the point where flexure plate 3037-1 is mounted to the flexure support ring 3038. The downward force also translates into a counterclockwise rotational force on flexure plate 6037-3 about the point where flexure plate 3037-3 is mounted to the flexure support ring 3038. These two rotational forces cause rotation about the intersection of the two planes in which the flexure plates 3037-1, 3037-3 lie. This intersection occurs at intersection point 3040.

A downward motion of the Y-axis tilt actuator 3033 imparts a downward force on the Y-axis lever 3036. This downward force produces a clockwise rotational force on flexure plate 3037-4 about the point where flexure plate 3037-4 is mounted to the flexure support plate 3039. Because of the rigidity of the flexure support ring 3038, this rotational force translates into a clockwise rotational force on flexure plate 3037-2 about the point where flexure plate 3037-2 is mounted to the flexure support plate 3039. These two rotational forces cause rotation about the intersection of the two planes in which the flexure plates 3037-2 and 3037-4 lie. This intersection occurs at intersection point 3040.

Figure 90:
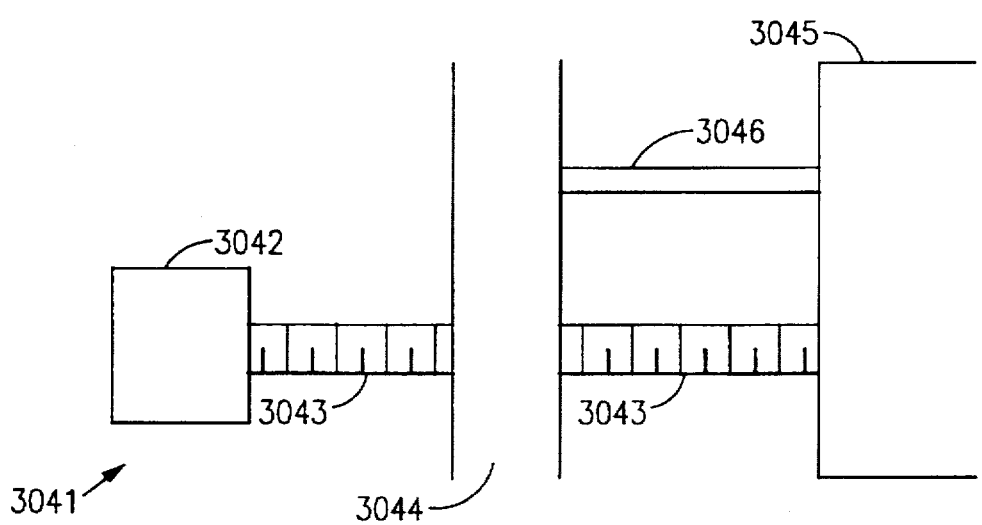
FIG. 90 is a view of an alignment actuator.

Referring to exemplary FIG. 90, there is shown one embodiment of an alignment actuator 3041. The alignment actuator 3041 may be a tilt actuator or a lateral alignment actuator, as described above. The alignment actuator 3041 contains a handle 3042 and a threaded body 3043. The threaded body 3043 is threadably mounted through a fixed surface 3044 and against a movable surface 3045. The movable surface 3045 is biased toward the fixed surface 3044 by a spring 3046 or other suitable biasing means. The mounting of the movable surface 3045 determines whether the force by the alignment actuator 3041 or the biasing by the spring 3046 produces a lateral or rotational force. The alignment actuator 3041 may include what is commonly referred to as a micrometer stage.

Figure 91:
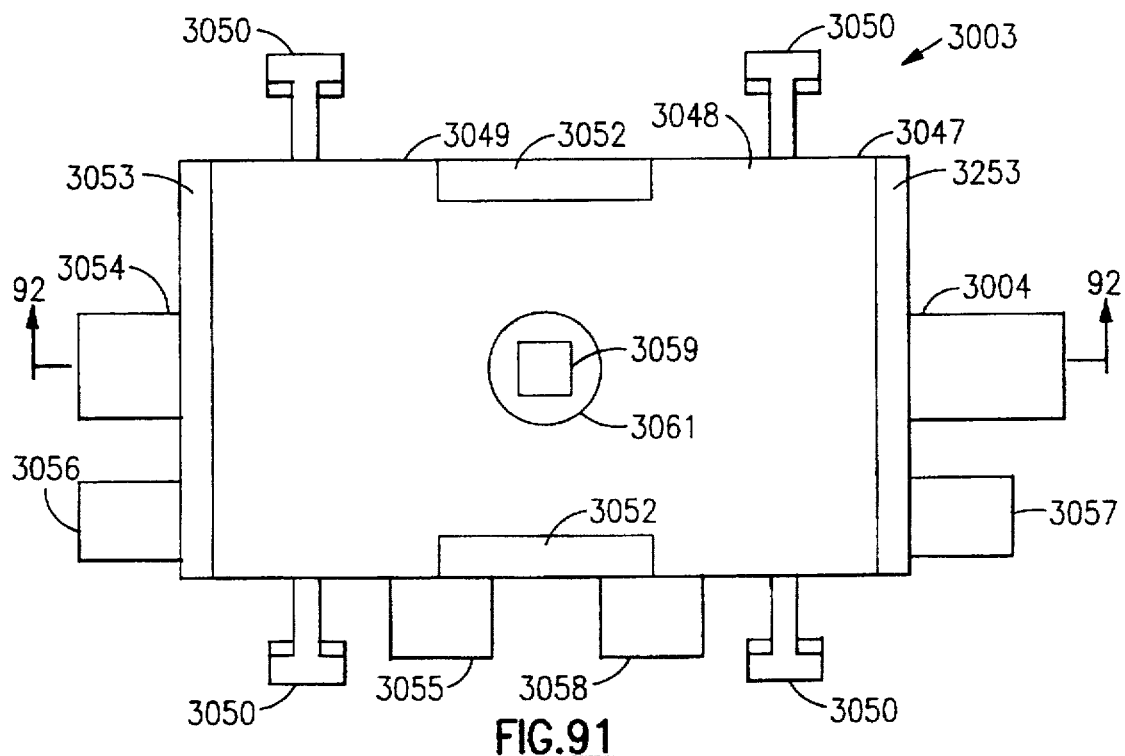
FIG. 91 is a top view of one embodiment of the cradle assembly.
Figure 92:
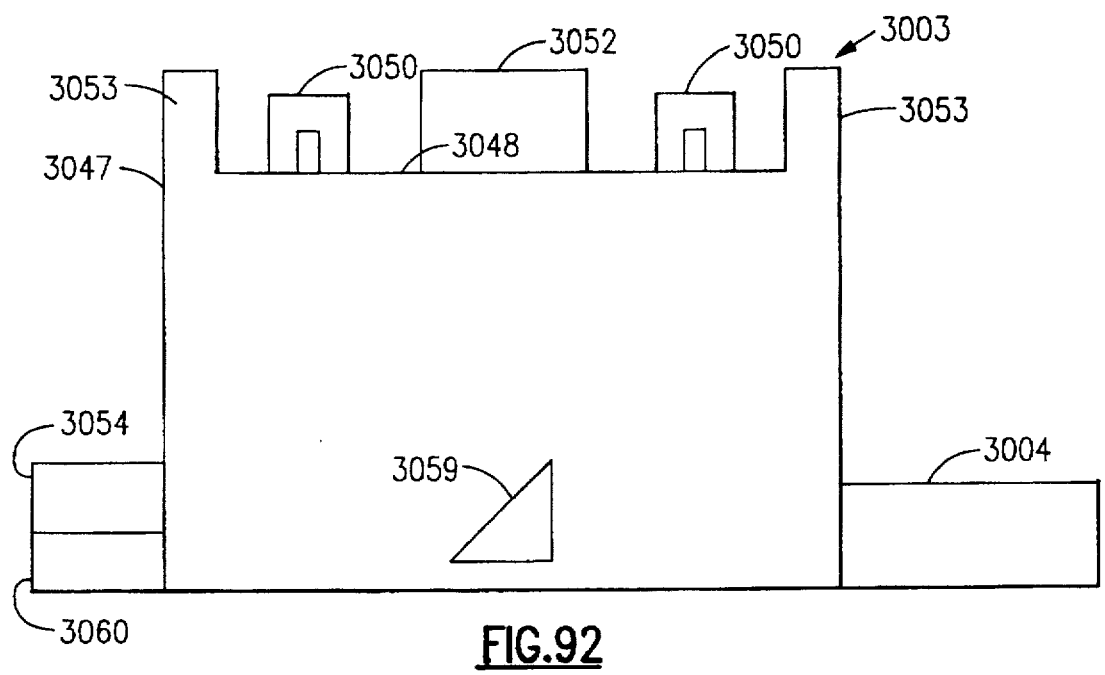
FIG. 92 is a cross-sectional view of one embodiment of the cradle assembly, taken along line 92—92 of FIG. 91.

Referring to exemplary FIG. 91, there is shown a top view of the cradle assembly 3003. Referring to exemplary FIG. 92, there is shown a cross-sectional view of the cradle assembly 3003. The cradle assembly 3003 comprises a cradle 3047 having a surface 3048 and a side 3049, a plurality of vacuum clamps 3050, and a baseplate alignment assembly (not shown). The cradle includes side walls 3052 and end walls 3053 for securing a baseplate assembly (not shown) in the cradle 3047. In the embodiment particularly shown in exemplary FIGS. 91 and 92, the baseplate alignment assembly (not shown) comprises a source of radiant energy 3054, a Y-axis source lateral actuator 3055, a Z-axis source lateral actuator 3056, an X-axis cradle assembly tilt actuator 3057, a Y-axis cradle assembly tilt actuator 3058, a mirror 3059, and an alignment analyzer 3060. In another embodiment, the baseplate alignment assembly (not shown) comprises a source of radiant energy 3054, an X-axis cradle assembly tilt actuator 3057, a Y-axis cradle assembly tilt actuator 3058, a mirror 3059, and an alignment analyzer 3060. In both embodiments, the mirror 3059 is aligned below a hole 3061 in the surface 3048 of the cradle 3047. Additionally, the source of radiant energy 3054 and the alignment analyzer 3060 may be combined in an auto-collimator or an auto-collimator/telescope.

Figure 93:
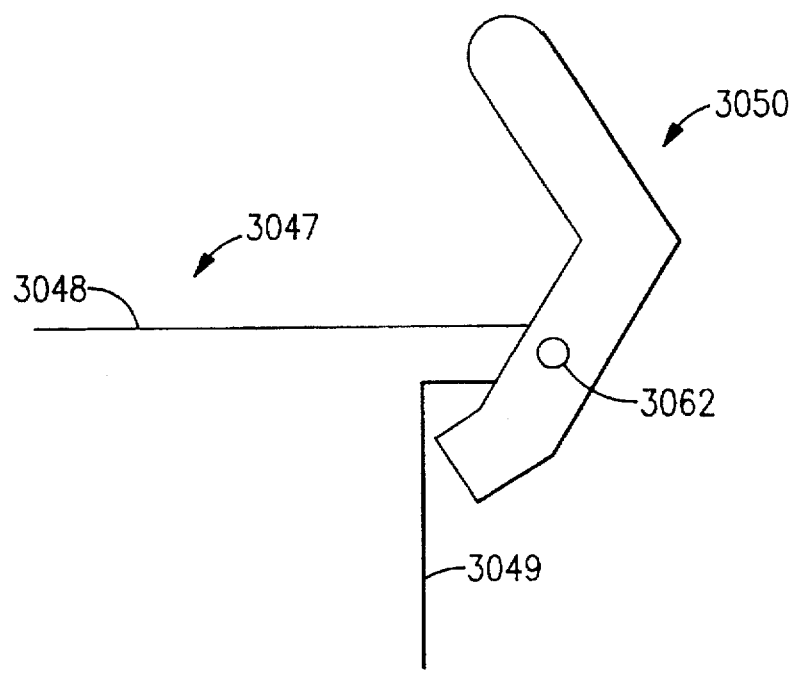
FIG. 93 is a cross-sectional view of one embodiment of a vacuum clamp in the open position, taken along line 92—92 of FIG. 91.
Figure 94:
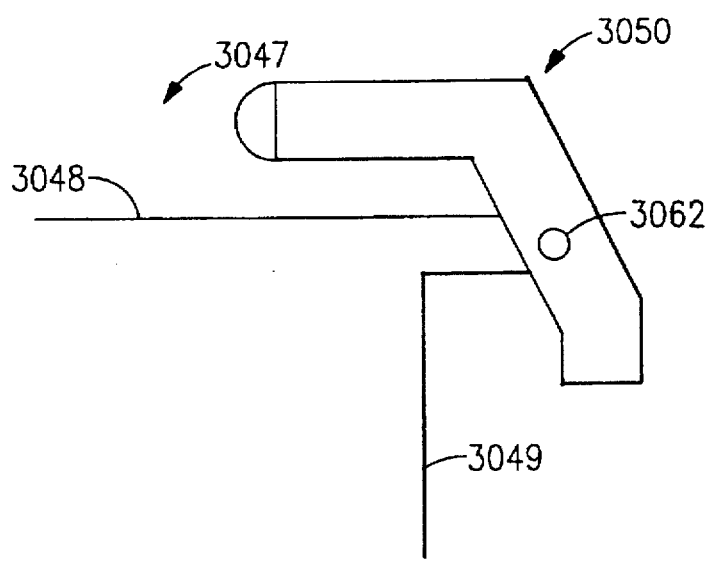
FIG. 94 is a cross-sectional view of one embodiment of a vacuum clamp in the closed position, taken along line 92—92 of FIG. 91.

Referring to exemplary FIG. 93, a cross-sectional view of a vacuum clamp 3050 is shown in the open position. Exemplary FIG. 94 shows a cross-sectional view of a vacuum clamp 3050 in the closed position. The surface 3048 of the cradle 3047 extends laterally beyond the side 3049 of the cradle 3047. A vacuum clamp 3050 with a U-shaped cross-section is placed over the extension of the cradle 3047, with one leg of the U-shape on each side of the extension. A pivot pin 3061 is placed through each leg of the U-shape and through the extension of the cradle 3047. In the open position, a baseplate assembly can be placed on the cradle 3047. Once in place, a pneumatic tube (not shown) biases the vacuum clamp 3050 to the closed position, securing the baseplate against movement.

Figure 95:
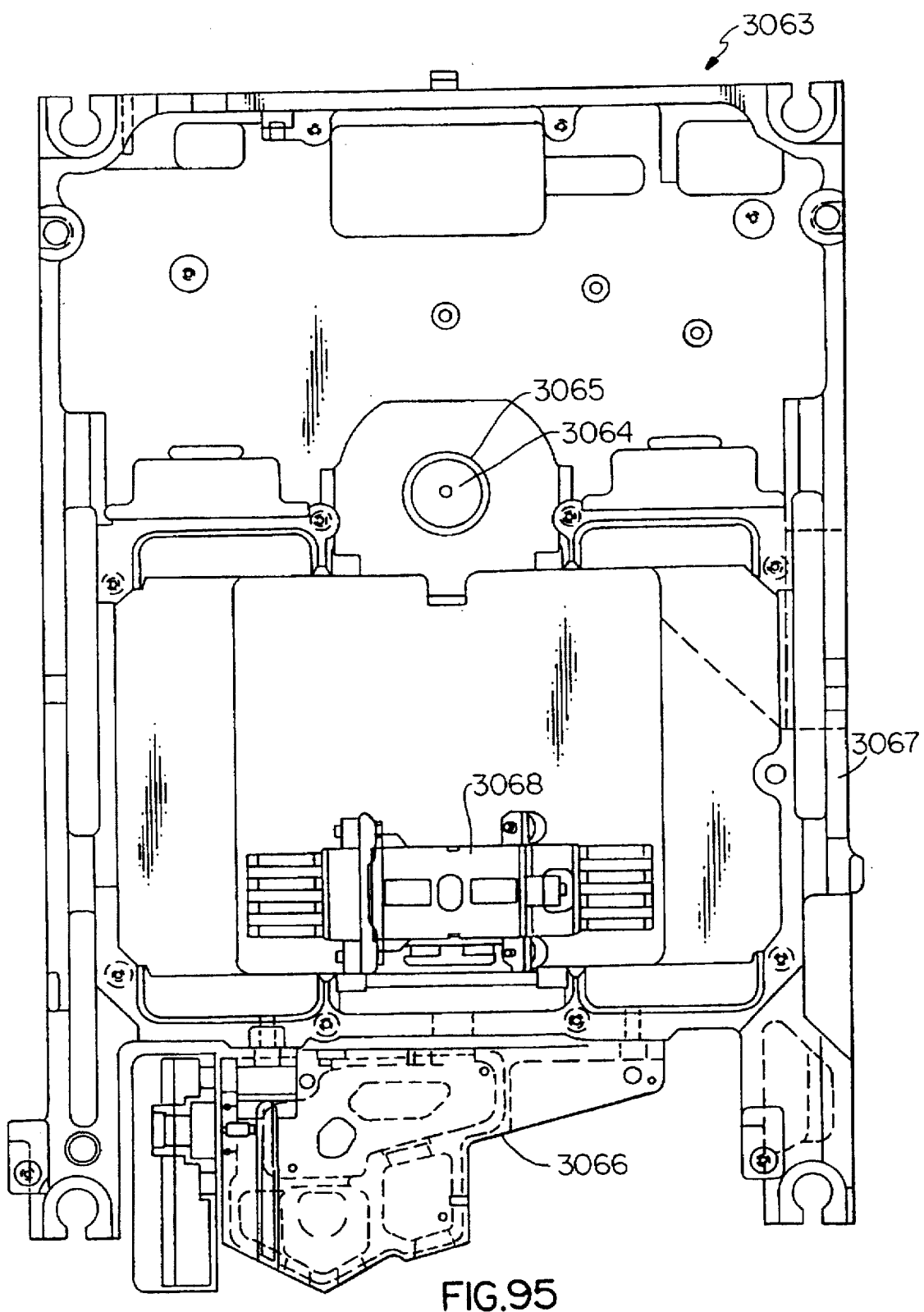
FIG. 95 is a plan view of a baseplate assembly.

In operation, a baseplate assembly 3063, shown generally in FIG. 95, is provided. The structure of the baseplate assembly is described in co-pending U.S. patent application Ser. No. 08/376,882 and co-pending U.S. Patent Application filed under Attorney's Docket Number MMMIP951028(US) US on Mar. 21, 1995, which are hereby incorporated by reference. The baseplate assembly contains a spindle 3063 and spindle motor 3064 for rotating an information-bearing disk, and a spindle servo for controlling the speed of the spindle motor. The baseplate assembly further contains an optics module assembly 3066. The baseplate assembly also contains a carriage motor 3067 and carriage assembly 3068 for directing a beam of radiant energy from the optics module assembly toward a position on the information-bearing disk, and a carriage control servo for controlling the position of the carriage assembly. The carriage assembly 3068 does not initially contain an actuator lens for focussing the beam of radiant energy on the information-bearing disk. The carriage assembly may be held in place relative to the spindle by a carriage stop.

The baseplate assembly 3063 is placed on the surface 3048 of the cradle 3047 and secured with the vacuum clamps 3050. A test disk of glass or other suitable material (not shown) is placed on the spindle of the baseplate assembly. The gripper assembly 3002 is then lowered into the closed position.

The source of radiant energy 3054 radiates two cradle alignment beams of radiant energy toward the mirror 3059. The first cradle alignment beam is reflected from the mirror 3059, then passes through the hole 3061 in the cradle 3047 and through the baseplate assembly. The first cradle alignment beam reflects off the test disk and is received by the alignment analyzer 3060. The second cradle alignment beam is reflected from the mirror 3059, then passes through the hole 3061 in the cradle 3047 and through the baseplate assembly. The second cradle alignment beam reflects off the substrate 3020 and is received by the alignment analyzer 3060. By analyzing the relative positions of the first and second cradle alignment beams, the alignment analyzer 3060 determines the tilt of the test disk with respect to the substrate 3020. The mirror 3059 may comprise two parallel mirrors, each reflecting one of the cradle alignment beams.

Tilt between the test disk and the substrate 3020 is corrected in the following manner. The X-axis cradle assembly tilt actuator 3057 tilts the cradle assembly 3003 about the X-axis. The Y-axis cradle assembly tilt actuator 3058 tilts the cradle assembly 3003 about the Y-axis. Acting together, the cradle assembly tilt actuators 3057, 3058 tilt the cradle assembly 3003, including the test disk, with respect to the substrate 3020. Because the substrate 3020 is orthogonal to the tower optical axis, this action tilts the cradle assembly 3003 with respect to the tower optical axis. Each of the actuators 3057, 3058 may be an alignment actuator 3041 as shown in exemplary FIG. 90.

In one embodiment, lateral alignment of the cradle assembly 3003 with respect to the tower optical axis is done mechanically, and is not tested or measured. In another embodiment, if the cradle alignment beam is not received by the alignment analyzer 3060, or is off-center when received by the alignment analyzer 3060, the position of the source of radiant energy 3054 can be moved using the Y-axis source lateral actuator 3055 and the Z-axis source lateral actuator 3056. As shown best in FIG. 91, the mirror 3059 is situated such that a change in the position of the source of radiant energy 3054 along the Y-axis is translated into a change in the position of the cradle alignment beam along the Y-axis as it is received by the alignment analyzer 3060. The Y-axis source lateral actuator 3055 effects this change in position. Similarly, a change in the position of the source of radiant energy 3054 along the Z-axis is translated into a change in the position of the cradle alignment beam along the X-axis as it is received by the alignment analyzer 3060. The Z-axis source lateral actuator 3056 effects this change in position. Each of the actuators 3055, 3056 may be an alignment actuator 3041 as shown in exemplary FIG. 90.

In the embodiment particularly described below, all references to a coordinate system are made in accordance with reference coordinate system 3024 shown in exemplary FIG. 87. This reference coordinate system 3024 is chosen for purposes of explanation only, and it will be obvious to one skilled in the art that any convenient coordinate system could be chosen without departing from the spirit and scope of the present invention.

Once aligned, the source of radiant energy 3054 is turned off and the test disk is removed. If not previously aligned, the carriage assembly of the baseplate assembly is moved in approximate alignment with the assembly axis, and an actuator lens is placed within the carriage assembly of the baseplate assembly and is allowed to assume a natural rest position. The lever assembly 3005 is lowered to the closed position.

A pressure differential is then created between the vacuum chuck 3012 and the atmosphere. This pressure differential operates to hold the actuator lens against the vacuum chuck 3012, while maintaining the orientation of the actuator lens. Additionally, the optical center of the actuator lens is maintained at the intersection point 3040. This optical center may also be substantially at the center of mass of the actuator lens.

An adjustable power supply is attached to the radiant energy source within the optics module assembly. The radiant energy source projects a lens alignment beam of radiant energy into the carriage assembly. Within the carriage assembly, the lens alignment beam passes through the pentaprism and through the actuator lens. The lens alignment beam then passes through the substrate 3020, through the microscope objective lens 3019, and into the tower assembly 3001, where the lens alignment beam passes through the tower magnifying lens 3006 and is received by the video camera 3007. The analysis assembly 3009 then displays and analyzes the spot profile of the lens alignment beam.

If the lens alignment beam is not received by the video camera 3007 and passed to the analysis assembly 3009, the X-axis lateral alignment actuator 3021 and the Y-axis lateral alignment actuator 3022 are used to move the microscope objective lens 3019 laterally with respect to the tower assembly 3001. The X-axis lateral alignment actuator 3021 and the Y-axis lateral alignment actuator 3022 may be alignment actuators 3041 as shown in exemplary FIG. 90.

If the lens alignment beam is not focussed properly in the video camera 3007 and analysis assembly 3009, the focus actuator 3023 is used to move the microscope objective lens 3019 toward or away from the tower assembly 3001 until the lens alignment beam is in proper focus within the video camera 3007 and analysis assembly 3009. The focus actuator 3023 may be an alignment actuator 3041 as shown in exemplary FIG. 90.

Once focussed properly, the analysis assembly 3009 analyzes the profile of the beam for coma and astigmatism, as the cradle alignment beam was previously analyzed. If these optical aberrations occur, the actuator lens tilt assembly 3015 operates to minimize these aberrations by aligning the actuator lens. As described above, the X-axis tilt actuator 3032 rotates the actuator lens about the X-axis. Likewise, the Y-axis tilt actuator 3033 rotates the actuator lens about the Y-axis. Together, the actuator lens tilt assembly 3015 can rotate the actuator lens in any direction with respect to the lens alignment beam, while maintaining the optical center or the center of mass of the actuator lens at the intersection point 3040.

Once the misalignment is corrected to within an acceptable tolerance, the gripper assembly 3002, including the vacuum chuck 3012 and the actuator lens, is raised to the open position. A fastening agent is placed on the pedestals of the carriage assembly, and the gripper assembly 3002 is again lowered to the closed position. The actuator lens is secured by the fastening agent to the carriage assembly, without changing the orientation of the actuator lens established by the actuator lens tilt assembly 3015. The fastening agent may be a selectably-curable adhesive, such as ultraviolet radiation-curable adhesive.

Once the fastening agent has cured, the actuator lens is tested for alignment. As above, a lens alignment beam is radiated through the actuator lens, the substrate 3020, the microscope objective lens 3019, the tower magnifying lens 3006, and into the video camera 3007. The analysis assembly 3009 then analyzes the spot profile of the lens alignment beam. Each of the alignments described above may need to be adjusted for this testing process. Depending on its configuration, the vacuum chuck 3012 may need to be retracted or removed to avoid contacting and damaging the carriage assembly.

In another embodiment of the invention, the cradle assembly 3003 may comprise a plurality of cradles 3047, a plurality of vacuum clamps 3050, and a baseplate alignment assembly (not shown). The cradles 3047 may be movable with respect to the tower assembly 3001, and there may be either one baseplate alignment assembly (not shown) for each cradle 3047, or a single baseplate alignment assembly (not shown) which aligns only the cradle 3047 presently in position with respect to the tower assembly 3001. Further, there may be a single source of radiant energy 3054 and set of actuators 3055, 3056, 3057, 3058 regardless of the number of cradles 3047, with one mirror 3059 associated with each cradle 3047.

According to this embodiment, there may be a second tower assembly 3001 identical to the first tower assembly 3001 described above. In addition, there may be a second gripper assembly 3002 associated with the second tower assembly 3001 as described above. The second gripper assembly 3002 will not contain a vacuum chuck 3012.

In operation, the first tower assembly 3001 and first gripper assembly 3002 operate as described in the previous embodiment. After fastening the actuator lens to the carriage assembly with the fastening agent, the cradle 3047 containing the baseplate assembly is moved beneath the second tower assembly 3001 and second gripper assembly 3002. Again, a lens alignment beam of radiant energy is projected by the optics module assembly through the same path in the second tower assembly 3001 and second gripper assembly 3002 as described with respect to the first tower assembly 3001 and first gripper assembly 3002. The analysis assembly 3009 associated with the second tower assembly 3001 analyzes the spot profile of the lens alignment beam after the actuator lens is fastened to the baseplate assembly. It will be obvious to one skilled in the art that, by allowing the vacuum chuck 3012 to be removable or retractable, the first tower assembly 3001 and first gripper assembly 3002 may function as the second tower assembly 3001 and second gripper assembly 3002, respectively.

Optomechanics Loader

Step SERVO-ALIGN 3329 is discussed with reference to FIGS. 63 and 68. FIG. 68 depicts a servo alignment station 2300. The purposes of Step SERVO-ALIGN 3329 are to align the servo detectors 2145, 2147 and to insert the differential frustrated total internal reflection (DFTR) prism 2150 into the head assembly 2100. Initially the head assembly 2100 is attached to a baseplate 2310, which is mounted on the stand 2305. The DFTR prism 2150 is inserted into its pedestal 2148, and the pedestal then raised so that prism 2150 is in contact with the head assembly 2100. Servo detectors 2145, 2147 are grasped with a suitable gripping tool (not shown) that provides pogo pins for acquiring electrical contacts with the output leads of the servo detectors 2145, 2147. Other electrical and power connections are made and the laser 2116 actuated. While monitoring the output signals of the servo detectors 2145, 2147, the detectors are centered on the beams from the DFTR prism 2150, and the DFTR prism 2150 is rotated until the output signals are balanced and crosstalk minimized. The DFTR prism 2150 is then fixed in place with a UV adhesive or other suitable fastening agent, and the pedestal 2148 is removed. The servo detectors 2145, 2147 are also fixed into position at this time. During the alignment the servo detector outputs are analyzed by a computer (not shown), and certain electrical characteristics of the system are determined, for example the servo channel offset, focus offset, tracking offset, tracking amplitude, peak-to-peak amplitudes, and dark currents for each of the detectors. Also stray light effects, and crosstalk between the servo channels are determined. These determinations are all made to assure that the unit is operating within predefined specifications. The software that is executed by the computer to accomplish the determinations is disclosed in Appendix 2.

Figure 81:
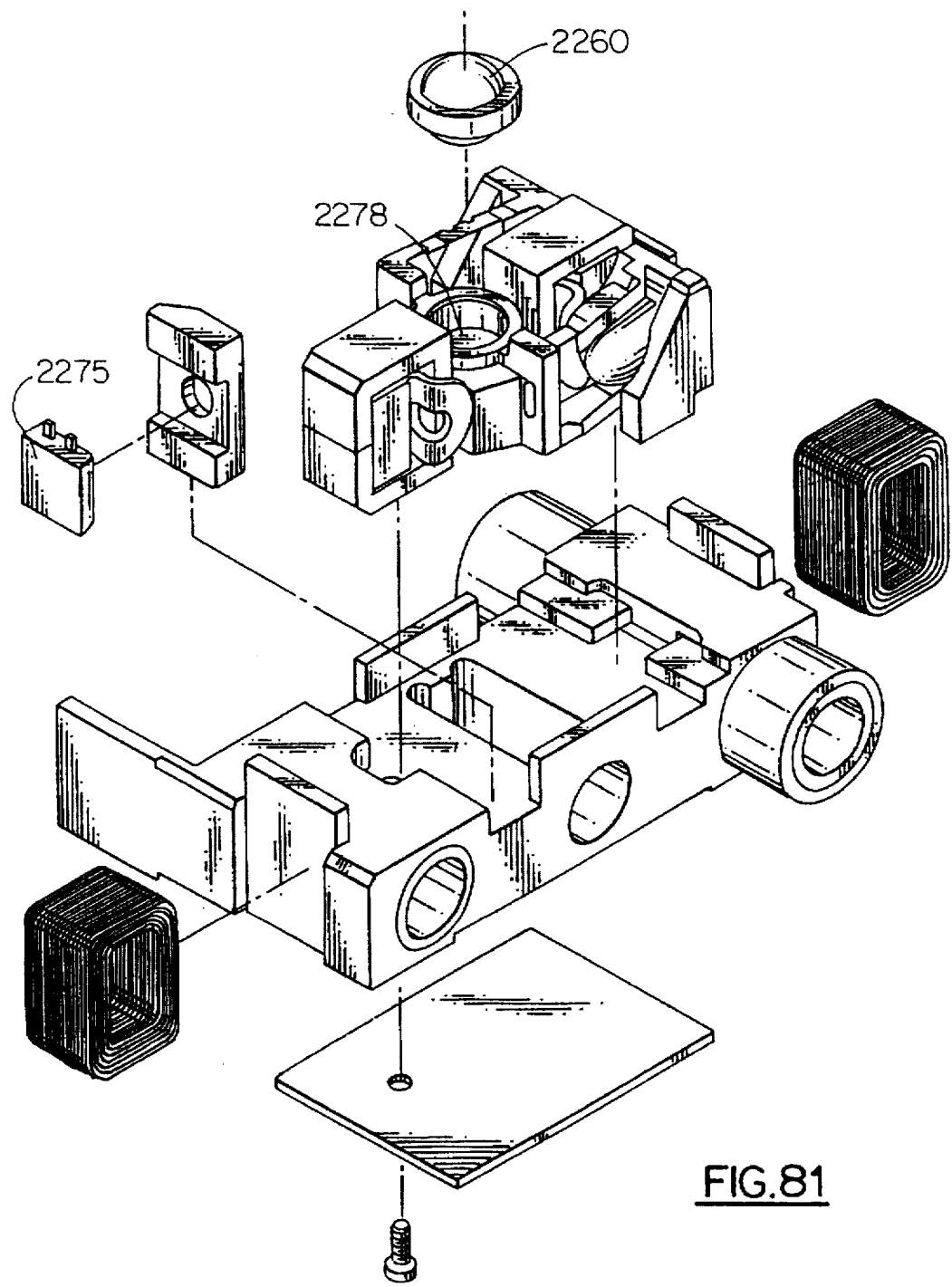
FIG. 81 is a partial exploded view of the carriage assembly shown in FIG. 80.

Referring to FIGS. 61, 80, and 81, step POSITION SENSOR 3328 is performed on a station similar to servo alignment station 2300. A baseplate 2310 and an attached head assembly 2100 are mounted on the stage. Again, appropriate electrical connections are made. The position sensor 2275 is grasped with a manipulator (not shown), and moved in one axis to minimize the position sensor offset. Once in proper location, the position sensor 2275 is fixed in position using UV glue or other suitable fastening agent, and the manipulator is released. A power monitor (not shown) is placed above the objective lens 2250. A power calibration curve for the assembly is then plotted under control of a computer (not shown), executing the data logger portion of the software programs disclosed in the appendices, for example Appendix 1.

Figure 70:
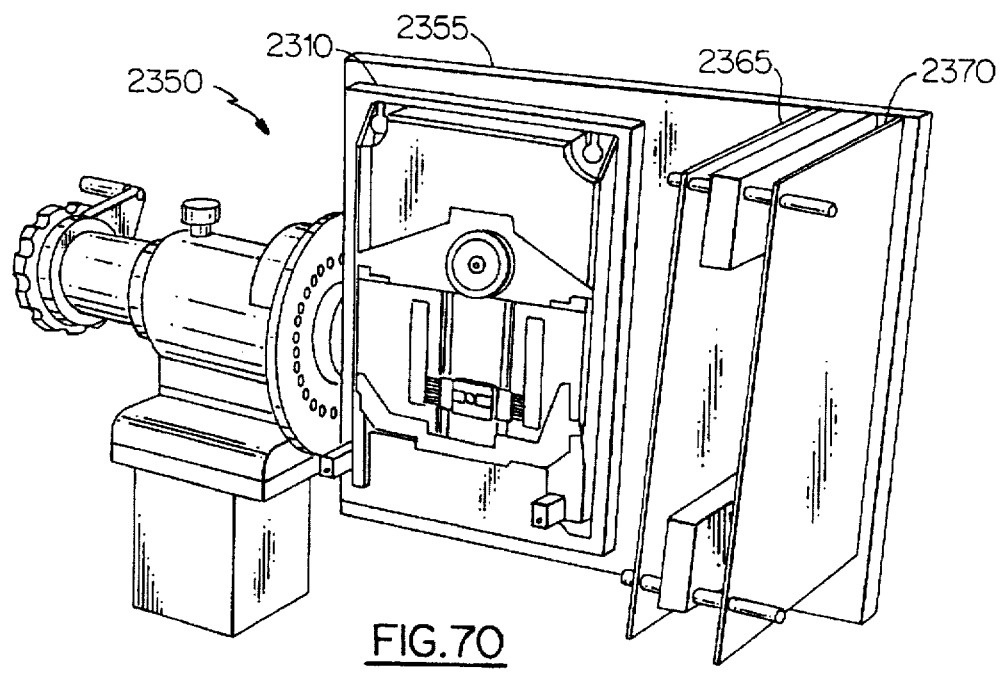
FIG. 70 is a perspective view of the test station shown in FIG. 69 having a baseplate mounted thereon in a vertical orientation.
Figure 71:
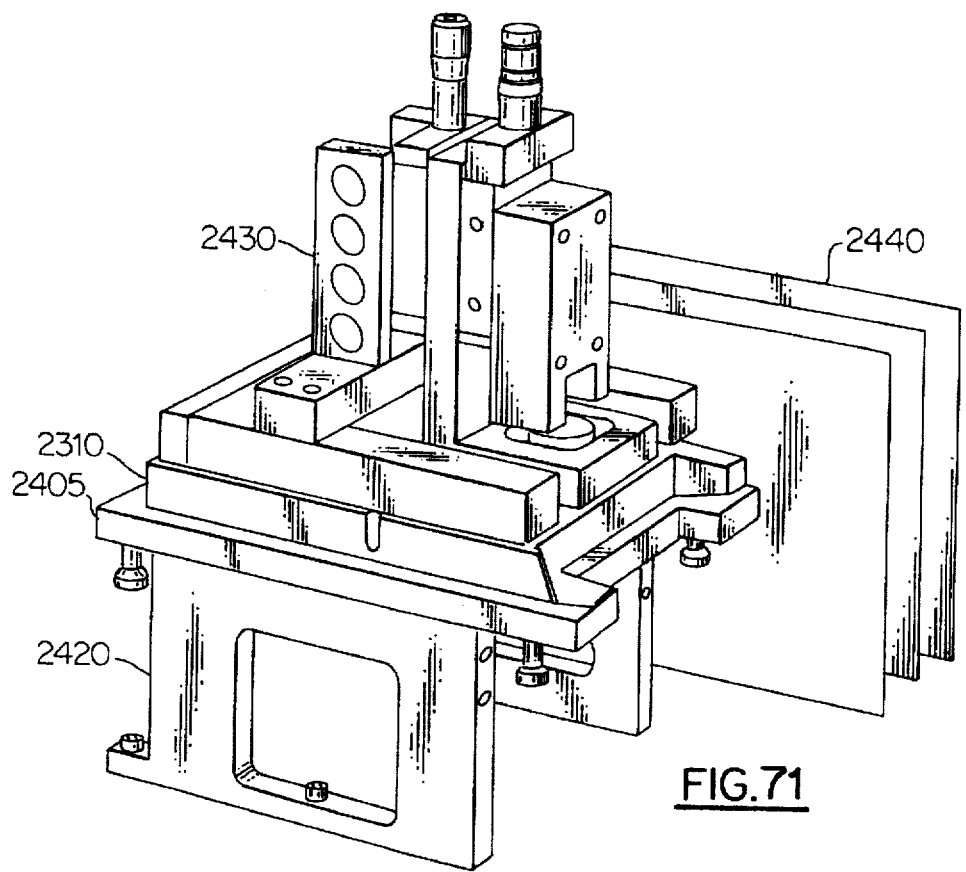
FIG. 71 is a perspective view of a test station for evaluation of a head assembly in accordance with the embodiment of FIG. 61, with a baseplate mounted therein.
Figure 72:
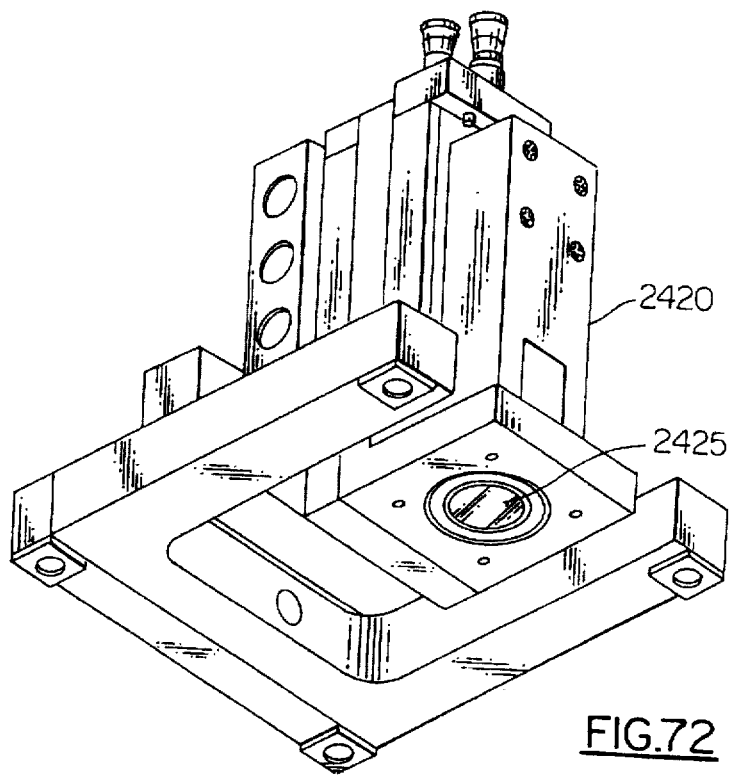
FIG. 72 is a bottom perspective view of the actuator module of the station shown in FIG. 71.
Figure 73:
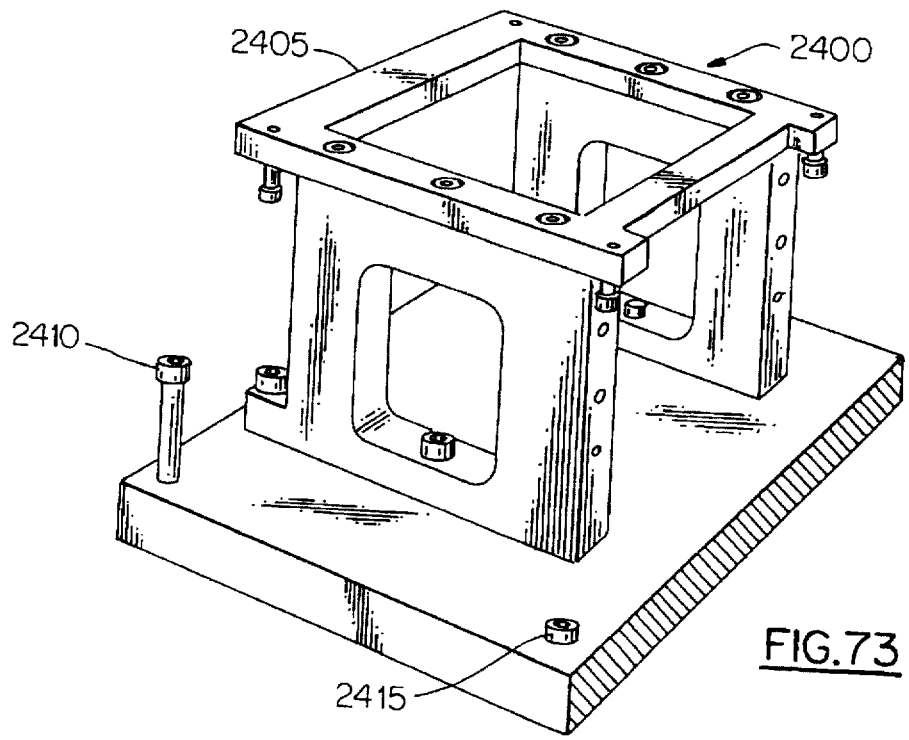
FIG. 73 is a perspective view of the station shown in FIG. 71 with the baseplate and the actuator module removed.

Step CON. & TRANS 3330 is conducted subsequent to step SERVO-ALIGN 3329 at test station 2350. A baseplate 2310 is mounted on a rotatable stage 2355 of the test station 2350, and electrical connections are made to the baseplate, electronics boards 2365, 2370, and to an analysis computer (not shown) which executes the analysis program disclosed in Appendix 3. The stage 2350 is fully rotatable about an axis indicated by dashed line 2360. Dynamic characteristics of the carriage, including constants of the baseplate's tracking motor, focus motor, and coarse positioning motor are determined. More particularly the sensitivity of each motor to driving currents is evaluated. Transfer curves are determined for each of these motors, for example low and high frequency focus transfer, low and high frequency tracking transfer, and a transfer curve for the coarse positioning motor. The motor sensitivities are determined by first obtaining measurements in a horizontal position (FIG. 69), and then again after the baseplate 2310 is mounted in a first vertical orientation (FIG. 70). In order to determine how much driving current is required for the tracking motor to hold the carriage in place, a further analysis is made after rotating the baseplate 2310 by 180° into a second vertical orientation (not shown). Thus the full effects of gravity are taken into account in determining the sensitivity of the tracking motor in both directions of carriage travel. Similarly the focus motor is evaluated by obtaining measurements in a first horizontal orientation (FIG. 69), and in a second horizontal orientation (not shown) after rotating the baseplate 2310 by 180°.

Step S-CURVE 3331 can be understood with reference to FIGS. 63, and 71–73. The focus error signal of an assembled head assembly 2100 (FIG. 63) is evaluated at station 2400. In assembly the station 2400 comprises a stage 2405 disposed on a base 2420, an actuator module 2430, and a baseplate 2310 therebetween. The baseplate 2310 has a finished head assembly 2100 placed therein. The actuator module 2430 contains an optical medium 2425 (FIG. 72) that is vertically movable. The actuator 2420 is precalibrated, so that the driving current required to move the optical medium 2425 a specified distance is known. During the evaluation, the actuator 2420 and the optical medium are displaced vertically in micron steps, and reading the optical medium is attempted. At each displacement the focus error signal is measured, and plotted to yield an "s-curve", which is required to fit within a specified envelope, or else the unit is rejected. The evaluations are conducted under control of a computer (not shown), which executes the software program disclosed in Appendix 4.

Figure 62:
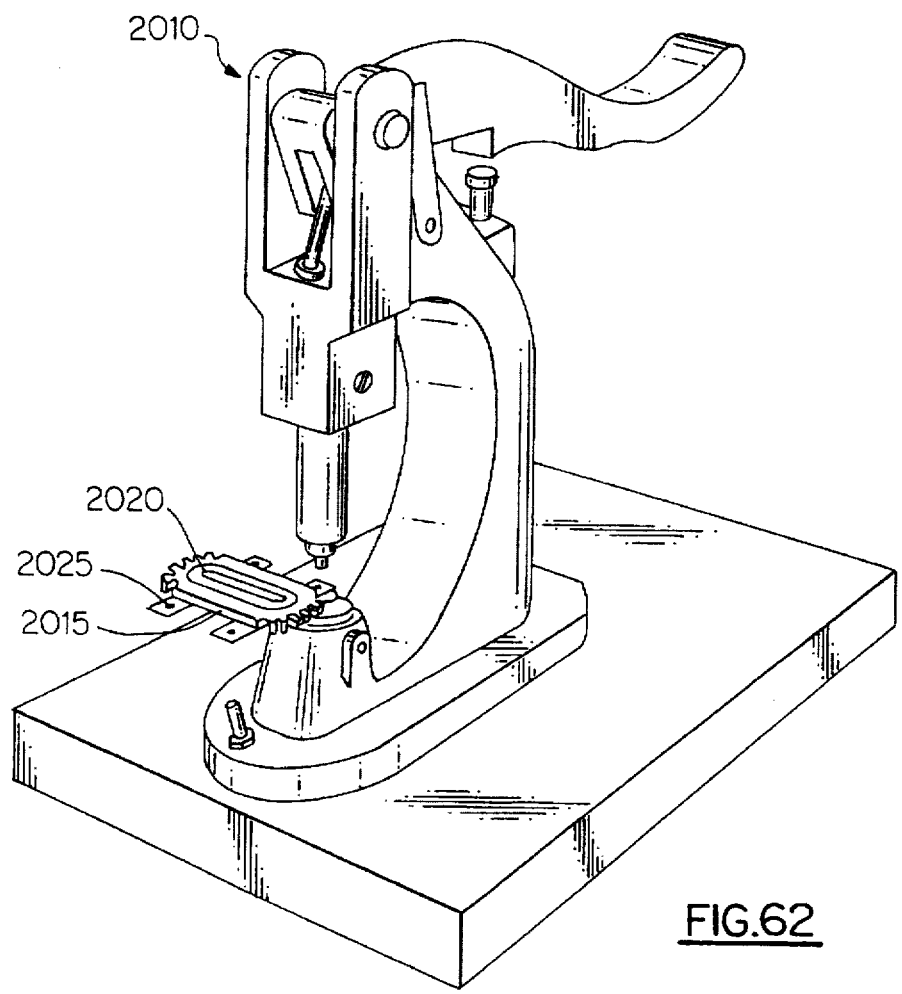
FIG. 62 is a perspective view of an eyelet hand press utilized for mounting a bias coil onto a baseplate.

At step BIAS COIL 3332, as explained with reference to FIG. 62, a magnetic coil baseplate 2015 is placed on the stage of an eyelet hand press 2010, and a bias coil 2020 is laid on the magnetic coil baseplate 2015 in appropriate alignment. A plurality of eyelets 2025, preferably four, are then impressed with the eyelet hand press 2010 to secure the baseplate 2015 and the bias coil 2020 in assembly.

Figure 82:
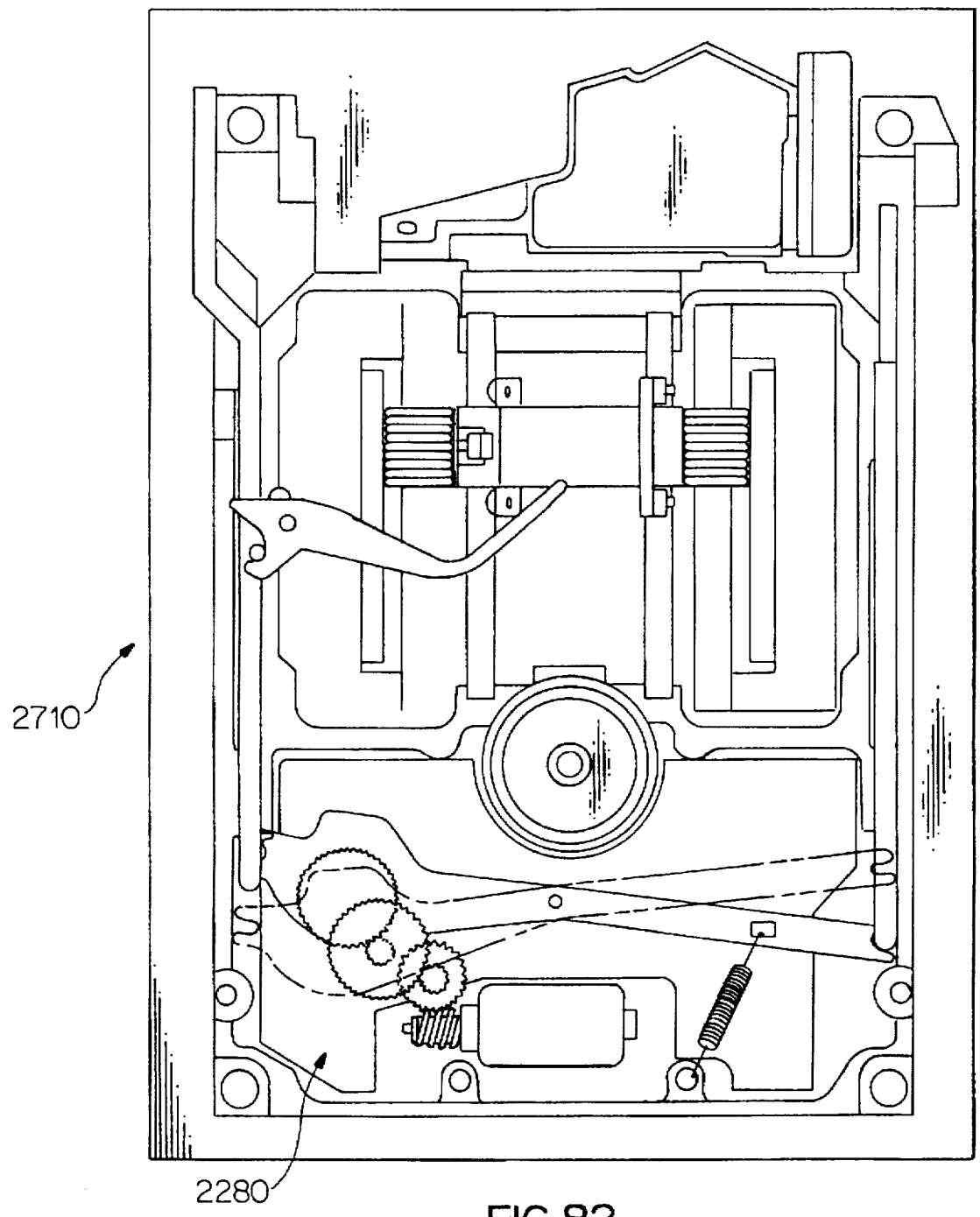
FIG. 82 is a bottom elevational view of a disc drive similar to that shown in FIG. 76, illustrating a cartridge loading assembly.

At step CART. RECEIVE 3333, the plastic housing (not shown) and the cartridge loading assembly 2280 (FIG. 82) are mounted. These parts are designed to fit together without need for special tooling.

Figure 74:
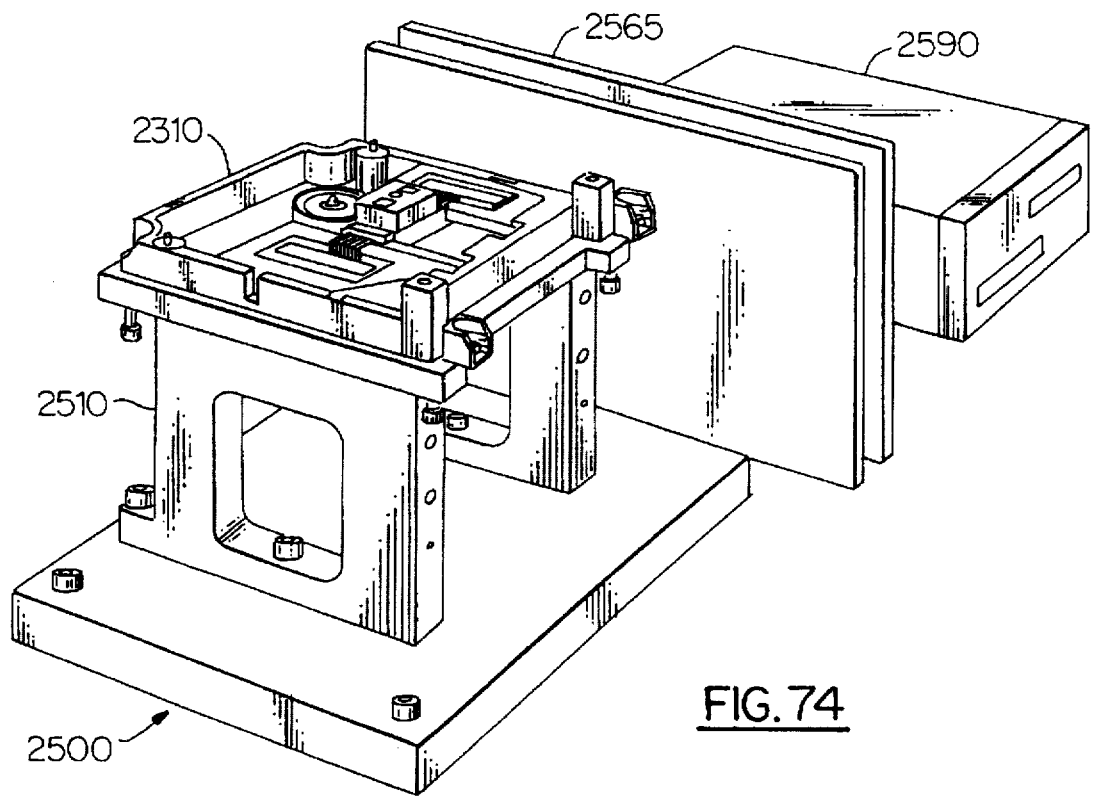
FIG. 74 is a perspective view of a data alignment station in accordance with the embodiment of FIG. 61.

Step DATA ALIGN 3334 is explained with reference to FIGS. 63, and 74, wherein there is shown a data alignment station 2500, and a baseplate 2310 mounted on a stage 2510 thereof. Electrical connections are made between the baseplate, electronics 2565, and an analysis computer 2590, which operates under control of the program disclosed in Appendices 5a and 5b. In particular the read detector 2140 (FIG. 63) is grasped with a gripper equipped with pogo pins to obtain the read detector's output signals. An optical disc (not shown) is then placed on the baseplate. Signals from the disc header are displayed on an oscilloscope (not shown), and optimized by manually displacing the read detector 2140. Thereafter a track will be written to the disc by the unit, and read back. Alignment of the read detector 2140 is again optimized, now by manual rotation. The read detector 2140 is then fixed in position using UV glue or other suitable fastening agent. A testing program is then executed which includes writing operations onto the disc at 2, 4 and 8 MHz, to verify the presence of patterns at predetermined locations on the disc. The reading and writing operations in step DATA ALIGN 3334 utilize the calibration information determined in step S-CURVE 3331.

Final Assembly

In step CONFIG 3341 the now fully constructed optomechanical assembly is placed in a chassis (not shown), and shock mounts 2760 for securing the baseplate 2310 to the chassis are tightened down. The electronics board 2726, (FIG. 78) is installed above the top of the baseplate. Firmware is downloaded into the electronics board 2726 in a known manner in step INTEGR. TIA 3342. Basic function testing is then performed on the assembled unit. Burn in under SCSI control is accomplished in step SCSI BURN-IN 3343. The unit is then subjected to additional environmental testing with added humidity and thermal cycling in an oven (not shown), during which reading and writing operations are performed at key points in the thermal cycle. Thereafter a final function test is completed, and the unit is boxed for shipment in step BOX & SHIP 3344.

While this invention has been explained with reference to the structure disclosed herein, it is not confined to the details set forth and this application is intended to cover any modifications and changes as may come within the scope of the following claims:

What is claimed is:

1. A method of manufacturing a disc drive of the type having a movable carriage for carrying an actuator, the actuator adapted to incorporate an objective lens for focusing a beam of radiant energy on a disc, and the disc drive further having a head assembly for passage of radiant energy therethrough in a path extending between a source of radiant energy and the disc, comprising the steps of: prior to incorporating said objective lens in said actuator, providing a deflector in said carriage for deflecting said beam into said actuator;

disposing said carriage and said actuator proximate said head assembly;

passing a beam of radiant energy through said head assembly to strike said deflector, wherein said beam is deflected by said deflector through said actuator;

adjusting a path of said beam to minimize optical aberrations of said head assembly and said deflector; and thereafter inserting said objective lens in said actuator.

2. The method according to claim 1, wherein said step of passing said beam comprises the step of:

disposing a collimator proximate said laser;

disposing said source of radiant energy in said head assembly, wherein said source of radiant energy is directed toward said collimator; and energizing said source of radiant energy to emit energy through said collimator.

3. The method according to claim 1, wherein said step of adjusting said beam comprises the steps of:

disposing an autocollimator perpendicular to a front face of said head assembly;

placing an interferometer beyond said actuator in a path of said beam; and manipulating said source of radiant energy and said collimator.

4. The method according to claim 1, wherein said step of providing a deflector is performed by installing a pentaprism in said actuator.

5. The method according to claim 1, further comprising the steps of:

providing guiding means on a baseplate for guiding said carriage in linear motion relative said baseplate;

installing said carriage on said guiding means; and after performing said step of inserting said objective lens in said actuator, aligning an axis of said objective lens with respect to said baseplate.

6. The method according to claim 5, wherein said guiding means comprises first and second parallel rails.

7. A method of manufacturing an optical disc drive, comprising the steps of:

assembling a carriage assembly and a magnetic drive therefor, wherein said carriage assembly includes a linear actuator and an initially lensless objective lens assembly suspended therein;

aligning a deflector in said linear actuator to direct an incident light beam toward said objective lens assembly;

installing a laser in a head assembly having a collimator;

disposing said head assembly on a head support module;

disposing said carriage assembly on a carriage support module proximate said head assembly;

passing a beam of radiant energy through said head assembly and said deflector for prealignment thereof;

prealigning said beam to minimize optical aberrations of said head assembly and said deflector;

thereafter installing said head assembly and said carriage assembly on a baseplate; and inserting an objective lens in said installed lensless objective lens assembly.

8. The method according to claim 7, further comprising the step of aligning an optical axis of said inserted objective lens with said baseplate assembly.

9. The method according to claim 7, wherein said step of prealigning said beam comprises the steps of:

disposing an autocollimator perpendicular to a front face of said head assembly;

placing an interferometer beyond said carriage assembly in a path of said beam; and manipulating said laser and said collimator until alignment is achieved.

10. A method of manufacturing an optical disc drive, comprising the steps of:

assembling a carriage assembly and a magnetic drive therefor, wherein said carriage assembly includes a linear actuator and an initially lensless objective lens assembly suspended therein;

aligning a pentaprism in said linear actuator to direct an incident light beam toward said objective lens assembly;

performing a tilt-over-stroke test on said carriage assembly and said lensless objective lens assembly;

installing a laser in a head assembly having a collimator;

disposing said head assembly on a head support module;

installing a bias coil assembly on said baseplate;

installing a read detector in said head assembly;

disposing said carriage assembly on a carriage support module proximate said head assembly;

passing a first beam of radiant energy through said head assembly and said pentaprism for prealignment thereof;

prealigning said first beam to minimize optical aberrations of said head assembly and said pentaprism;

thereafter installing said head assembly and said carriage assembly on a baseplate;

inserting an objective lens in said installed lensless objective lens assembly; and aligning an optical axis of said inserted objective lens with said baseplate.

11. The method according to claim 10, wherein said step of installing said laser is performed by press fitting.

12. The method according to claim 10, wherein said carriage support module comprises a rail for slidably receiving said carriage assembly thereon.

13. The method according to claim 10, wherein said step of prealigning said first beam comprises the steps of:

disposing an autocollimator perpendicular to a front face of said head assembly;

placing an interferometer beyond said carriage assembly in a path of said first beam; and manipulating said laser and said collimator with reference to said autocollimator and said interferometer until alignment is achieved.

14. The method according to claim 10, wherein said step of performing a tilt-over-stroke test further comprises the steps of:

inserting a temporary optical element in said lensless objective lens assembly; and passing a second beam of light through said temporary optical element.

15. The method according to claim 10, wherein said magnetic drive for said carriage assembly comprises a focus motor, further comprising the steps of:

passing said first beam of radiant energy through said objective lens onto a storage medium;

displacing said objective lens assembly from said storage medium and;

while said step of displacing is being performed, measuring a focus error signal.

16. The method according to claim 10, wherein said magnetic drive for said carriage assembly comprises a carriage tracking motor, a focus motor, and a coarse positioning motor, further comprising the steps of:

horizontally mounting said baseplate on a rotatable stage;

measuring transfer curves for said carriage tracking motor, said focus motor and said coarse positioning motor while said baseplate is horizontally mounted;

vertically mounting said baseplate on a rotatable stage; and measuring transfer curves for said carriage tracking motor, said focus motor and said coarse positioning motor while said baseplate is vertically mounted.

17. The method according to claim 10, further comprising the steps of:

placing an optical disc on said baseplate;

actuating said laser to illuminate said optical disc, wherein light returning from said optical disc impinges on said read detector;

while said laser is actuated, linearly displacing said read detector to optimize an output signal thereof;

thereafter actuating said bias coil assembly and energizing said laser to write information on said optical disc;

reading said written information;

while said step of reading is being performed, rotating said read detector to further optimize said output signal; and thereafter fixing said read detector in position in said head assembly.

* * * * *

UNITED STATES PATENT AND TRADEMARK OFFICE
CERTIFICATE OF CORRECTION

PATENT NO. : 5,708,633         Page 1 of 7
DATED       : January 13, 1998
INVENTOR(S) : Hollen et al It is certified that error appears in the above-identified patent and that said Letters Patent is hereby corrected as shown below:

Col. 11, line 7, please delete "FIGS.1-3 and 61," and insert --FIGS. 1A-3M, and 61A-61C-- in place thereof.

Col. 14, line 36, please delete "unsure" and insert --ensure-- in place thereof.

Col. 15, line 40, please delete "The right half of".

Col. 15, lines 41 and 42, please delete "The right half of Fig. 30" and insert --Fig. 28-- in place thereof.

Col. 15, line 51, please delete "the right hand side of FIG. 30A" and insert --FIG. 30-- in place thereof.

Col. 15, line 65, please delete "30B" and insert --30-- in place thereof.

Col. 16, line 25, please delete "fits" and insert --fit-- in place thereof.

Figures 1F, 1G:
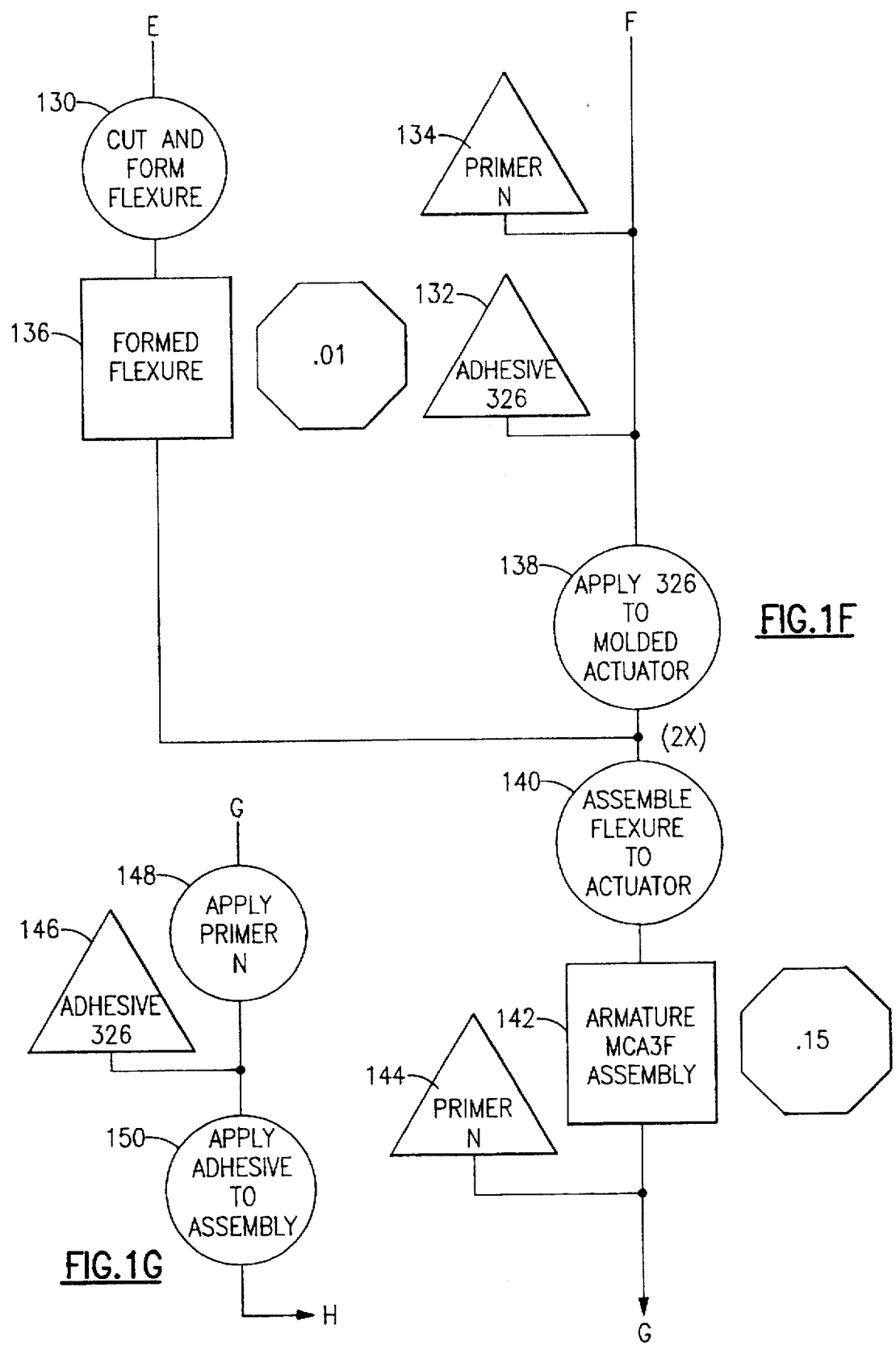

Col. 16, line 35, please delete "FIG. 1" and insert --FIGS. 1E and 1G-- in place thereof.

Col. 16, line 43, please insert --, FIG. 31,-- between the number "1076" and the word "to".

Figure 1H:
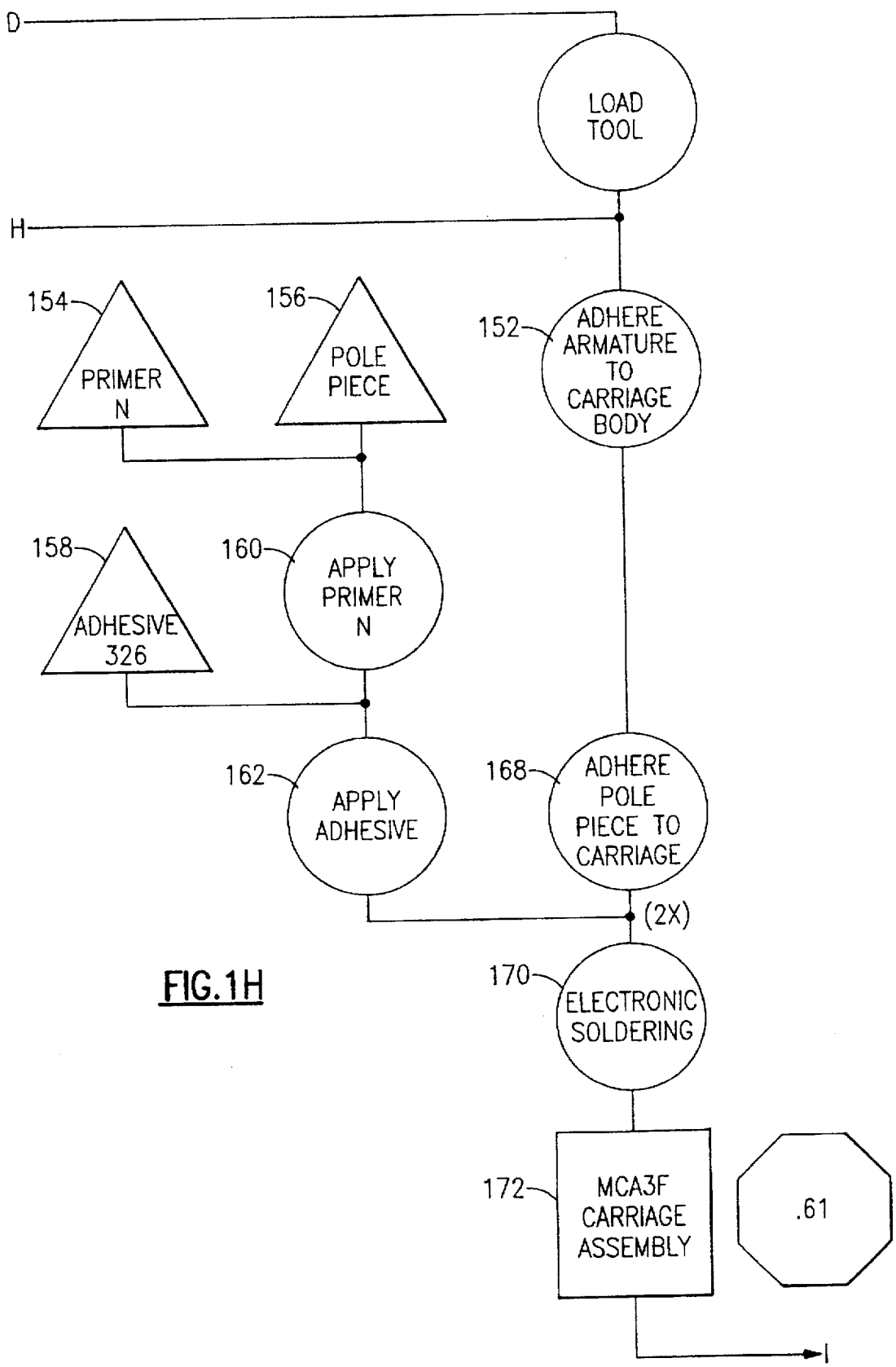

Col. 16, line 44, please delete "FIG. 1" and insert --FIGS. 1F-1H--.

Col. 17, line 20, please add --according to the prior art-- after the number "1108" and before the " . ".

Col. 17, line 23, please add --obtained in accordance with the method of this invention,-- after the word "result" and before the word "is".

Figure 1I:
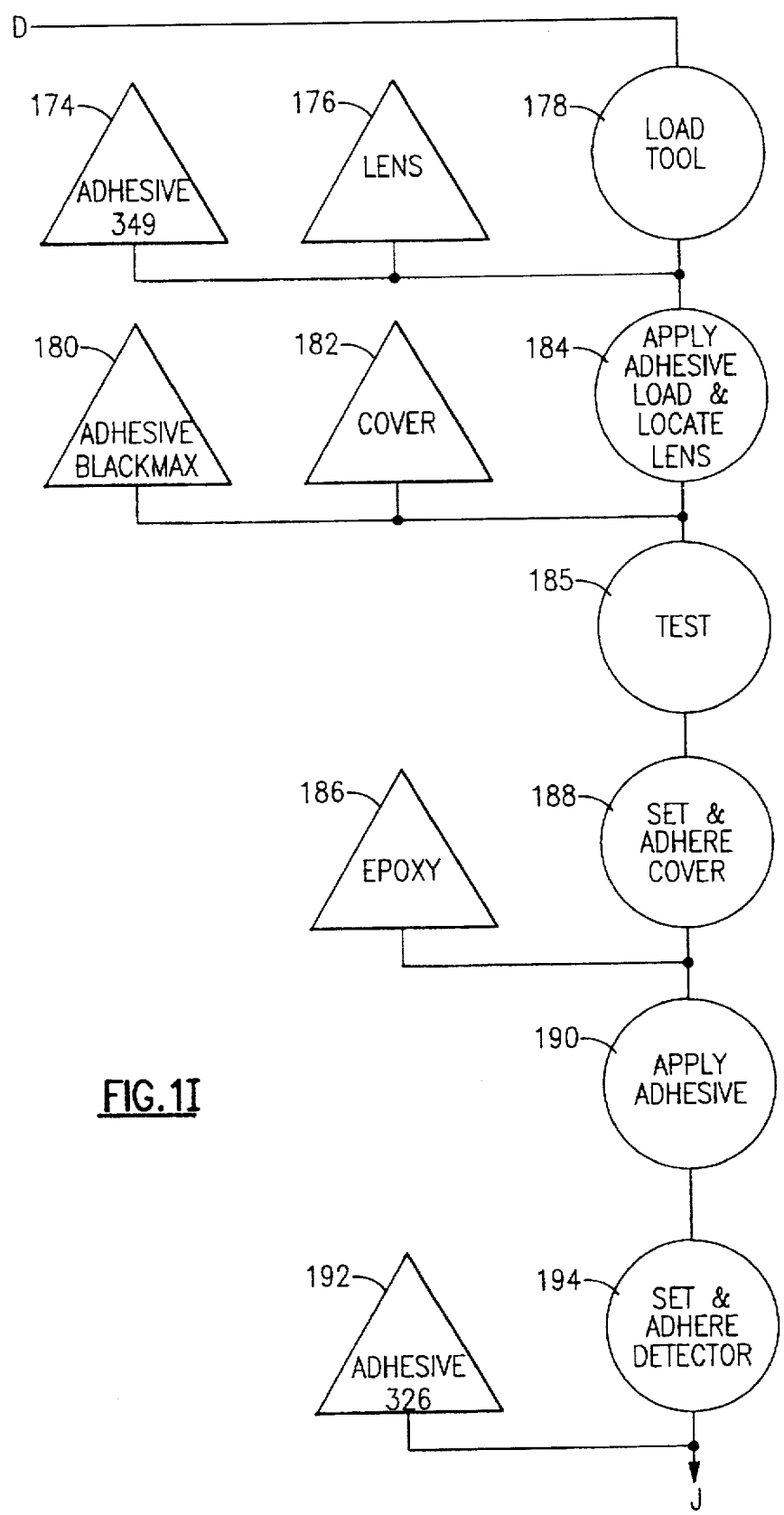

Col. 17, line 54, please add --of FIG. 1I-- after the number "185" and before the word "is".

Col. 17, line 64, please add --, FIG. 37,-- after the number "1030" and before the word "and".

Col. 18, line 4, please add --, FIG. 38-- after the word "alignment" and before the ".".

Figure 1J:
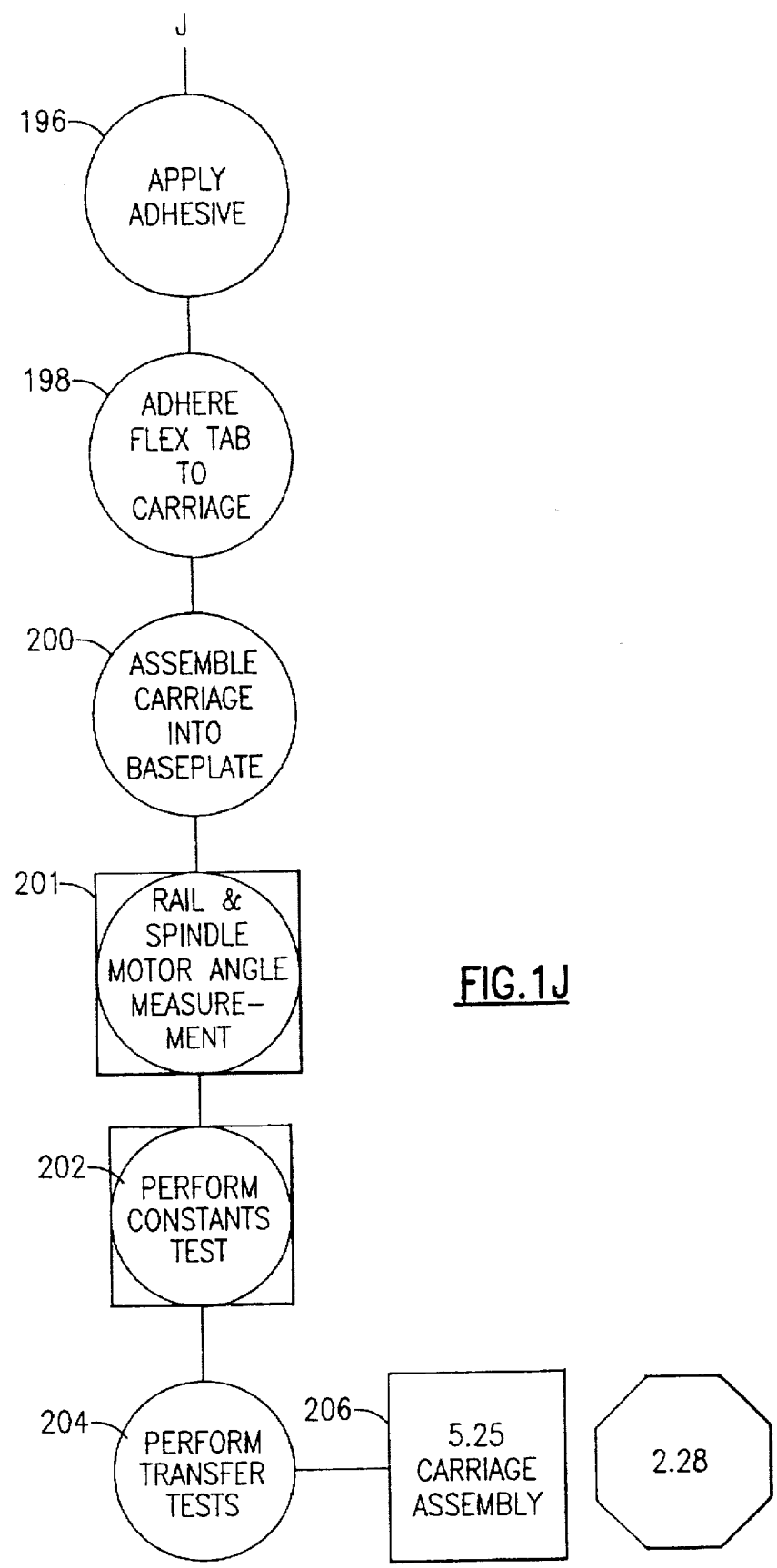
Figure 1L:
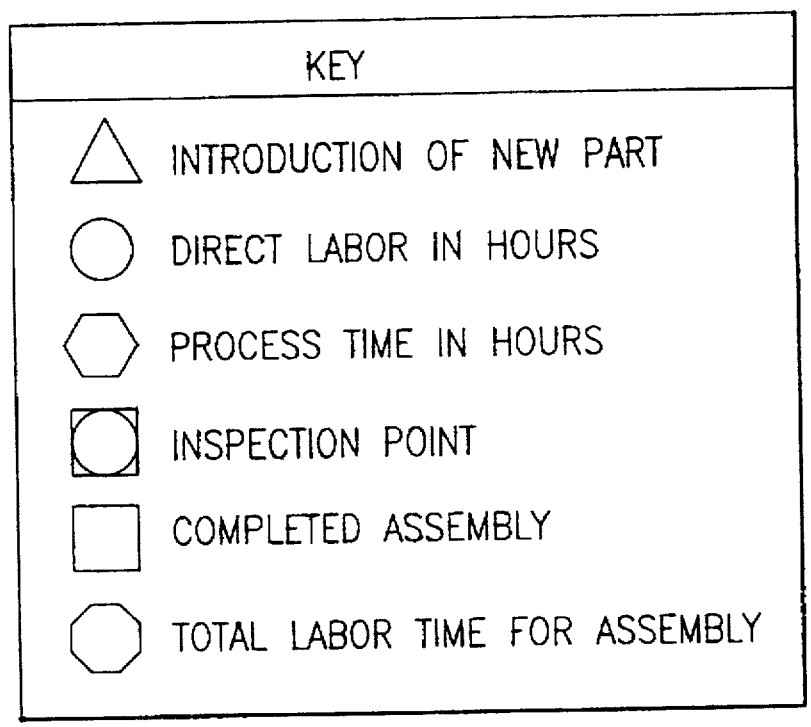
FIG. 1L is a graphical key defining the icons employed in FIGS. 1A–1J.
Figure 1K:
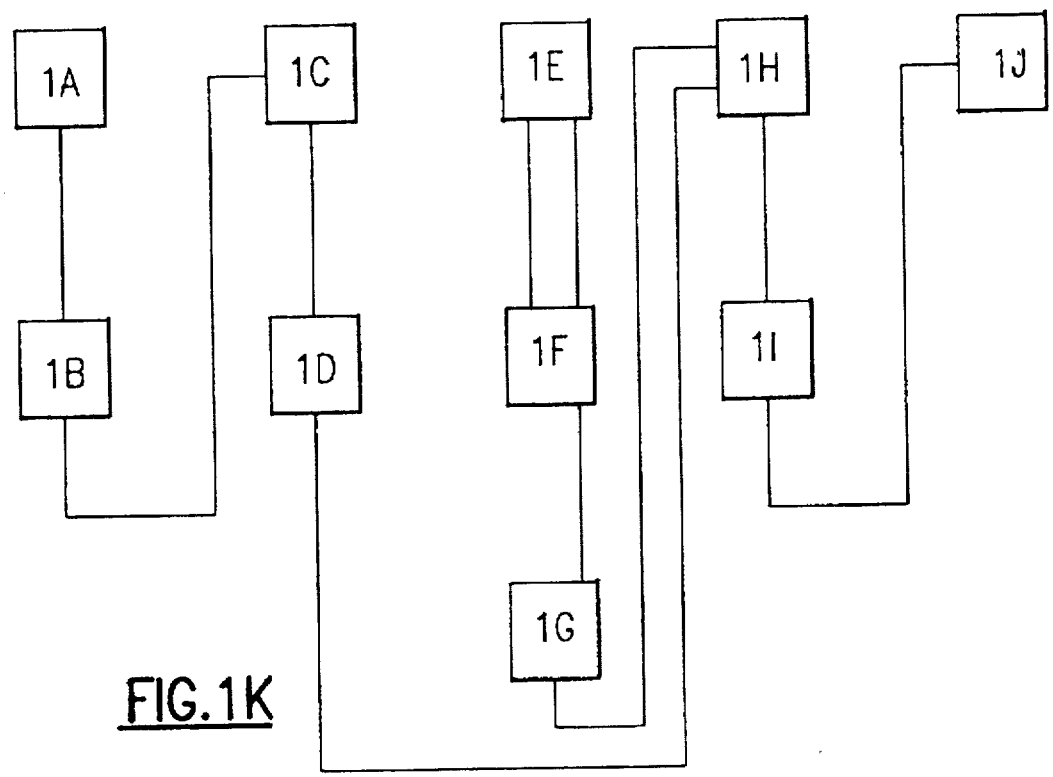
FIG. 1K is a diagram indicating the relationships of FIGS. 1A–1J.

Col. 18, line 10, please delete "FIG. 1" and insert --FIGS. 1I and 1J-- in place thereof.

Col. 18, line 36, please delete "FIG. 1" and insert --FIG. 1J-- in place thereof.

Col. 18, line 51, please delete "a" and insert --the-- in place thereof.

Col. 19, line 27, please delete "Fig. 2" and insert --FIGS. 2A-2E-- in place thereof.

Col. 19, line 31, please insert the word --and-- after the word "magnets" and before the ",".

Col. 19, line 41, please delete "the" and insert --a-- in place thereof.

UNITED STATES PATENT AND TRADEMARK OFFICE
CERTIFICATE OF CORRECTION

PATENT NO. : 5,708,633  
DATED : January 13, 1998  
INVENTOR(S) : Hollen et al

Page 2 of 7

Figure 2A:
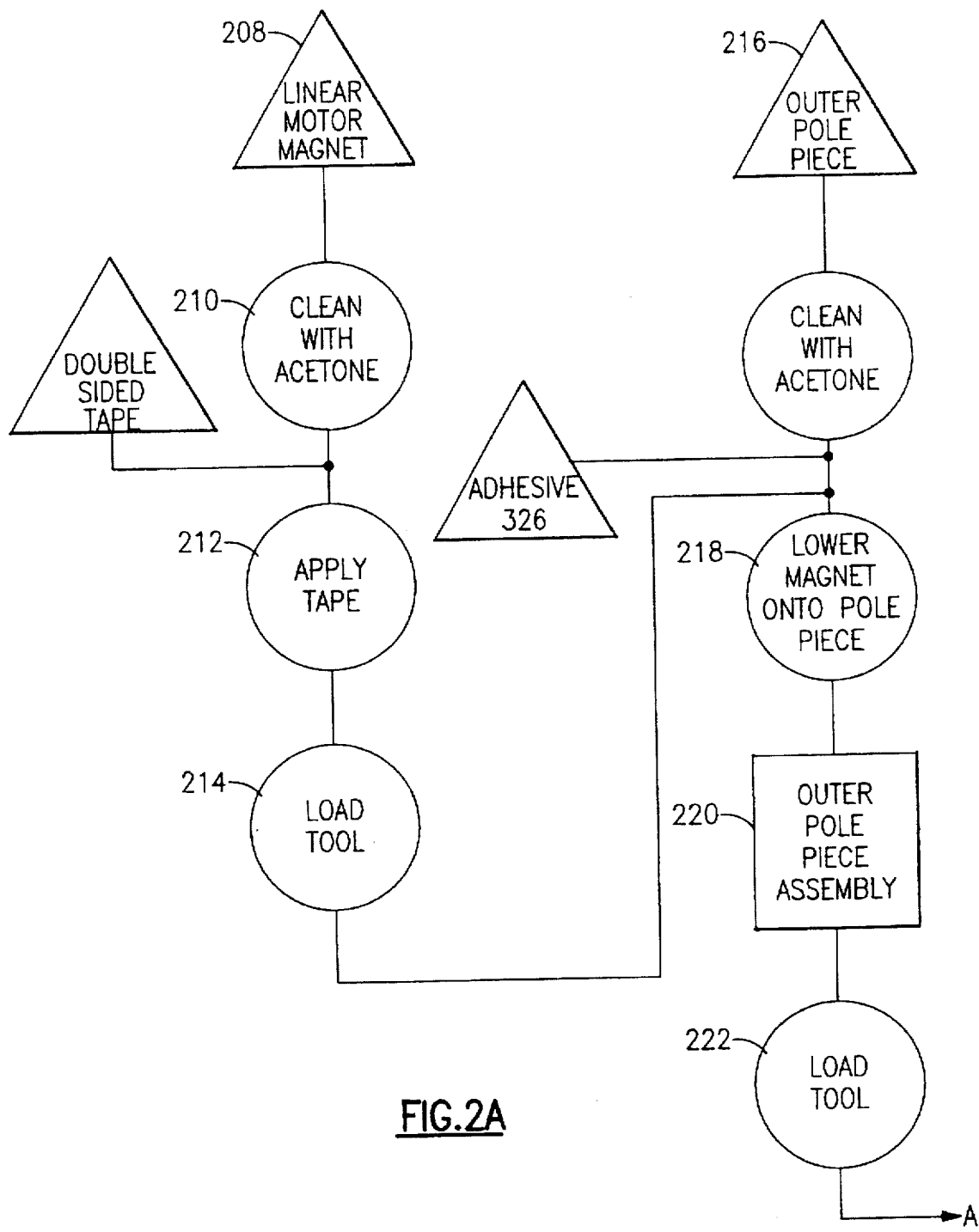
Figure 2B:
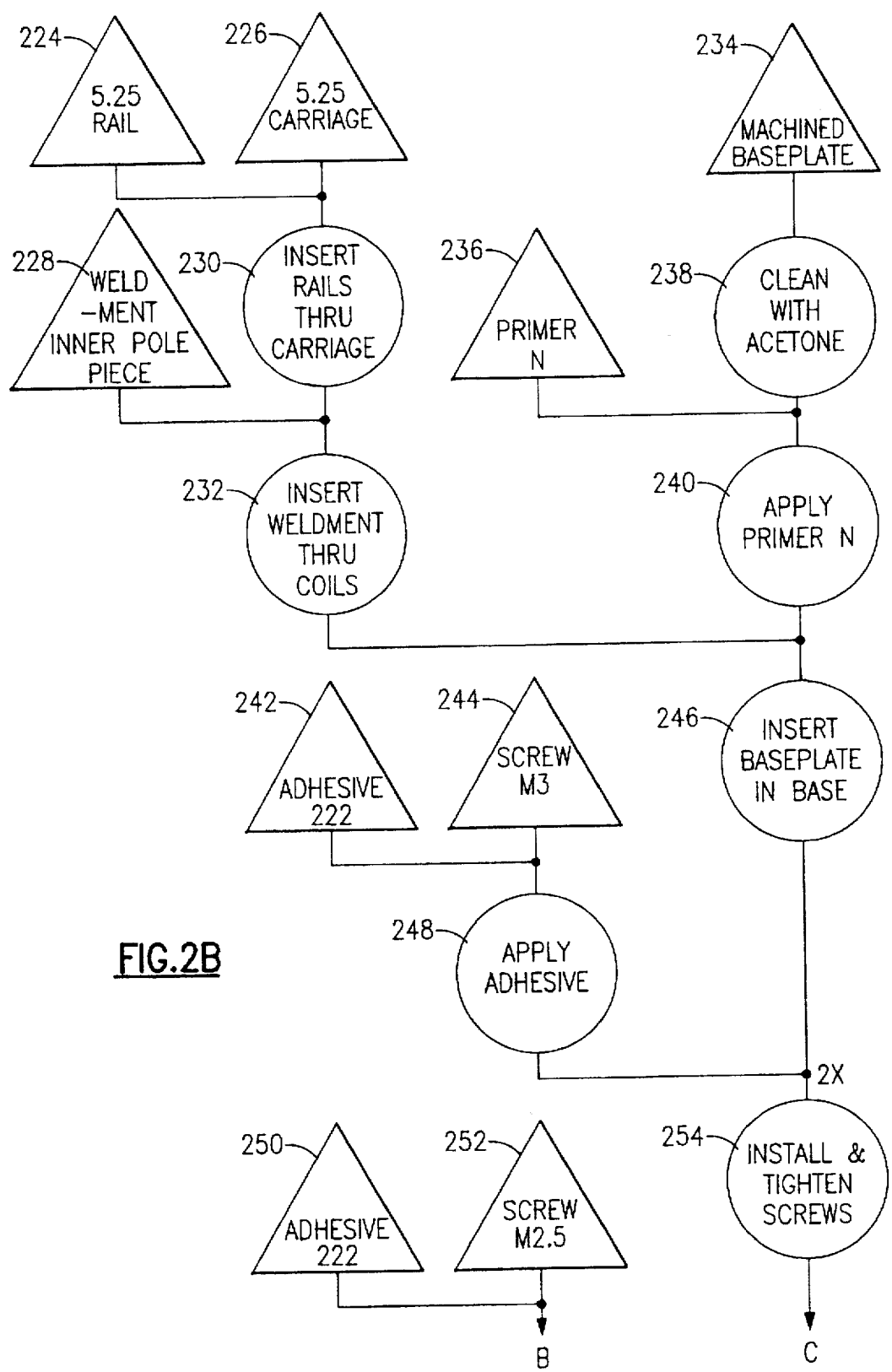
Figure 2C:
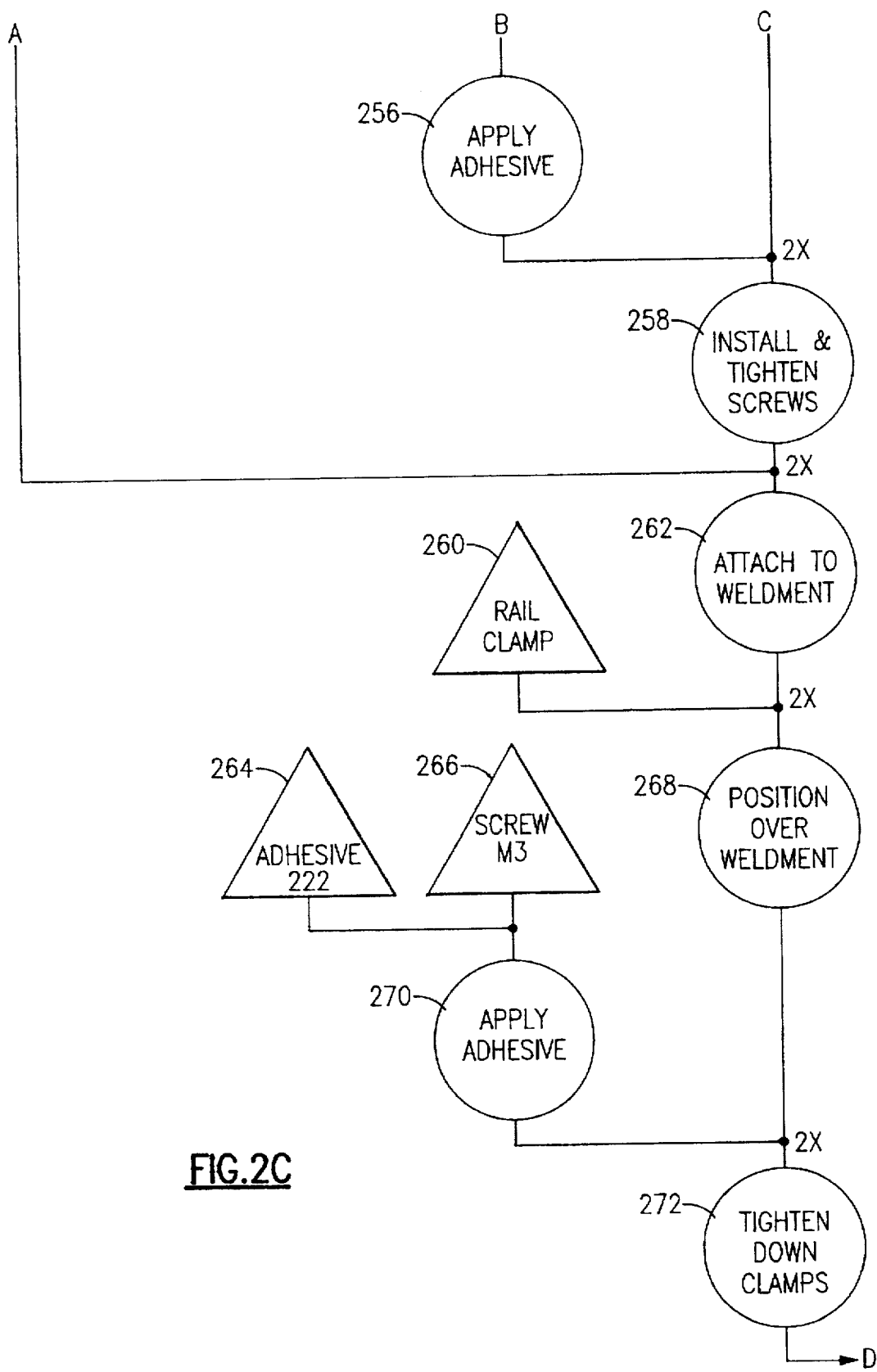
Figure 2D:
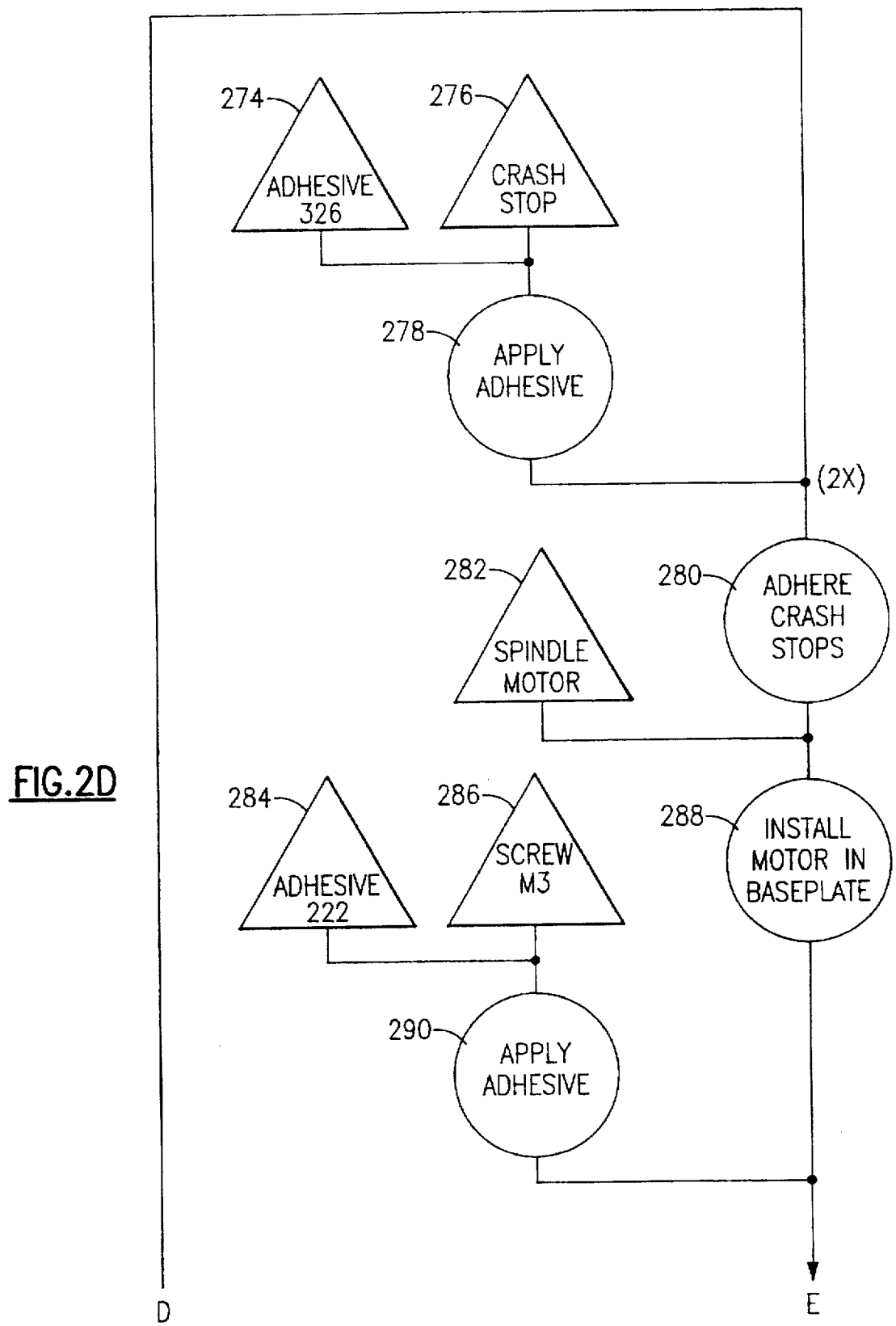
Figure 2E:
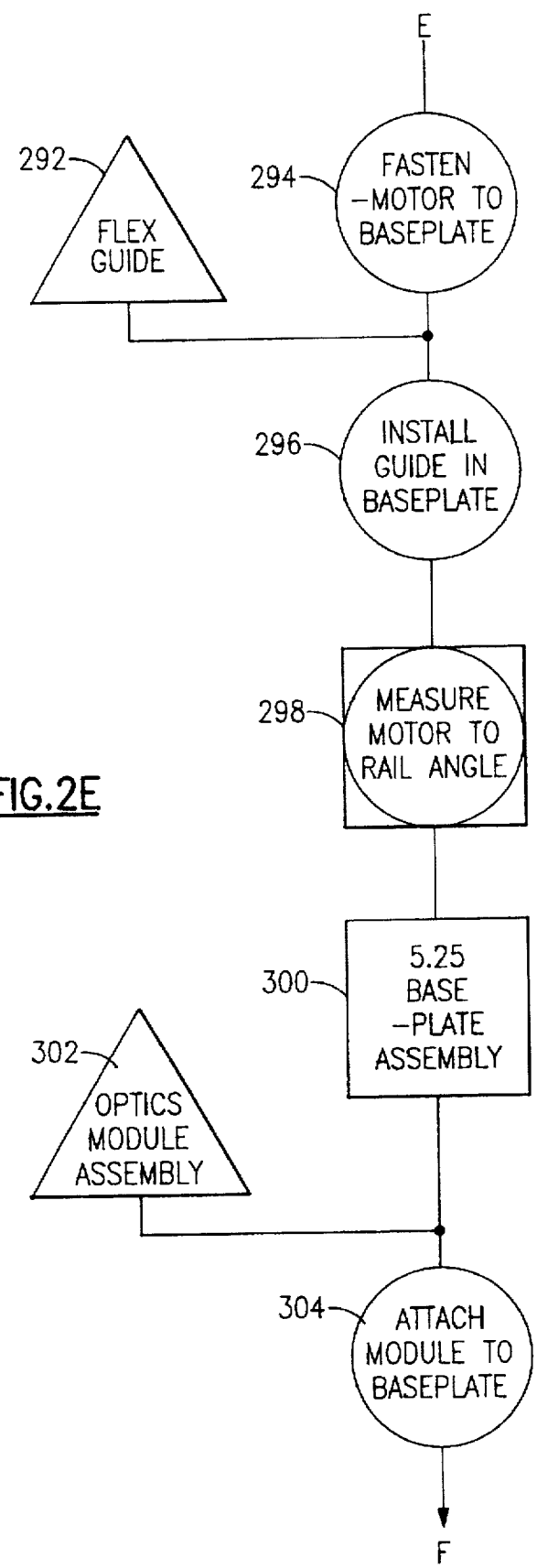
Figure 2F:
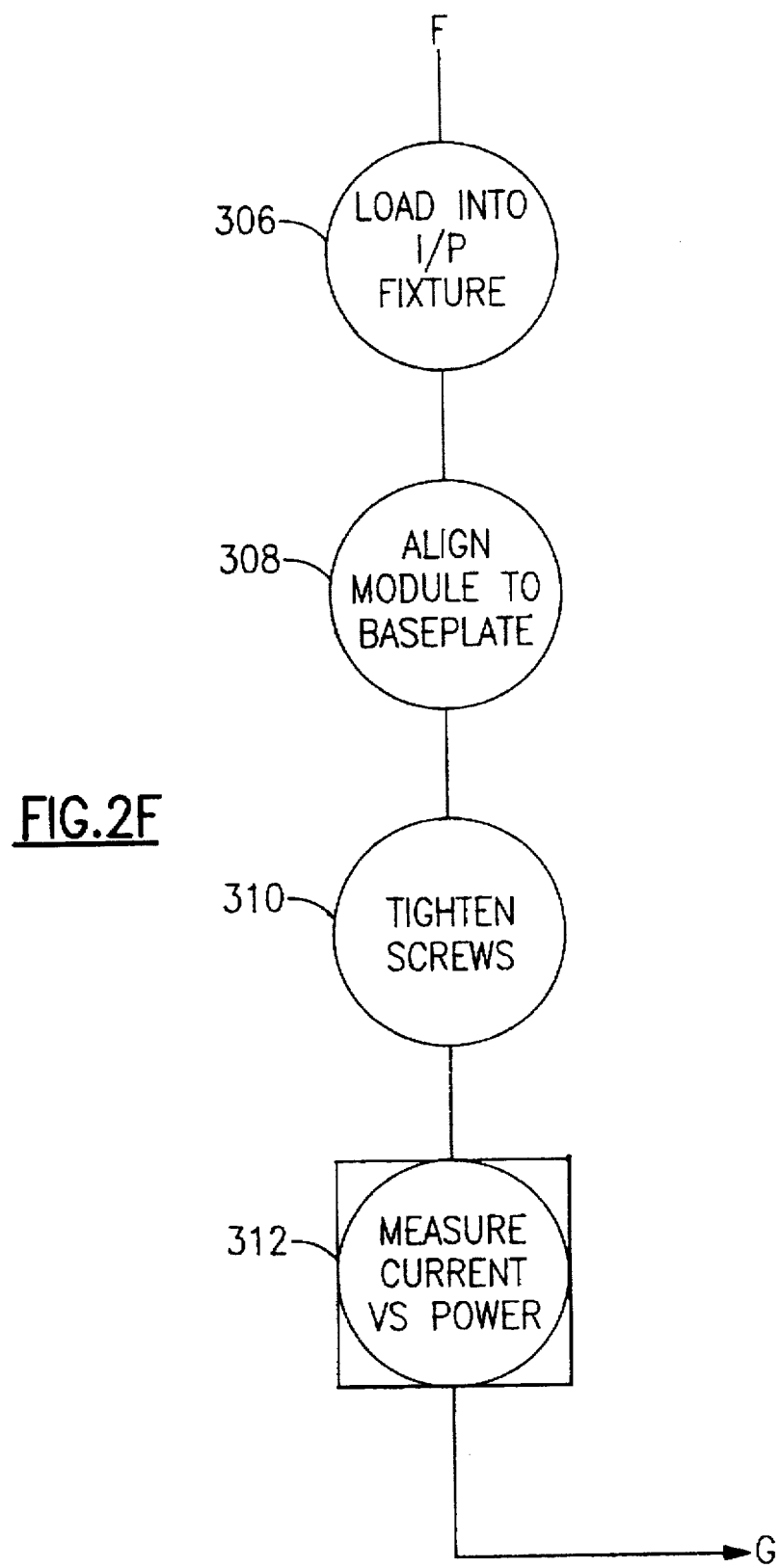

It is certified that error appears in the above-identified patent and that said Letters Patent is hereby corrected as shown below:

Col. 20, line 24, please delete "FIG. 2." and insert --FIGS. 2E and 2F-- in place thereof.

Col. 20, line 26, please insert --FIGS. 2G and 2H,-- after the number "332" and before the word "refer".

Col. 20, line 53, please delete "FIG. 2" and insert --FIGS. 2I and 2H-- in place thereof.

Col. 20, line 59, please delete the number --1180--.

Figure 2J:
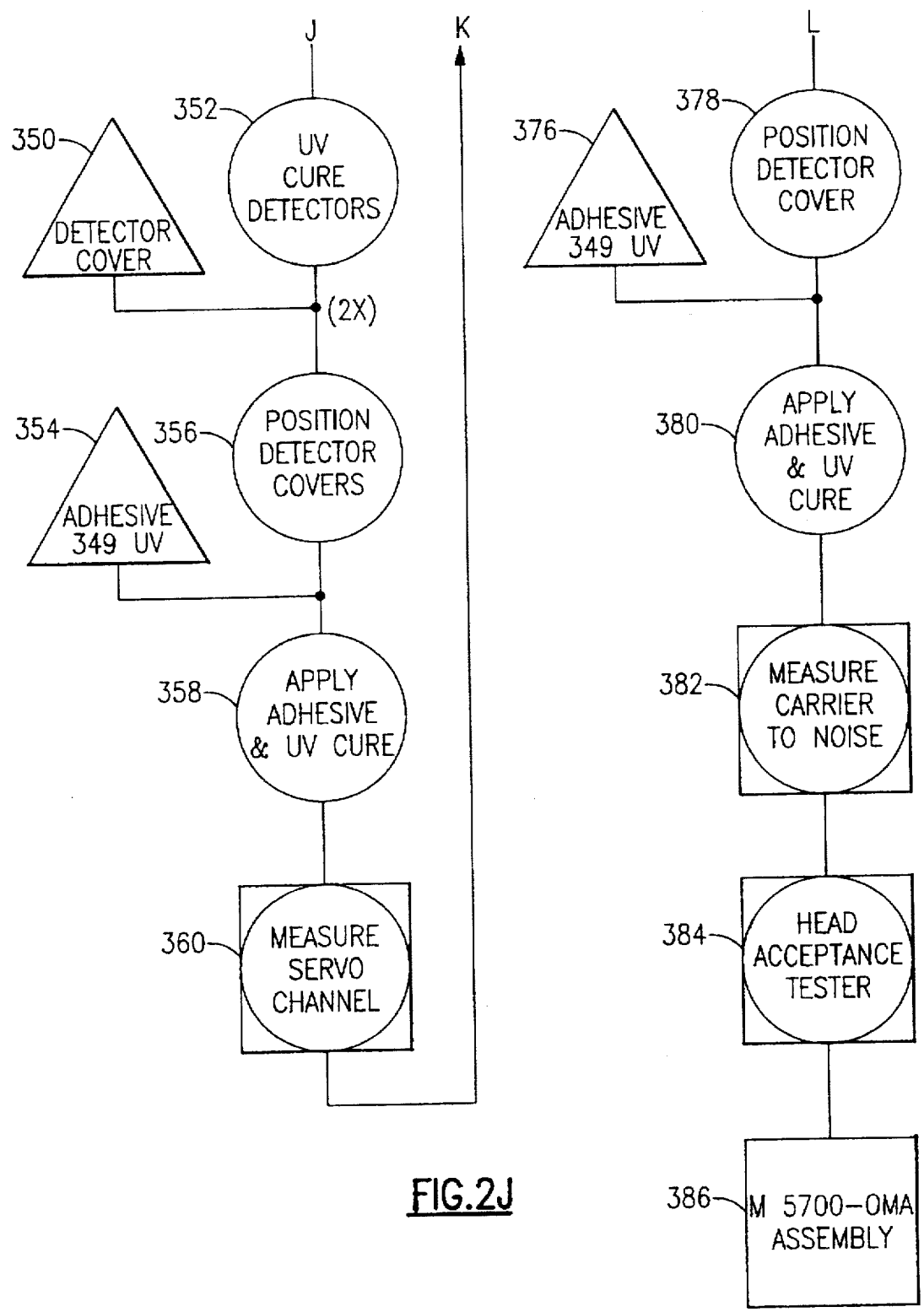
Figure 2L:
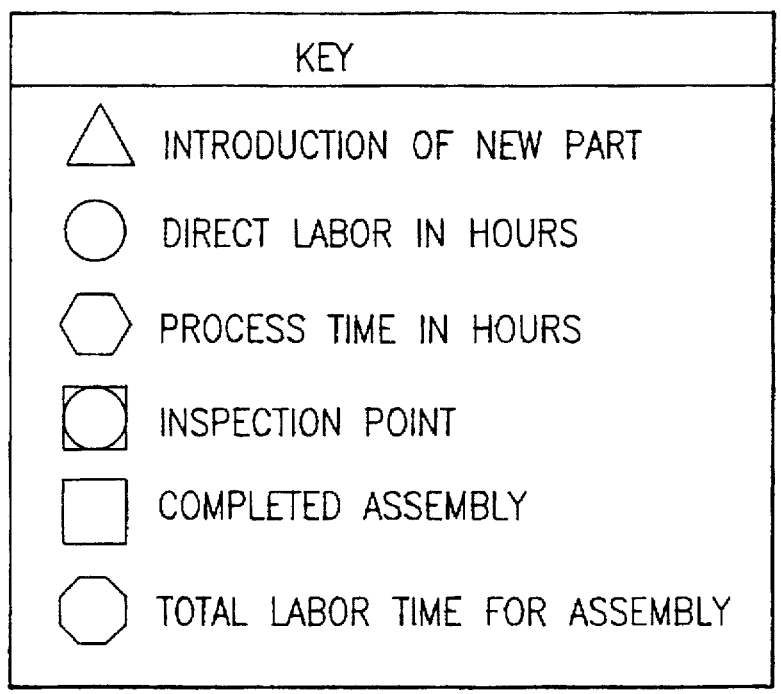
FIG. 2L is a graphical key defining the icons employed in FIGS. 2A–2J.
Figure 2K:
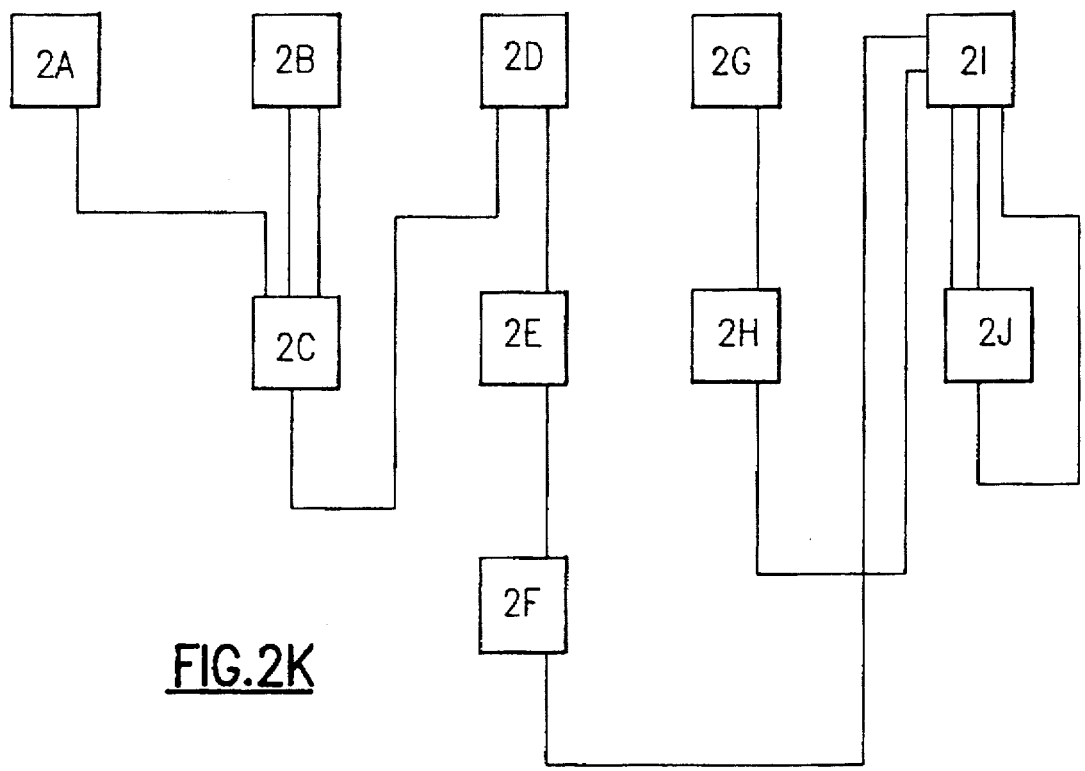
FIG. 2K is a diagram indicating the relationships of FIGS. 2A–2J.

Col. 20, line 63, please insert --, FIGS. 2I and 2J,-- after the number "358" and before the word "represent".

Col. 21, line 21, please insert --, FIG. 45-- after the number "1166)" and before the ".".

Col. 21, line 38, please insert --, FIG. 49-- after the number 1178 and before the ".".

Col. 22, line 1, please insert --, FIG. 51-- after the number "1198" and before the ")".

Col. 22, line 21, please insert --, FIG. 45-- after the number "1166" and before the ".".

Col. 22, line 25, please delete "in combination" and insert --now-- in place thereof.

Col. 22, line 53, please delete "FIG. 2" and insert --FIG. 2I-- in place thereof.

Col. 23, line 39, please insert --, FIGS. 2I and 2J-- after the word "test" and before the ".".

Col. 23, line 42, please delete "3" and insert --3A, 3B,-- in place thereof.

Figure 3A:
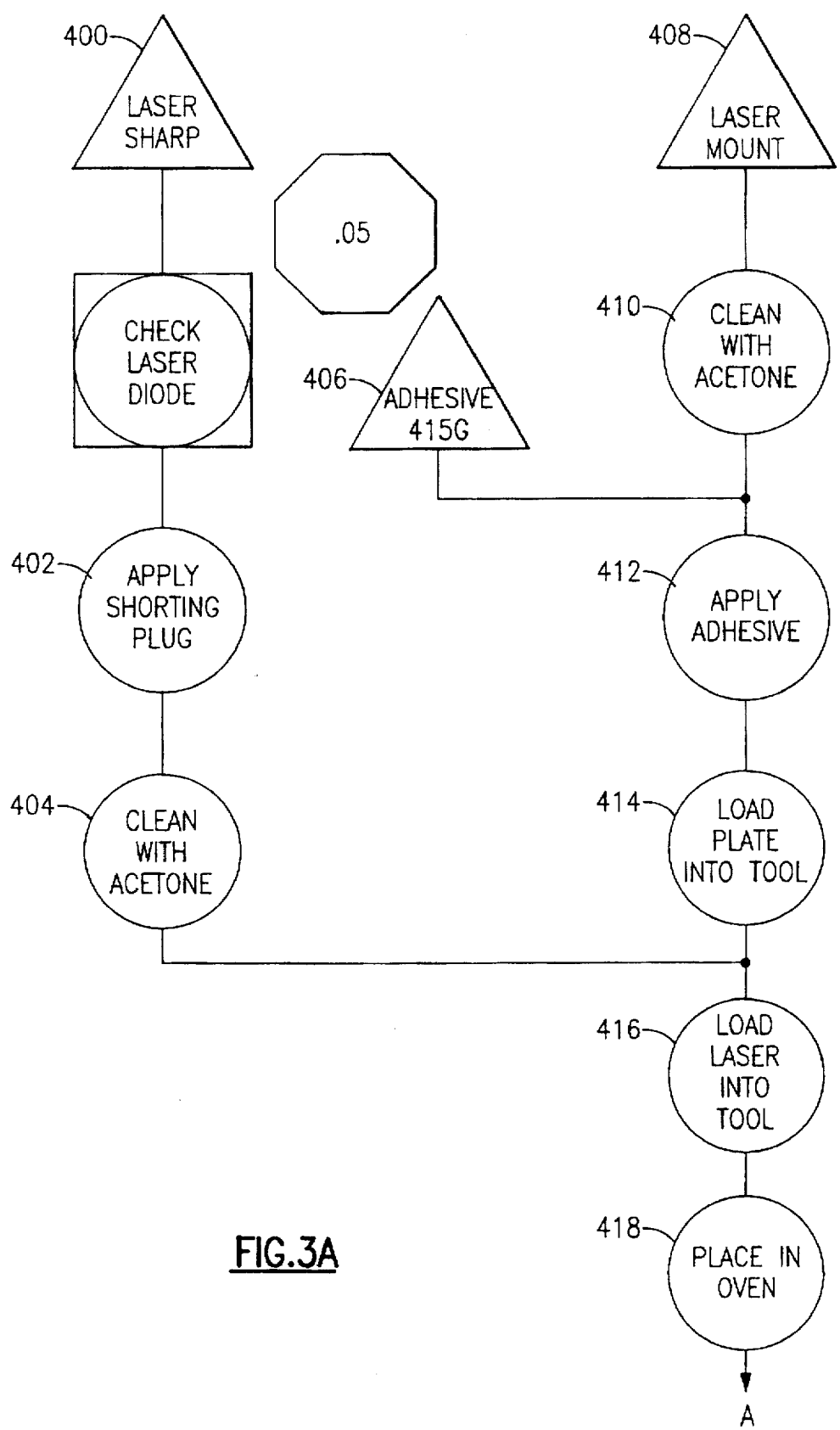
Figure 3B:
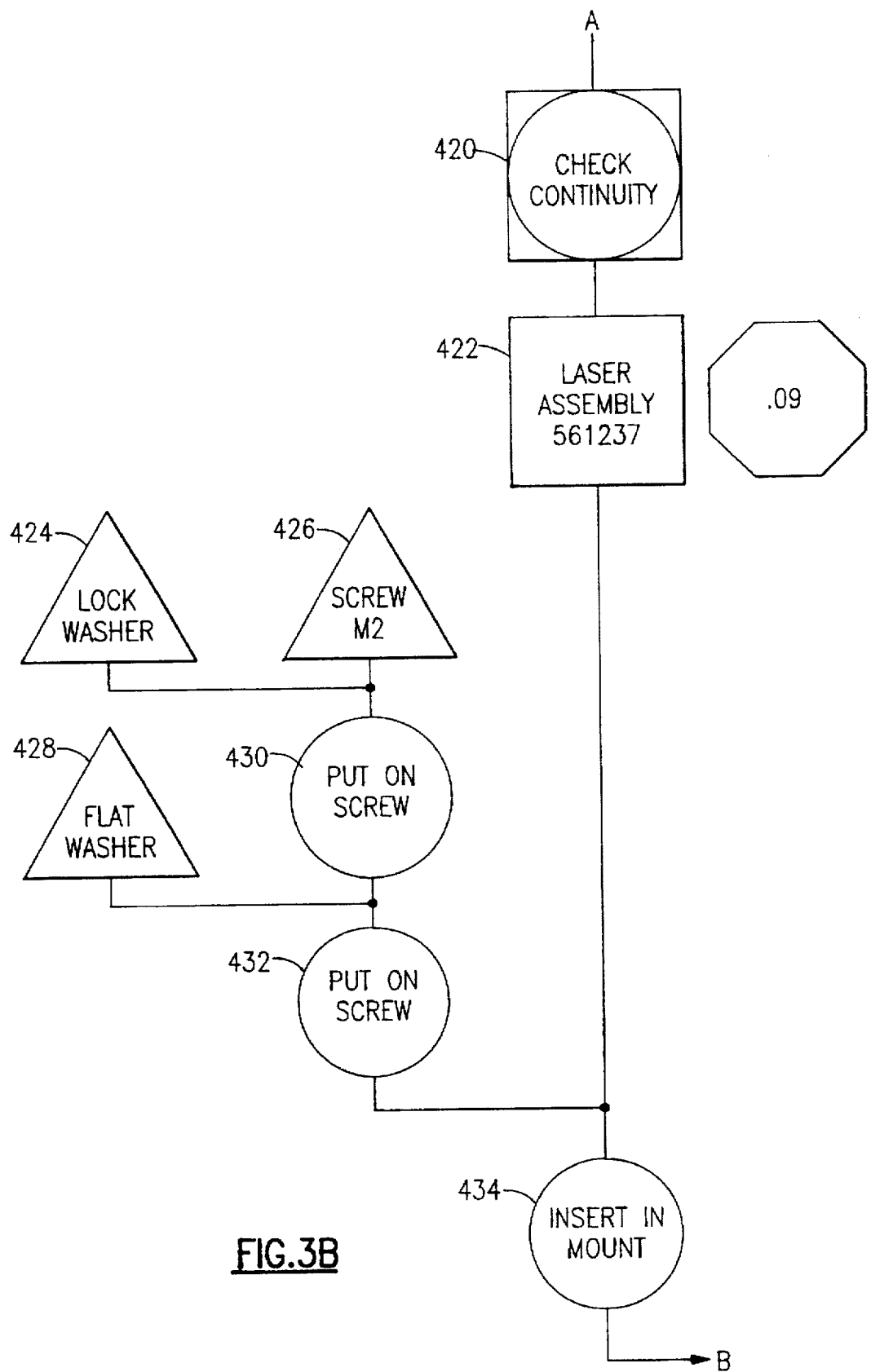
Figure 3E:
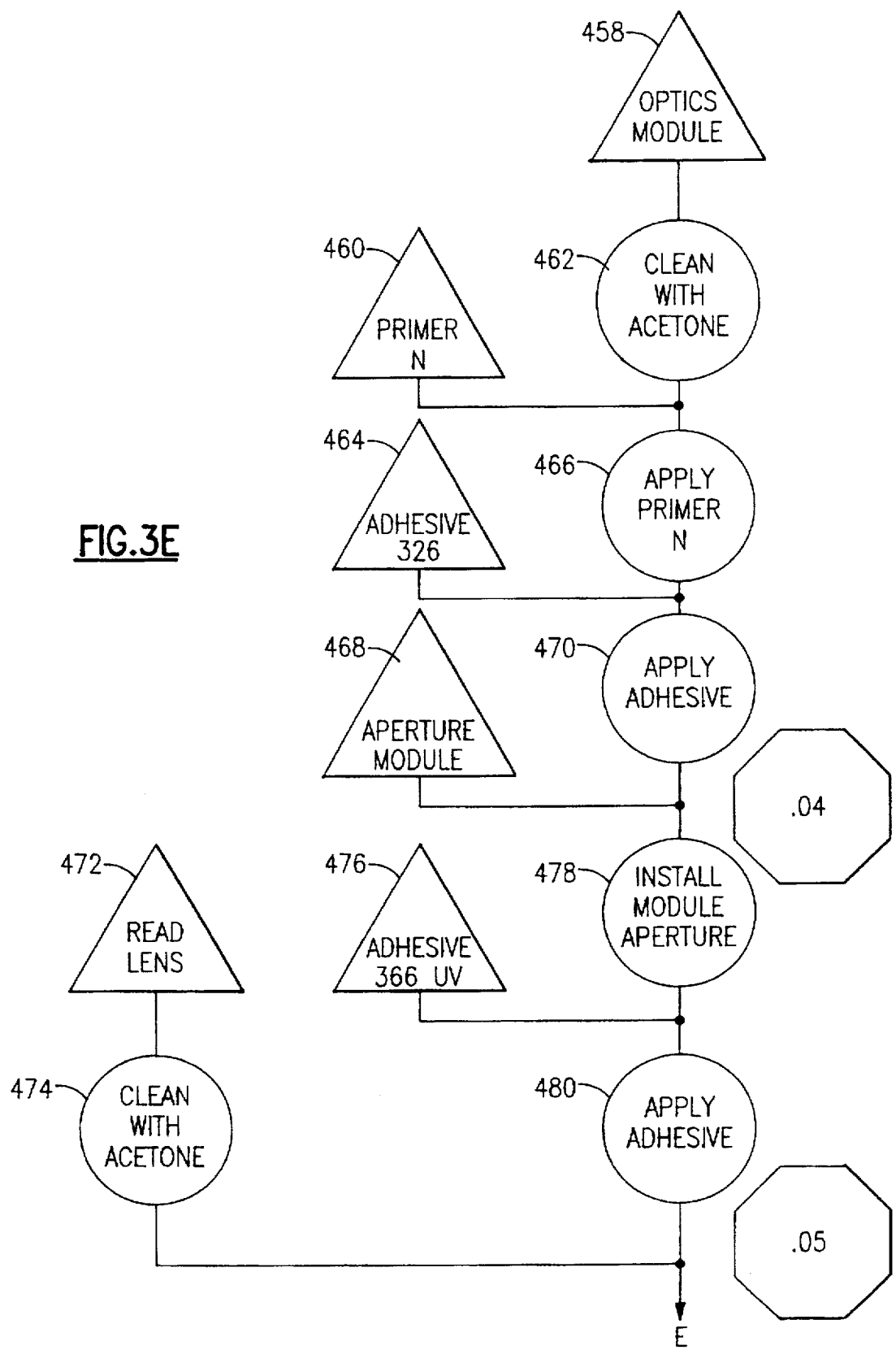

Col. 23, line 61, please delete "FIGS. 3 and 45" and insert --FIG. 3B-- in place thereof.

Col. 24, line 6, please insert --, also shown in Fig. 40-- between "1132" and the ".".

Col. 24, line 7, please delete "2168" and insert --1268-- in place thereof.

Figure 3F:
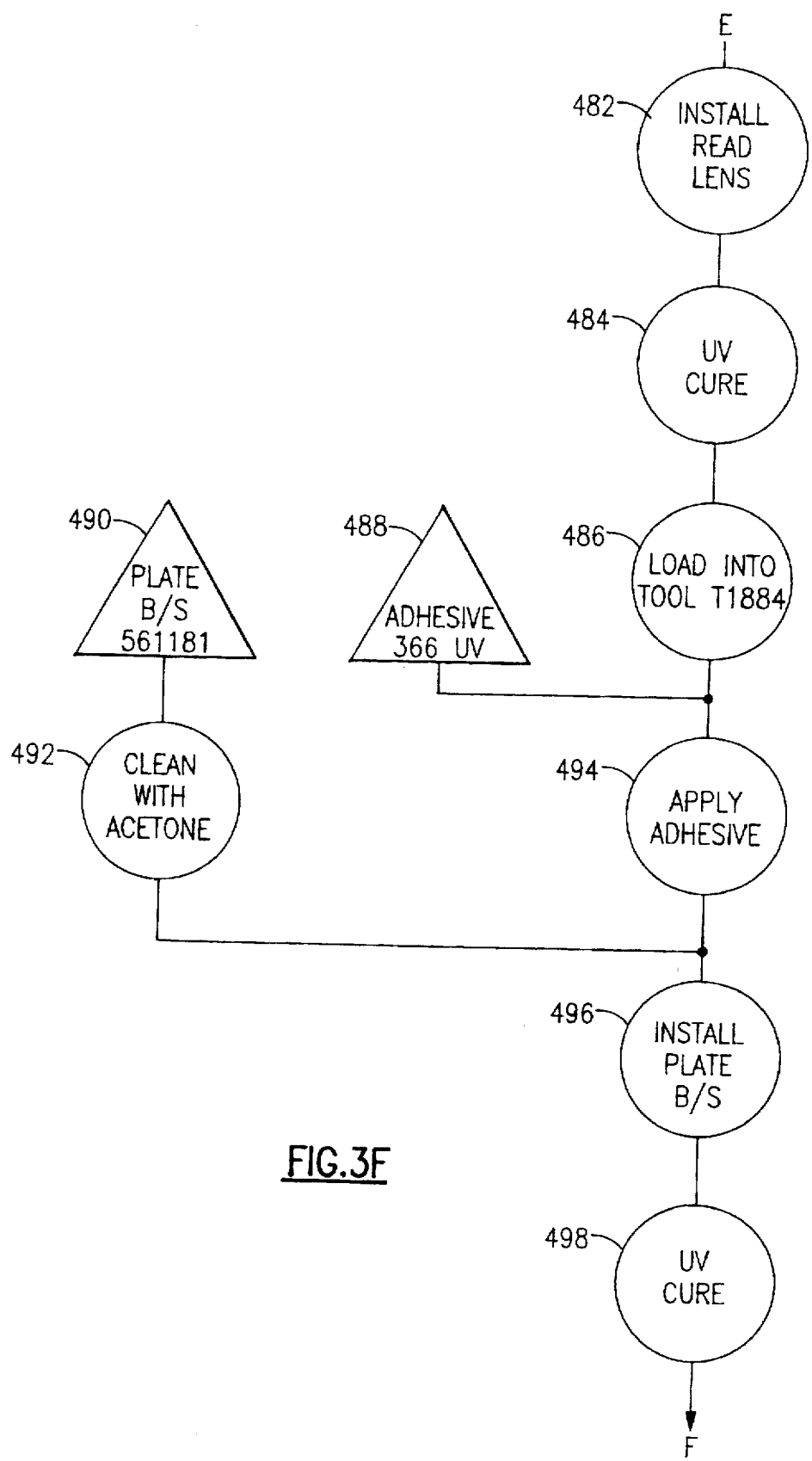
Figure 3G:
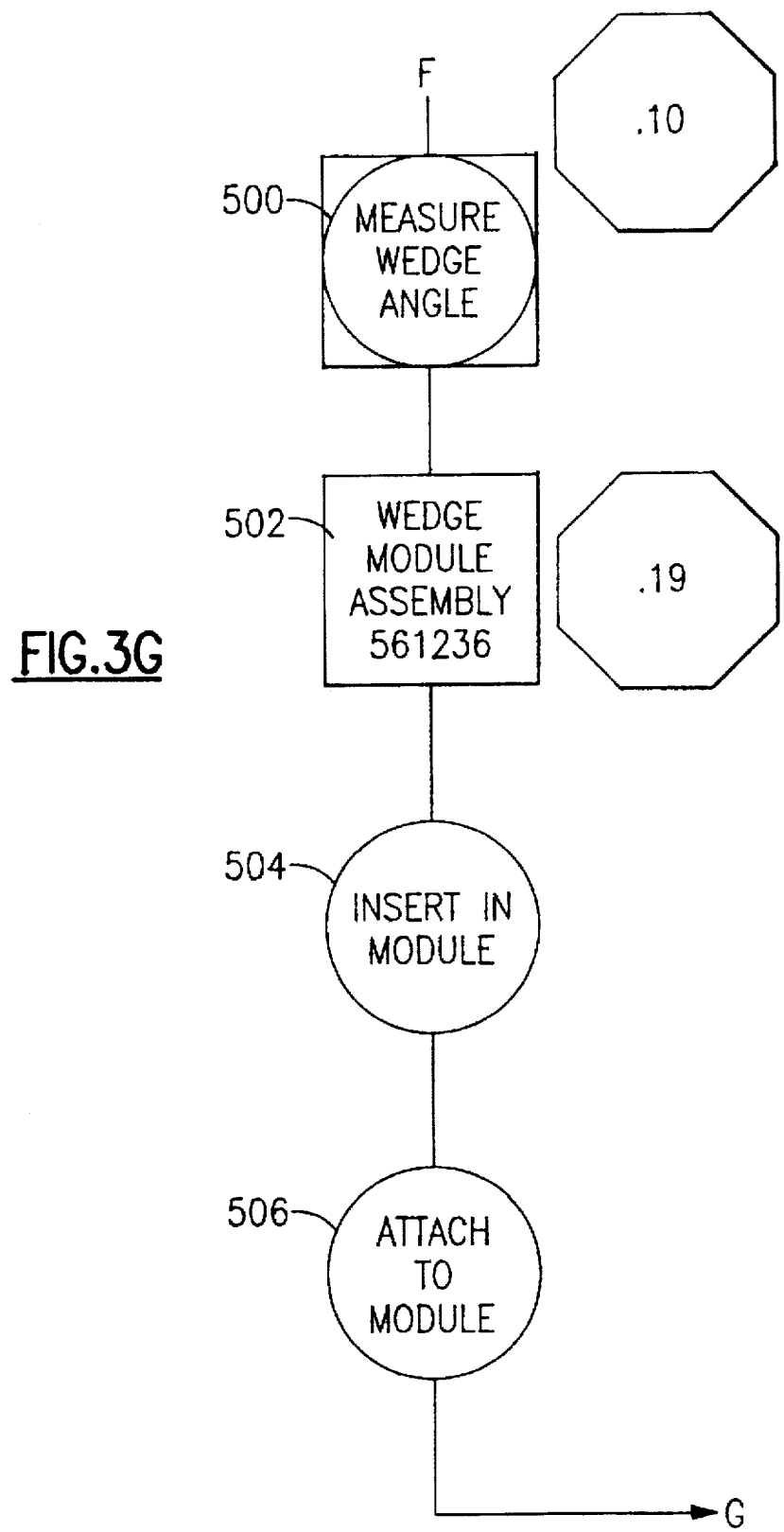
Figure 3H:
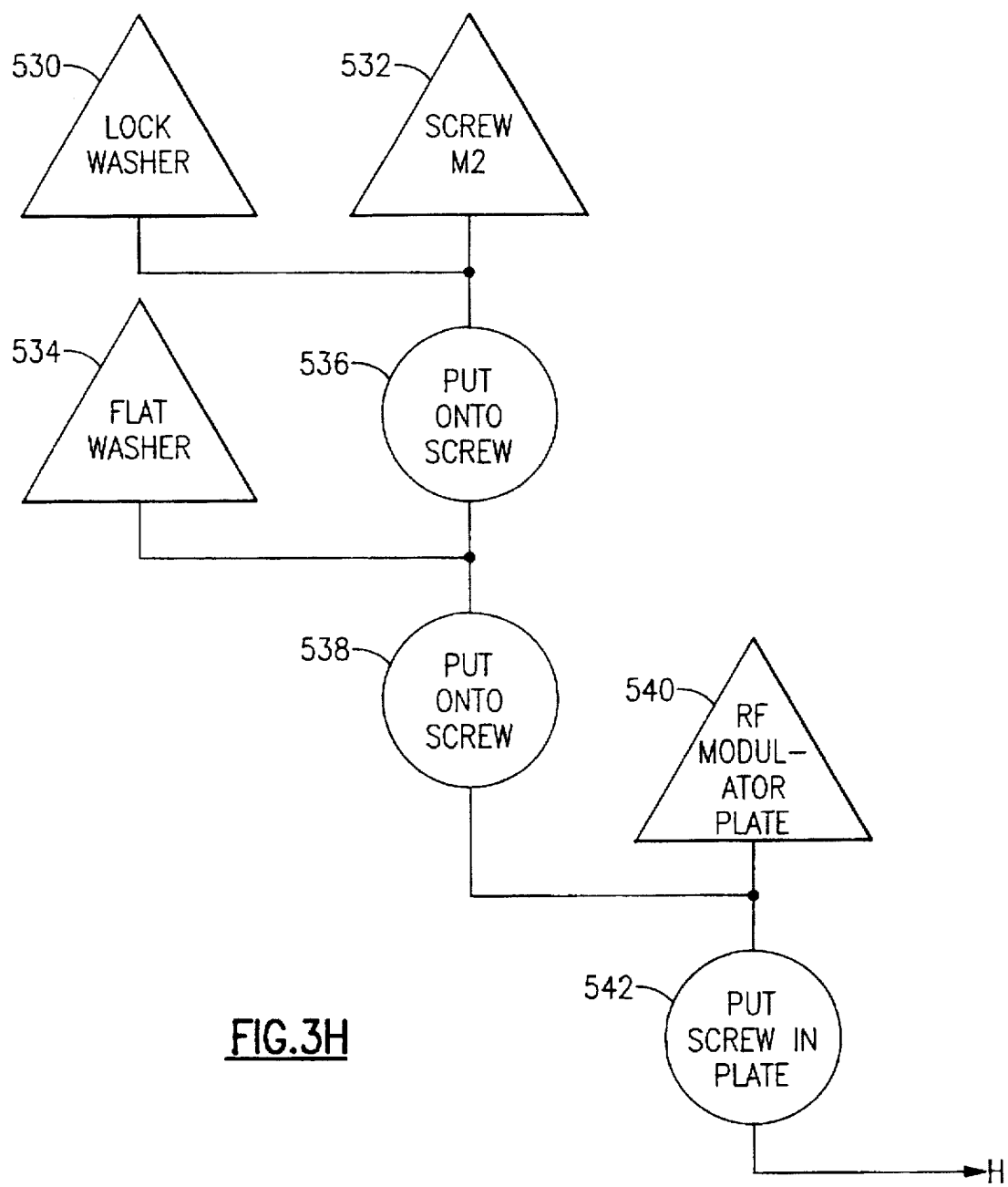
Figure 4A:
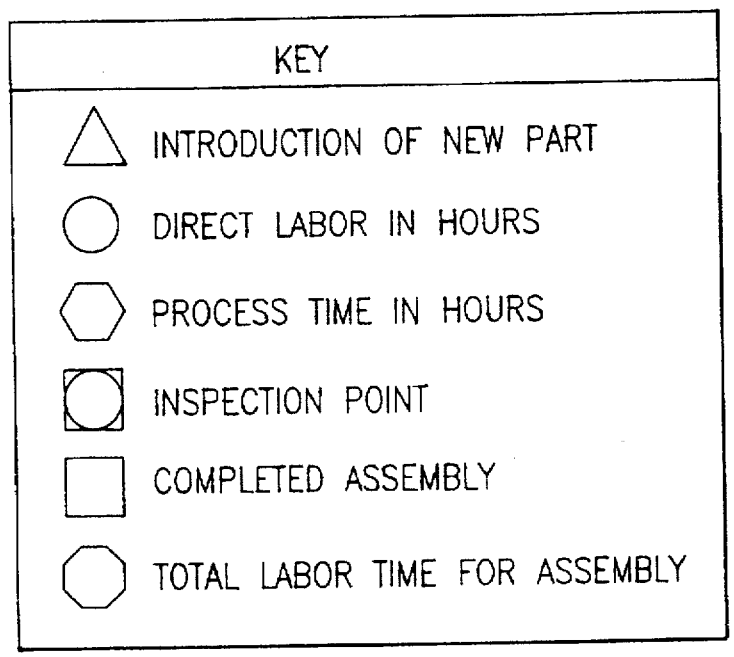
FIG. 4A is a graphical key defining the icons employed in FIGS. 3A–3M.
Figure 4B:
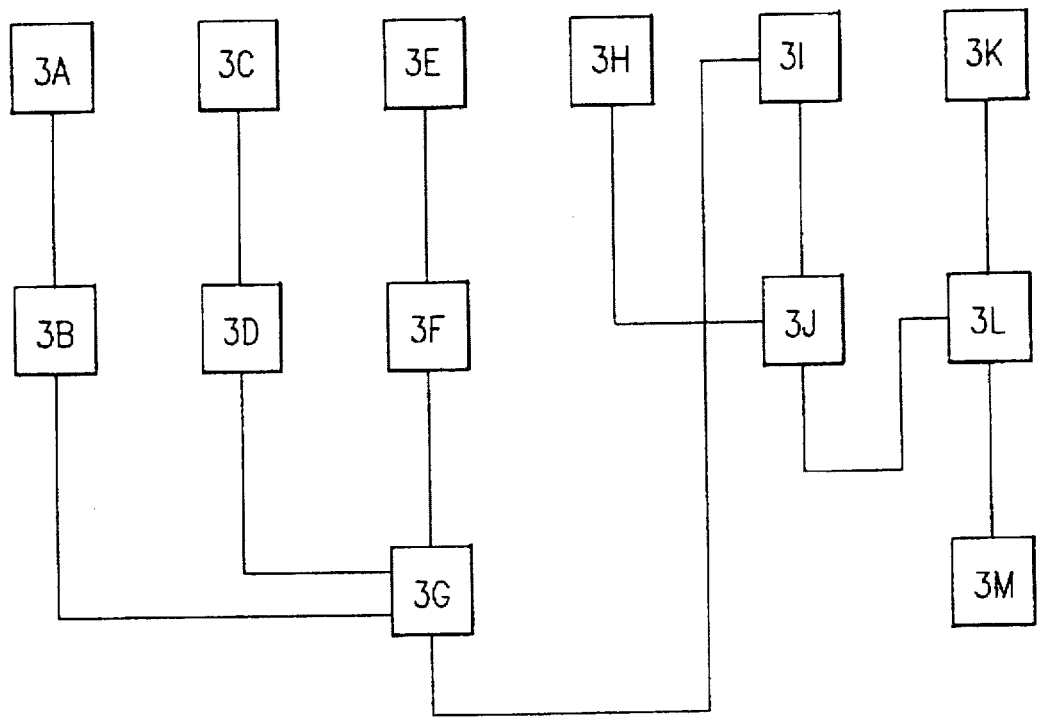
FIG. 4B is a diagram indicating the relationships of FIGS. 3A–3M.

Col. 24, line 24, please delete "FIG. 3" and insert --FIGS. 3F and 3G-- in place thereof.

Col. 24, line 26, please delete "FIG. 3" and insert --FIG. 3G-- in place thereof.

Col. 24, line 29, please insert --, FIG. 3B-- after the number "434" and before the ".".

Col. 25, line 29, please delete the word "an" and insert --another-- in place thereof.

Col. 25, line 32, please delete "FIG. 61" and insert --Fig. 61A-61C-- in place thereof.

Col. 25, line 37, please insert --in FIG. 61C-- after the number "3309" and before the ".".

Col. 25, line 39, please delete "FIG. 61" and insert --FIGS. 61A-61C-- in place thereof.

UNITED STATES PATENT AND TRADEMARK OFFICE
CERTIFICATE OF CORRECTION

PATENT NO. : 5,708,633  
DATED : January 13, 1998  
INVENTOR(S) : Hollen et al

Page 3 of 7

It is certified that error appears in the above-identified patent and that said Letters Patent is hereby corrected as shown below:

Col. 26, line 43, please insert --FIGS. 61A and 61B,-- after the number "3306" and before the word "the".

Col. 26, line 59, please delete "61" and insert --61C-- in place thereof.

Col. 27, line 7, please delete "61" and insert --61A-- in place thereof.

Col. 27, line 57, please insert --FIG. 61A-- after the number "3322" and before the word "accomplishes".

Col. 27, line 64, please insert --FIG. 61B-- after the number "3334" and before the ",".

Col. 28, line 6, please insert --FIG. 80,-- after the number "2284" and before the word "are".

Col. 28, line 7, please insert --FIG. 77-- after the number "2786" and before the ",".

Col. 28, line 45, please insert --, FIG. 61B-- after the number "3327" and before the word "by".

Col. 30, line 2, please delete "FIG. 87" and insert --FIGS. 86 and-- in place thereof.

Col. 31, line 29, please delete "6037-3" and insert --3037-3-- in place thereof.

Col. 32, line 26, please delete "3061" and insert --3062-- in place thereof.

Col. 32, line 36, please delete this entire line.

Col. 32, line 37, please delete the "US" at the beginning of the line and insert --Number 08/408,251, filed-- in place thereof.

Col. 32, line 38, please delete "3063" and insert --3064-- in place thereof.

Col. 32, line 39, please delete "3064" and insert --3065-- in place thereof.

Col. 35, line 33, please insert --, FIG. 61A,-- between the number "3329" and before the word "is".

Col. 35, line 67, please insert --, FIG. 61C,-- after the number "3328" and before the word "is".

Col. 36, line 14, please insert --, FIG. 61A,-- after the number "3330" and before the word "is".

Col. 36, line 19, please insert --included herein below-- after the number "3" and before the ".".

Col. 36, line 42, please insert --, FIG. 61A,-- after the number "3331" and before the word "can".

UNITED STATES PATENT AND TRADEMARK OFFICE
CERTIFICATE OF CORRECTION

PATENT NO. : 5,708,633  
DATED : January 13, 1998  
INVENTOR(S) : Hollen et al

It is certified that error appears in the above-identified patent and that said Letters Patent is hereby corrected as shown below:

Col. 36, line 54, please insert --2425-- after the word "medium" and before the word "are".

Col. 36, line 60, please insert --herein below-- after the word "disclosed" and before the word "in".

Col. 36, line 61, please insert --FIG. 61A-- after the number "3332," and before the ",".

Col. 37, line 1, please insert --FIG. 61B,-- after the number "3333" and before the ",".

Col. 37, line 5, please insert --FIG. 61B,-- after the number "3334" and before the word "is".

Col. 37, line 11, please insert --hereto-- after the number "5b" and before the ".".

Col. 37, line 11, please insert a --,-- after the word "particular".

Col. 37, line 25, please insert --, FIG. 61B,-- after the number "3334" and before the word "utilize".

Col. 37, line 28, please insert --, FIG. 61B,-- after the number "3341" and before the word "the".

Col. 37, line 30, please insert --, FIG. 78,-- after the number "2760" and before the word "for".

Col. 37, line 42, please insert --, FIG. 61C-- after the number "3344" and before the ".".

Col. 37, line 55, please insert --said method, prior to incorporating said objective lens in said actuator,-- after the word "disc," and before the word "comprising".

Col. 37, lines 55 and 56, please delete --prior to incorporating said objective lens in said actuator,--.

Col. 37, line 62, please delete the word --wherein-- after the word "deflector " and before the word "said".

Col. 37, line 62, please insert --so that-- after the word "deflector," and before the word "said".

Col. 37, line 65, please delete the " ; " after the word "deflector" and insert a --,-- in place thereof.

Col. 37, line 65, please insert --thereafter;-- after the word "and".

Col. 37, line 66, please delete the word "thereafter" before the word "inserting".

Col. 38, line 1, please delete the " , " after the number "1".

Col. 38, line 2, please delete the word "step" and insert --steps-- in place thereof.

Col. 38, line 9, please delete the " , " after the number "1".

Col. 38, line 18, please delete the " , " after the number "1".

UNITED STATES PATENT AND TRADEMARK OFFICE
CERTIFICATE OF CORRECTION

PATENT NO. : 5,708,633
DATED : January 13, 1998
INVENTOR(S) : Hollen et al

It is certified that error appears in the above-identified patent and that said Letters Patent is hereby corrected as shown below:

Col. 38, line 21, please delete the " , " after the number "1".
Col. 38, lines 26 and 27, please delete "after performing said step of inserting said objective lens in said actuator,".
Col. 38, line 28, please insert --after performing said step of inserting said objective lens in said actuator-- after the word "baseplate" and before the ".".
Col. 38, line 29, please delete the "," after the number "5".
Col. 38, line 30, please delete the word "comprises" and insert --includes-- in place thereof.
Col. 38, line 35, please delete the word "wherein" after the word "therefor," and before the word "said".
Col. 38, line 35, please delete the word "includes" and insert --including-- after the word "assembly" and before the word "a".
Col. 38, line 49, please insert --, and thereafter-- after the word "deflector" and before the ";".
Col. 38, line 50, please delete the word "thereafter" before the word "installing".
Col. 38, line 54, please delete the "," after the number "7" and before the word "further".
Col. 38, line 57, please delete the "," after the number "7" and before the word "wherein".
Col. 39, line 2, please delete the word "wherein" after the word "therefor," and before the word "said".
Col. 39, line 2, please delete the word "includes" and insert --including-- in place thereof.
Col. 39, line 21, please insert --, and thereafter-- after the word "pentaprism" and before the ";".
Col. 39, line 22, please delete the first word "thereafter".
Col. 39, line 28, please delete the " , " after the number "10".
Col. 39, line 30, please delete the " , " after the number "10".
Col. 39, line 31, please delete the word "comprises" and insert --includes-- in place thereof.
Col. 39, line 33, please delete the " , " after the number "10".
Col. 39, line 43, please delete the " , " after the number "10".
Col. 39, line 44, please delete the word "a" and insert --said-- in place thereof.
Col. 40, line 5, please delete the " , " after the number "10".
Col. 40, line 6, please delete the word "comprises" and insert the word --includes-- in place thereof.

UNITED STATES PATENT AND TRADEMARK OFFICE
CERTIFICATE OF CORRECTION

PATENT NO. : 5,708,633
DATED : January 13, 1998
INVENTOR(S) : Hollen et al

It is certified that error appears in the above-identified patent and that said Letters Patent is hereby corrected as shown below:

Col. 40, line 7, please insert --and said method-- after the word "motor," and before the word "further".

Col. 40, line 7, please delete the word "comprising" and insert --comprises-- in place thereof.

Col. 40, line 12, please delete "while said step of displacing is being performed,".

Col. 40, line 13, please insert --while said step of displacing is being performed,-- after the word "signal" and before the ".".

Col. 40, line 14, please delete the "," after the number "10" and before the word "wherein".

Col. 40, line 15, please delete the word "comprises" and insert the word --includes-- in place thereof.

Col. 40, line 17, please insert --and said method-- after the word "motor," and before the word further.

Col. 40, line 17, please delete the word "comprising" and insert --comprises-- in place thereof.

Col. 40, line 28, please delete the " , " after the number "10" and before the word "further".

UNITED STATES PATENT AND TRADEMARK OFFICE
CERTIFICATE OF CORRECTION

PATENT NO. : 5,708,633
DATED : January 13, 1998
INVENTOR(S) : Hollen et al

It is certified that error appears in the above-identified patent and that said Letters Patent is hereby corrected as shown below:

Col. 40, line 35, please delete "while said laser is actuated," before the word "linearly".
Col. 40, line 35, please insert --while said laser is actuated, and thereafter-- after the word "thereof" and before the " ; ".
Col. 40, line 36, please delete the word "thereafter" before the word "actuating".
Col. 40, line 40, please delete "while said step of reading is being performed," before the word "rotating".
Col. 40, line 41, please insert --while said step of reading is being performed,--. after " signal " .
Col. 40, line 41, please delete the " ; " after the word "signal" and before the word "and".

Signed and Sealed this

Eighteenth Day of May, 1999

Attest:

Attesting Officer

Q. TODD DICKINSON

Acting Commissioner of Patents and Trademarks